US009273245B2

(12) United States Patent
Gotoh et al.

(10) Patent No.: US 9,273,245 B2
(45) Date of Patent: *Mar. 1, 2016

(54) COMPOUND HAVING 2,2-DIFLUOROVINYLOXY GROUP OR 1,2,2-TRIFLUOROVINYLOXY GROUP, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Hiroki Ookawa, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,251

(22) Filed: Jul. 1, 2013

(65) Prior Publication Data

US 2014/0034876 A1 Feb. 6, 2014

(30) Foreign Application Priority Data

Jul. 26, 2012 (JP) ................................ 2012-165870

(51) Int. Cl.

*C09K 19/20* (2006.01)
*C09K 19/34* (2006.01)
*C09K 19/30* (2006.01)
*C09K 19/04* (2006.01)

(52) U.S. Cl.

CPC ............. *C09K 19/20* (2013.01); *C09K 19/3066* (2013.01); *C09K 19/3402* (2013.01); *C09K 2019/0444* (2013.01); *C09K 2019/0459* (2013.01); *C09K 2019/0466* (2013.01); *C09K 2019/3422* (2013.01)

(58) Field of Classification Search

CPC ............................ C09K 19/20; C09K 19/3402
USPC ......................... 252/299.61, 299.66; 549/370
See application file for complete search history.

(56) References Cited

U.S. PATENT DOCUMENTS 5,403,512 A 4/1995 Bartmann et al.
5,589,102 A * 12/1996 Bartmann et al. ....... 252/299.01
2003/0230737 A1 12/2003 Kirsch et al.
2008/0199635 A1 8/2008 Hirschmann et al.
2011/0001090 A1* 1/2011 Wittek et al. ............ 252/299.61
2011/0140039 A1* 6/2011 Wu et al. .................. 252/299.61
2011/0242473 A1* 10/2011 Haseba et al. ................ 349/139
2012/0009393 A1 1/2012 Koehler et al.
2012/0326085 A1 12/2012 Wittek et al.

FOREIGN PATENT DOCUMENTS

EP 0 844 229 5/1998

OTHER PUBLICATIONS

English abstract of DE 4445224, Jun. 20, 1996.
English abstract of DE 4428766, Mar. 2, 1995.
English abstract of DE 4326020, Feb. 9, 1995.
English abstract of DE 4434976, Apr. 4, 1996.
English abstract of DE 19525314, Jan. 16, 1997.
English abstract of DE 102007009944, Sep. 20, 2007.
English abstract of JP H8-040952, Feb. 13, 1996.

* cited by examiner

*Primary Examiner* — Chanceity Robinson

(74) *Attorney, Agent, or Firm* — Wenderoth, Lind & Ponack, L.L.P.

(57) ABSTRACT

To provide a liquid crystal compound having a high stability to light, a high clearing point, a low minimum temperature of a liquid crystal phase, a small viscosity, a suitable optical anisotropy, a large dielectric anisotropy, a suitable elastic constant and an excellent solubility in other liquid crystal compounds. The invention concerns a compound represented by formula (1), a liquid crystal composition containing the compound and a liquid crystal display device including the composition:

(1)

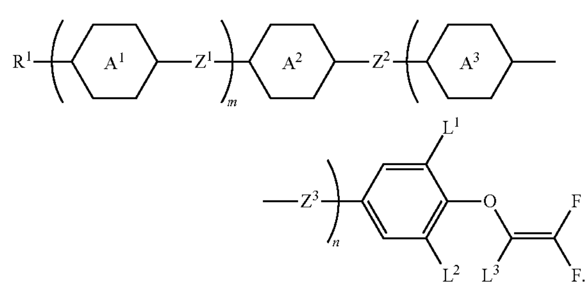

16 Claims, No Drawings

COMPOUND HAVING 2,2-DIFLUOROVINYLOXY GROUP OR 1,2,2-TRIFLUOROVINYLOXY GROUP, LIQUID CRYSTAL COMPOSITION AND LIQUID CRYSTAL DISPLAY DEVICE

TECHNICAL FIELD

The invention relates to a liquid crystal compound and a liquid crystal composition. More specifically, the invention relates to a compound having a 2,2-difluorovinyloxy group or a 1,2,2-trifluorovinyloxy group, a liquid crystal composition containing the compound and having a nematic phase, and a liquid crystal display device including the composition.

BACKGROUND ART

A liquid crystal display device is widely utilized for a display of a personal computer, a television and so forth. The device utilizes optical anisotropy, dielectric anisotropy or the like of the liquid crystal compound. As an operating mode of the liquid crystal display device, various modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

In such a liquid crystal display device, a liquid crystal composition having suitable physical properties is used. In order to further improve characteristics of the liquid crystal display device, the liquid crystal compound contained in the composition preferably has physical properties as represented in (1) to (8) below:

(1) high stability to heat, light and so forth;
(2) high clearing point;
(3) low minimum temperature of a liquid crystal phase;
(4) small viscosity (η);
(5) suitable optical anisotropy (Δn);
(6) large dielectric anisotropy (Δ∈);
(7) suitable elastic constant (K); and
(8) excellent solubility in other liquid crystal compounds.

An effect of the physical properties of the liquid crystal compound on the characteristics of the device is as described below. A compound having a high stability to heat, light and so forth as described in (1) increases a voltage holding ratio of the device. Thus, a service life of the device becomes long. A compound having a high clearing point as described in (2) extends a temperature range in which the device can be used. A compound having a low minimum temperature of a liquid crystal phase such as a nematic phase or a smectic phase as described in (3), particularly, a compound having a low minimum temperature of the nematic phase also extends the temperature range in which the device can be used. A compound having a small viscosity as described in (4) shortens a response time of the device.

A compound having a suitable optical anisotropy as described in (5) improves a contrast of the display device. According to a design of the display device, a compound having a large optical anisotropy or small optical anisotropy, more specifically, a compound having a suitable optical anisotropy is required. When shortening a response time by decreasing a cell gap of the display device, a compound having a large optical anisotropy is suitable. A compound having a large dielectric anisotropy as described in (6) decreases a threshold voltage of the display device. Thus, an electric power consumption of the display device becomes small. On the one hand, a compound having a small dielectric anisotropy, decreases a viscosity of the composition, and thus shortens a response time of the device.

With regard to (7), a compound having a large elastic constant shortens a response time of the display device. A compound having a small elastic constant decreases a threshold voltage of the display device. Accordingly, a suitable elastic constant is required according to characteristics to be desirably improved. A compound having an excellent solubility in other liquid crystal compounds as described in (8) is preferred. The reason is that physical properties of the composition are adjusted by mixing liquid crystal compounds having different physical properties.

Various kinds of liquid crystal compounds having a large dielectric anisotropy have been synthesized so far. The reason is that excellent physical properties that are not developed by a conventional compound are expected. The reason is that a suitable balance between two of physical properties required upon preparing the liquid crystal composition is expected for a new compound. Patent literature Nos. 1 to 7 describe a linear and cyclic compound having 2,2-difluorovinyloxy group.

Patent literature No. 8 describes a linear and cyclic compound (S-1) having a 1,3-dioxane ring.

Patent literature Nos. 9 to 12 describe compounds (S-2) to (S-5) having a $CF_2O$ bonding group and having a 2,2-difluorovinyloxy group.

Patent literature Nos. 13 to 14 describe compounds (S-6) to (S-7) having a bonding group other than a $CF_2O$ bonding group, and having a 2,2-difluorovinyloxy group.

Patent literature No. 15 describes compound (S-8).

Formula 1

(S-1)

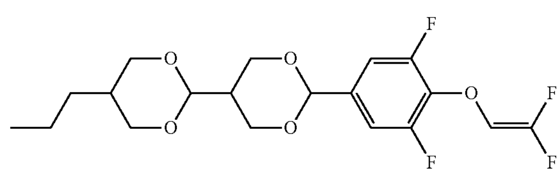

(S-2)

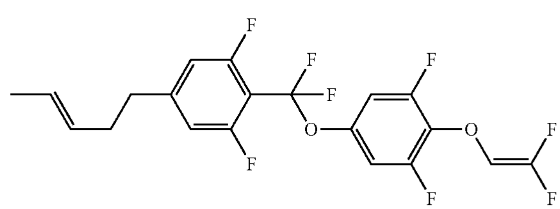

(S-3)

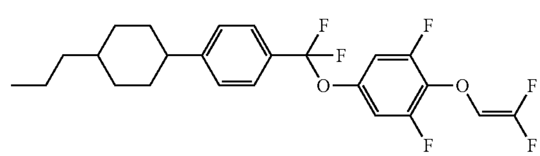

(S-4)

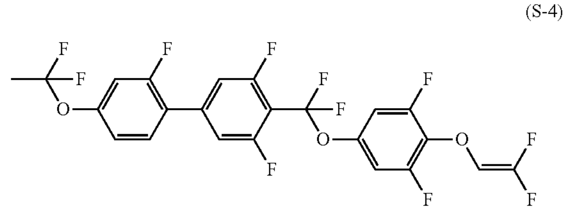

(S-5)

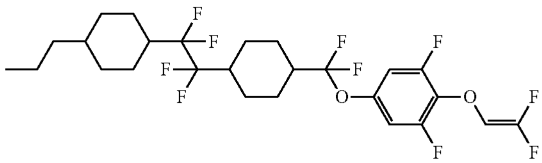

(S-6)

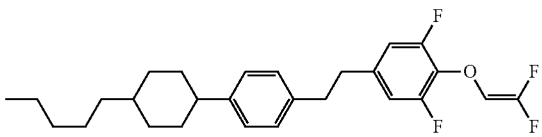

(S-7)

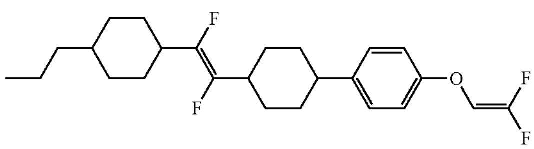

(S-8)

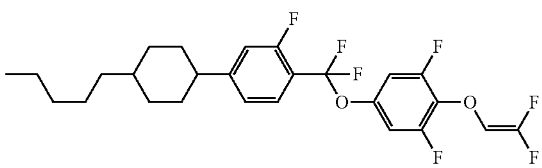

In view of such a situation, a development is desired for a compound having excellent physical properties and a suitable balance with regard to the physical properties described in (1) to (8).

CITATION LIST

Patent Literature

Patent literature No. 1: DE 4445224 A.
Patent literature No. 2: DE 4428766 A.
Patent literature No. 3: DE 102008004062 A.
Patent literature No. 4: DE 4326020 A.
Patent literature No. 5: DE 102009013710 A.
Patent literature No. 6: WO 2010/105730 A.
Patent literature No. 7: DE 4434976 A.
Patent literature No. 8: DE 19525314 A.
Patent literature No. 9: DE 102011011268 A.
Patent literature No. 10: DE 19531165 A.
Patent literature No. 11: DE 102007009944 A.
Patent literature No. 12: DE 10061790 A.

Patent literature No. 13: WO 92/21734 A.
Patent literature No. 14: JP H8-040952 A.
Patent literature No. 15: JP H10-204016 A.

SUMMARY OF INVENTION

Technical Problem

A first object of the invention is to provide a liquid crystal compound having a high stability to light, a high clearing point, a low minimum temperature of a liquid crystal phase, a small viscosity, a suitable optical anisotropy, a large dielectric anisotropy, a suitable elastic constant and an excellent solubility in other liquid crystal compounds. The object is to provide a compound having a particularly large dielectric anisotropy. The object is to provide a compound having a particularly high clearing point. A second object is to provide a liquid crystal composition containing the compound and having a high maximum temperature of a nematic phase, a low minimum temperature of the nematic phase, a small viscosity, a suitable optical anisotropy, a large dielectric anisotropy and a suitable elastic constant. The object is to provide a liquid crystal composition having a suitable balance regarding at least two of characteristics. A third object is to provide a liquid crystal display device including the composition and having a wide temperature range in which the device can be used, a short response time, a large voltage holding ratio, a large contrast ratio and a long service life.

Solution to Problem

The invention concerns a compound represented by formula (1), a liquid crystal composition containing the compound, and a liquid crystal display device including the composition.

Formula 2

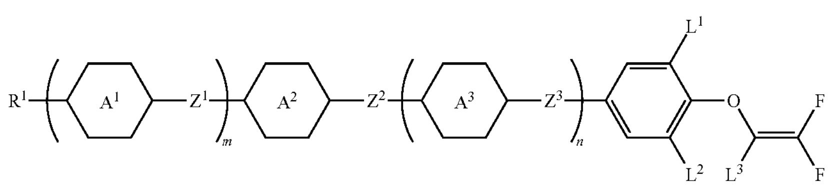

(1)

wherein, in the formula, $R^1$ is alkyl having 1 to 20 carbons, and in the alkyl, at least one of —$CH_2$— may be replaced by —O—, and at least one of —$(CH_2)_2$— may be replaced by —CH═CH—;

ring $A^1$, ring $A^2$ and ring $A^3$ are independently 1,4-cyclohexylene, 1,4-cyclohexenylene, 1,4- in which hydrogen may be replaced by halogen, tetrahydropyran-2,5-diyl or 1,3-dioxane-2,5-diyl;

$Z^1$ and $Z^3$ are independently a single bond, —$(CH_2)_2$—, —CH═CH—, —$CF_2O$—, —$CH_2O$—, —CF═CF—, —$(CH_2)_2CF_2O$—, —CH═CHCF$_2$O—, —$CF_2$—O—$(CH_2)_2$—, —$CF_2$OCH═CH—, —CH═CH—$(CH_2)_2$— or —$(CH_2)_2$—CH═CH—;

$Z^2$ is —$CF_2O$—;

$L^1$, $L^2$ and $L^3$ are independently hydrogen or halogen; and m and n are independently 0, 1, 2 or 3, and a sum of m and n is 0, 1, 2 or 3, and when m or n is 2 or 3, a plurality of ring $A^1$ or ring $A^3$ may be identical or different, and a plurality of $Z^1$ or $Z^3$ may be identical or different.

However, when ring $A^2$ is 1,4-phenylene, or 1,4-phenylene in which one of hydrogen is replaced by halogen, m is 1 and n is 0, ring $A^1$ is 1,4-phenylene in which hydrogen may be replaced by halogen, tetrahydropyran-2,5-diyl or 1,3-dioxane-2,5-diyl; and when a sum of m and n is 0, ring $A^2$ is 1,4-cyclohexylene, tetrahydropyran-2,5-diyl or 1,3-dioxane-2,5-diyl.

The invention also concerns a liquid crystal composition containing the compound.

The invention further concerns a liquid crystal display device including the composition.

Advantageous Effects of Invention

A first advantage of the invention is to provide a liquid crystal compound having a high stability to light, a high clearing point, a low minimum temperature of a liquid crystal phase, a small viscosity, a suitable optical anisotropy, a large dielectric anisotropy, a suitable elastic constant and an excellent solubility in other liquid crystal compounds. The advantage is to provide a compound having a particularly large dielectric anisotropy. The advantage is to provide a compound having a particularly high clearing point. A second advantage is to provide a liquid crystal composition containing the compound and having a high maximum temperature of a nematic phase, a low minimum temperature of the nematic phase, a small viscosity, a suitable optical anisotropy, a large dielectric anisotropy and a suitable elastic constant. The advantage is to provide a liquid crystal composition having a suitable balance regarding at least two of characteristics. A third advantage is to provide a liquid crystal display device including the composition and having a wide temperature range in which the device can be used, a short response time, a large voltage holding ratio, a large contrast ratio and a long service life.

DESCRIPTION OF EMBODIMENTS

Usage of terms herein is as described below. "Liquid crystal compound" is a generic term for a compound having a liquid crystal phase such as a nematic phase or a smectic phase, and a compound having no liquid crystal phase but being useful as a component of a liquid crystal composition. "Liquid crystal compound," liquid crystal composition," and "liquid crystal display device" may be occasionally abbreviated as "compound," "composition," and "device," respectively. "Liquid crystal display device" is a generic term for a liquid crystal display panel and a liquid crystal display module. "Clearing point" is a phase transition temperature between the liquid crystal phase and an isotropic phase in the liquid crystal compound. "Minimum temperature of the liquid crystal phase" is a phase transition temperature between a solid and the liquid crystal phase (smectic phase, nematic phase or the like) in the liquid crystal compound. "Maximum temperature of the nematic phase" is a phase transition temperature between the nematic phase and the isotropic phase in the liquid crystal composition, and may be occasionally abbreviated as "maximum temperature." A minimum temperature of the nematic phase may be occasionally abbreviated as "minimum temperature." A compound represented by formula (1) may be occasionally abbreviated as "compound (1)." The abbreviation may be occasionally applied to a compound represented by formula (2) or the like. In formulas (1) to (14), a symbol such as $A^1$, $B^1$ and $C^1$ surrounded by a hexagonal shape corresponds to ring $A^1$, ring $B^1$, ring $C^1$ or the like, respectively. A plurality of $R^2$ are described in identical formulas or different formulas. In the compounds, two groups represented by two of arbitrary $R^2$ may be identical or different. A same rule also applies to a symbol such as ring $A^1$ and $Z^1$. An amount of compound expressed in terms of percentage is expressed in terms of weight percent (% by weight) based on the total weight of the composition.

An expression "at least one of "A" may be replaced by "B"" means that, when the number of "A" is one, a position of "A" is arbitrary, and also when the number of "A" is two or more, positions thereof can be selected without limitation. An expression "at least one of A may be replaced by B, C or D" includes a case where arbitrary A is replaced by B, a case where arbitrary A is replaced by C, a case where arbitrary A is replaced by D, and also a case where a plurality of A are replaced by at least two of B, C and D. For example, alkyl in which at least one of $—CH_2—$ may be replaced by —O— or —CH=CH—" includes alkyl, alkenyl, alkoxy, alkoxyalkyl, alkoxyalkenyl and alkenyloxyalkyl. In addition, replacement of two successive $—CH_2—$ by —O— to form —O—O— or the like is not preferred. In alkyl or the like, replacement of $—CH_2—$ in a methyl part ($—CH_2—H$) by —O— to form —O—H is not preferred, either.

Then, 2-fluoro-1,4-phenylene means inclusion of two divalent groups described below. In the chemical formula, fluorine may be bonded in a left (L) or right (R) direction. A same rule also applies to an asymmetric divalent ring such as tetrahydropyran-2,5-diyl.

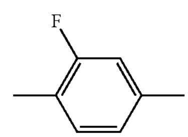
(L)

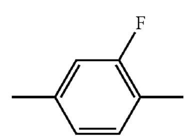
(R)

The invention includes the content as described in item 1 to item 16 below.

Item 1. A compound represented by formula (1):

Formula 3

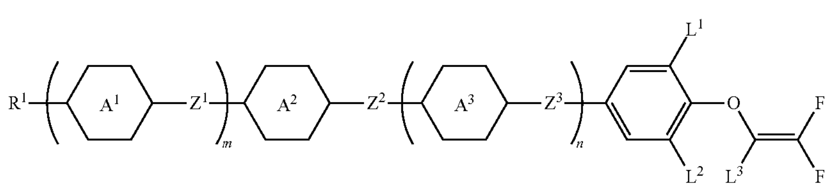
(1)

wherein, in the formula, $R^1$ is alkyl having 1 to 20 carbons, and in the alkyl, at least one of —$CH_2$— may be replaced by —O—, and at least one of —$(CH_2)_2$— may be replaced by —CH═CH—;

ring $A^1$, ring $A^2$ and ring $A^3$ are independently 1,4-cyclohexylene, 1,4-cyclohexenylene, 1,4-phenylene in which hydrogen may be replaced by halogen, tetrahydropyran-2,5-diyl or 1,3-dioxane-2,5-diyl;

$Z^1$ and $Z^3$ are independently a single bond, —$(CH_2)_2$—, —CH═CH—, —$CF_2O$—, —$CH_2O$—, —CF═CF—, —$(CH_2)_2CF_2O$—, —CH═CHC$F_2$O—, —$CF_2$—O—$(CH_2)_2$—, —$CF_2$OCH═CH—, —CH═CH—$(CH_2)_2$— or —$(CH_2)_2$—CH═CH—;

$Z^2$ is —$CF_2O$—;

$L^1$, $L^2$ and $L^3$ are independently hydrogen or halogen; and m and n are independently 0, 1, 2 or 3, and a sum of m and n is 0, 1, 2 or 3, and when m or n is 2 or 3, a plurality of ring $A^1$ or ring $A^3$ may be identical or different, and a plurality of $Z^1$ or $Z^3$ may be identical or different.

However, when ring $A^2$ is 1,4-phenylene, or 1,4-phenylene in which one of hydrogen is replaced by halogen, m is 1 and n is 0, ring $A^1$ is 1,4-phenylene in which hydrogen may be replaced by halogen, tetrahydropyran-2,5-diyl or 1,3-dioxane-2,5-diyl; and when a sum of m and n is 0, ring $A^2$ is 1,4-cyclohexylene, tetrahydropyran-2,5-diyl or 1,3-dioxane-2,5-diyl.

Item 2. The compound according to item 1, wherein $R^1$ is alkyl having 1 to 20 carbons or alkenyl having 2 to 20 carbons;

ring $A^1$, ring $A^2$ and ring $A^3$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl;

$Z^1$ and $Z^3$ are independently a single bond, —CH═CH— or —$CF_2O$—; and $L^1$, $L^2$ and $L^3$ are independently hydrogen or fluorine.

Item 3. The compound according to item 1 or 2, wherein m is 1 or 2.

Item 4. The compound according to any one of items 1 to 3, wherein ring $A^2$ is 1,4-cyclohexylene, 1,4-phenylene, 2-fluoro-1,4-phenylene or 2,6-difluoro-1,4-phenylene.

Item 5. The compound according to any one of items 1 to 4, wherein $Z^1$ is a single bond.

Item 6. The compound according to any one of items 1 to 5, wherein n is 0.

Item 7. A compound represented by any one of formula (1-1) to formula (1-5):

Formula 4

(1-1)

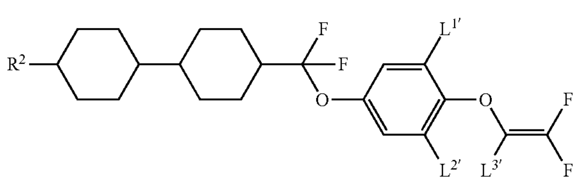

-continued (1-2)

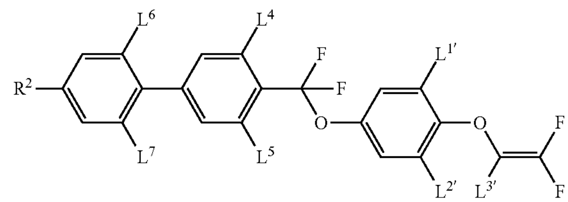

(1-3)

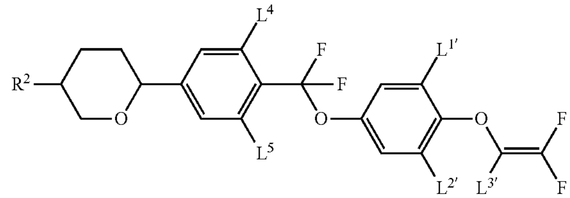

(1-4)

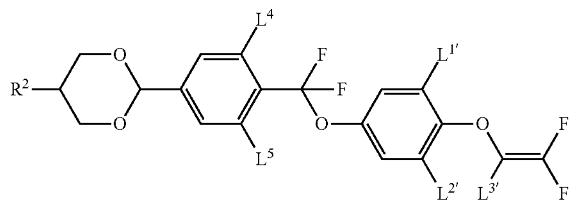

(1-5)

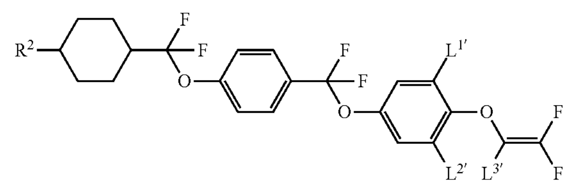

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$ and $L^7$ are independently hydrogen or fluorine.

Item 8. A compound represented by any one of formula (1-6) to formulas (1-11):

Formula 5

(1-6)

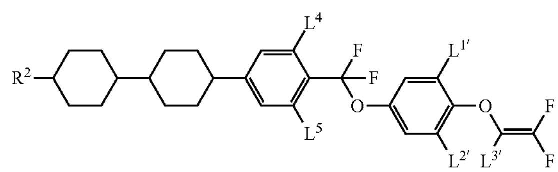

(1-7)

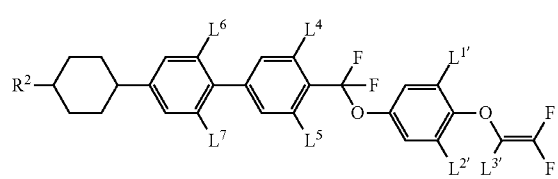

-continued (1-8)

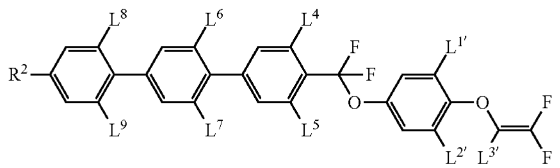

(1-9)

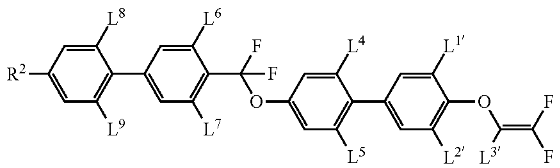

(1-10)

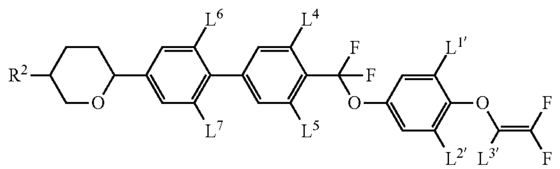

(1-11)

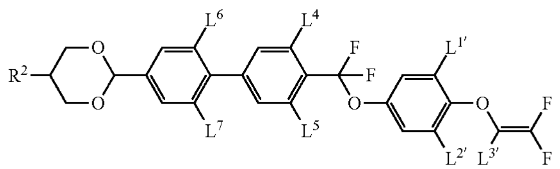

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$, $L^7$, $L^8$ and $L^9$ are independently hydrogen or fluorine.

Item 9. A liquid crystal composition containing at least one of compound according to any one of items 1 to 8:

Item 10. The liquid crystal composition according to item 9, further containing at least one of compound selected from the group of compounds represented by formulas (2) to (4):

Formula 6

(2)

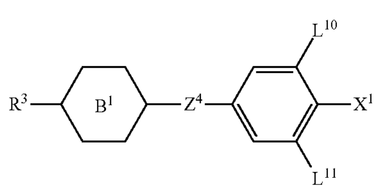

(3)

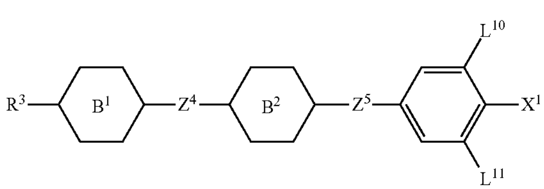

-continued (4)

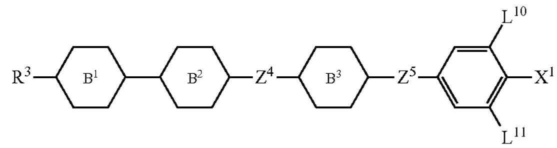

wherein, in the formulas, $R^3$ is alkyl having 1 to 10 carbons or alkenyl having 2 to 10 carbons, and in the alkyl and the alkenyl, at least one of hydrogen may be replaced by fluorine, and at least one of $—CH_2—$ may be replaced by —O—;

$X^1$ is fluorine, chlorine, $—OCF_3$, $—OCF_2H$, $—CF_3$, $—CHF_2$, $—CH_2F$, $—CF{=}CF_2$, $—OCF_2CHF_2$ or $—OCF_2CHFCF_3$;

ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl;

$Z^4$ and $Z^5$ are independently a single bond, $—(CH_2)_2—$, $—CH{=}CH—$, $—C{\equiv}C—$, —COO—, $—CF_2O—$, $—OCF_2—$, $—CH_2O—$ or $—(CH_2)_4—$, and $Z^4$ and $Z^5$ are not simultaneously $—CF_2O—$ or $—OCF_2—$; and $L^{10}$ and $L^{11}$ are independently hydrogen or fluorine.

Item 11. The liquid crystal composition according to item 9, further containing at least one of compound selected from the group of compounds represented by formula (5):

Formula 7

(5)

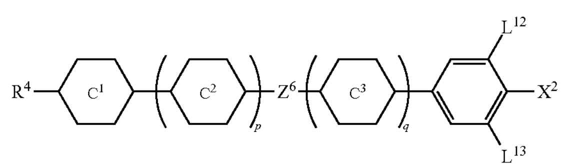

wherein, in the formula, $R^4$ is alkyl having 1 to 10 carbons or alkenyl having 2 to 10 carbons, and in the alkyl and the alkenyl, at least one of hydrogen may be replaced by fluorine, and at least one of $—CH_2—$ may be replaced by —O—;

$X^2$ is $—C{\equiv}N$ or $—C{\equiv}C—C{\equiv}N$;

Ring $C^1$, ring $C^2$ and ring $C^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^6$ is a single bond, $—(CH_2)_2—$, $—C{\equiv}C—$, —COO—, $—CF_2O—$, $—OCF_2—$ or $—CH_2O—$;

$L^{12}$ and $L^{13}$ are independently hydrogen or fluorine; and p is 0, 1 or 2, q is 0 or 1, and a sum of p and q is 0, 1, 2 or 3.

Item 12. The liquid crystal composition according to item 9, further containing at least one of compound selected from the group of compounds represented by formulas (6) to (11):

Formula 8

(6)

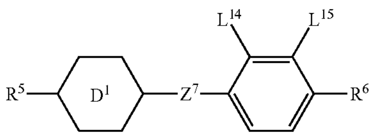

(7)

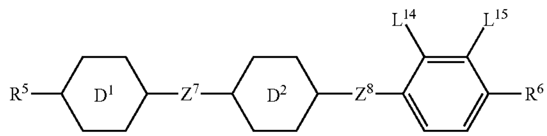

(8)

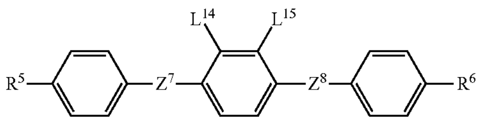

(9)

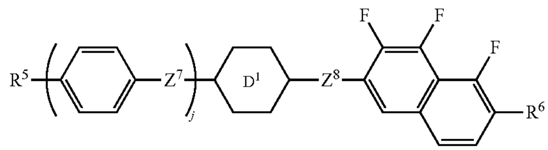

(10)

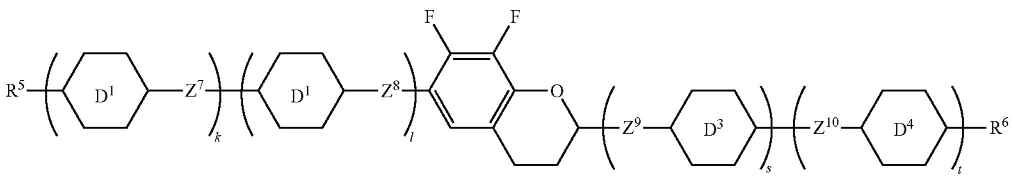

(11)

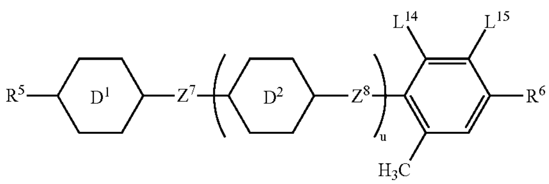

wherein, in the formulas, $R^5$ and $R^6$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydro-2,6-naphthalene;

$Z^7$, $Z^8$, $Z^9$ and $Z^{10}$ are independently a single bond, —$(CH_2)_2$—, —COO—, —$CH_2O$—, —$OCF_2$— or —$OCF_2(CH_2)_2$—;

$L^{14}$ and $L^{15}$ are independently fluorine or chlorine; and j, k, l, s, t and u are independently 0 or 1, and a sum of k, l, s and t is 1 or 2.

Item 13. The liquid crystal composition according to any one of items 9 to 12, further containing at least one of compound selected from the group of compounds represented by formulas (12) to (14):

Formula 9

(12)

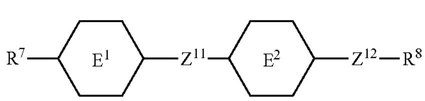

(13)

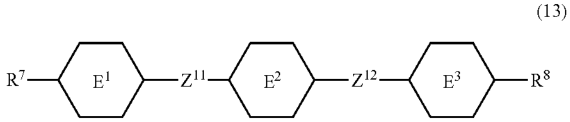

-continued (14)

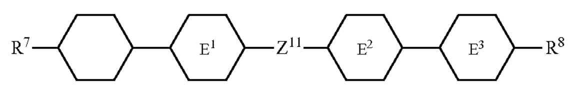

wherein, in the formulas, $R^7$ and $R^8$ are independently alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and $Z^{11}$ and $Z^{12}$ are independently a single bond, —$(CH_2)_2$—, —CH═CH—, —C≡C— or —COO—.

Item 14. The liquid crystal composition according to item 9, further containing at least one of optically active compound.

Item 15. The liquid crystal composition according to item 9, further containing at least one of antioxidant and/or ultraviolet light absorber.

Item 16. A liquid crystal display device including the liquid crystal composition according to any one of items 9 to 15.

The compound, the liquid crystal composition and the liquid crystal display device according to the invention will be explained in the order.

1-1. Compound (1)

The compound of the invention has a 2,2-difluorovinyloxy group and —$CF_2O$— in a structure, and thus produces an effect such as a small viscosity, a large dielectric anisotropy and a high clearing point.

Compound (1) and preferred examples of compound (1) according to the invention will be explained. Preferred examples of a terminal group, a ring structure, a bonding group and a substituent in compound (1) are also applied to the formula below of compound (1).

Formula 10

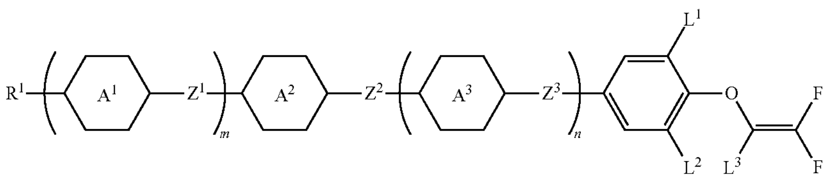

(1)

wherein, in formula (1), $R^1$ is alkyl having 1 to 20 carbons, and in the alkyl, at least one of —$CH_2$— may be replaced by —O—, and at least one of —$(CH_2)_2$— may be replaced by —CH═CH—.

The groups have a straight chain, and do not include a cyclic group such as cyclohexyl. When the groups have the straight chain, a temperature range of a liquid crystal phase of a compound is wide and viscosity is small.

Examples of the alkyl include ordinarily straight-chain alkyl having 1 to 20 carbons, preferably, straight-chain alkyl having 1 to 15 carbons, further preferably, straight-chain alkyl having 1 to 5 carbons. Specific examples include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

A specific example of groups in which, in the alkyl, at least one of —$(CH_2)_2$— is replaced by —CH═CH— includes alkenyl. A preferred configuration of —CH═CH— in the alkenyl depends on a position of a double bond. A trans configuration is preferred in alkenyl having the double bond in an odd-numbered position, such as —CH═$CHCH_3$, —CH═$CHC_2H_5$, —CH═$CHC_3H_7$, —CH═$CHC_4H_9$, —$C_2H_4$—CH═$CHCH_3$ and —$C_2H_4$—CH═$CHC_2H_5$. A cis configuration is preferred in alkenyl having the double bond in an even-numbered position, such as —$CH_2CH$═$CHCH_3$, —$CH_2CH$═$CHC_2H_5$ and —$CH_2CH$═$CHC_3H_7$. An alkenyl compound having a preferred configuration has a high clearing point or a wide temperature range of the liquid crystal phase. A detailed description is found in Mol. Cryst. Liq. Cryst., 1985, 131, 109 and Mol. Cryst. Liq. Cryst., 1985, 131, 327.

Examples of the alkenyl include ordinarily alkenyl having 2 to 20 carbons, preferably, alkenyl having 2 to 15 carbons, further preferably, alkenyl having 2 to 6 carbons. Specific examples include —CH═$CH_2$, —CH═$CHCH_3$, —$CH_2CH$═$CH_2$, —CH═$CHC_2H_5$, —$CH_2CH$═$CHCH_3$, —$(CH_2)_2$—CH═$CH_2$, —CH═$CHC_3H_7$, —$CH_2CH$═$CHC_2H_5$, —$(CH_2)_2$—CH═$CHCH_3$ and —$(CH_2)_3$—CH═$CH_2$.

Specific examples of groups in which, in the alkyl, at least one of —$CH_2$— is replaced by —O— include alkoxy and alkoxyalkyl. Examples of the alkoxy include ordinarily alkoxy having 1 to 20 carbons, preferably, alkoxy having 1 to 15 carbons, further preferably, alkoxy having 1 to 5 carbons. Specific examples include —$OCH_3$, —$OC_2H_5$, —$OC_3H_7$, —$OC_4H_9$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$, —$OC_{14}H_{29}$ and —$OC_{15}H_{31}$. Specific examples of the alkoxyalkyl include groups formed by introducing one oxygen atom into the alkyl, and include ordinarily alkoxyalkyl having 2 to 20 carbons, preferably, alkoxyalkyl having 2 to 15 carbons, further preferably, alkoxyalkyl having 2 to 6 carbons. Specific examples include —$CH_2OCH_3$, —$CH_2OC_2H_5$, —$CH_2OC_3H_7$ and —$(CH_2)_2OC_2H_5$.

Alkyl represented by $R^1$ also includes groups in which at least one of —$(CH_2)_2$— in the alkyl is replaced by] —CH═CH—, and at least one of —$CH_2$— in the alkyl is replaced by —O—. Specific examples of such groups include —$OCH_2CH$═$CH_2$ and —$OCH_2CH$═$CHCH_3$.

Preferred examples of $R^1$ include alkyl having 1 to 15 carbons and alkenyl having 2 to 15 carbons. Further preferred example of $R^1$ include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$, —$C_{15}H_{31}$, —CH═$CH_2$, —CH═$CHCH_3$, —$CH_2CH$═$CH_2$, —CH═$CHC_2H_5$, —$CH_2CH$═$CHCH_3$, —$(CH_2)_2$—CH═$CH_2$, —CH═$CHC_3H_7$, —$CH_2CH$═$CHC_2H_5$, —$(CH_2)_2$—CH═$CHCH_3$ and —$(CH_2)_3$—CH═$CH_2$. Particularly preferred examples include —$CH_3$, —$C_2H_5$, —$C_3H_7$, —$C_4H_9$, —$C_5H_{11}$, —CH═$CH_2$ and —$(CH_2)_2$—CH═$CH_2$.

In formula (1), ring $A^1$ is 1,4-cyclohexylene, 1,4-cyclohexenylene, 1,4-phenylene in which hydrogen may be replaced by halogen, tetrahydropyran-2,5-diyl or 1,3-dioxane-2,5-diyl.

Preferred examples of ring $A^1$ include 1,4-cyclohexylene, 1,4-phenylene, 2-fluoro-1,4-phenylene, tetrahydropyran-2,5-diyl or 1,3-dioxane-2,5-diyl.

In formula (1), ring $A^2$ is 1,4-cyclohexylene, 1,4-cyclohexenylene, 1,4-phenylene in which hydrogen may be replaced by halogen, tetrahydropyran-2,5-diyl or 1,3-dioxane-2,5-diyl.

Preferred examples of ring $A^2$ include 1,4-cyclohexylene, 1,4-phenylene, 2-fluoro-1,4-phenylene or 2,6-difluoro-1,4-phenylene.

Most preferred examples of ring $A^2$ include 1,4-cyclohexylene or 2,6-difluoro-1,4-phenylene.

In formula (1), ring $A^3$ is 1,4-cyclohexylene, 1,4-cyclohexenylene, 1,4-phenylene in which hydrogen may be replaced by halogen, tetrahydropyran-2,5-diyl or 1,3-dioxane-2,5-diyl.

Preferred examples of ring $A^3$ include 1,4-cyclohexylene, 1,4-phenylene, 2-fluoro-1,4-phenylene or 2,6-difluoro-1,4-phenylene.

Most preferred examples of ring $A^3$ include 1,4-cyclohexylene or 1,4-phenylene.

Preferred examples of 2-fluoro-1,4-phenylene, 2,6-difluoro-1,4-phenylene, tetrahydropyran-2,5-diyl or 1,3-dioxane-2,5-diyl in ring $A^1$, ring $A^2$ and ring $A^3$ include groups (R-1) to (R-4).

Formula 11

(R-1)

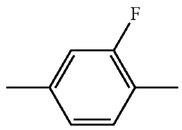

(R-2)

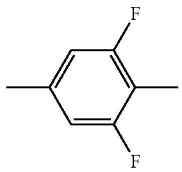

(R-3)

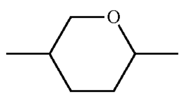

(R-4)

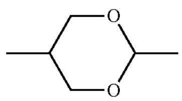

wherein, in formula (1), $Z^1$ is a single bond, —$(CH_2)_2$—, —CH═CH—, —$CF_2O$—, —$CH_2O$—, —CF═CF—, —$(CH_2)_2CF_2O$—, —CH═CH$CF_2O$—, —$CF_2$—O—$(CH_2)_2$—, —$CF_2$OCH═CH—, —CH═CH—$(CH_2)_2$— or —$(CH_2)_2$—CH═CH—.

Preferred examples of $Z^1$ include a single bond, —$(CH_2)_2$—, —CH═CH—, —$CF_2O$— or —$CH_2O$—.

Most preferred examples of $Z^1$ include a single bond or —$CF_2O$—.

In formula (1), $Z^2$ is —$CF_2O$—.

In formula (1), $Z^3$ is a single bond, —$(CH_2)_2$—, —CH═CH—, —$CF_2O$—, —$CH_2O$—, —CF═CF—, —$(CH_2)_2CF_2O$—, —CH═CH$CF_2O$—; —$CF_2O(CH_2)_2$—, —$CF_2$OCH═CH—, —CH═CH—$(CH_2)_2$— or —$(CH_2)_2$—CH═CH—.

Preferred examples of $Z^3$ include a single bond, —$(CH_2)_2$—, —CH═CH—, —$CF_2O$— or —$CH_2O$—.

Most preferred examples of $Z^3$ include a single bond or —$CF_2O$—.

In formula (1), $L^1$, $L^2$ and $L^3$ are independently hydrogen or halogen. Preferred $L^1$, $L^2$ and $L^3$ are independently hydrogen, fluorine or chlorine, and further preferred $L^1$, $L^2$ and $L^3$ are independently hydrogen or fluorine.

In formula (1), m and n are independently 0, 1, 2 or 3, and when m or n is 2, two of ring $A^1$ or ring $A^3$ may be identical or different, and two of $Z^1$ or $Z^3$ may be identical or different.

Moreover, a sum of m and n is ordinarily 0, 1, 2 or 3, preferably, 1 or 2.

1-2. Physical Properties of Compound (1)

When kinds of $R^1$, ring $A^1$, ring $A^2$, ring $A^3$, $Z^1$, $Z^2$, $Z^3$, $L^1$, $L^2$, m and n are suitably combined in compound (1), physical properties such as a clearing point, optical anisotropy and dielectric anisotropy can be arbitrarily adjusted. Compound (1) may also contain isotopes such as $^2H$ (deuterium) and $^{13}C$ in an amount higher than an amount of natural abundance because no significant difference is present in the physical properties of the compound. Main effects of kinds of $R^1$ or the like on the physical properties of compound (1) will be explained below.

When left-terminal group $R^1$ is straight-chain alkyl, the temperature range of the liquid crystal phase is wide, and the viscosity is small, and compound (1) is useful as a component of the composition. When $R^1$ is alkenyl, a preferred configuration depends on a position of a double bond. An alkenyl compound having the preferred configuration has a high maximum temperature or a wide temperature range of the liquid crystal phase.

When all of ring $A^1$, ring $A^2$ and ring $A^3$ are 1,4-cyclohexylene, the clearing point is high and the viscosity is small. When at least one of ring $A^1$, ring $A^2$ and ring $A^3$ is 1,4-phenylene or 1,4-phenylene in which at least one of hydrogen is replaced by halogen (fluorine or chlorine, for example), the optical anisotropy is relatively large and an orientational order parameter is relatively large. When at least one of ring $A^1$, ring $A^2$ and ring $A^3$ is 2,6-difluoro-1,4-phenylene, the dielectric anisotropy is positively large.

When the bonding group is a single bond, —$(CH_2)_2$—, —CH═CH—, —$CF_2O$—, —$CH_2O$—, —CF═CF—, —$(CH_2)_2$—$CF_2O$— or —$OCF_2$— $(CH_2)_2$—, the viscosity is small. When the bonding group is a single bond, —$(CH_2)_2$—, —$CF_2O$— or —CH═CH—, the viscosity is smaller. When the bonding group is —CH═CH—, the temperature range of the liquid crystal phase is wide, and an elastic constant (K) is large, and when the bonding group is a single bond or —$(CH_2)_2$—, chemical stability is high.

When both $L^1$ and $L^2$ are fluorine and $L^3$ is hydrogen, the chemical stability is high, the temperature range of the liquid crystal phase is wide, and the dielectric anisotropy is large.

When a sum of n and m is 0, the viscosity is small. When a sum of n and m is 3, the maximum temperature is high.

As described above, when kinds of the ring structure, the terminal group, the bonding group or the like are suitably selected, a compound having objective physical properties can be obtained. Accordingly, compound (1) is useful as a component of the liquid composition to be used for a liquid crystal display device having a mode such as a PC, TN, STN, ECB, OCB, IPS or VA mode.

1-3. Preferred Compound

As described above, preferred examples of compound (1) include compounds (1-1) to (1-5) (when a sum of n and m is 2), and compounds (1-6) to (1-11) (when a sum of n and m is 3).

Formula 12

(1-1)

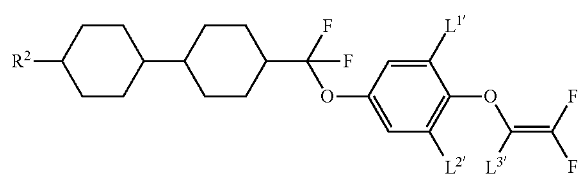

(1-2)

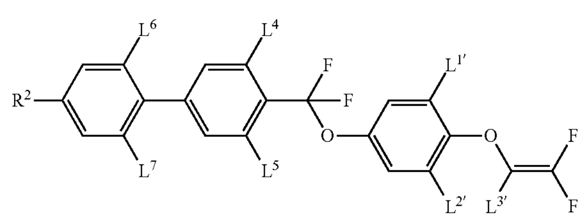

-continued (1-3)

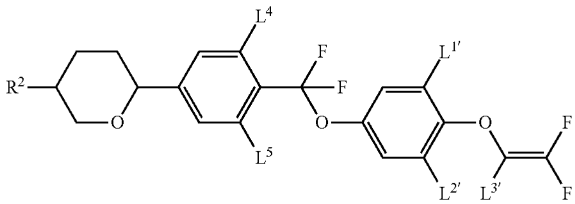

(1-4)

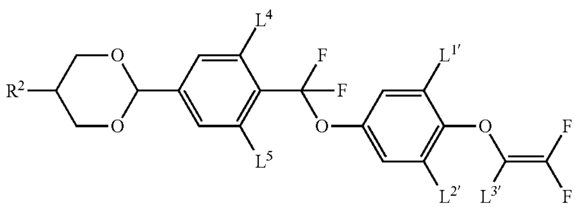

(1-5)

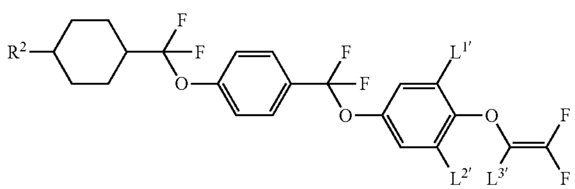

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$ and $L^7$ are independently hydrogen or fluorine.

Formula 13

(1-6)

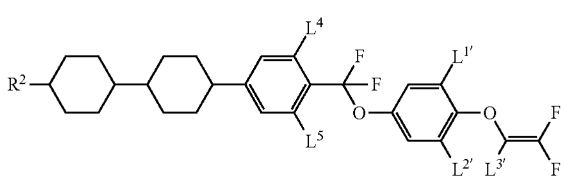

(1-7)

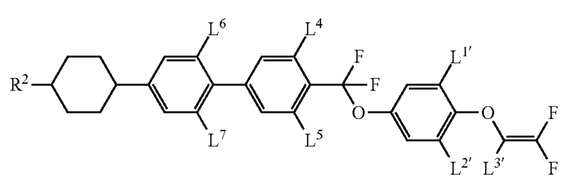

-continued (1-8)

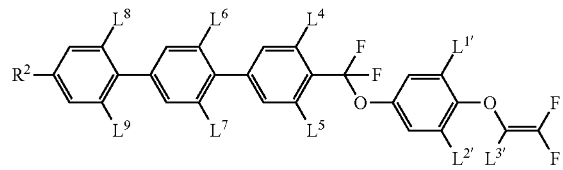

(1-9)

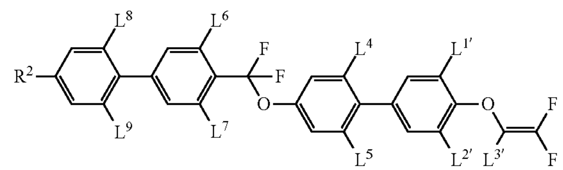

(1-10)

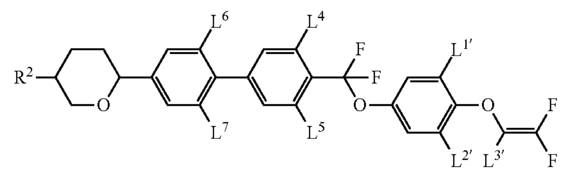

(1-11)

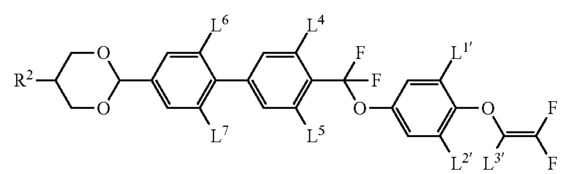

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$, $L^7$, $L^8$ and $L^9$ are independently hydrogen or fluorine.

1-4. Synthesis of Compound (1)

A process for synthesizing compound (1) will be explained. Compound (1) can be prepared by suitably combining methods in synthetic organic chemistry. Methods for introducing an objective terminal group, ring and bonding group into a starting material are described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course (Shin Jikken Kagaku Koza in Japanese)" (Maruzen Co., Ltd.).

1-4-1. Formation of a Bonding Group

An example of a method for forming a bonding group in compound (1) is as described in a scheme below. In the scheme, $MSG^1$ (or $MSG^2$) is a monovalent organic group having at least one ring. A plurality of monovalent organic groups represented by $MSG^1$ (or $MSG^2$) may be identical or different. Compounds (1A) to (1i) correspond to compound (1).

Formula 14

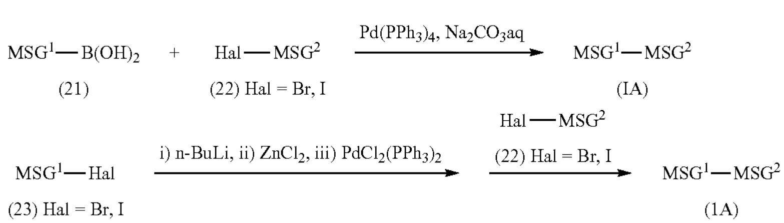

-continued
Formula 15
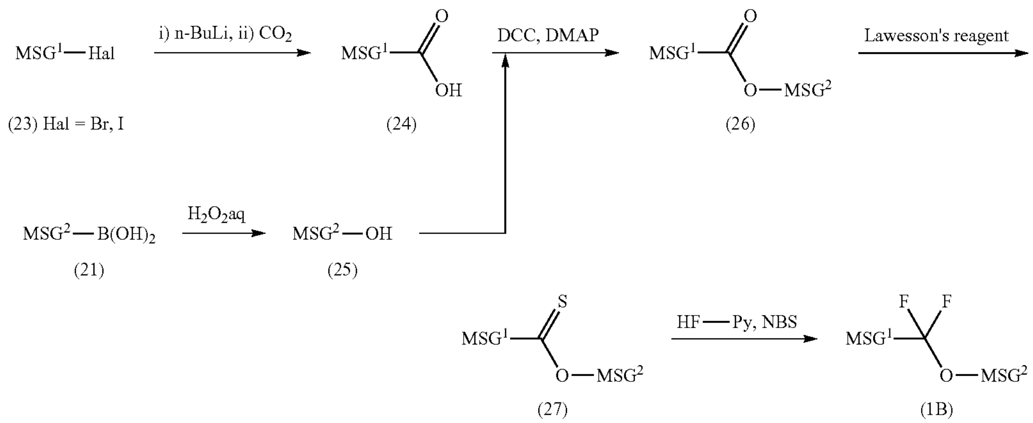
Formula 16
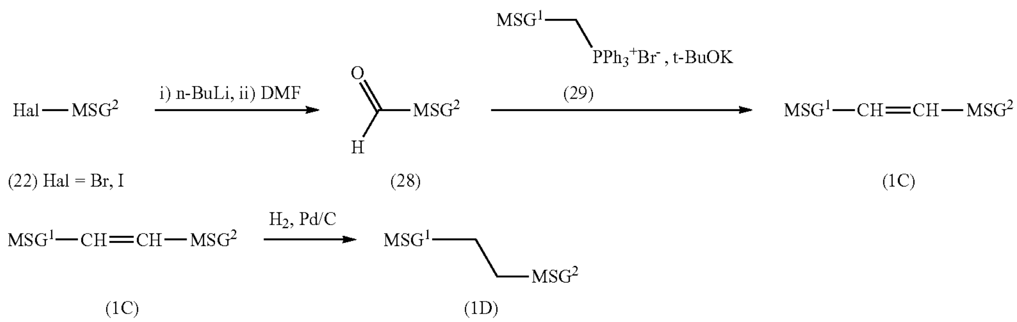
Formula 17
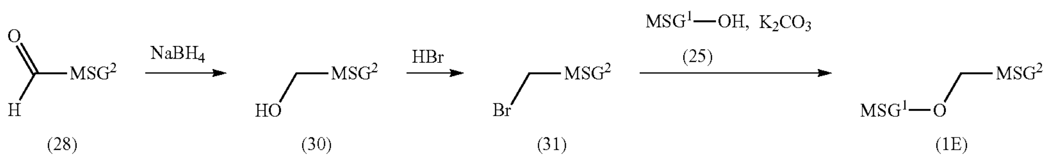
Formula 18
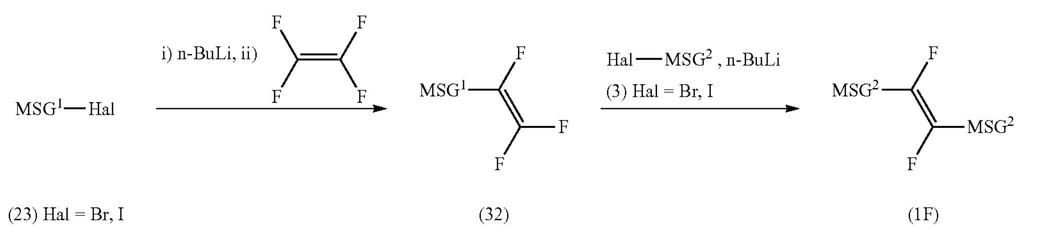
Formula 19
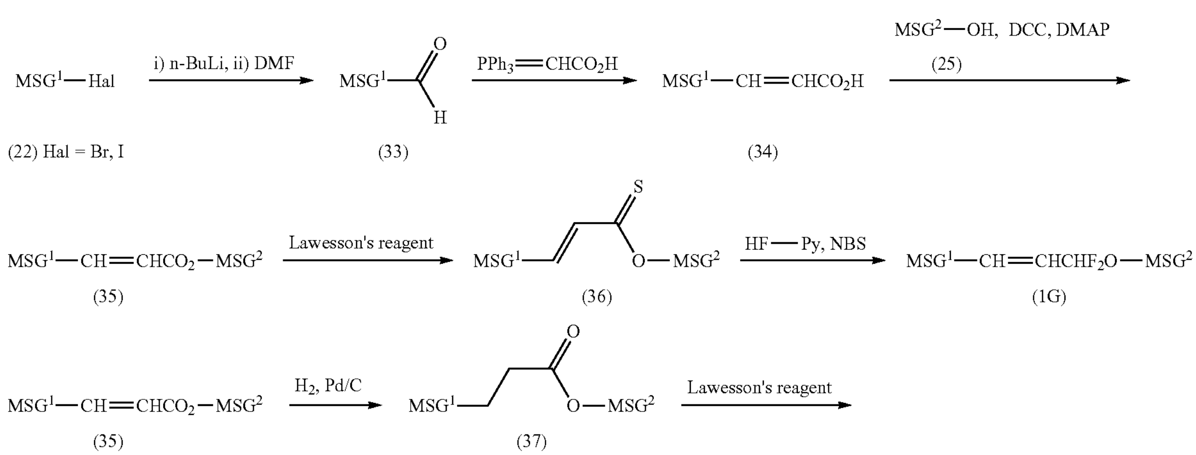

-continued

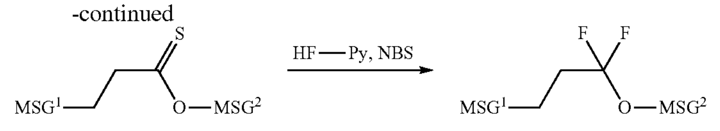

(38) (1H)

Formula 20

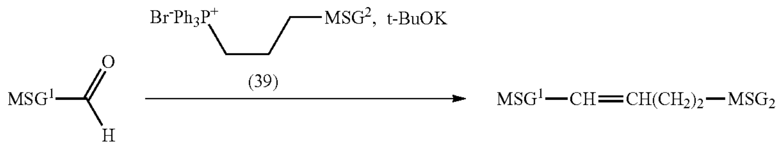

(33) (1i)

(I) Formation of a Single Bond (Synthesis of Compound (1A))

Compound (1A) is prepared by allowing arylboronic acid (21) to react, in the presence of a catalyst such as tetrakis (triphenylphosphine)palladium in an aqueous solution of carbonate, with compound (22) to be prepared according to a publicly known method. Compound (1A) is also prepared by allowing compound (23) to be prepared according to a publicly known method to react with n-butyllithium, and subsequently with zinc chloride, and further with compound (22) in the presence of a catalyst such as dichlorobis(triphenylphosphine)palladium.

(II) Formation of —$CF_2O$— (Synthesis of Compound (1B))

Carboxylic acid (24) is obtained by allowing compound (23) to react with n-butyllithium, and subsequently with carbon dioxide. Compound (26) having —COO— is prepared by dehydrating, in the presence of 1,3-dicyclohexylcarbodiimide (DCC) and 4-dimethylaminopyridine (DMAP), compound (24) and phenol (25) to be prepared according to a publicly known method. Compound (27) is obtained by treating compound (26) with a thiation reagent such as Lawesson's reagent. Compound (1B) having —$CF_2O$— is prepared by fluorinating compound (27) with a hydrogen fluoride-pyridine complex and N-bromosuccinimide (NBS). See M. Kuroboshi et al., Chem. Lett., 1992, 827. Compound (1B) is also prepared by fluorinating compound (27) with (diethylamino)sulfur trifluoride (DAST). See W. H. Bunnelle et al., J. Org. Chem. 1990, 55, 768.

(III) Formation of —CH═CH— (Synthesis of Compound (1C))

Aldehyde (28) is obtained by treating compound (22) with n-butyllithium, and then allowing the treated compound to react with formamide such as N,N-dimethylformamide (DMF). Compound (1C) is prepared by allowing aldehyde (28) to react with phosphorus ylide generated by treating phosphonium salt (29) to be prepared according to a known method with a base such as potassium tert-butoxide. Because a cis isomer is formed depending on reaction conditions, the cis isomer is isomerized into a trans isomer according to a known method, when necessary.

(IV) Formation of —$(CH_2)_2$— (Synthesis of Compound (1D))

Compound (1D) is prepared by hydrogenating compound (1C) in the presence of a catalyst such as palladium on carbon.

(V) Formation of —$CH_2O$— (Synthesis of Compound (1E))

Compound (30) is obtained by reducing compound (28) with a reducing agent such as sodium borohydride. Compound (31) is obtained by halogenating compound (28) with hydrobromic acid or the like. Compound (1E) is prepared by allowing compound (31) to react with compound (25) in the presence of potassium carbonate or the like.

(VI) Formation of —CF═CF— (Synthesis of Compound (1F))

Compound (32) is obtained by treating compound (23) with n-butyllithium, and then allowing the treated compound to react with tetrafluoroethylene. Compound (1F) is prepared by treating compound (32) with n-butyllithium, and then allowing the treated compound to react with compound (3).

(VII) Formation of —$CH{=}CHCF_2O$— (Synthesis of Compound (1G))

Aldehyde (33) is obtained by allowing compound (23) to react with n-butyllithium, and subsequently with formamide such as N,N-dimethylformamide (DMF). Carboxylic acid (34) is prepared by allowing compound (33) to react with $PPh_3{=}CHCO_2H$. Compound (1G) is prepared by allowing compound (34) to be subjected to a dehydrating condensation reaction, fluorination or the like with phenol (25) in a manner similar to preparation of —$CF_2O$—.

(VIII) Formation of —$(CH_2)_2CF_2O$— (Synthesis of Compound (1H))

Compound (37) is obtained by hydrogenating compound (35) in the presence of a catalyst such as palladium on carbon. Compound (38) is obtained by treating compound (37) with a thiation reagent such as a Lawesson's reagent. Compound (1H) is prepared by fluorinating compound (38) with a hydrogen fluoride-pyridine complex and N-bromosuccinimide (NBS).

(IX) Formation of —CH═CH—$(CH_2)_2$— (Synthesis of Compound (1i))

Compound (1i) is prepared by allowing aldehyde (28) to react with phosphorus ylide generated by treating phosphonium salt (39) to be prepared according to a known method with a base such as potassium tert-butoxide.

1-4-2. Formation of Rings $A^1$, $A^2$ and $A^3$

With regard to a ring such as 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, tetrahydropyran-2,5-diyl and 1,3-dioxane-2,5-diyl, a starting material is commercially available or a synthetic process is well known.

1-4-3. Synthesis Example

An example of a method for preparing compound (1) is as described below. Phenol (42) is obtained by allowing compound (41) that can be prepared by a known method to react with n-butyllithium, and subsequently with trimethoxy borane, and further with a hydrogen peroxide aqueous solution. Compound (43) is obtained by allowing compound (42) to react with 1-methyl-4-(2,2,2-trifluoroethoxy)benzene and potassium carbonate. Compound (1) is prepared by allowing compound (43) to react with lithium diisopropylamide (LDA).

Formula 21

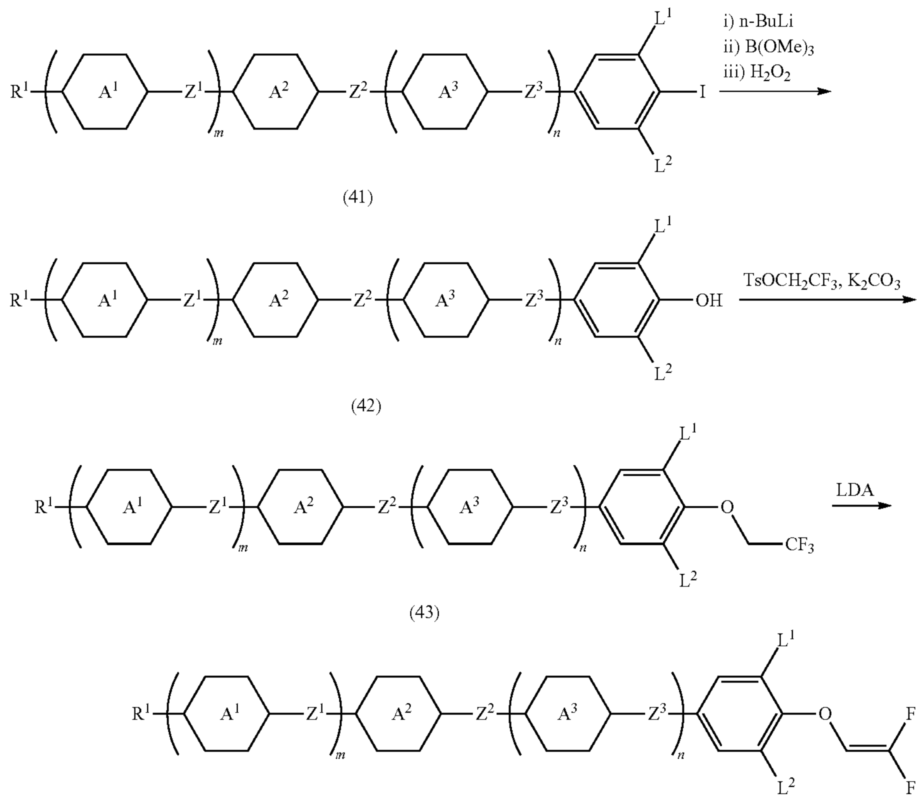

(41) (42) (43) (1)

In the compounds, $R^1$, ring $A^1$, ring $A^2$, ring $A^3$, $Z^1$, $Z^2$, $Z^3$, $L^1$, $L^2$, m and n are defined in a manner identical with the definitions described above.

2-1. Composition (1)

Liquid crystal composition (1) of the invention will be explained. Composition (1) contains at least one of compound (1) as component A. Composition (1) may contain two or more compounds (1). A component of the liquid crystal compound may include only compound (1). In order to develop excellent physical properties, composition (1) preferably contains at least one of compound (1) in the range of approximately 1 to approximately 99% by weight. A further preferred ratio is in the range of approximately 5 to approximately 60% by weight. Composition (1) may also contain compound (1) and various kinds of liquid crystal compounds that are not described herein.

A preferred composition contains a compound selected from components B, C, D and E shown below. When preparing composition (1), a component can also be selected, for example, in consideration of the dielectric anisotropy of compound (1). A composition prepared by suitably selecting components has a high maximum temperature of the nematic phase, a low minimum temperature of the nematic phase, a small viscosity, a suitable optical anisotropy, a large dielectric anisotropy and a suitable elastic constant.

Component B includes compounds (2) to (4). Component C includes compound (5). Component D includes compounds (6) to (11). Component E includes compounds (12) to (14). The components will be explained in the order.

Component B includes a compound having a halogen-containing group or a fluorine-containing group at a right terminal. Preferred examples of component B include compounds (2-1) to (2-16), compounds (3-1) to (3-112) and compounds (4-1) to (4-54). In addition, in formulas (3) and (4), a case where both $Z^4$ and $Z^5$ are —$CF_2O$— and/or —$OCF_2$— is excluded. The exclusion means that component B does not contain a compound in which both $Z^4$ and $Z^5$ are —$CF_2O$—, a compound in which both $Z^4$ and $Z^5$ are —$OCF_2$—, and a compound in which one of $Z^4$ and $Z^5$ is —$CF_2O$— and the other is —$OCF_2$—.

Formula 22

(2-1)

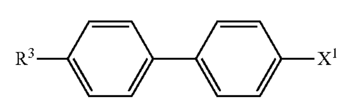

(2-2)

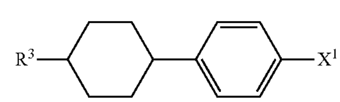

(2-3)
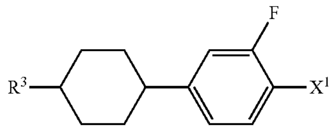
(2-4)
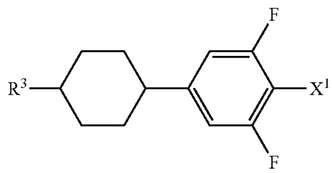
(2-5)
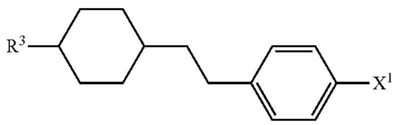
(2-6)
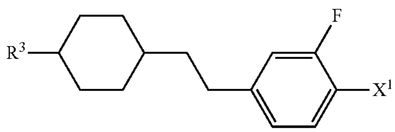
(2-7)
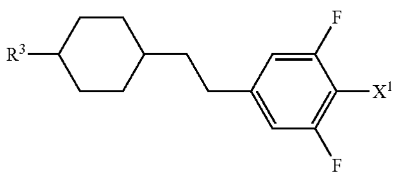
(2-8)
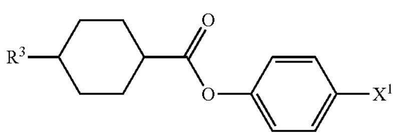
(2-9)
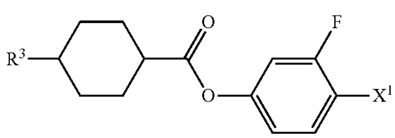
(2-10)
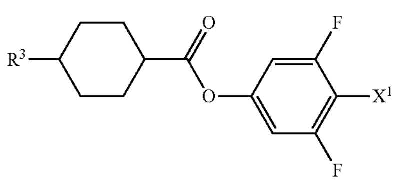
(2-11)
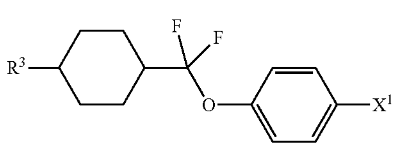
(2-12)
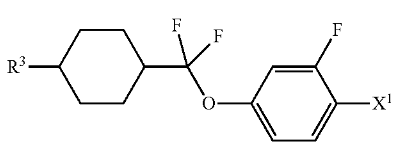
(2-13)
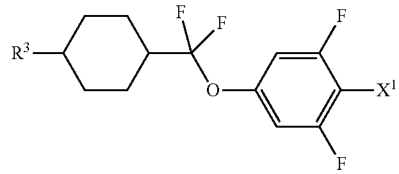
(2-14)
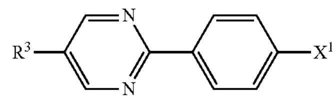
(2-15)
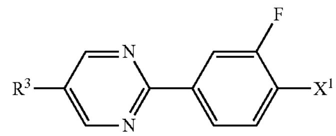
(2-16)
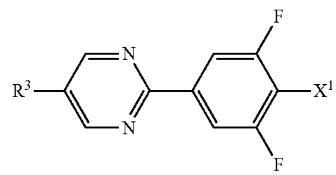
Formula 23
(3-1)
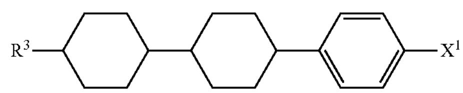
(3-2)
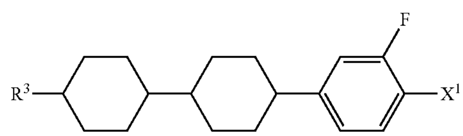
(3-3)
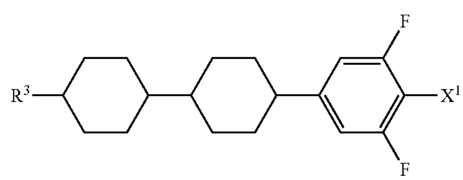
(3-4)
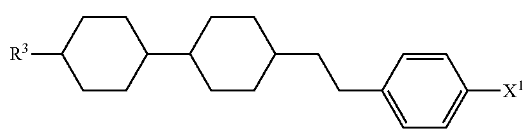
(3-5)
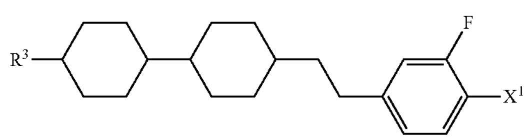
(3-6)
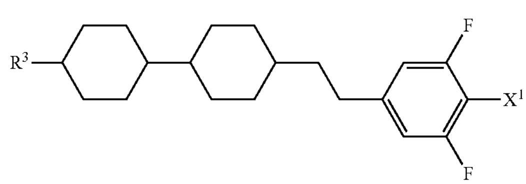

-continued
(3-7)
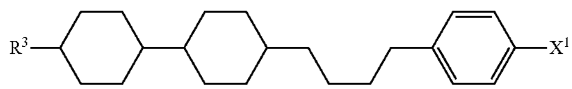
(3-8)
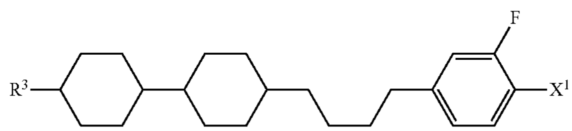
(3-9)
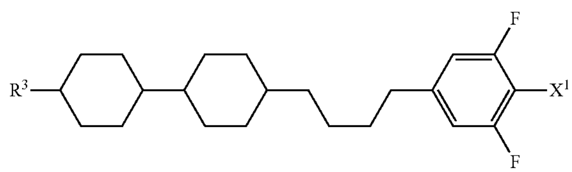
(3-10)
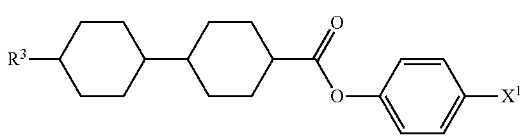
(3-11)
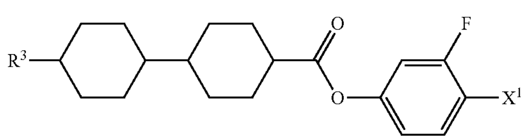
(3-12)
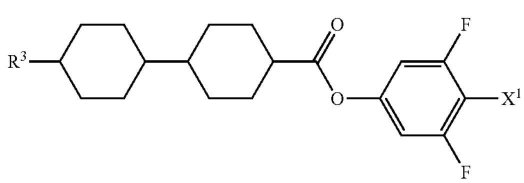
(3-13)
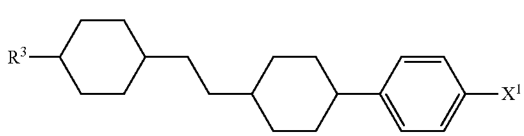
(3-14)
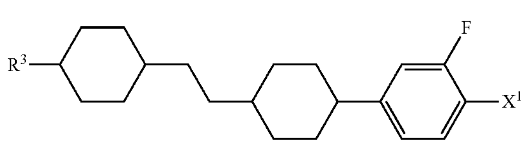
(3-15)
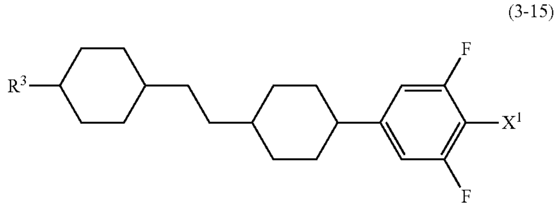
-continued
(3-16)
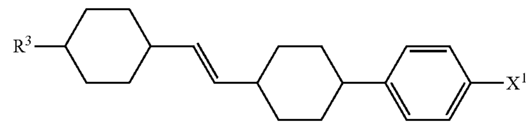
(3-17)
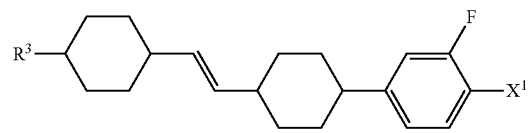
(3-18)
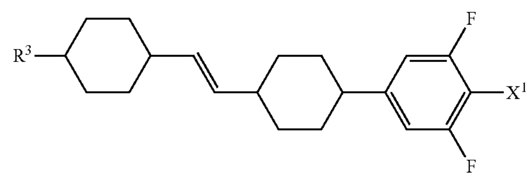
(3-19)
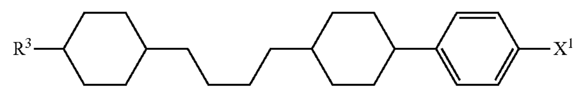
(3-20)
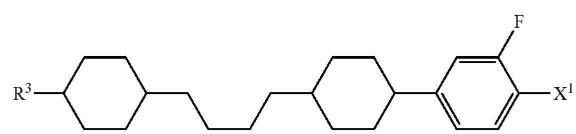
(3-21)
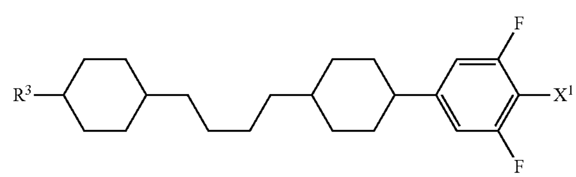
(3-22)
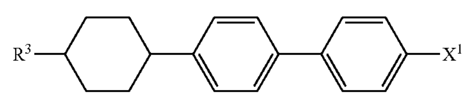
(3-23)
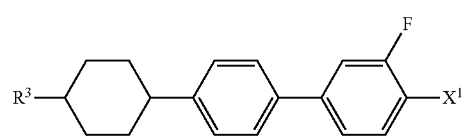
(3-24)
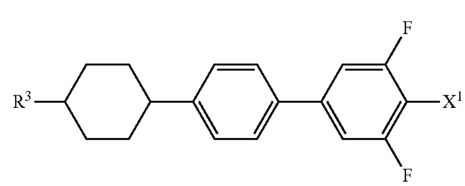
Formula 24
(3-25)
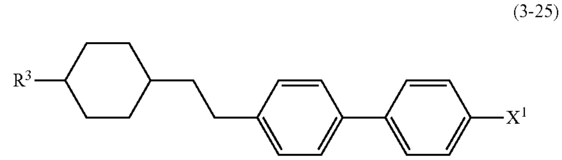

-continued
(3-26)
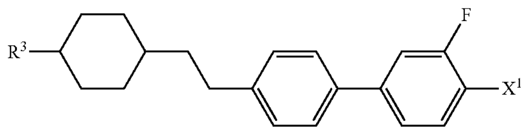
(3-27)
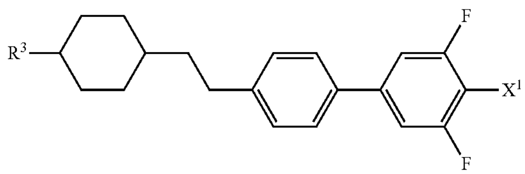
(3-28)
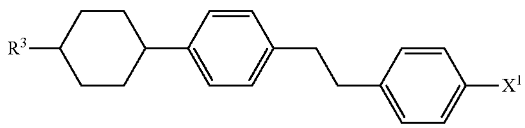
(3-29)
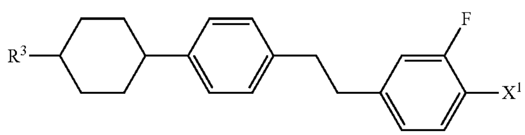
(3-30)
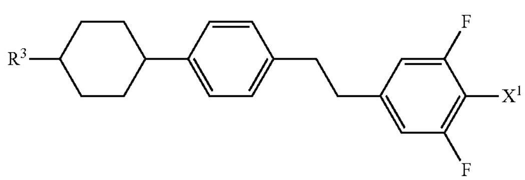
(3-31)
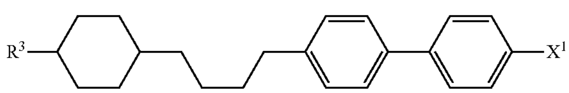
(3-32)
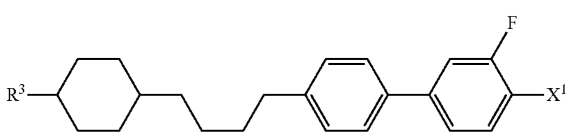
(3-33)
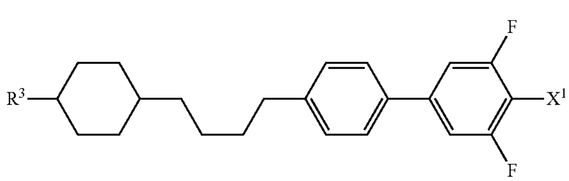
(3-34)
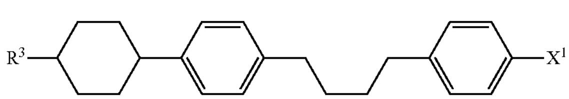
(3-35)
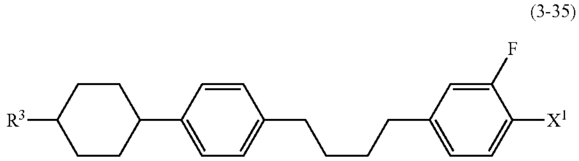
-continued
(3-36)
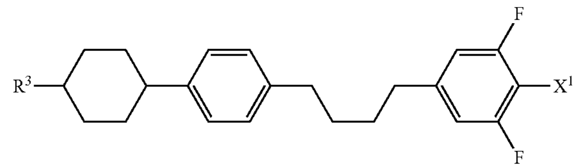
(3-37)
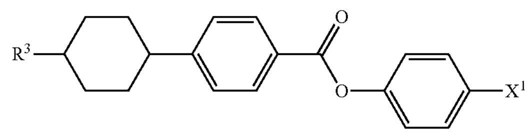
(3-38)
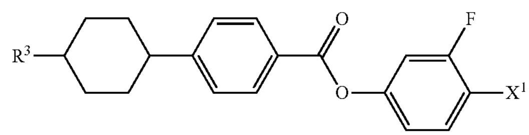
(3-39)
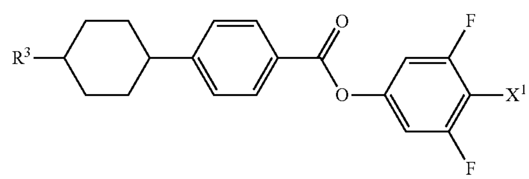
(3-40)
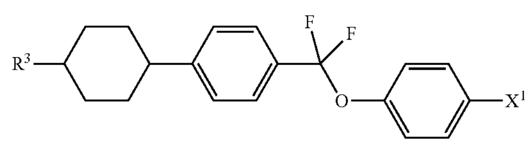
(3-41)
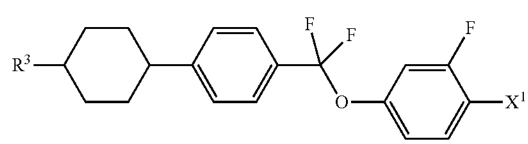
(3-42)
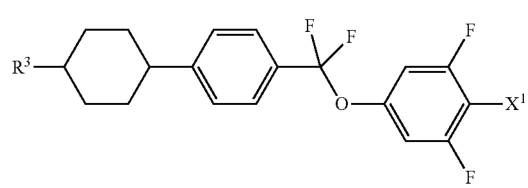
(3-43)
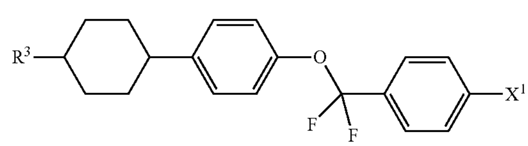
(3-44)
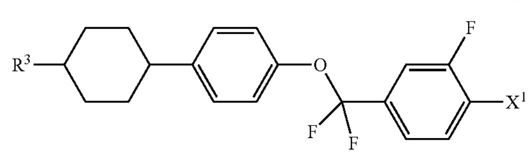

-continued
(3-45)
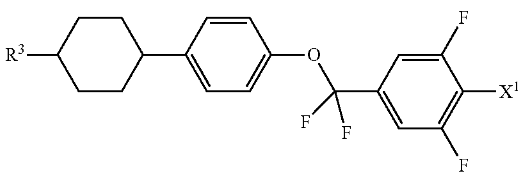
(3-46)
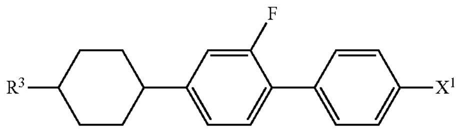
(3-47)
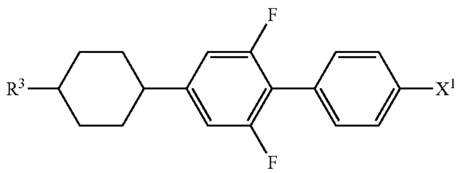
(3-48)
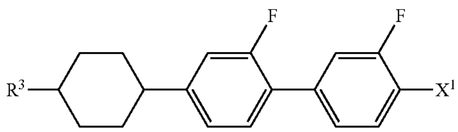
(3-49)
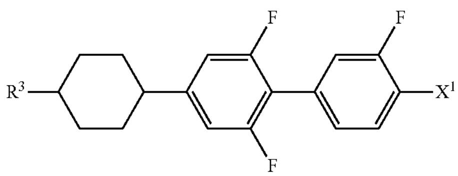
(3-50)
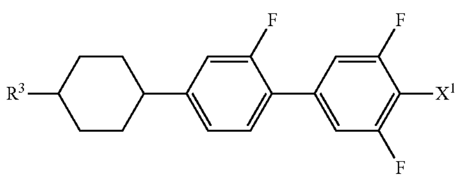
(3-51)
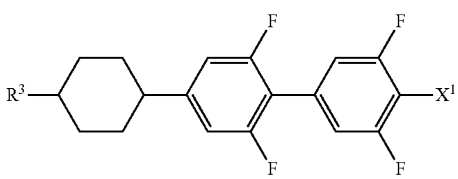
Formula 25
(3-52)
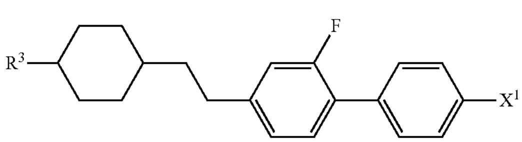
(3-53)
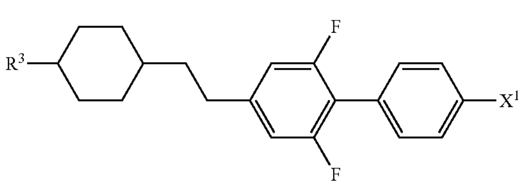
-continued
(3-54)
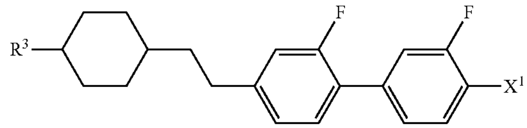
(3-55)
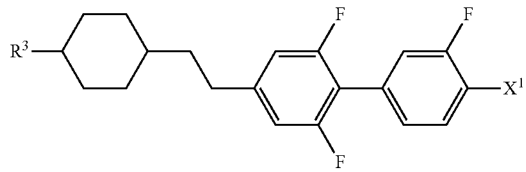
(3-56)
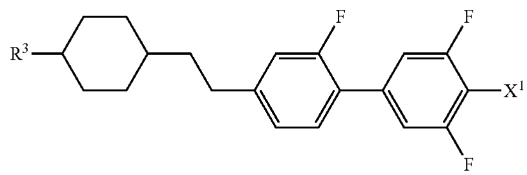
(3-57)
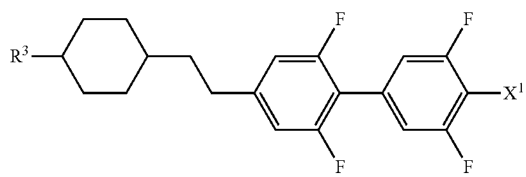
(3-58)
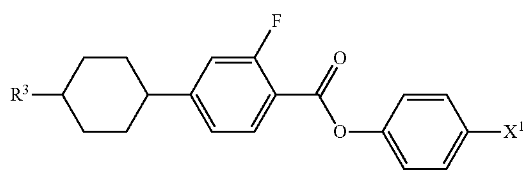
(3-59)
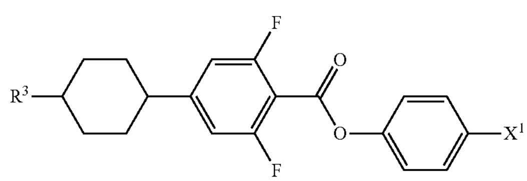
(3-60)
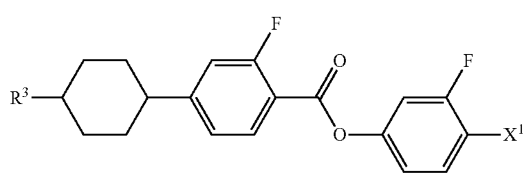
(3-61)
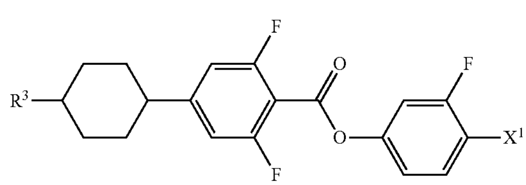

-continued
(3-62)
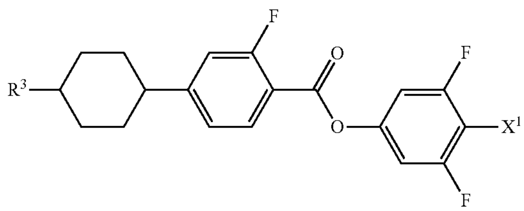
(3-63)
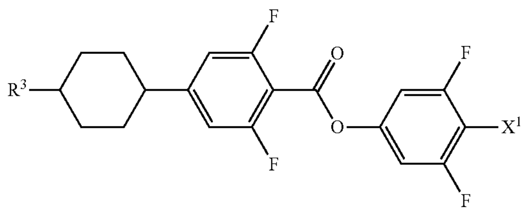
(3-64)
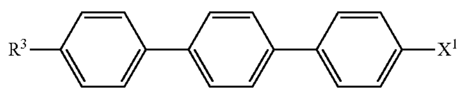
(3-65)
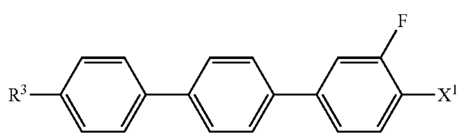
(3-66)
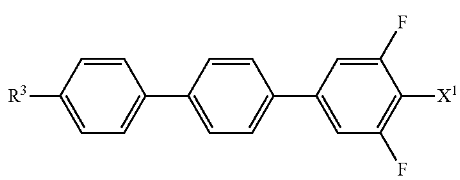
(3-67)
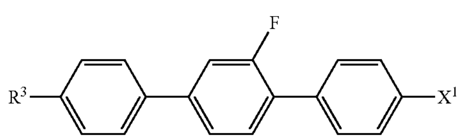
(3-68)
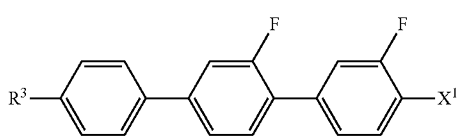
(3-69)
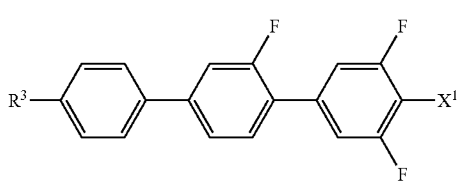
(3-70)
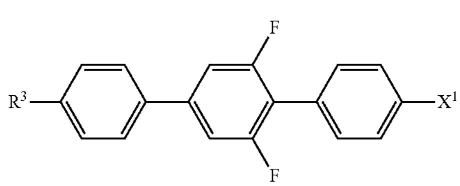
-continued
(3-71)
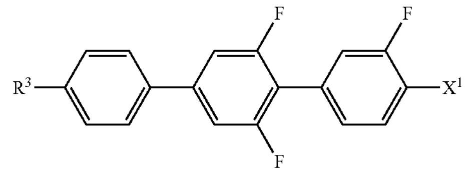
(3-72)
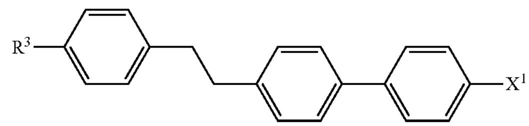
(3-73)
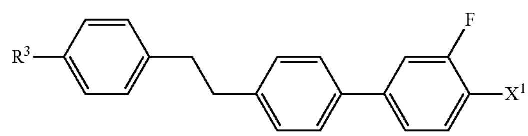
(3-74)
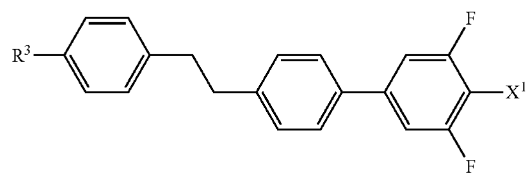
(3-75)
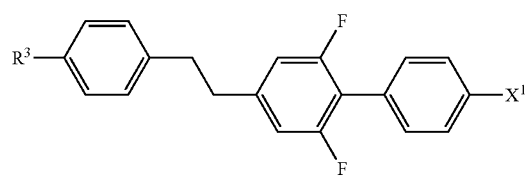
(3-76)
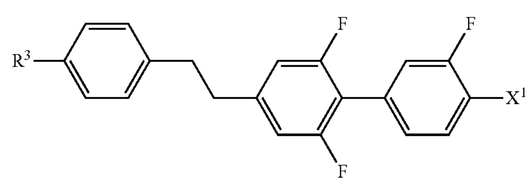
Formula 26
(3-77)
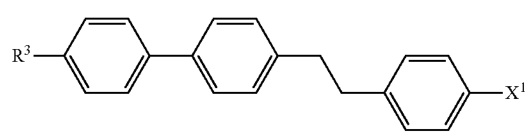
(3-78)
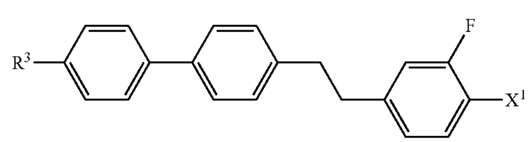
(3-79)
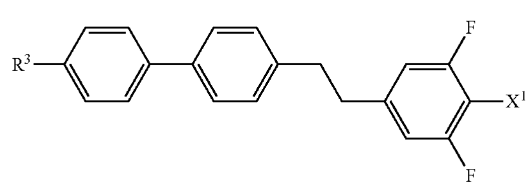

-continued
(3-80)
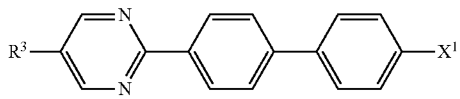
(3-81)
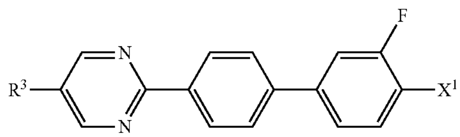
(3-82)
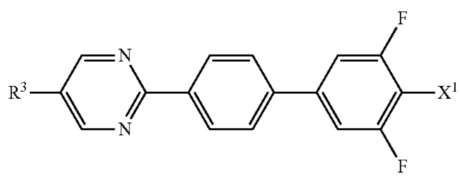
(3-83)
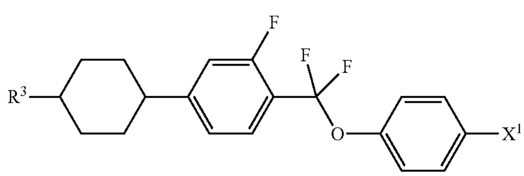
(3-84)
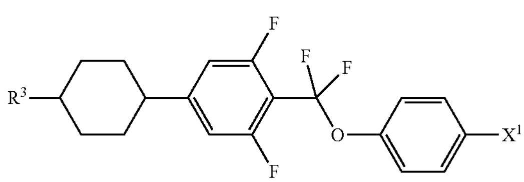
(3-85)
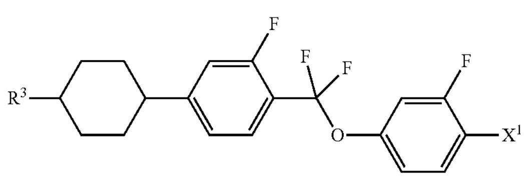
(3-86)
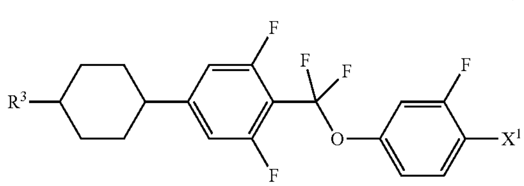
(3-87)
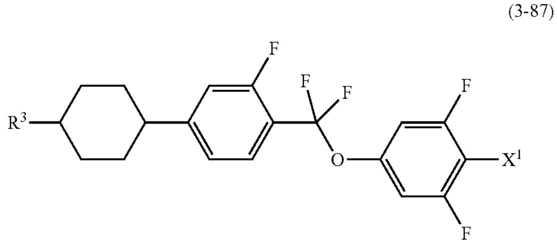
-continued
(3-88)
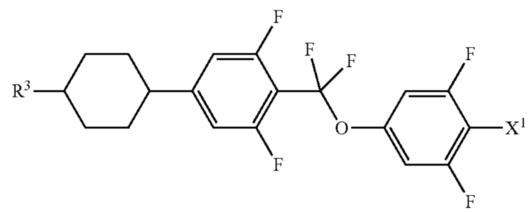
(3-89)
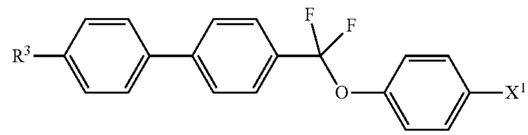
(3-90)
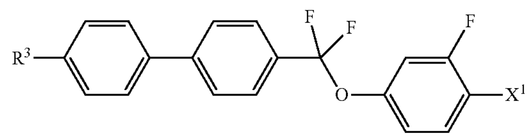
(3-91)
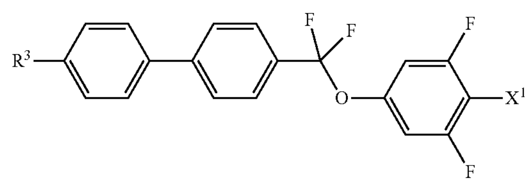
(3-92)
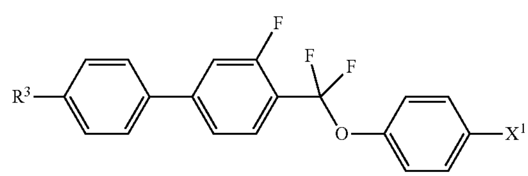
(3-93)
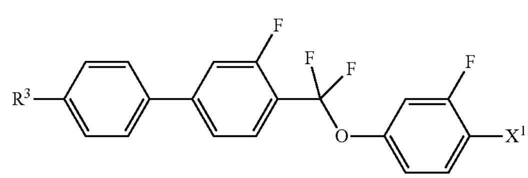
(3-94)
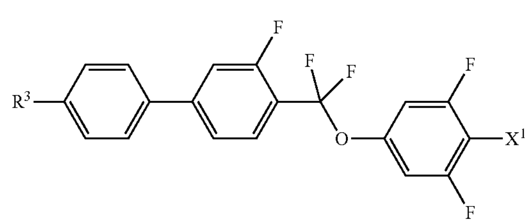
(3-95)
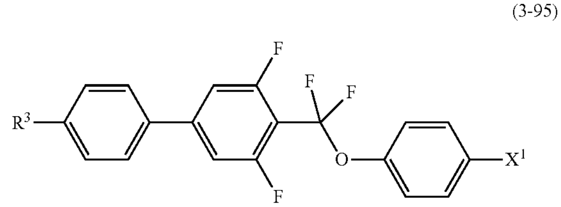

-continued
(3-96)
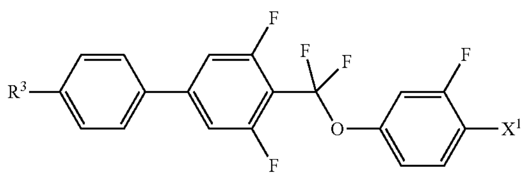
(3-97)
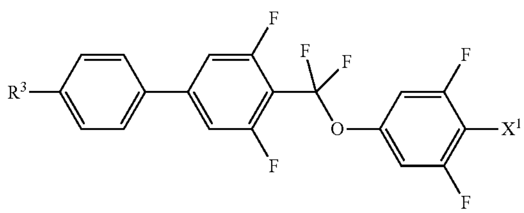
(3-98)
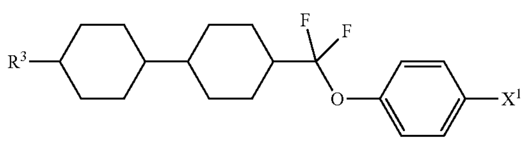
(3-99)
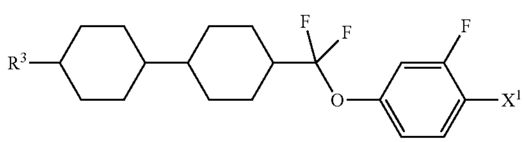
(3-100)
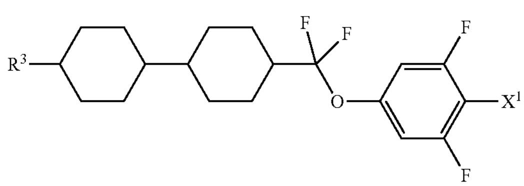
Formula 27
(3-101)
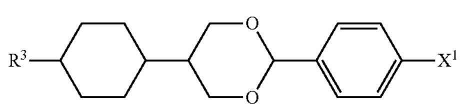
(3-102)
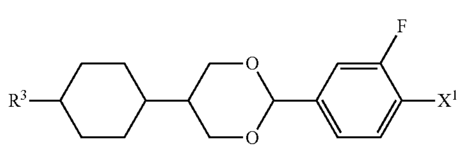
(3-103)
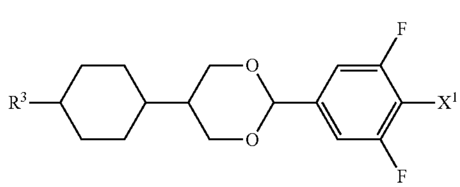
(3-104)
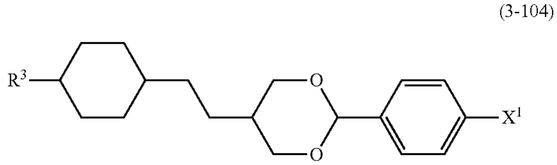
-continued
(3-105)
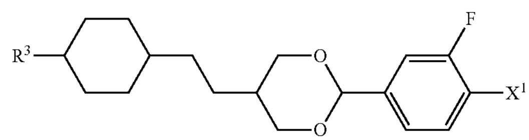
(3-106)
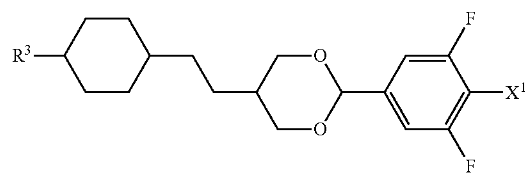
(3-107)
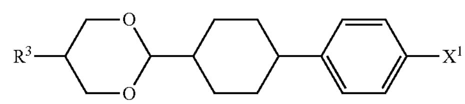
(3-108)
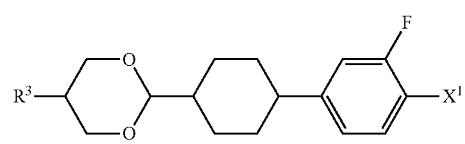
(3-109)
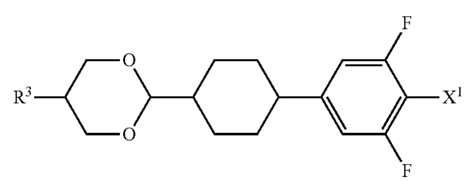
(3-110)
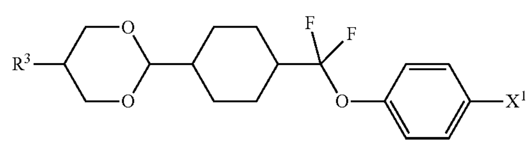
(3-111)
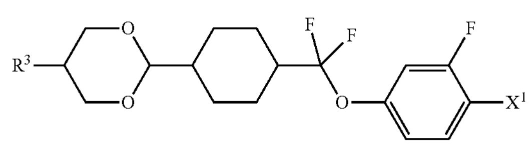
(3-112)
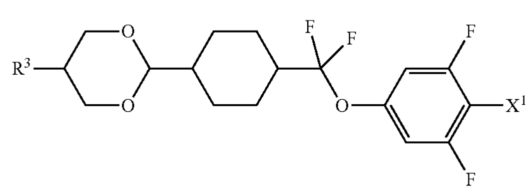
Formula 28
(4-1)
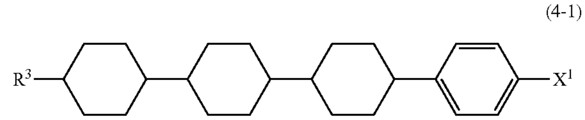

-continued
(4-2)
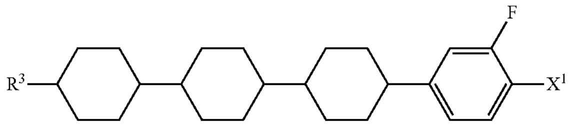
(4-3)
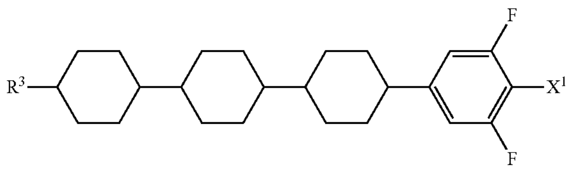
(4-4)
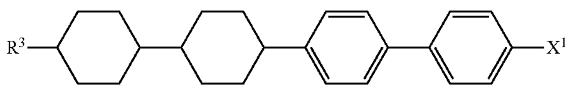
(4-5)
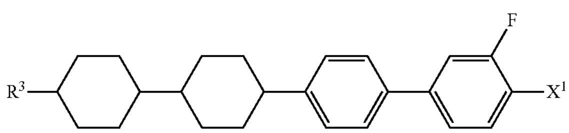
(4-6)
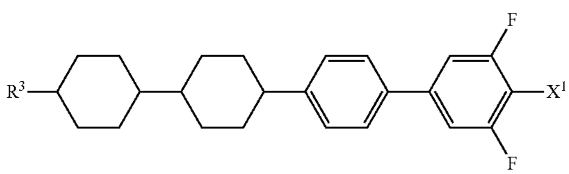
(4-7)
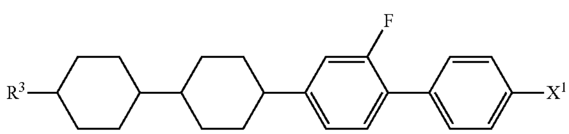
(4-8)
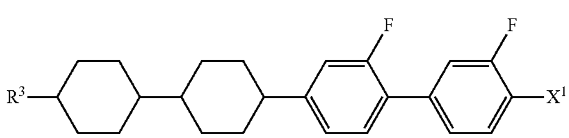
(4-9)
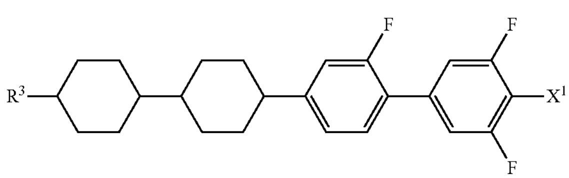
(4-10)
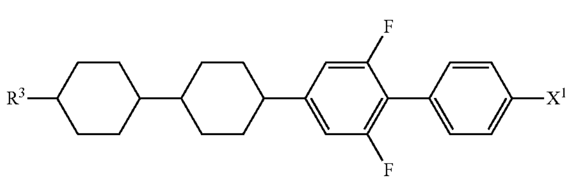
-continued
(4-11)
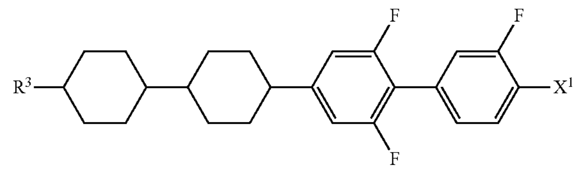
(4-12)
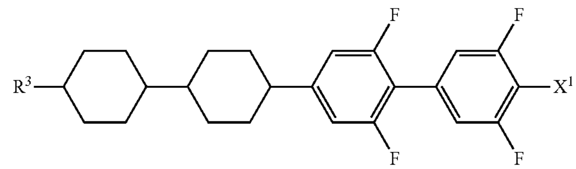
(4-13)
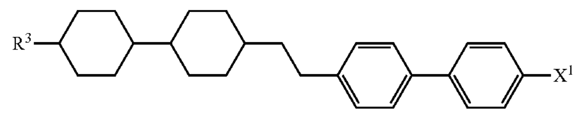
(4-14)
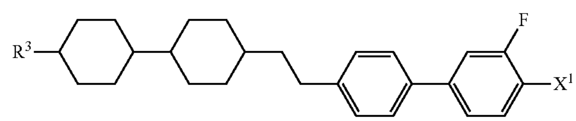
(4-15)
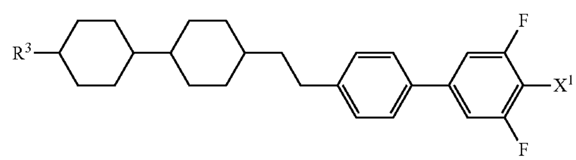
(4-16)
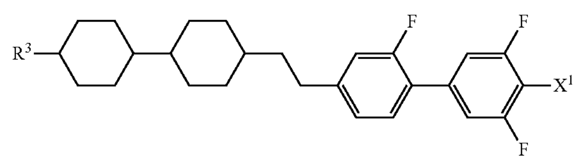
(4-17)
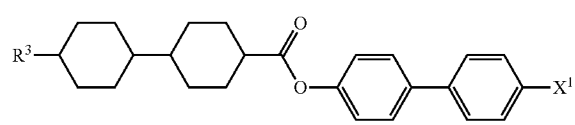
(4-18)
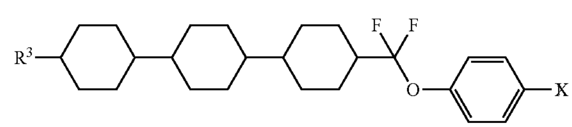
(4-19)
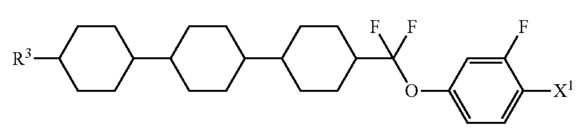

-continued
(4-20)
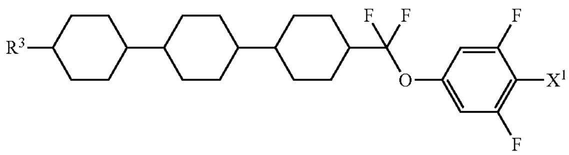
(4-21)
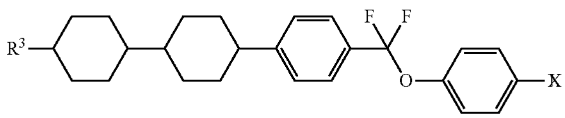
(4-22)
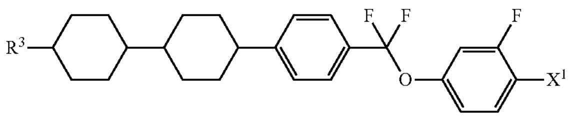
(4-23)
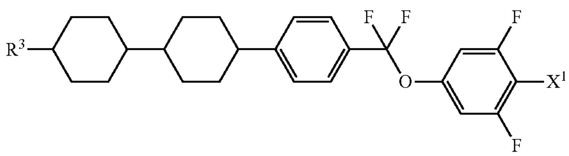
(4-24)
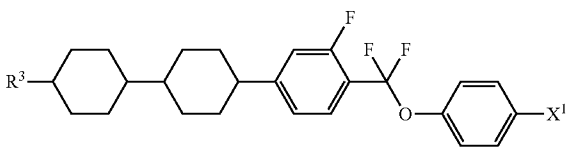
(4-25)
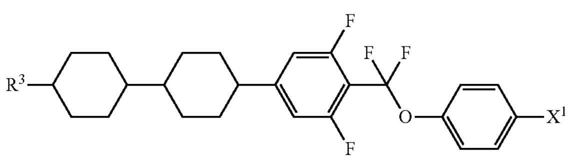
(4-26)
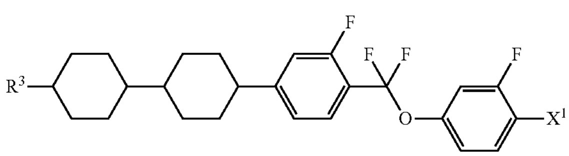
(4-27)
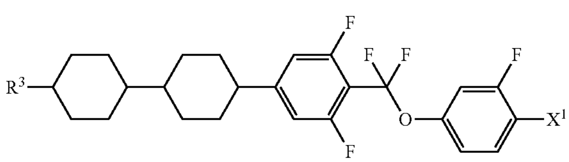
(4-28)
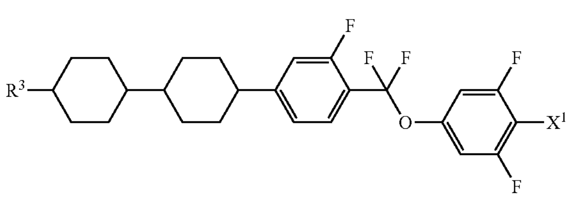
-continued
(4-29)
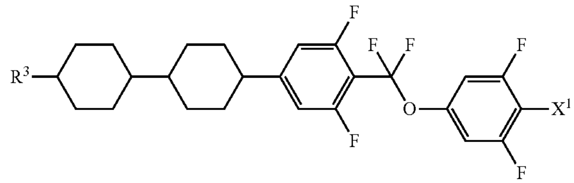
Formula 29
(4-30)
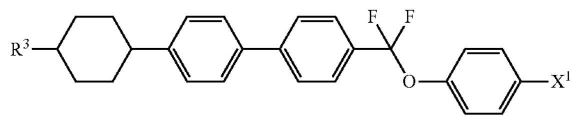
(4-31)
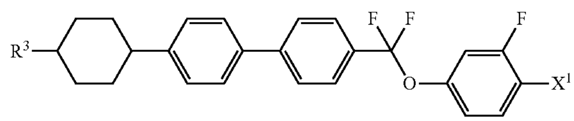
(4-32)
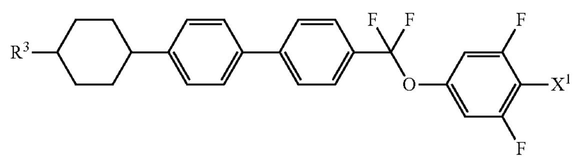
(4-33)
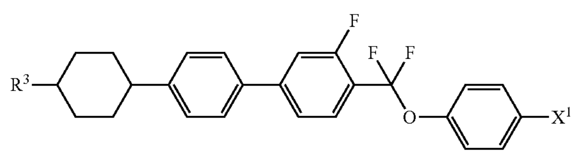
(4-34)
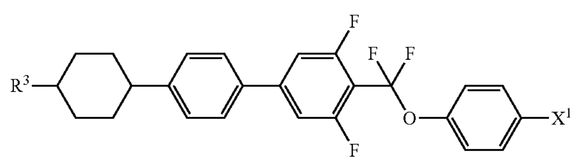
(4-35)
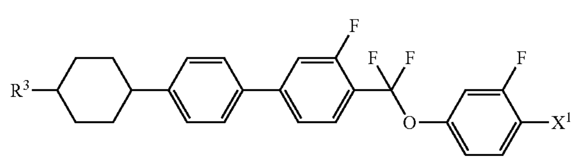
(4-36)
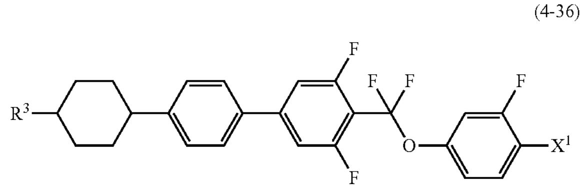

-continued
(4-37)
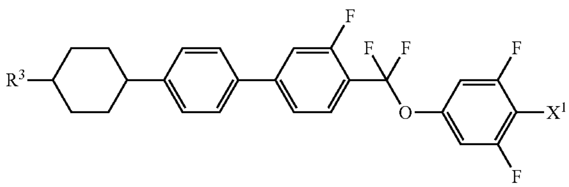
(4-38)
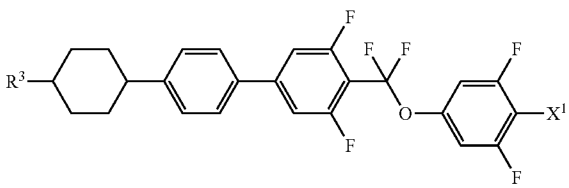
(4-39)
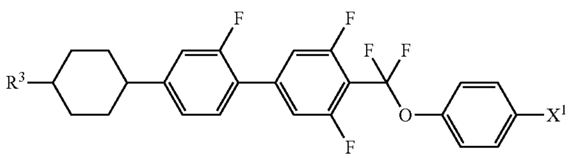
(4-40)
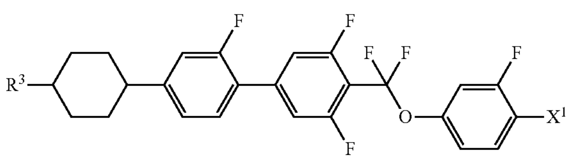
(4-41)
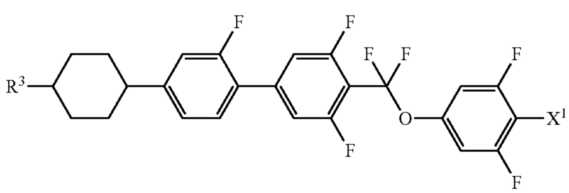
(4-42)
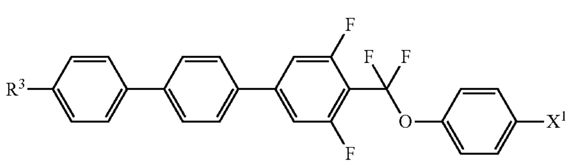
(4-43)
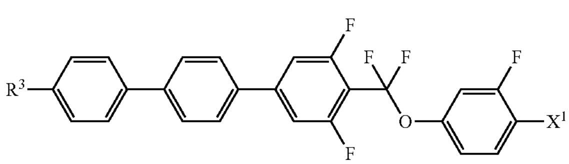
(4-44)
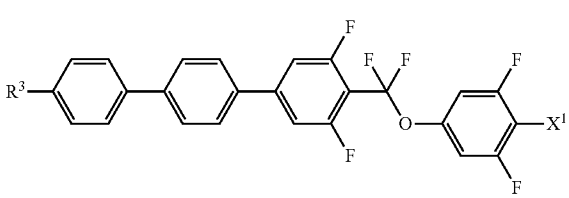
-continued
(4-45)
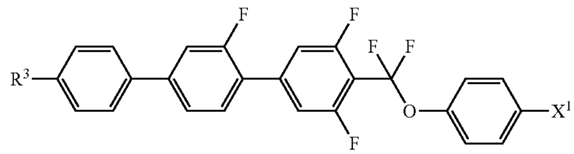
(4-46)
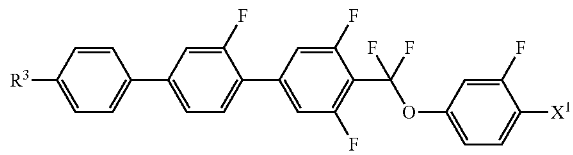
(4-47)
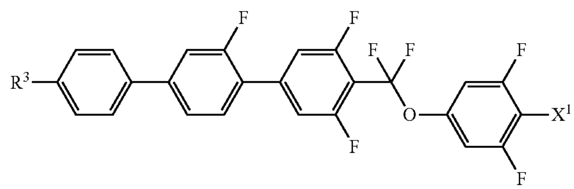
(4-48)
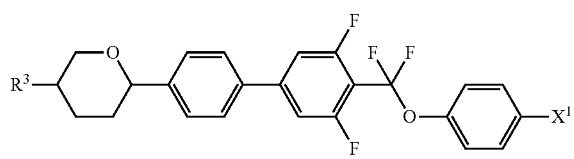
(4-49)
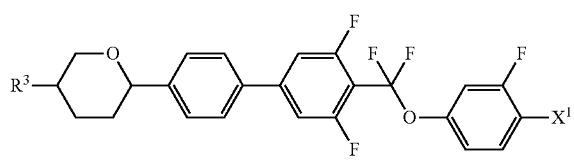
(4-50)
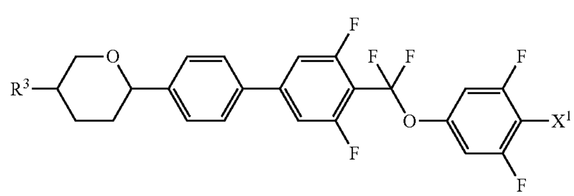
(4-51)
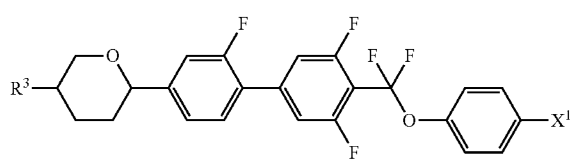
(4-52)
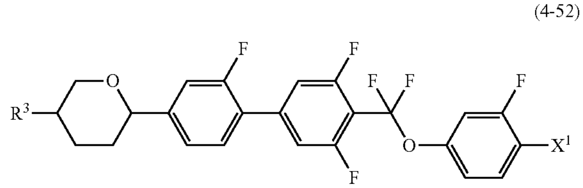

-continued (4-53)

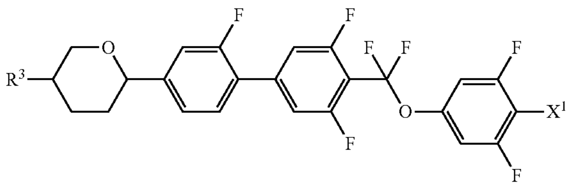

(4-54)

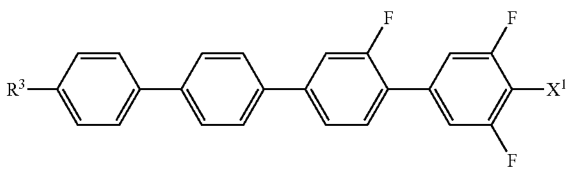

In the compounds (component B), $R^3$ and $X^1$ are defined in a manner identical with the definitions described above.

Component B has a positive dielectric anisotropy and has a superb stability to heat, light and so forth, and therefore is used when preparing a composition for the TFT mode or the PSA mode. Content of component B is suitably in the range of approximately 1 to approximately 99% by weight, preferably, in the range of approximately 10 to approximately 97% by weight, still further preferably, in the range of approximately 40 to approximately 95% by weight, based on the total weight of the composition. When compounds (12) to (14) are further added to the composition, the viscosity can be adjusted.

Component C includes compound (5) in which a right-terminal group is —C≡N or —C≡C—C≡N. Preferred examples of component C include compounds (5-1) to (5-64).

Formula 30

(5-1)

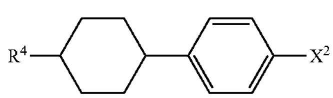

(5-2)

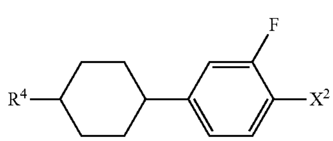

(5-3)

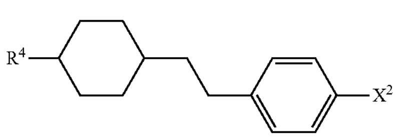

(5-4)

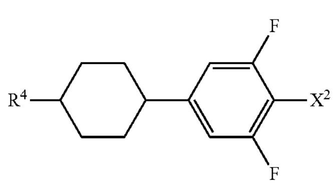

(5-5)

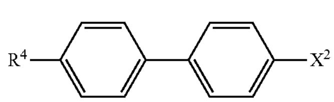

-continued (5-6)

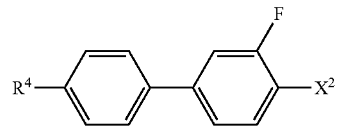

(5-7)

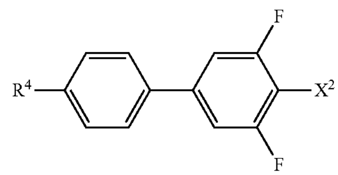

(5-8)

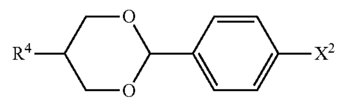

(5-9)

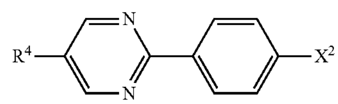

(5-10)

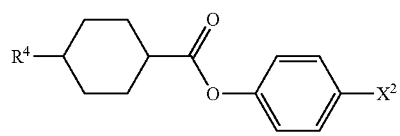

(5-11)

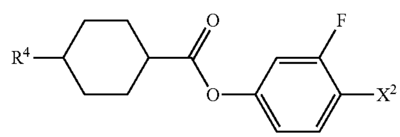

(5-12)

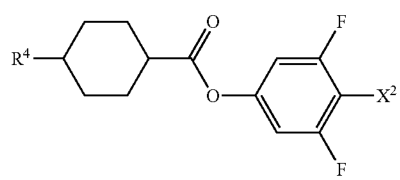

(5-13)

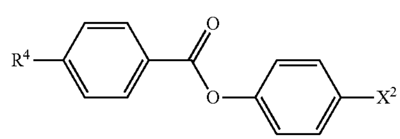

(5-14)

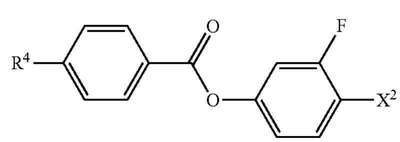

(5-15)

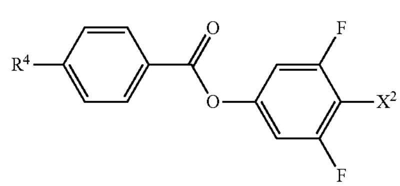

(5-16)

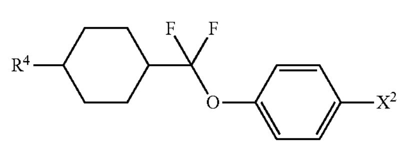

-continued
(5-17)
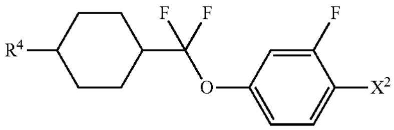
(5-18)
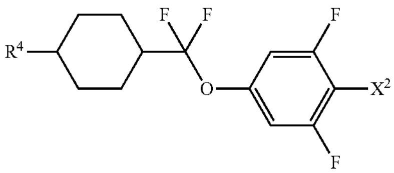
(5-19)
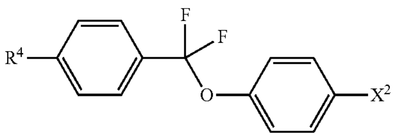
(5-20)
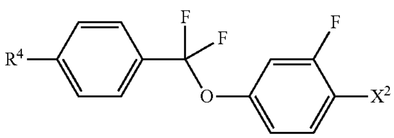
(5-21)
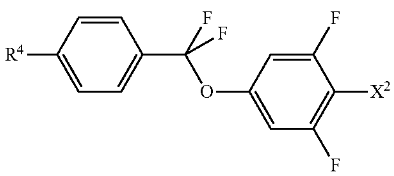
(5-22)
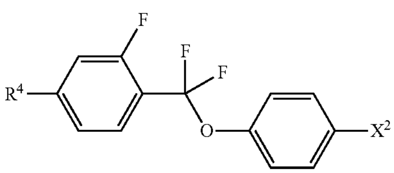
(5-23)
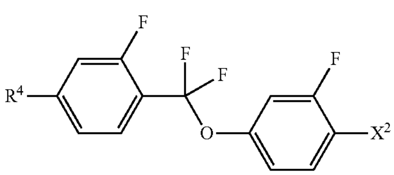
(5-24)
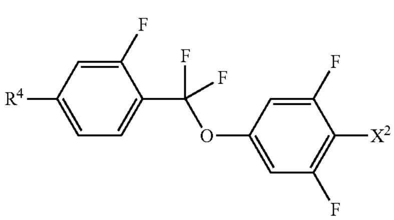
(5-25)
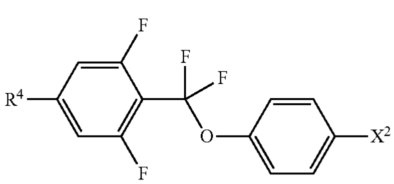
-continued
(5-26)
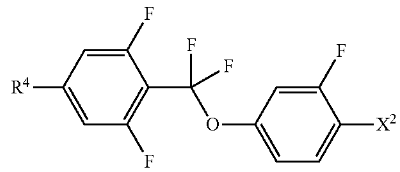
(5-27)
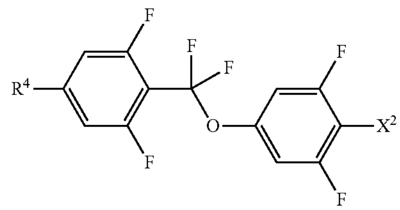
Formula 31
(5-28)
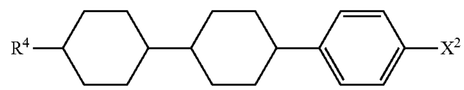
(5-29)
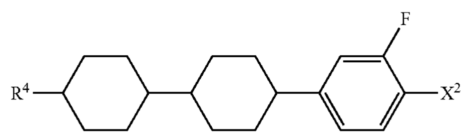
(5-30)
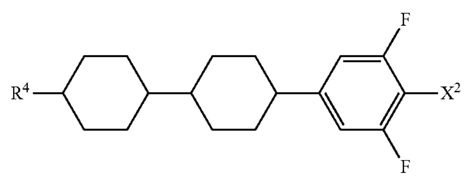
(5-31)
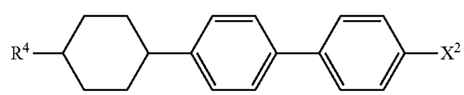
(5-32)
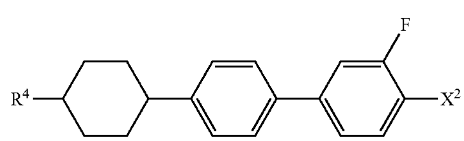
(5-33)
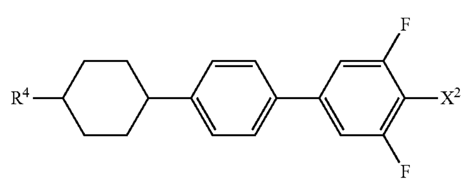
(5-34)
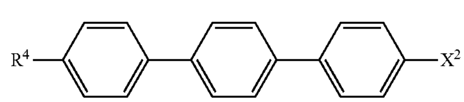
(5-35)
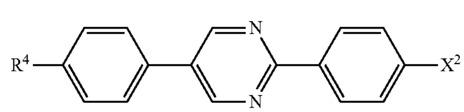

-continued
(5-36)
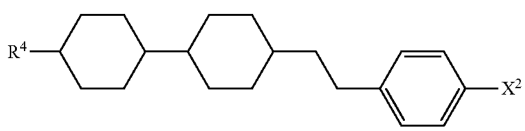
(5-37)
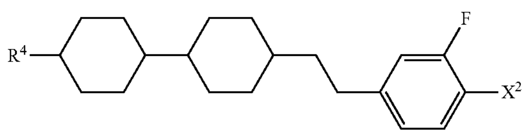
(5-38)
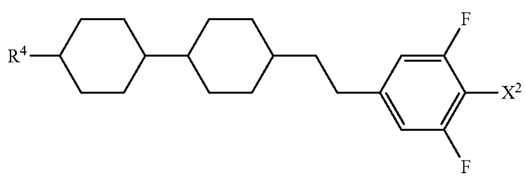
(5-39)
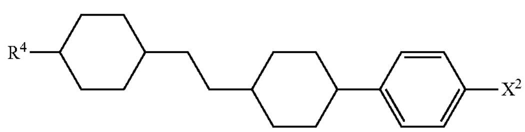
(5-40)
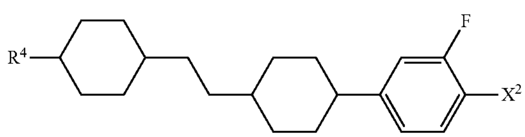
(5-41)
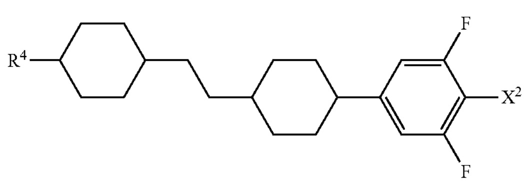
(5-42)
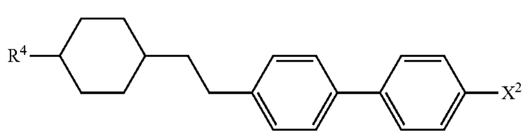
(5-43)
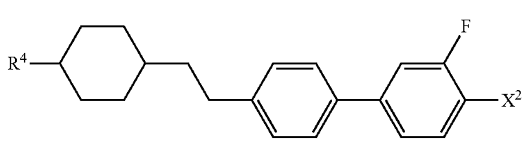
(5-44)
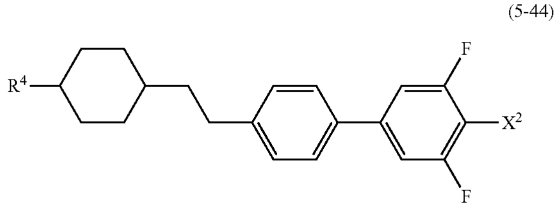
-continued
(5-45)
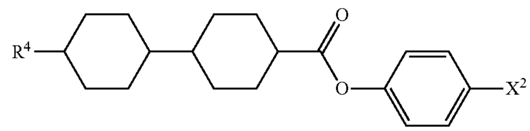
(5-46)
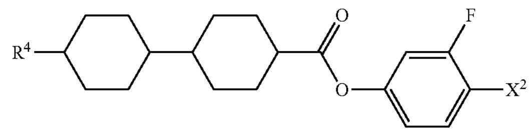
(5-47)
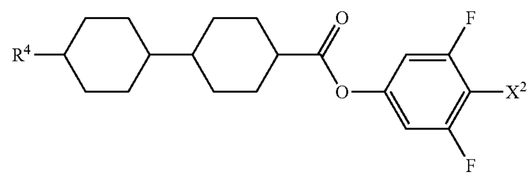
(5-48)
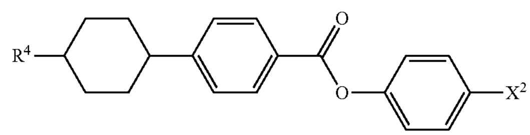
(5-49)
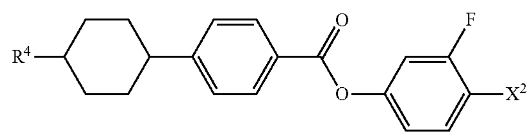
Formula 32
(5-50)
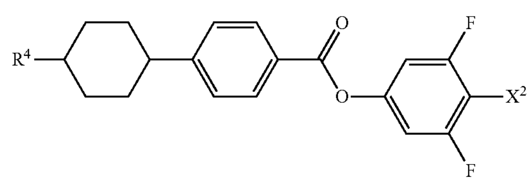
(5-51)
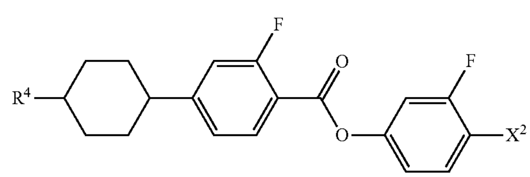
(5-52)
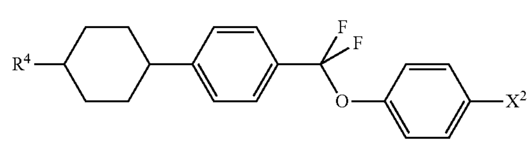
(5-53)
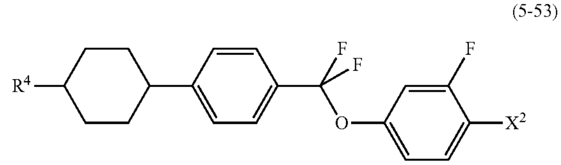

-continued (5-54)

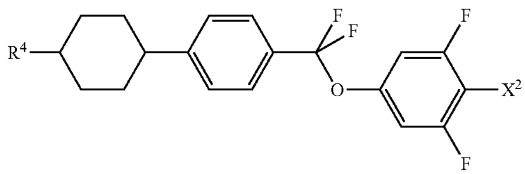

(5-55)

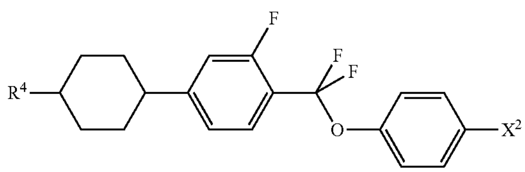

(5-56)

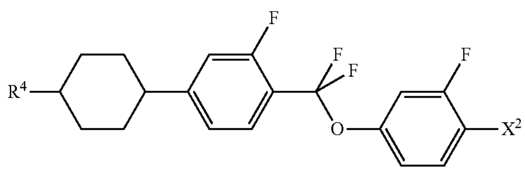

(5-57)

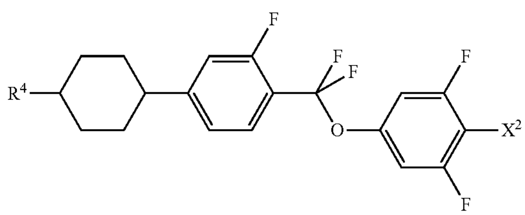

(5-58)

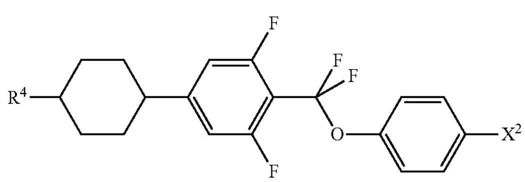

(5-59)

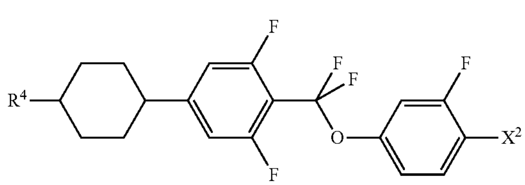

(5-60)

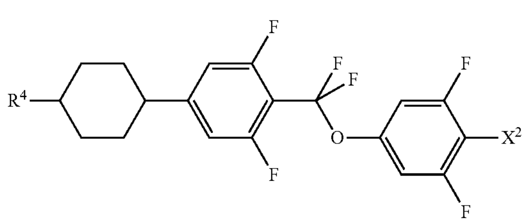

(5-61)

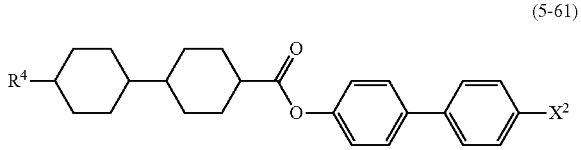

-continued (5-62)

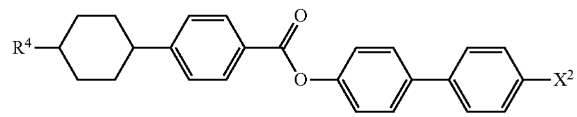

(5-63)

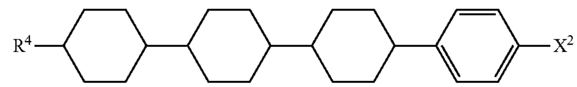

(5-64)

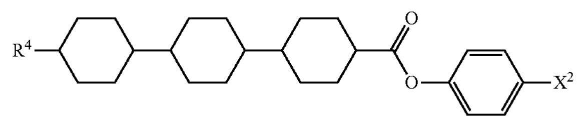

In the compounds (component C), $R^4$ and $X^2$ are defined in a manner identical with the definitions described above.

Component C has a very large positive value of dielectric anisotropy, and therefore is mainly used when preparing a composition for the STN mode, the TN mode or the PSA mode. When component C is added to the composition, the dielectric anisotropy of the compound can be increased. Compound C is effective in extending the temperature range of the liquid crystal phase, adjusting the viscosity or adjusting the optical anisotropy. Component C is also useful for adjusting a voltage-transmittance curve of the device.

When preparing a composition for the STN mode or the TN mode, content of component C is suitably in the range of approximately 1 to approximately 99% by weight, preferably, in the range of approximately 10 to approximately 97% by weight, further preferably, in the range of approximately 40 to approximately 95% by weight, based on the total weight of the composition. When component E is added to the composition, the temperature range of the liquid crystal phase, the viscosity, the optical anisotropy, the dielectric anisotropy or the like can be adjusted.

Component D includes compounds (6) to (11). The compounds have a benzene ring in which lateral positions are replaced by two halogen atoms, such as 2,3-difluoro-1,4-phenylene. Preferred examples of component D include compounds (6-1) to (6-6), compounds (7-1) to (7-15), compound (8-1), compounds (9-1) to (9-3), compounds (10-1) to (10-11) and compounds (11-1) to (11-10).

Formula 33

(6-1)

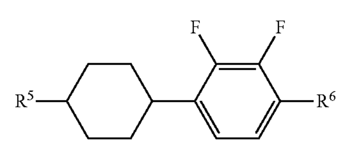

(6-2)

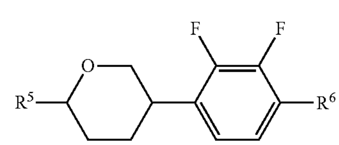

-continued
(6-3)
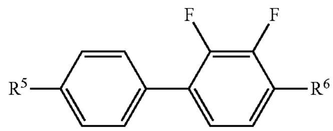
(6-4)
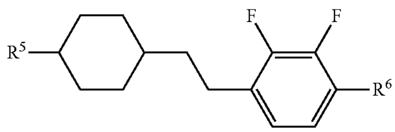
(6-5)
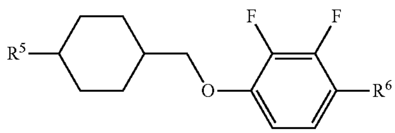
(6-6)
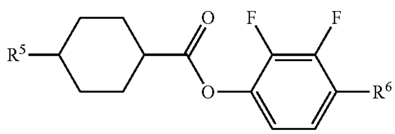
(7-1)
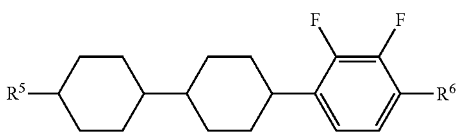
(7-2)
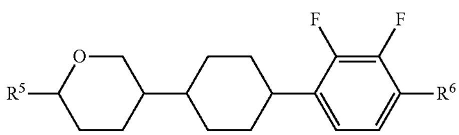
(7-3)
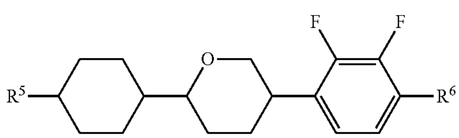
(7-4)
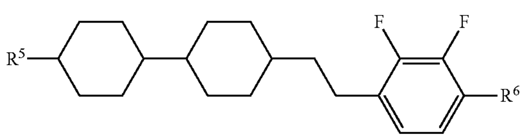
(7-5)
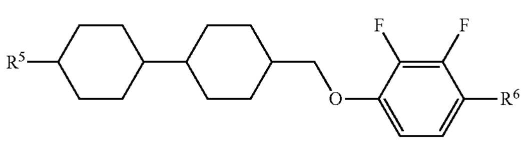
(7-6)
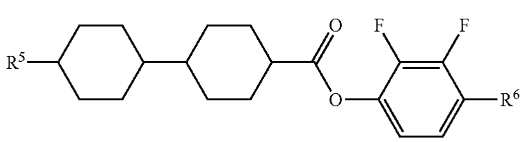
(7-7)
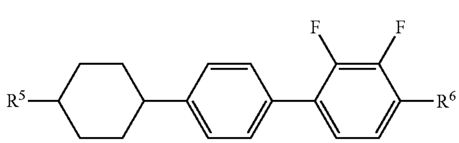
-continued
(7-8)
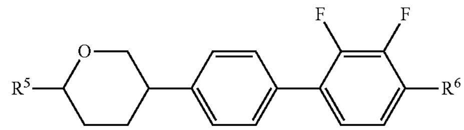
(7-9)
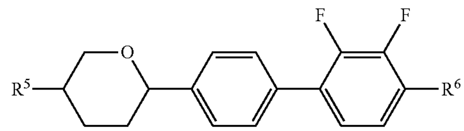
(7-10)
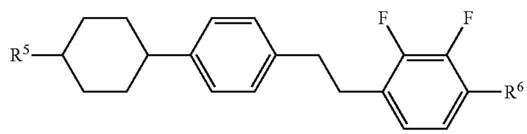
(7-11)
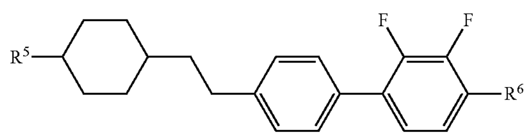
(7-12)
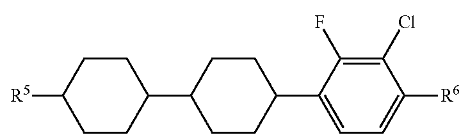
(7-13)
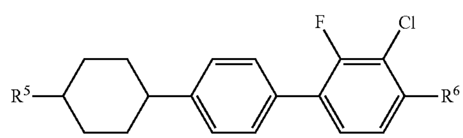
(7-14)
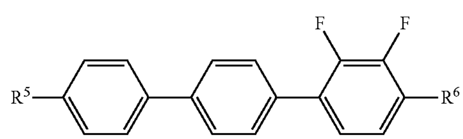
(7-15)
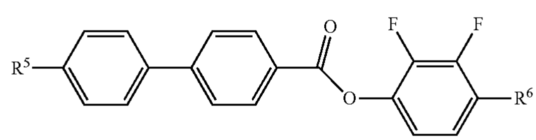
(8-1)
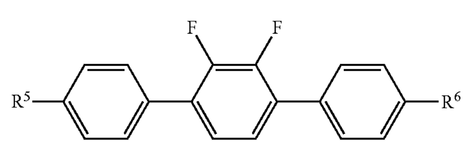
(9-1)
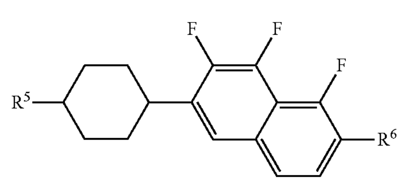

-continued
(9-2)
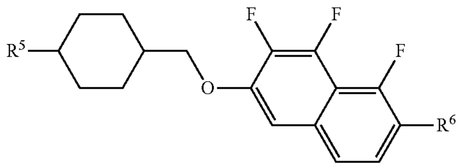
(9-3)
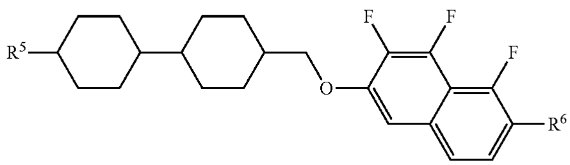
(10-1)
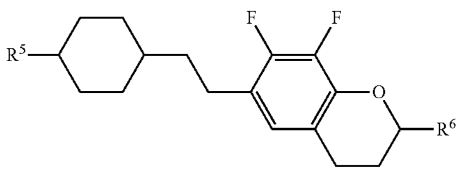
(10-2)
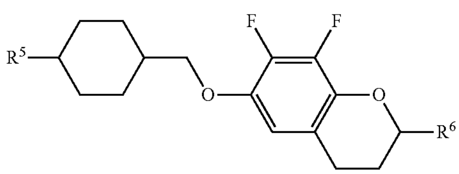
(10-3)
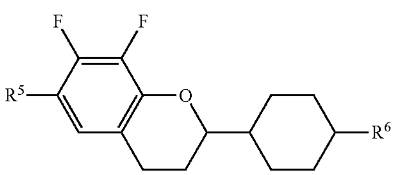
(10-4)
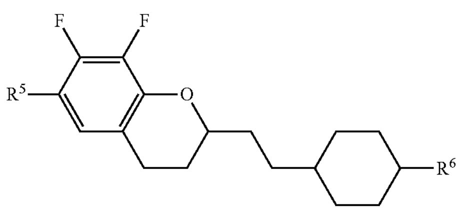
Formula 34
(10-5)
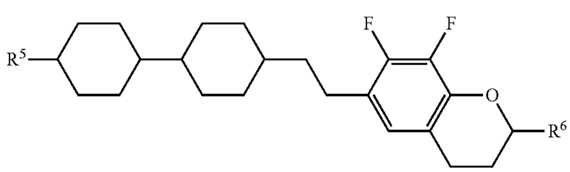
(10-6)
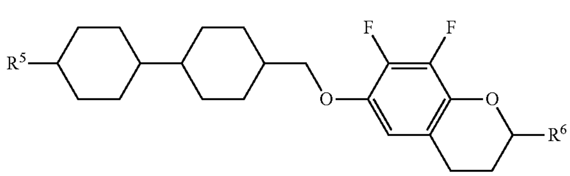
-continued
(10-7)
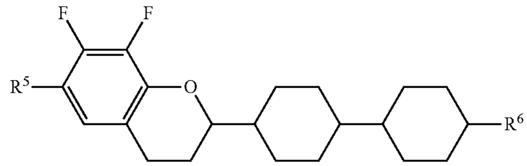
(10-8)
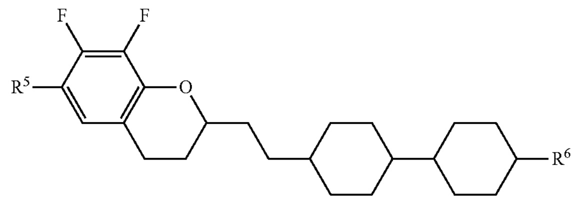
(10-9)
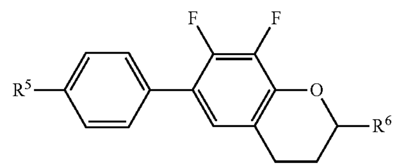
(10-10)
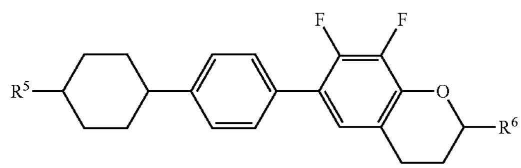
(10-11)
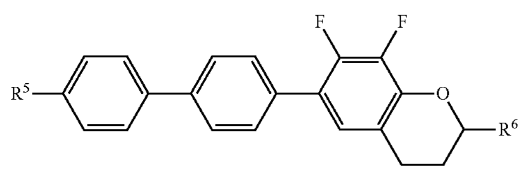
(11-1)
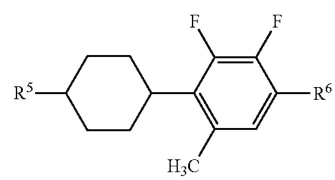
(11-2)
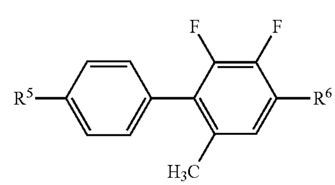
(11-3)
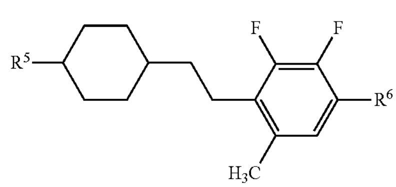

-continued (11-4)

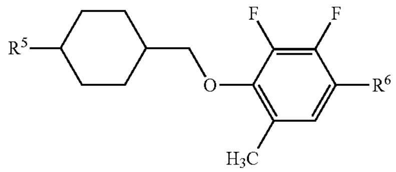

(11-5)

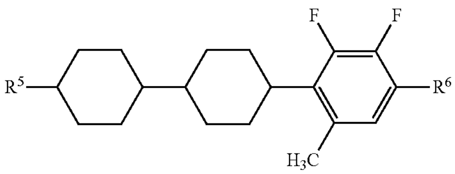

(11-6)

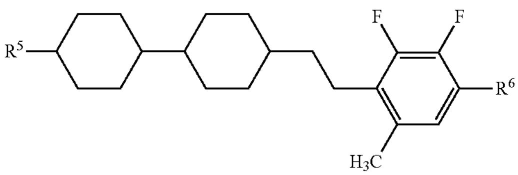

(11-7)

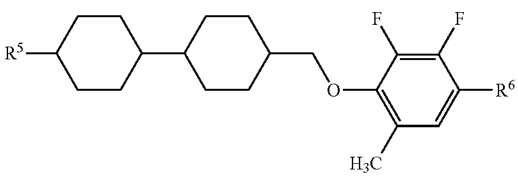

(11-8)

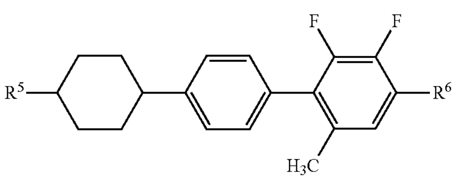

(11-9)

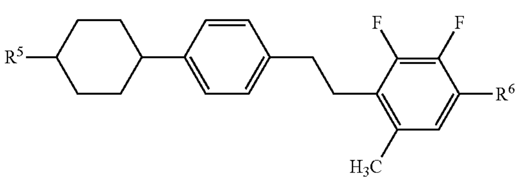

(11-10)

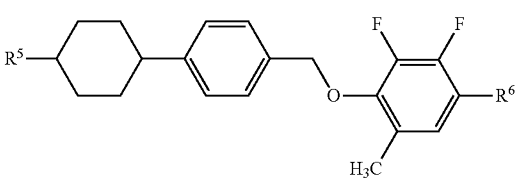

In the compounds (component D), $R^5$ and $R^6$ are defined in a manner identical with the definitions described above.

Component D includes a compound having a negative dielectric anisotropy. Component D is mainly used when preparing a composition for the VA mode or the PSA modes. If content of component D is increased, the dielectric anisotropy of the composition increases, but the viscosity also increases. Thus, the content is preferably decreased, as long as a required value of dielectric anisotropy is satisfied. Accordingly, in consideration of approximately 5 of an absolute value of dielectric anisotropy, the content is preferably in the range of approximately 40% by weight or more based on the total weight of the composition in order to allow sufficient voltage driving.

Among types of compound D, compound (6) is a bicyclic compound, and therefore effective mainly in adjusting the viscosity, the optical anisotropy or the dielectric anisotropy. Compound (7) and compound (8) each are a tricyclic compound, and therefore effective in increasing the maximum temperature, the optical anisotropy or the dielectric anisotropy. Compounds (9) to (11) each are effective in increasing the dielectric anisotropy.

When preparing a composition for the VA mode or the PSA mode, the content of component D is preferably in the range of approximately 40% by weight or more, further preferably, in the range of approximately 50 to approximately 95% by weight, based on the total weight of the composition. When component D is added to the composition, the elastic constant of the composition can be adjusted, and the voltage-transmittance curve of the device can be adjusted. When component D is added to a composition having a positive dielectric anisotropy, the content of component D is preferably in the range of approximately 30% by weight or less based on the total weight of the composition.

Component E includes a compound in which two terminal groups are alkyl or the like. Preferred examples of component E include compounds (12-1) to (12-11), compounds (13-1) to (13-19) and compounds (14-1) to (14-6).

Formula 35

(12-1)

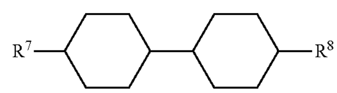

(12-2)

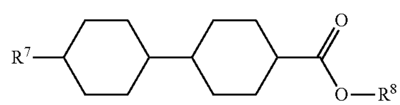

(12-3)

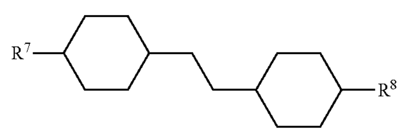

(12-4)

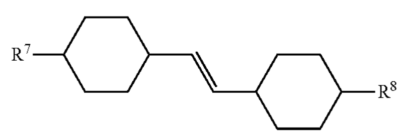

(12-5)

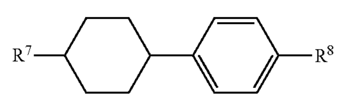

(12-6)

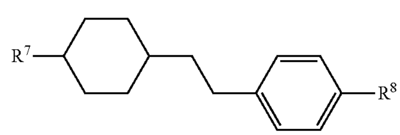

(12-7)

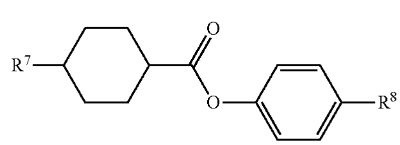

-continued
(12-8)
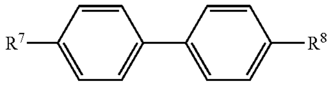
(12-9)
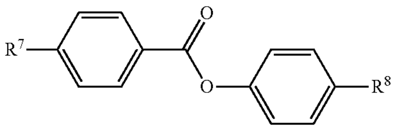
(12-10)
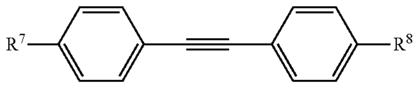
(12-11)
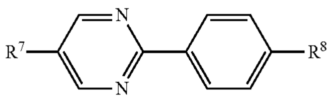
(13-1)
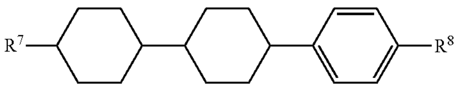
(13-2)
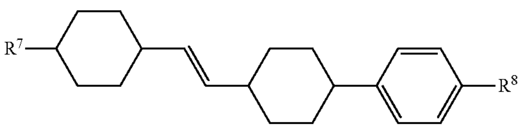
(13-3)
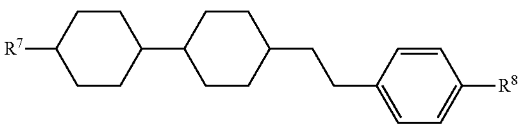
(13-4)
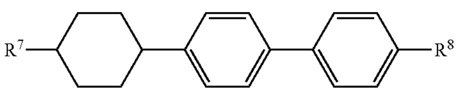
(13-5)
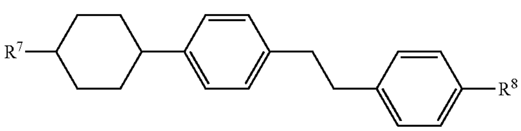
(13-6)
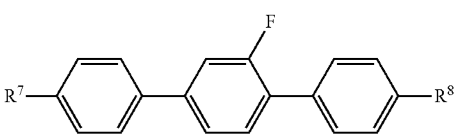
(13-7)
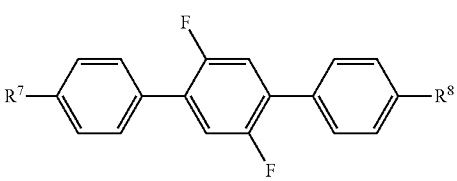
(13-8)
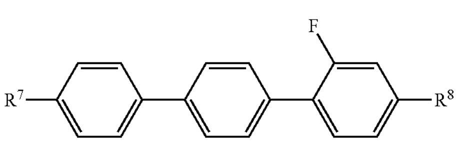
-continued
(13-9)
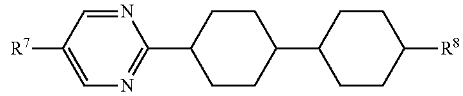
(13-10)
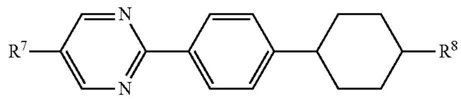
(13-11)
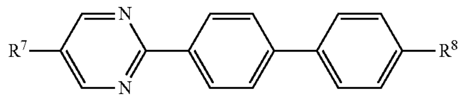
(13-12)
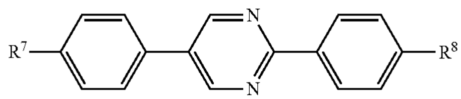
(13-13)
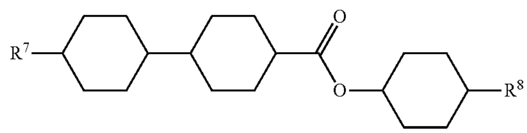
(13-14)
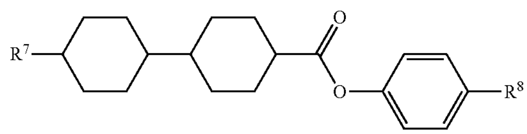
(13-15)
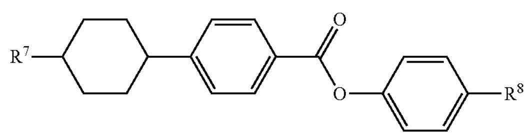
(13-16)
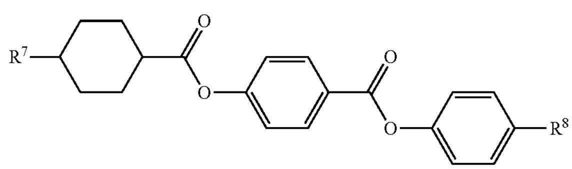
(13-17)
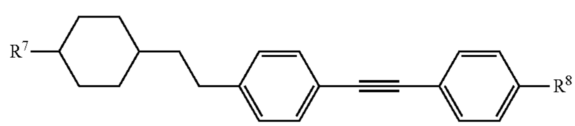
(13-18)
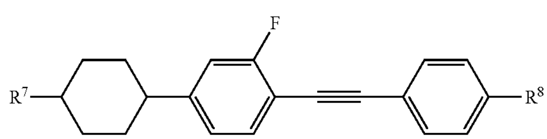
(13-19)
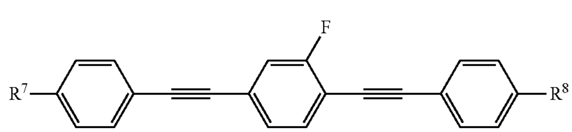

-continued

Formula 36

(14-1)

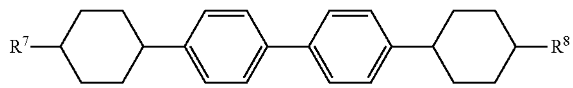

(14-2)

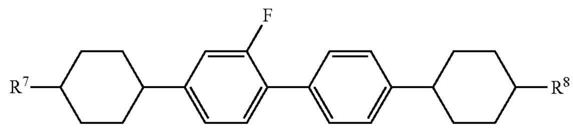

(14-3)

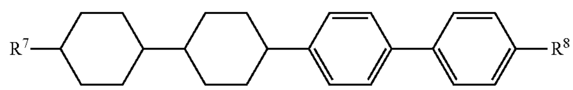

(14-4)

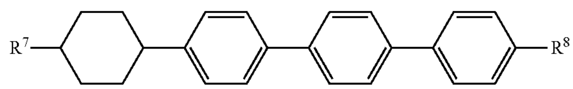

(14-5)

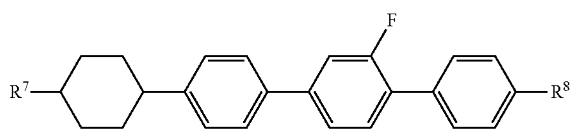

(14-6)

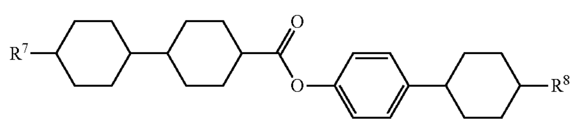

In the compounds (component E), $R^7$ and $R^8$ are defined in a manner identical with the definitions described above.

Component E has a small absolute value of dielectric anisotropy, and therefore is close to neutrality. Compound (12) is effective mainly in adjusting the viscosity or the optical anisotropy. Compound (13) and compound (14) are effective in extending the temperature range of the nematic phase by increasing the maximum temperature, or effective in adjusting the optical anisotropy.

If content of component E is increased, the viscosity of the composition decreases, but the dielectric anisotropy decreases. Thus, the content is preferably increased, as long as a required value for the dielectric anisotropy is satisfied. Accordingly, when preparing a composition for the VA mode or the PSA mode, the content of component E is preferably in the range of approximately 30% by weight or more, and further preferably, in the range of approximately 40% by weight or more, based on the total weight of the composition.

2-2. Preparation of Composition (1) and Additive

Composition (1) is prepared according to a method for dissolving required components at a high temperature, or the like. According to an application, an additive may be added to the composition. Examples of the additives include an optically active compound, a polymerizable compound, a polymerization initiator, an antioxidant and an ultraviolet light absorber. Such additives are well known to those skilled in the art, and are described in literatures.

Composition (1) may further contain at least one optically active compound. As the optically active compound, a publicly known chiral dopant can be added. The chiral dopant is effective in inducing a helical structure of liquid crystals to give a required twist angle, and preventing an inverted twist. Preferred examples of the chiral dopants include optically active compounds (Op-1) to (Op-13) below.

Formula 37

(Op-1)

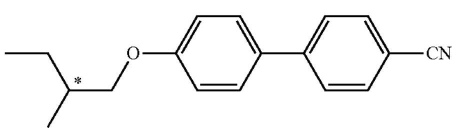

(Op-2)

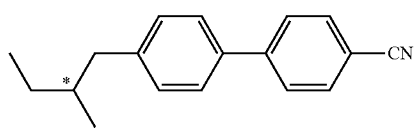

(Op-3)

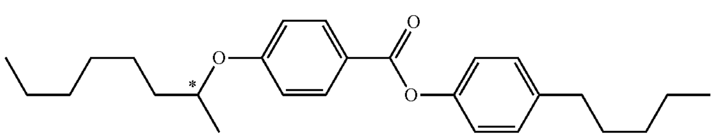

(Op-4)

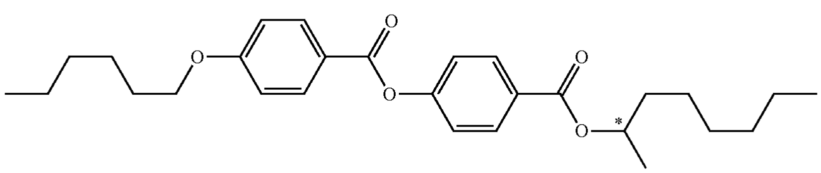

(Op-5)

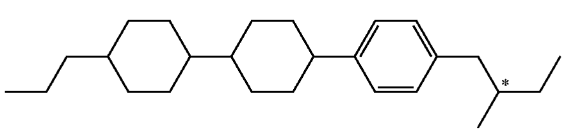

(Op-6)

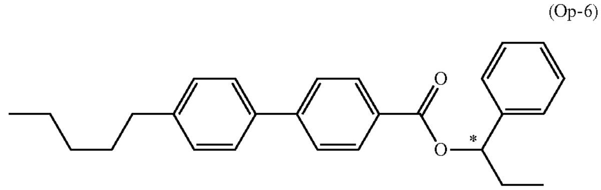

-continued (Op-7)

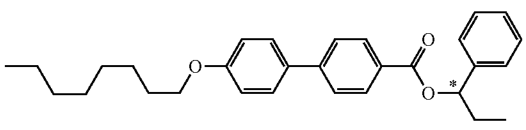

(Op-8)

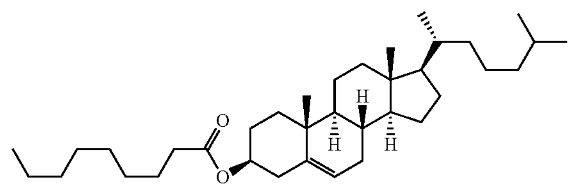

(Op-9)

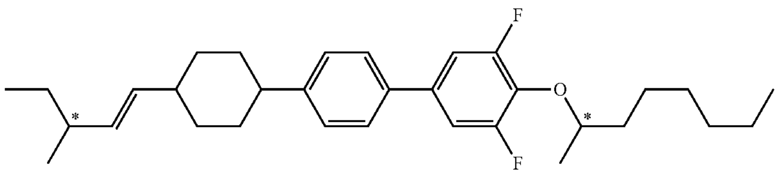

(Op-10)

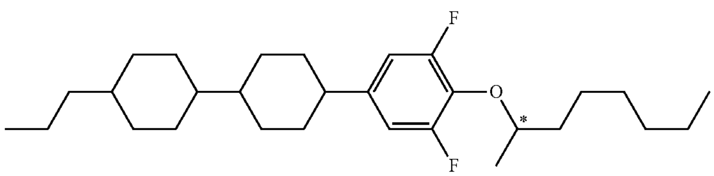

(Op-11)

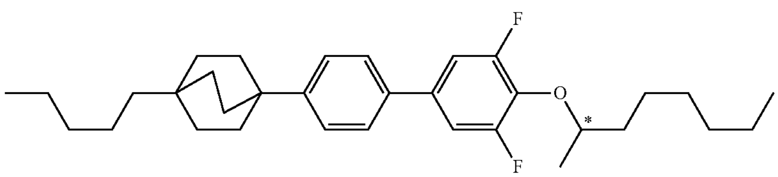

(Op-12)

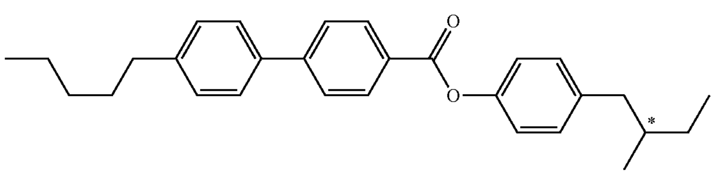

(Op-13)

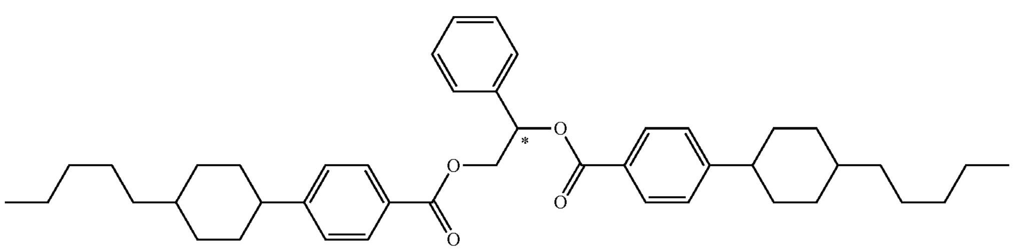

A helical pitch of composition (1) is adjusted by adding such an optically active compound. The helical pitch is preferably adjusted to the range of approximately 40 to approximately 200 micrometers for a composition for the TFT mode and the TN mode. The helical pitch is preferably adjusted to the range of approximately 6 to approximately 20 micrometers for a composition for the STN mode. The helical pitch is preferably adjusted to the range of approximately 1.5 to approximately 4 micrometers for a composition for the BTN mode. Two or more kinds of optically active compounds may be added for the purpose of adjusting temperature dependence of the helical pitch.

Composition (1) can also be used for the PSA mode by adding the polymerizable compound. Examples of the polymerizable compounds include an acrylate, a methacrylate, a vinyl compound, a vinyloxy compound, a propenyl ether, an epoxy compound (oxirane, oxetane) and a vinyl ketone. The polymerizable compound is preferably polymerized by irradiation with ultraviolet light in the presence of a suitable polymerization initiator such as a photopolymerization initiator. Suitable conditions for polymerization, suitable types and suitable amounts of the polymerization initiator are known to those skilled in the art and described in literatures.

The antioxidant is effective in maintaining a large voltage holding ratio. Preferred examples of the antioxidants include 2,6-di-tert-butyl-4-alkyl phenol. The ultraviolet light absorber is effective in preventing a decrease in the maximum temperature. Preferred examples of the ultraviolet light absorbers include a benzophenone derivative, a benzoate derivative and a triazole derivative. Alight stabilizer such as an amine having steric hindrance is also preferred.

If a dichroic dye of a merocyanine type, a styryl type, an azo type, an azomethine type, an azoxy type, a quinophthalone type, an anthraquinone type, a tetrazine type or the like is added to the composition, composition (1) can also be used for a guest-host (GH) mode.

3. Liquid Crystal Display Device

Composition (1) can be used for a liquid crystal display device that has the operating mode such as the PC mode, the TN mode, the STN mode, the OCB mode and the PSA mode, and is driven according to an active matrix (AM) mode. Composition (1) can also be used for a liquid crystal display device that has the operating mode such as the PC mode, the TN mode, the STN mode, the OCB mode, the VA mode and the IPS mode, and is driven according to a passive matrix (PM) mode. The devices according to the AM mode and the PM mode can also be applied to any type of a reflective type, a transmissive type and a transflective type.

Composition (1) can also be used for a nematic curvilinear aligned phase (NCAP) device prepared by microencapsulating nematic liquid crystals, a polymer dispersed liquid crystal display device (PDLCD) and a polymer network liquid crystal display device (PNLCD) as prepared by forming a three-dimensional network polymer in the liquid crystals.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereinafter, the invention will be explained in more detail by way of Examples, but the invention is not limited by the Examples.

1-1. Examples of Compound (1)

Compound (1) was prepared according to procedures as described below. A compound prepared was identified by a method such as an NMR analysis. Physical properties of the compound were measured by methods as described below.

NMR Analysis

As a measuring apparatus, DRX-500 (made by Bruker BioSpin Corporation) was used. In measurement of $^{1}$H-NMR, a sample was dissolved into a deuterated solvent such as $CDCl_3$, and measurement was carried out under the conditions of room temperature, 500 MHz and 16 times of accumulation. Tetramethylsilane was used as a reference material. In measurement of $^{19}$F-NMR, $CFCl_3$ was used as a reference material, and measurement was carried out under the conditions of 24 times of accumulation. In the explanation of nuclear magnetic resonance spectra, s, d, t, q, quin, sex, m and br stand for a singlet, a doublet, a triplet, a quartet, a quintet, a sextet, a multiplet and broad, respectively.

Measurement Sample

When measuring a phase structure and a transition temperature, a liquid crystal compound per se was used as a sample. When measuring physical properties such as a maximum temperature of a nematic phase, viscosity, optical anisotropy and dielectric anisotropy, a composition prepared by mixing a compound with a base liquid crystal was used as a sample.

When using the sample in which the compound is mixed with the base liquid crystal, measurement was carried out according to the methods described below. A sample was prepared by mixing 15% by weight of compound with 85% by weight of base liquid crystal. Extrapolated values were calculated from measured values of the sample, according to an extrapolation method represented by an equation described below, and the values were described.

(Extrapolated value)={100×(measured value of a sample)−(% by weight of base liquid crystal)×(measured value of the base liquid crystal)}/(% by weight of compound).

When a crystal (or a smectic phase) precipitated at 25° C. even at the ratio of the compound to the base liquid crystal, a ratio of the compound to the base liquid crystal was changed in the order of (10% by weight:90% by weight), (5% by weight:95% by weight) and (1% by weight:99% by weight), and physical properties of a sample were measured at a ratio at which no crystal (or no smectic phase) precipitated at 25° C. In addition, unless otherwise noted, the ratio of the compound to the base liquid crystal is 15% by weight:85% by weight.

As the base liquid crystal, base liquid crystal (i) as described below was used. Ratios of components in base liquid crystal (i) are expressed in terms of weight percent.

Formula 38

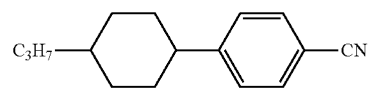

24%

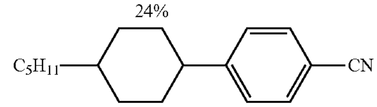

36%

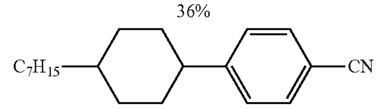

25%

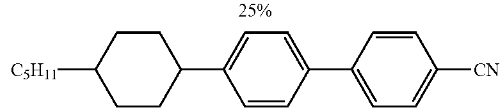

15%

Measuring Method

Physical properties were measured according to the methods described below. Most of the methods are applied as described in the Standard of Japan Electronics and Information Technology Industries Association (hereinafter, abbreviated as JEITA) as the JEITA standard (JEITA ED-2521A) to be discussed and established in JEITA, or as modified thereon. No TFT was attached to a TN device used for measurement.

(1) Phase Structure

A sample was placed on a hot plate of a melting point apparatus (FP-52 Hot Stage made by Mettler-Toledo International Inc.) equipped with a polarizing microscope, and a state of phase and a change thereof were observed with the polarizing microscope while heating the sample at a rate of 3° C. per minute, and a kind of the phase was specified.

(2) Phase Transition Temperature (° C.)

A sample was heated and then cooled at a rate of 3° C. per minute using a differential scanning calorimeter, DSC-7 System or Diamond DSC System, made by PerkinElmer, Inc. A starting point of an endothermic peak or an exothermic peak caused by a phase change of the sample was determined by extrapolation, and thus a phase transition temperature was determined. Temperature at which a compound transits from a solid to a liquid crystal phase such as a smectic phase and a nematic phase may be occasionally abbreviated as "minimum temperature of the liquid crystal phase." Temperature at which a compound transits from the liquid crystal phase to a liquid may be occasionally abbreviated as "clearing point."

The crystal was expressed as C. When kinds of the crystals were further distinguishable, each of the crystals was expressed as $C_1$ or $C_2$. The smectic phase was expressed as S and the nematic phase as N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. The phase transition temperature was expressed, for example, as "C 50.0N 100.0 I." The expression represents that a phase transition temperature from the crystal to the nematic phase is 50.0° C., and a phase transition temperature from the nematic phase to the liquid is 100.0° C.

(3) Compatibility at a Low Temperature

Samples were prepared in which a base liquid crystal and a liquid crystal compound were mixed for a ratio of the compound to be 20% by weight, 15% by weight, 10% by weight, 5% by weight, 3% by weight and 1% by weight, and the samples were put in glass vials. The glass vials were kept in freezers at −10° C. or −20° C. for a fixed period of time, and then whether or not a crystal or a smectic phase precipitated was observed.

(4) Maximum Temperature of a Nematic Phase ($T_{NI}$ or NI; ° C.)

A sample was placed on a hot plate of a melting point apparatus equipped with a polarizing microscope, and heated at a rate of 1° C. per minute. Temperature when part of the sample changed from the nematic phase to the isotropic liquid was measured. A maximum temperature of the nematic phase may be occasionally abbreviated as "maximum temperature." When the sample was a mixture of the compound and the base liquid crystal, the maximum temperature was expressed using a symbol of $T_{NI}$. When the sample was a mixture of the compound and component B or the like, the maximum temperature was expressed using a symbol of NI.

(5) Minimum Temperature of a Nematic Phase ($T_c$; ° C.)

Samples each having a nematic phase were kept in freezers at 0° C., −10° C., −20° C., −30° C. and −40° C. for 10 days, and then liquid crystal phases were observed. For example, when a sample maintained the nematic phase at −20° C. and changed to a crystal or a smectic phase at −30° C., $T_c$ was expressed as $T_c \leq -20$° C. A minimum temperature of the nematic phase may be occasionally abbreviated as "minimum temperature."

(6) Viscosity (Bulk Viscosity; η; Measured at 20° C.; mPa·s)

Viscosity was measured using a cone-plate (E type) rotational viscometer.

(7) Viscosity (Rotational Viscosity; $\gamma^1$; Measured at 25° C.; mPa·s)

Measurement was carried out according to a method described in M. Imai et al., Molecular Crystals and Liquid Crystals, Vol. 259, 37 (1995). A sample was put in a TN device in which a twist angle was 0 degrees and a distance (cell gap) between two glass substrates was 5 micrometers. Voltage was stepwise applied to the device in the range of 16 V to 19.5 V at an increment of 0.5 V. After a period of 0.2 second with no voltage application, application was repeated under conditions of only one of rectangular waves (rectangular pulse; 0.2 second) and no application (2 seconds). A peak current and a peak time of a transient current generated by the application were measured. A value of rotational viscosity was obtained from the measured values according to calculating equation (8) on page 40 of the paper by Imai et al. A value of dielectric anisotropy necessary for the calculation was determined by using the device used for measuring the rotational viscosity according to the method as described below.

(8) Optical Anisotropy (Refractive Index Anisotropy; Measured at 25° C.; Δn)

Measurement was carried out by means of Abbe refractometer with a polarizing plate mounted on an ocular by using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy (Δn) was calculated from an equation:

$$\Delta n = n\| - n\perp.$$

(9) Dielectric Anisotropy (Δ∈; Measured at 25° C.)

A sample was put in a TN device in which a distance (cell gap) between two glass substrates was 9 micrometers and a twist angle was 80 degrees. Sine waves (10V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

(10) Elastic Constant (K; Measured at 25° C.; pN)

HP4284A LCR Meter made by Yokogawa-Hewlett-Packard Co. was used for measurement. A sample was put in a horizontal alignment cell in which a distance (cell gap) between two glass substrates was 20 micrometers. An electric charge from 0 V to 20 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.), and values of $K_{11}$ and $K_{33}$ were obtained from equation (2.99). Next, $K_{22}$ was calculated using the previously determined values of $K_{11}$ and $K_{33}$ in equation (3.18) on page 171 of the same Handbook. An elastic constant is a mean value of the thus determined $K_{11}$, $K_{22}$ and $K_{33}$.

(11) Threshold Voltage (Vth; Measured at 25° C.; V)

An LCD-5100 luminance meter made by Otsuka Electronics Co., Ltd. was used for measurement. A light source was a halogen lamp. A sample was put in a normally white mode TN device in which a distance (cell gap) between two glass substrates was 0.45/Δn (μm) and a twist angle was 80 degrees. Voltage (32 Hz, rectangular waves) to be applied to the device was stepwise increased from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 90% transmittance.

(12) Voltage Holding Ratio (VHR-1; at 25° C.; %)

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

(13) Voltage Holding Ratio (VHR-2; at 80° C.; %)

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the TN device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Raw Materials

Solmix A-11 (registered trade name) is a mixture of ethanol (85.5%), methanol (13.4%) and isopropanol (1.1%), and obtained from Japan Alcohol Trading Co., Ltd. Tetrahydrofuran may be occasionally abbreviated as THF.

Example 1

Synthesis of Compound (No. 13)

Formula 39

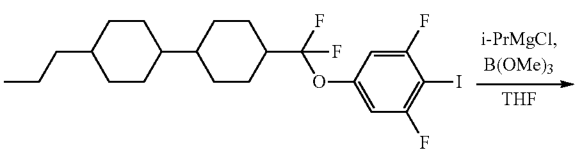

(e-1)

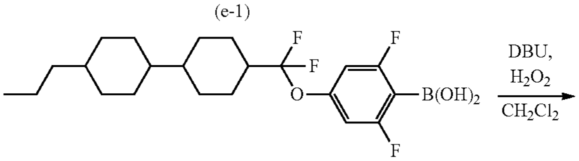

(e-2)

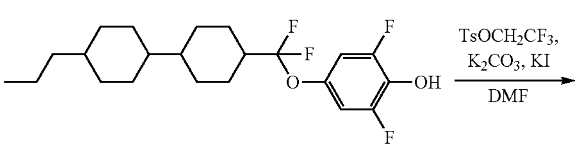

(e-3)

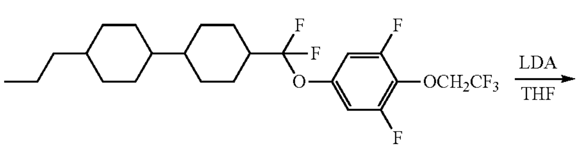

(e-4)

-continued

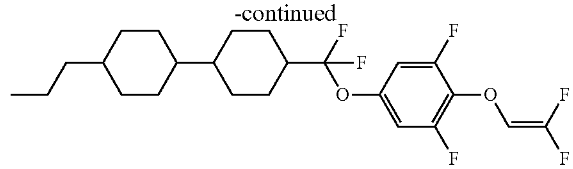

(No.13)

Under a nitrogen atmosphere, compound (e-1) (210 g) and THF (1,200 mL) were put into a reaction vessel, and the resultant mixture was cooled at −20° C. Thereto, isopropyl magnesium chloride (20%; THF solution; 350 g) was slowly added dropwise at −20° C., and the resultant mixture was further stirred for 30 minutes. Subsequently, trimethyl borate (70 g) was added at −20° C., the resultant mixture was stirred for 30 minutes, and then returned to room temperature. After reaction completion, the resultant mixture was subjected to post-treatment with a 10% hydrochloric acid aqueous solution. An aqueous layer was extracted with ethyl acetate, combined organic layers were concentrated under reduced pressure, a residue was washed with heptane, and thus compound (e-2) was obtained.

Second Step

Compound (e-2) and methylene chloride (600 mL) were put into a reaction vessel, and then 1,8-diazabicyclo[5.4.0]undeca-7-en (DBU) (6 g) was added thereto, and a hydrogen peroxide aqueous solution (27%; aqueous solution; 100 mL) was slowly added dropwise at 20° C. The resultant mixture was stirred at 30° C. for 30 minutes, and then a reaction mixture was poured into pure water and an aqueous layer was extracted with dichloromethane. Combined organic layers were sequentially washed with an aqueous solution of sodium thiosulfate and pure water. The solution was concentrated under reduced pressure, and thus compound (e-3) (110 g) was obtained. A yield based on compound (e-1) was 66.7%.

Third Step

Under a nitrogen atmosphere, compound (e-3) (100 g), 1-methyl-4-(2,2,2-trifluoroethoxy)benzene (70 g), potassium carbonate (90 g), potassium iodide (3 g) and DMF (500 mL) were put into a reaction vessel, and the resultant mixture was subjected to heating stirring at 120° C. for 4 hours. A reaction mixture was cooled to room temperature, and subjected to post-treatment with a 15% hydrochloric acid aqueous solution. An aqueous layer was extracted with ethyl acetate, and combined organic layers were concentrated under reduced pressure. A residue was purified by recrystallization from ethanol, and thus compound (e-4) (85 g; 70.6%) was obtained.

Fourth Step

Under a nitrogen atmosphere, compound (e-4) (48 g) and THF (240 mL) were put into a reaction vessel, and the resultant mixture was cooled at −75° C. Thereto, LDA (adjusted from diisopropylamine (70 g) and n-butyllithium (385 mL)) was slowly added dropwise at −75° C. Then, a reaction mixture was returned to room temperature, subjected to post-treatment with pure water, and an aqueous layer was extracted with hexane. Combined organic layers were washed with pure water, and the solution was concentrated under reduced pressure. A residue was passed through silica gel chromatography, and then purified by recrystallization, and thus compound (No. 13) (6 g: 13.0%) was obtained.

$^1$H-NMR (δ ppm; $CDCl_3$): 6.80 (d, 2H, J=8.7 Hz), 6.20 (dd, 1H, J=3.2 Hz, 14.5 Hz), 2.05-1.92 (m, 3H), 1.88-1.81 (m, 2H), 1.79-1.67 (m, 4H), 1.38-1.24 (m, 4H), 1.19-1.11 (m, 3H), 1.10-0.92 (m, 6H), 0.90-0.80 (m, 2H), 0.87 (t, 3H, J=7.4 Hz).

$^{19}$F-NMR (δ ppm; $CFCl_3$): −79.25 (d, 2F, J=8.8 Hz), −96.28-−96.50 (m, 1F), −118.28 (dd, 1F, J=3.2 Hz, 73.1 Hz), −127.39 (dd, 2F, J=2.0 Hz, 8.7 Hz).

Physical properties of compound (No. 13) were as described below.

Attached data were determined in accordance with the methods described above. When measuring a transition temperature, the compound per se was used as a sample. When measuring a maximum temperature ($T_{NI}$), viscosity (η), optical anisotropy (Δn) and dielectric anisotropy (Δ∈), a mixture of the compound (15% by weight) and base liquid crystal (i) (85% by weight) was used as a sample. From the measured values, extrapolated valued were calculated in accordance with the extrapolation method described above and described.

Transition temperature: C 32.8N 138.9 I. $T_{NI}$=105.7° C.; η=25.4 mPa·s; Δn=0.0903; Δ∈=17.4.

Example 2

Synthesis of Compound (No. 22)

Formula 40

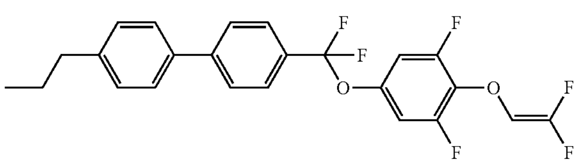

Compound (No. 22) was prepared in a manner similar to the operations in Example 1.

$^{1}$H-NMR (δ ppm; $CDCl_3$): 7.73 (d, 2H, J=8.3 Hz), 7.68 (d, 2H, J=8.3 Hz), 7.53 (d, 2H, J=8.1 Hz), 7.28 (d, 2H, J=8.1 Hz), 6.94 (d, 2H, J=9.7 Hz), 6.23 (dd, 1H, J=3.3 Hz, 14.3 Hz), 2.65 (t, 2H, J=7.6 Hz), 1.69 (tq, 2H, J=7.6 Hz, J=7.3 Hz), 0.98 (t, 3H, J=7.3 Hz).

$^{19}$F-NMR (δ ppm; $CFCl_3$): −66.52 (s, 2F), −96.13-−96.35 (m, 1F), −118.12 (dd, 1F, J=3.2 Hz, 74.2 Hz), −126.89 (d, 2F, J=9.7 Hz).

Physical properties of compound (No. 22) were as described below.

Transition temperature: C 87.7 I. $T_{NI}$=57.7° C.; η=20.9 mPa·s; Δn=0.157; Δ∈=23.9.

Example 3

Synthesis of Compound (No. 25)

Formula 41

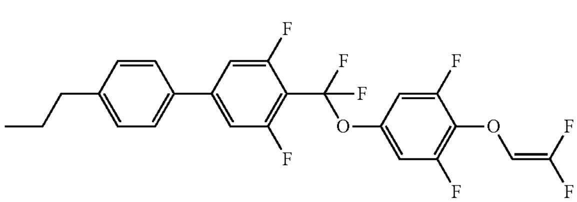

Compound (No. 25) was prepared in a manner similar to the operations in Example 1.

$^{1}$H-NMR (δ ppm; $CDCl_3$): 7.48 (d, 2H, J=8.0 Hz), 7.29 (d, 2H, J=8.0 Hz), 7.20 (d, 2H, J=11.0 Hz), 6.95 (d, 2H, J=8.6 Hz), 6.23 (dd, 1H, J=3.3 Hz, 14.3 Hz), 2.65 (t, 2H, J=7.7 Hz), 1.68 (tq, 2H, J=7.7 Hz, J=7.4 Hz), 0.97 (t, 3H, J=7.4 Hz).

$^{19}$F-NMR (δ ppm; $CFCl_3$): −61.94 (t, 2F, J=27.8 Hz), −96.09-−96.30 (m, 1F), −111.10 (dt, 2F, J=11.0 Hz, 27.8 Hz), −118.07 (dd, 1F, J=3.3 Hz, 73.1 Hz), −126.89 (d, 2F, J=8.6 Hz).

Physical properties of compound (No. 25) were as described below.

Transition temperature: C 32.7 I. $T_{NI}$=15.7° C.; η=30.4 mPa·s; Δn=0.137; Δ∈=32.6.

Example 4

Synthesis of Compound (No. 67)

Formula 42

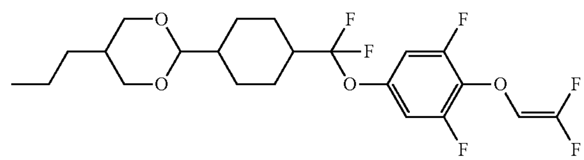

Compound (No. 67) was prepared in a manner similar to the operations in Example 1.

$^{1}$H-NMR (δ ppm; $CDCl_3$): 6.80 (d, 2H, J=8.7 Hz), 6.20 (dd, 1H, J=3.1 Hz, 14.4 Hz), 4.19 (d, 1H, J=5.1 Hz), 4.08 (dd, 2H, J=4.5 Hz, 11.3 Hz), 3.29 (dd, 2H, J=11.2 Hz, 11.2 Hz), 2.08-1.92 (m, 6H), 1.59-1.49 (m, 1H), 1.39-1.25 (m, 4H), 1.19-1.08 (m, 2H), 1.05-0.98 (m, 2H), 0.90 (t, 3H, J=7.2 Hz).

$^{19}$F-NMR (δ ppm; $CFCl_3$): −79.21 (d, 2F, J=8.75 Hz), −96.28-−96.50 (m, 1F), −118.28 (dd, 1F, J=3.1 Hz, 74.2 Hz), 127.35 (d, 2F, J=9.8 Hz).

Physical properties of compound (No. 67) were as described below.

Transition temperature: C 45.5 SB 64.5 N 101.9 I. $T_{NI}$=71.7° C.; η=44.5 mPa·s; Δn=0.0837; Δ∈=29.9.

Example 5

Synthesis of Compound No. 70

Formula 43

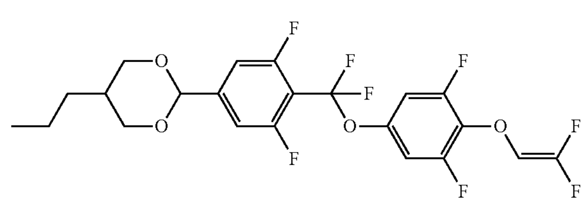

Compound (No. 70) was prepared in a manner similar to the operations in Example 1.

$^{1}$H-NMR (δ ppm; $CDCl_3$): 7.13 (d, 2H, J=10.1 Hz), 6.91 (d, 2H, J=8.4 Hz), 6.22 (dd, 1H, J=3.3 Hz, 14.2 Hz), 5.36 (s, 1H), 4.24 (dd, 2H, J=4.6 Hz, 11.8 Hz), 3.52 (d, 2H, J=11.8 Hz), 2.17-2.07 (m, 1H), 1.38-1.29 (m, 2H), 1.12-1.06 (m, 2H), 0.93 (t, 3H, J=7.3 Hz).

$^{19}$F-NMR (δ ppm; $CFCl_3$): −62.07 (t, 2F, J=28.5 Hz), −96.17 (dd, 1F, J=14.2 Hz, 73.0 Hz), −110.62 (dt, 2F, J=10.1 Hz, 28.5 Hz), −118.04 (dd, 2F, J=3.3 Hz, 73.0 Hz), −126.66 (dd, 2F, J=2.0 Hz, 8.4 Hz).

Physical properties of compound (No. 70) were as described below.

Transition temperature: C 31.3 I. $T_{NI}$=6.4° C.; η=27.9 mPa·s; Δn=0.0837; Δ∈=33.7.

Example 6

Synthesis of Compound (No. 148)

Formula 44

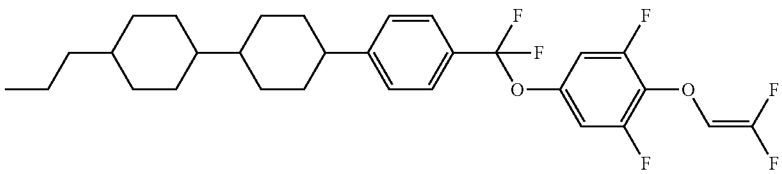

Compound (No. 148) was prepared in a manner similar to the operations in Example 1.

$^{1}$H-NMR (δ ppm; $CDCl_3$): 7.61 (d, 2H, J=8.2 Hz), 7.33 (d, 2H, J=8.2 Hz), 6.93 (d, 2H, J=8.6 Hz), 6.24 (dd, 1H, J=3.5 Hz, 14.4 Hz), 2.54 (tt, 1H, J=3.2 Hz, 12.2 Hz), 1.98-1.92 (m, 2H), 1.92-1.86 (m, 2H), 1.83-1.74 (m, 4H), 1.52-1.42 (m, 2H), 1.38-1.29 (m, 2H), 1.22-1.14 (m, 6H), 1.12-0.98 (m, 3H), 0.94-0.84 (m, 2H), 0.90 (t, 3H, J=7.4 Hz).

$^{19}$F-NMR (δ ppm; $CFCl_3$): −66.51 (s, 2F), −96.15-−96.35 (m, 1F), −118.12 (dd, 1F, J=3.5 Hz, 74.2 Hz), −127.01 (d, 2F, J=8.6 Hz).

Physical properties of compound (No. 148) were as described below.

Transition temperature: C 76.7 C 82.2 C 90.7 N 211.4 I. $T_{NI}$=161.7° C.; η=42.5 mPa·s; Δn=0.137; Δ∈=19.6.

Example 7

Synthesis of Compound (No. 151)

Formula 45

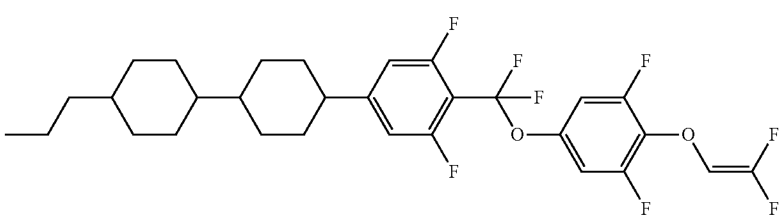

Compound (No. 151) was prepared in a manner similar to the operations in Example 1.

$^{1}$H-NMR (δ ppm; $CDCl_3$): 6.95 (d, 2H, J=8.5 Hz), 6.85 (d, 2H, J=10.8 Hz), 6.24 (dd, 1H, J=3.3 Hz, 14.5 Hz), 2.49 (tt, 1H, J=3.2 Hz, 12.2 Hz), 1.97-1.85 (m, 4H), 1.83-1.72 (m, 4H), 1.45-1.29 (m, 4H), 1.22-0.97 (m, 9H), 0.93-0.84 (m, 2H), 0.90 (t, 3H, J=7.3 Hz).

$^{19}$F-NMR (δ ppm; $CFCl_3$): −62.09 (t, 2F, J=27.8 Hz), −96.10-−96.29 (m, 1F), −112.11 (dt, 2F, J=10.8 Hz, 27.8 Hz), −118.03 (dd, 1F, J=3.3 Hz, 73.1 Hz), −126.82 (d, 2F, J=8.5 Hz).

Physical properties of compound (No. 151) were as described below.

Transition temperature: C 54.4 C 75.9 N 183.3 I. $T_{NI}$=124.4° C.; η=53.2 mPa·s; Δn=0.1237; Δ∈=27.6.

Example 8

Synthesis of Compound (No. 155)

Formula 46

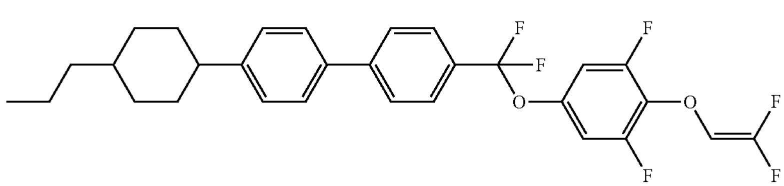

Compound (No. 155) was prepared in a manner similar to the operations in Example 1.

$^{1}$H-NMR (δ ppm; $CDCl_3$): 7.73 (d, 2H, J=8.3 Hz), 7.68 (d, 2H, J=8.3 Hz), 7.54 (d, 2H, J=8.2 Hz), 7.32 (d, 2H, J=8.2 Hz), 6.94 (d, 2H, J=8.4 Hz), 6.23 (dd, 1H, J=3.2 Hz, 14.0 Hz), 2.53 (tt, 1H, J=3.2 Hz; 12.2 Hz), 1.97-1.85 (m, 4H), 1.54-1.44 (m, 2H), 1.41-1.27 (m, 3H), 1.27-1.20 (m, 2H), 1.13-1.02 (m, 2H), 0.91 (t, 3H, J=7.1 Hz).

$^{19}$F-NMR (δ ppm; $CFCl_3$): −66.54 (s, 2F), −96.10-−96.31 (m, 1F), −118.08 (dd, 1F, J=3.2 Hz, 73.0 Hz), −126.80 (d, 2F, J=8.4 Hz).

Physical properties of compound (No. 155) were as described below.

Transition temperature: C 67.3 C 80.2 SG 98.6 SF 106 SB 109 SA 152.4 N 208.5 I. $T_{NI}$=163.7° C.; η=48.7 mPa·s; Δn=0.177; $\Delta\epsilon$=21.8.

Example 9

Synthesis of Compound (No. 157)

Formula 47

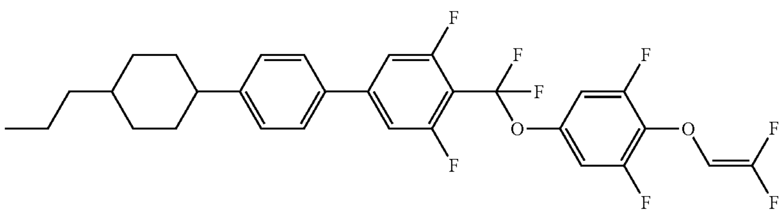

Compound (No. 157) was prepared in a manner similar to the operations in Example 1.

$^{1}$H-NMR (δ ppm; $CDCl_3$): 7.49 (d, 2H, J=8.3 Hz), 7.32 (d, 2H, J=8.3 Hz), 7.20 (d, 2H, J=10.5 Hz), 6.95 (d, 2H, J=8.4 Hz), 6.22 (dd, 1H, J=3.3 Hz, 14.1 Hz), 2.53 (tt, 1H, J=3.1 Hz, 12.1 Hz), 1.96-1.86 (m, 4H), 1.54-1.42 (m, 2H), 1.41-1.28 (m, 3H), 1.28-1.20 (m, 2H), 1.13-1.02 (m, 2H), 0.91 (t, 3H, J=7.4 Hz).

$^{19}$F-NMR (δ ppm; $CFCl_3$): −61.95 (t, 2F, J=27.8 Hz), −96.08-96.29 (m, 1F), −111.12 (dt, 2F, J=10.5 Hz, 27.7 Hz), −118.11 (dd, 1F, J=3.3 Hz, 73.0 Hz), −126.71 (d, 2F, J=8.4 Hz).

Physical properties of compound (No. 157) were as described below.

Transition temperature: C 81 N 164 I. $T_{NI}$=94.4° C.; η=34.9 mPa·s; Δn=0.1503; $\Delta\epsilon$=27.23.

Example 10

Synthesis of Compound (No. 163)

Formula 48

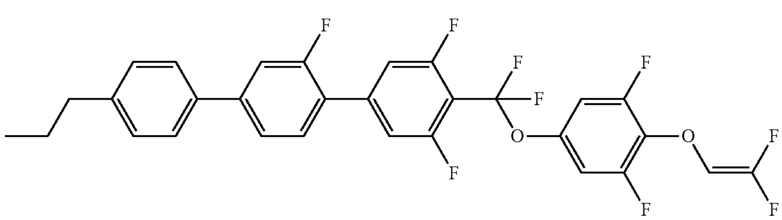

Compound (No. 163) was prepared in a manner similar to the operations in Example 1.

$^{1}$H-NMR (δ ppm; $CDCl_3$): 7.54 (d, 2H, J=8.2 Hz), 7.49 (d, 2H, J=4.3 Hz), 7.42 (d, 1H, J=12.3 Hz), 7.32-7.23 (m, 4H), 6.97 (d, 2H, J=8.2 Hz), 6.24 (dd, 1H, J=3.2 Hz, 14.3 Hz), 2.65 (t, 3H, J=7.7 Hz), 1.69 (tq, 2H, J=7.7 Hz, 7.4 Hz), 0.98 (d, 3H, J=7.4 Hz).

$^{19}$F-NMR (δ ppm; $CFCl_3$): −62.11 (t, 2F, J=27.8 Hz), −96.02-96.24 (m, 1F), −111.16 (dt, 2F, J=11.0 Hz, 27.9 Hz), −118.03 (dd, 1F, J=3.2 Hz, 73.0 Hz), −117.30-−117.37 (m, 1F), −126.64 (d, 2F, J=8.2 Hz).

Physical properties of compound (No. 163) were as described below.

Transition temperature: C 86.2 SA 126.9 N 156.9. $T_{NI}$=104.4° C.; η=53.9 mPa·s; Δn=0.2103; $\Delta\epsilon$=39.23.

Example 11

Synthesis of Compound (No. 205)

Formula 49

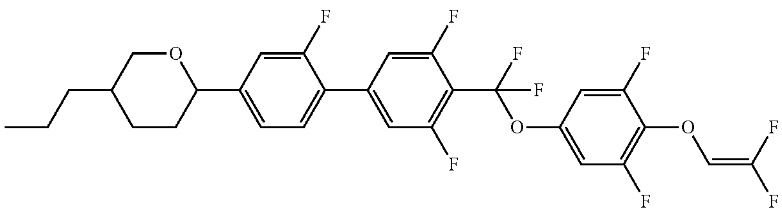

Compound (No. 205) was prepared in a manner similar to the operations in Example 1.

$^{1}$H-NMR (δ ppm; $CDCl_3$): 7.38 (dd, 1H, J=7.9 Hz, 7.9 Hz), 7.25-7.18 (m, 4H), 6.95 (d, 2H, J=8.4 Hz), 6.23 (dd, 1H, J=3.1 Hz, 14.1 Hz), 4.32-4.30 (m, 1H), 4.11 (ddd, 1H, J=1.8 Hz, 4.1 Hz, 11.2 Hz), 3.22 (dd, 1H, J=11.2 Hz, 11.2 Hz), 2.05-1.98 (m, 1H), 1.95-1.88 (m, 1H), 1.74-1.63 (m, 1H), 1.62-1.52 (m, 1H), 1.45-1.24 (m, 3H), 1.23-1.09 (m, 2H), 0.93 (t, 3H, J=7.3 Hz).

$^{19}$F-NMR (δ ppm; $CFCl_3$): −62.14 (t, 2F, J=27.8 Hz), −96.04-96.25 (m, 1F), −111.28 (dt, 2F, J=11.6 Hz, 27.8 Hz), −117.56 (dd, 1F, J=7.9 Hz, 12.3 Hz), −117.99 (dd, 1F, J=3.1 Hz, 73.0 Hz), −126.66 (dd, 2F, J=2.3 Hz, 8.4 Hz).

Physical properties of compound (No. 205) were as described below.

Transition temperature: C 63.2 N 128.2 I. $T_{NI}$=95.0° C.; η=55.9 mPa·s; Δn=0.1437; Δ∈=37.4.

Example 12

Synthesis of Compound (No. 212)

Formula 50

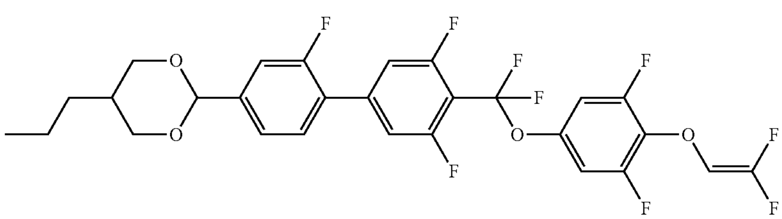

Compound (No. 212) was prepared in a manner similar to the operations in Example 1.

$^{1}$H-NMR (δ ppm; $CDCl_3$): 7.45 (dd, 1H, J=7.4 Hz, 7.4 Hz), 7.00 (d, 1H, J=7.4 Hz), 7.38 (d, 1H, J=10.1 Hz), 7.22 (d, 2H, J=10.6 Hz), 6.98 (d, 2H, J=8.4 Hz), 6.25 (dd, 1H, J=3.2 Hz, 14.4 Hz), 5.47 (s, 1H), 4.28 (dd, 2H, J=4.5 Hz, 11.6 Hz), 3.58 (dd, 2H, J=11.6 Hz, 11.6 Hz), 2.24-2.13 (m, 1H), 1.43-1.33 (m, 2H), 1.17-1.10 (m, 2H), 0.96 (t, 3H, J=7.3 Hz).

$^{19}$F-NMR (δ ppm; $CFCl_3$): −62.17 (d, 2F, J=27.9 Hz), −96.04-−96.24 (m, 1F), −111.11 (dt, 2F, J=10.6 Hz, 27.9 Hz), −117.33 (dd, 1F, J=7.4 Hz, 11.6 Hz), −117.98 (dd, 1F, J=3.2 Hz, 73.0 Hz), −126.64 (d, 2F, J=8.4 Hz).

Physical properties of compound (No. 212) were as described below.

Transition temperature: C 78.4 N 129.9 I. $T_{NI}$=101.7° C.; η=64.2 mPa·s; Δn=0.157; Δ∈=41.7.

Example 13

Synthesis of Compound (No. 446)

Formula 51

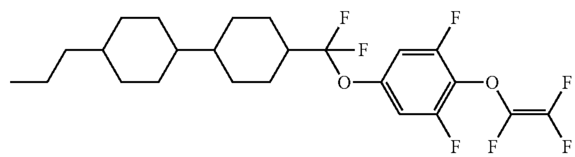

Compound (No. 446) was prepared in a manner similar to the operations in Example 1.

$^{1}$H-NMR (δ ppm; $CDCl_3$): 6.84 (d, 2H, J=8.4 Hz), 2.05-1.92 (m, 3H), 1.88-1.81 (m, 2H), 1.79-1.67 (m, 4H), 1.38-1.24 (m, 4H), 1.19-1.11 (m, 3H), 1.10-0.91 (m, 6H), 0.90-0.80 (m, 2H), 0.87 (t, 3H, J=7.5 Hz).

$^{19}$F-NMR (δ ppm; $CFCl_3$): −79.38 (d, 2F, J=8.9 Hz), −121.39-121.75 (dd, 1F, J=65.2 Hz, 103.8 Hz), −125.39-−125.88 (m, 1F), −126.87-−126.94 (m, 1F), −135.67-−136.09 (m, 1F).

Physical properties of compound (No. 446) were as described below.

Transition temperature: C 32.1 N 93.4 I. $T_{NI}$=73.7° C.; η=53.2 mPa·s; Δn=0.077; Δ∈=13.2.

Example 14

Synthesis of Compound (No. 694)

Formula 52

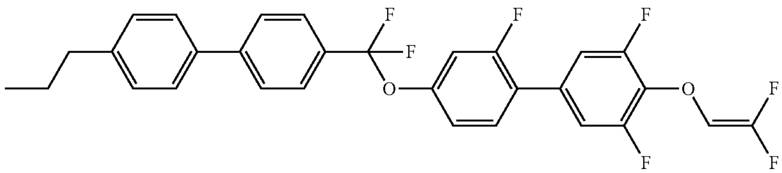

Compound (No. 694) was prepared in a manner similar to the operations in Example 1.

$^{1}$H-NMR (δ ppm; $CDCl_3$): 7.81 (d, 2H, J=8.3 Hz), 7.72 (d, 2H, J=8.3 Hz), 7.57 (d, 2H, J=8.1 Hz), 7.41 (dd, 1H, J=8.1 Hz), 7.32 (d, 2H, J=8.1 Hz), 7.23-7.15 (m, 4H), 6.33 (dd, 1H, J=3.2 Hz, 14.1 Hz), 2.68 (t, 2H, J=7.6 Hz), 1.72 (tq, 2H, J=7.6 Hz, J=7.5 Hz), 1.01 (t, 3H, J=7.5 Hz).

$^{19}$F-NMR (δ ppm; $CFCl_3$): −66.07 (s, 2F), −96.23-−96.44 (m, 1F), −115.00 (dd, 1F, J=8.1 Hz), −118.14 (dd, 1F, J=3.2 Hz, 73.2 Hz), −128.61 (d, 2F, J=9.7 Hz).

Physical properties of compound (No. 694) were as described below.

Transition temperature: C 106.3 SA 153.3 N 181.7. $T_{NI}$=131.7° C.; η=49.2 mPa·s; Δn=0.2103; Δ∈=29.23.

Compounds (No. 1) to (No. 696) shown below can be prepared in a manner similar to the synthesis method described in Example 1.

Formula 53

| No. | |
|---|---|
| 1 | 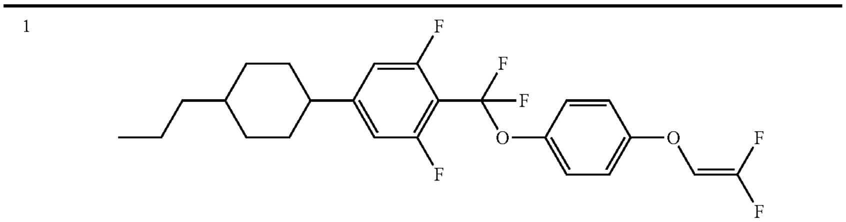 |
| 2 | 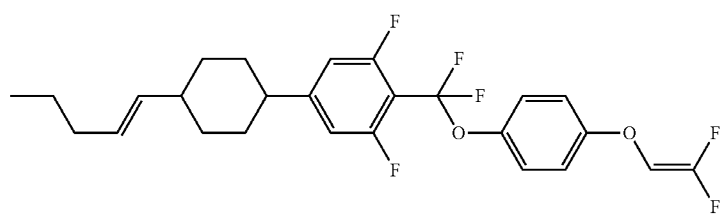 [SMILES: CCC/C=C/C1CCC(c2cc(F)c(C(F)(F)Oc3ccc(OC=C(F)F)cc3)c(F)c2)CC1] |
| 3 | 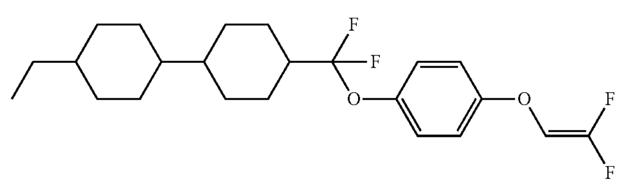 [SMILES: CCC1CCC(C2CCC(C(F)(F)Oc3ccc(OC=C(F)F)cc3)CC2)CC1] |
| 4 | 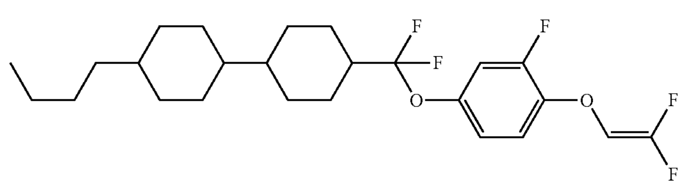 |
| 5 | 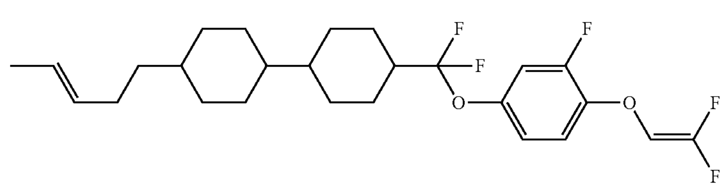 |

-continued
| Formula 53 | |
|---|---|
| No. | |
| 6 | 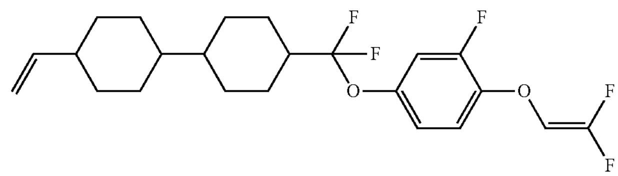 [SMILES: C=CC1CCC(C2CCC(C(F)(F)Oc3ccc(OC=C(F)F)c(F)c3)CC2)CC1] |
| 7 | 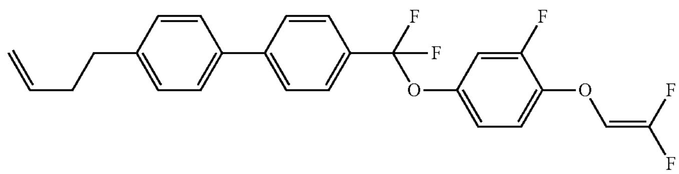 [SMILES: C=CCCc1ccc(-c2ccc(C(F)(F)Oc3ccc(OC=C(F)F)c(F)c3)cc2)cc1] |
| 8 | 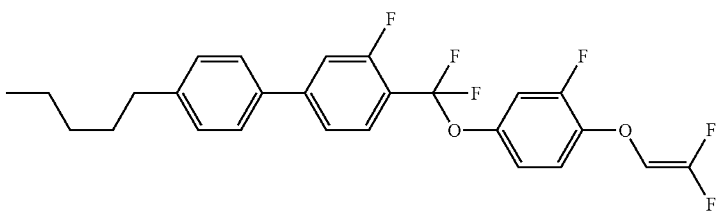 [SMILES: CCCCCc1ccc(-c2ccc(C(F)(F)Oc3ccc(OC=C(F)F)c(F)c3)c(F)c2)cc1] |
| 9 | 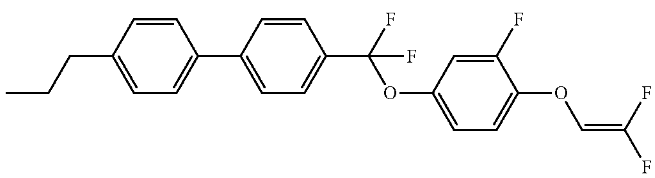 [SMILES: CCCc1ccc(-c2ccc(C(F)(F)Oc3ccc(OC=C(F)F)c(F)c3)cc2)cc1] |
| 10 | 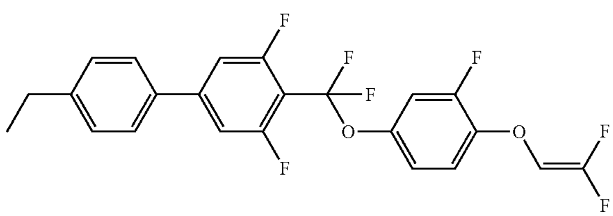 [SMILES: CCc1ccc(-c2cc(F)c(C(F)(F)Oc3ccc(OC=C(F)F)c(F)c3)c(F)c2)cc1] |
| 11 | 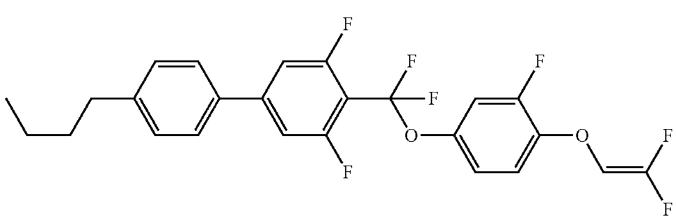 |
| 12 | 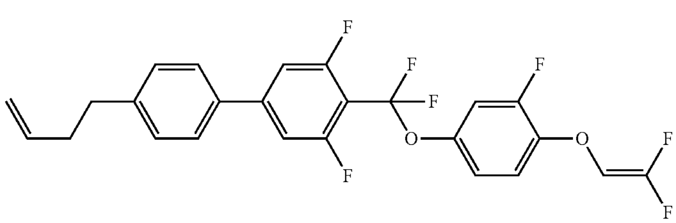 [SMILES: CCCCc1ccc(-c2cc(F)c(C(F)(F)Oc3ccc(OC=C(F)F)c(F)c3)c(F)c2)cc1] |

-continued
| Formula 53 | |
|---|---|
| No. | |
| 13 | 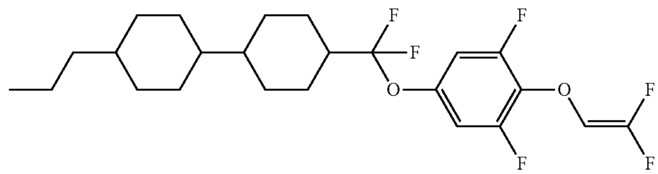<br>C 32.8 N 138.9 I<br>$T_{NI}$ = 105.7° C., η = 25.4 mPa · S, Δ n = 0.0903, Δ ε = 17.4 |
| 14 | 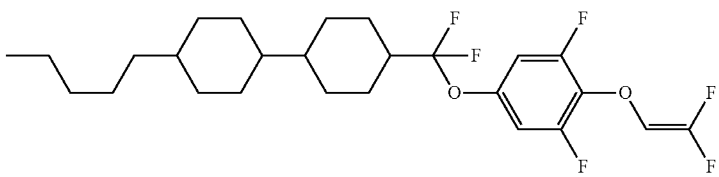 |
| 15 | 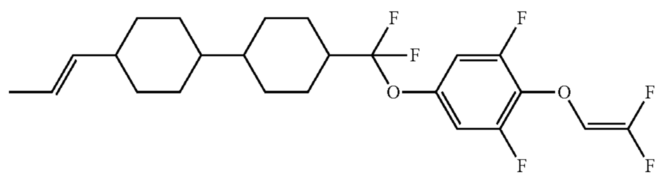 |
| 16 | 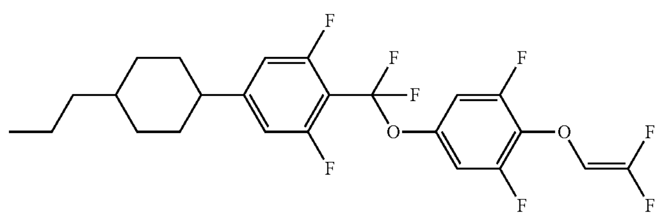 |
| 17 | 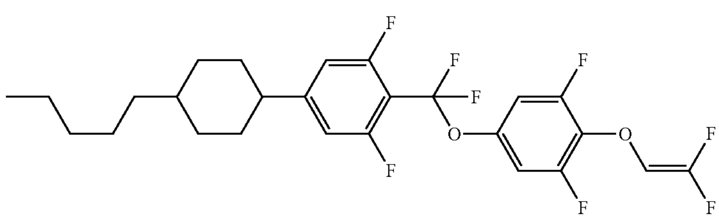 |
| 18 | 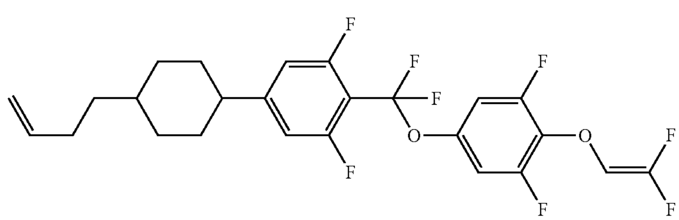 |
| 19 | 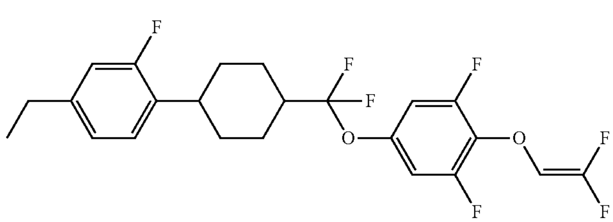 [SMILES: CCc1ccc(C2CCC(C(F)(F)Oc3cc(F)c(OC=C(F)F)c(F)c3)CC2)c(F)c1] |

-continued
| Formula 53 |
|---|
| No. |
| 20 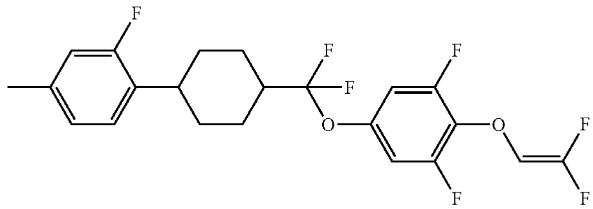 [SMILES: Cc1ccc(C2CCC(C(F)(F)Oc3cc(F)c(OC=C(F)F)c(F)c3)CC2)c(F)c1] |
| 21 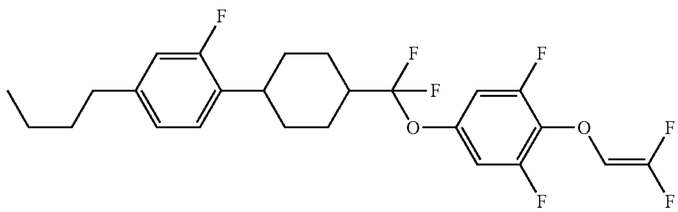 [SMILES: CCCCc1ccc(C2CCC(C(F)(F)Oc3cc(F)c(OC=C(F)F)c(F)c3)CC2)c(F)c1] |
| 22 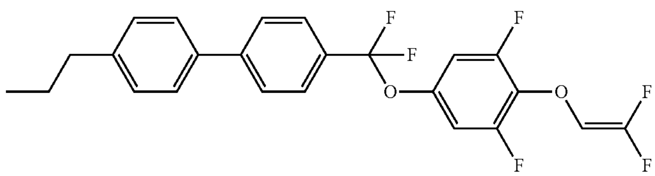 C 87.7 I $T_{NI}$ = 57.7° C., η = 20.9 mPa · S, Δ n = 0.157, Δ ε = 23.9 |
| 23 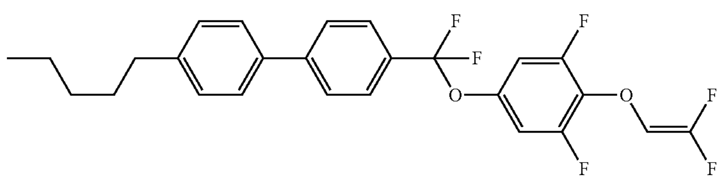 |
| 24 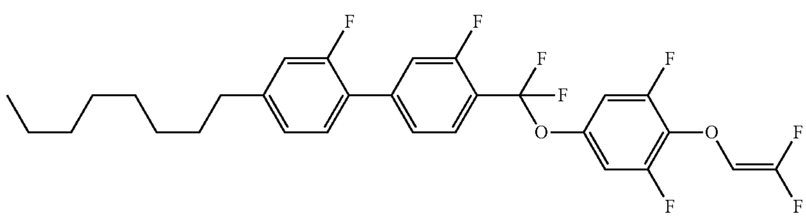 [SMILES: CCCCCCCCc1ccc(-c2ccc(C(F)(F)Oc3cc(F)c(OC=C(F)F)c(F)c3)c(F)c2)c(F)c1] |
| Formula 54 |
|---|
| No. |
| 25 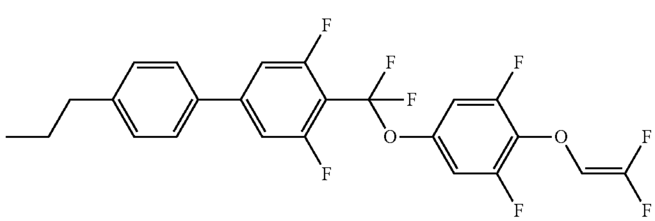 C 32.7 I $T_{NI}$ = 15.7° C., η = 30.4 mPa · S, Δ n = 0.137, Δ ε = 32.6 |

-continued
| Formula 54 |
| --- |
| No. |
26
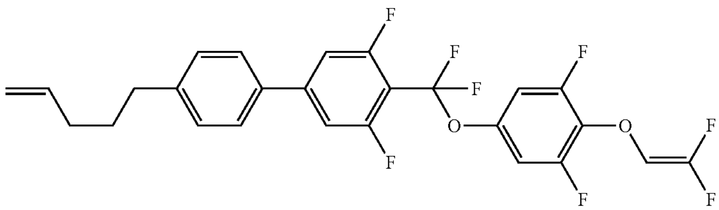 [SMILES: C=CCCCc1ccc(-c2cc(F)c(C(F)(F)Oc3cc(F)c(OC=C(F)F)c(F)c3)c(F)c2)cc1]
27
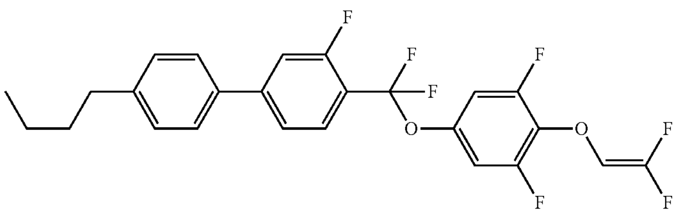 [SMILES: CCCCc1ccc(-c2ccc(C(F)(F)Oc3cc(F)c(OC=C(F)F)c(F)c3)c(F)c2)cc1]
28
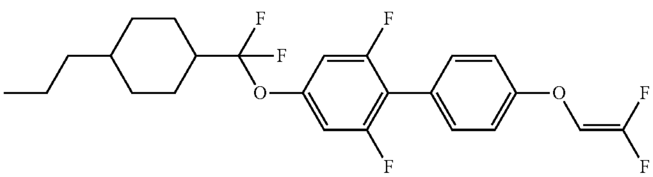 [SMILES: CCCC1CCC(C(F)(F)Oc2cc(F)c(-c3ccc(OC=C(F)F)cc3)c(F)c2)CC1]
29
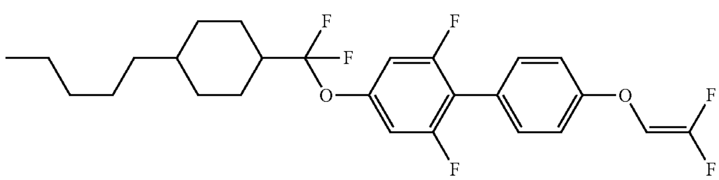 [SMILES: CCCCCC1CCC(C(F)(F)Oc2cc(F)c(-c3ccc(OC=C(F)F)cc3)c(F)c2)CC1]
30
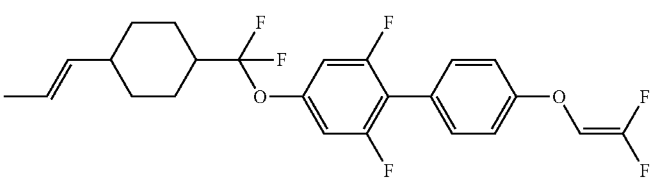 [SMILES: C/C=C/C1CCC(C(F)(F)Oc2cc(F)c(-c3ccc(OC=C(F)F)cc3)c(F)c2)CC1]
31
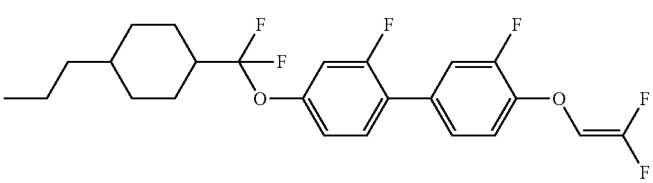
32
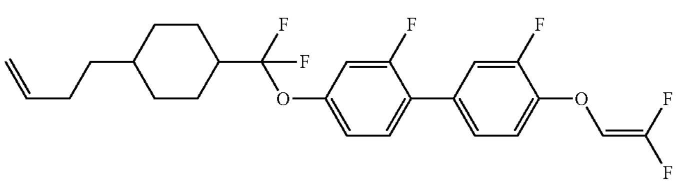
33
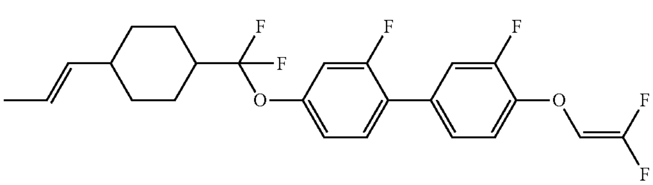 [SMILES: C/C=C/C1CCC(C(F)(F)Oc2ccc(-c3ccc(OC=C(F)F)c(F)c3)c(F)c2)CC1]

-continued
| Formula 54 | |
|---|---|
| No. | |
| 34 | 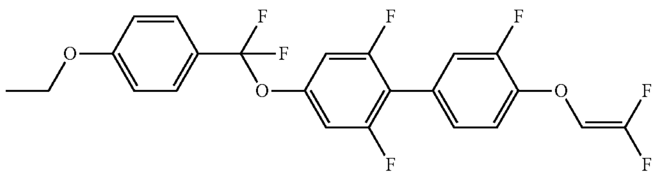 |
| 35 | 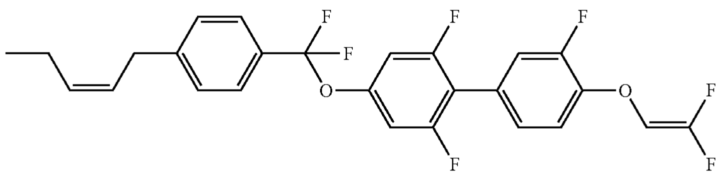 [SMILES: CC/C=C\Cc1ccc(C(F)(F)Oc2cc(F)c(-c3ccc(OC=C(F)F)c(F)c3)c(F)c2)cc1] |
| 36 | 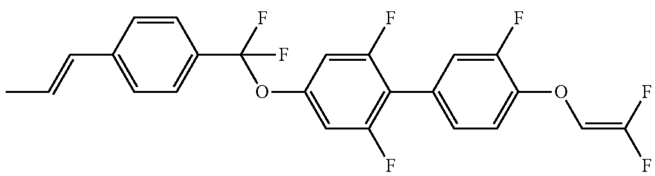 [SMILES: C/C=C/c1ccc(C(F)(F)Oc2cc(F)c(-c3ccc(OC=C(F)F)c(F)c3)c(F)c2)cc1] |
| 37 | 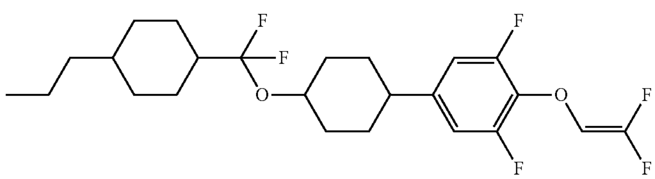 |
| 38 | 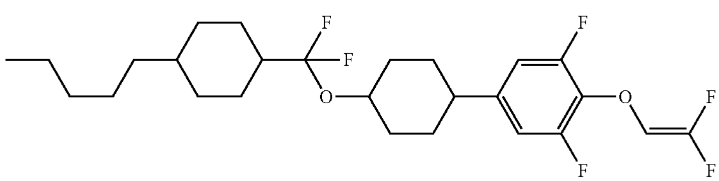 |
| 39 | 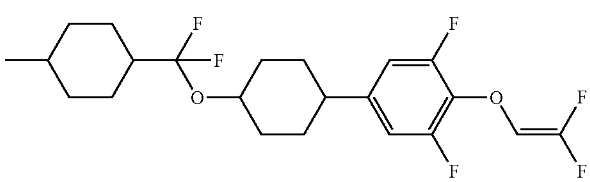 |
| 40 | 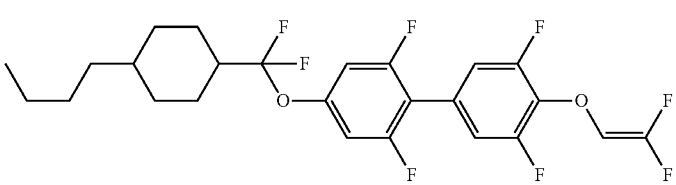 [SMILES: CCCCC1CCC(C(F)(F)Oc2cc(F)c(-c3cc(F)c(OC=C(F)F)c(F)c3)c(F)c2)CC1] |
| 41 | 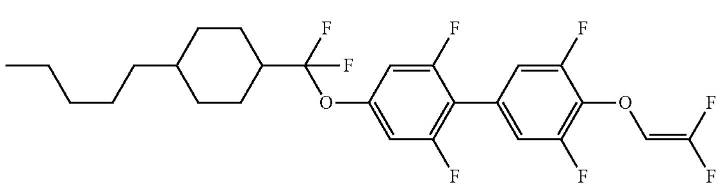 [SMILES: CCCCCC1CCC(C(F)(F)Oc2cc(F)c(-c3cc(F)c(OC=C(F)F)c(F)c3)c(F)c2)CC1] |

-continued
| Formula 54 | |
|---|---|
| No. | |
| 42 | 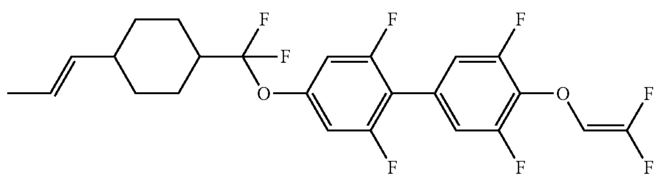 |
| 43 | 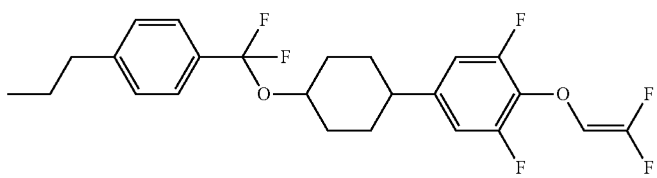 [SMILES: CCCc1ccc(C(F)(F)OC2CCC(c3cc(F)c(OC=C(F)F)c(F)c3)CC2)cc1] |
| 44 | 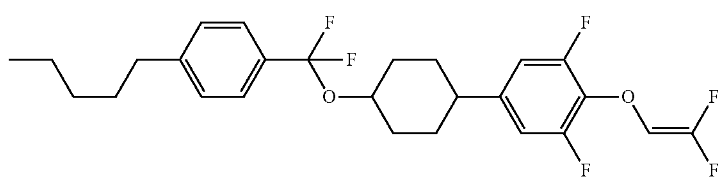 |
| 45 | 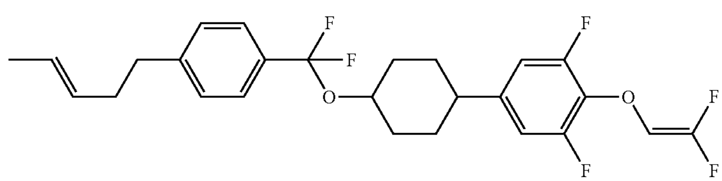 [SMILES: C/C=C/CCc1ccc(C(F)(F)OC2CCC(c3cc(F)c(OC=C(F)F)c(F)c3)CC2)cc1] |
| 46 | 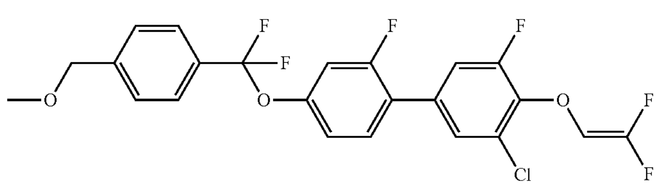 [SMILES: COCc1ccc(C(F)(F)Oc2ccc(-c3cc(F)c(OC=C(F)F)c(Cl)c3)c(F)c2)cc1] |
| 47 | 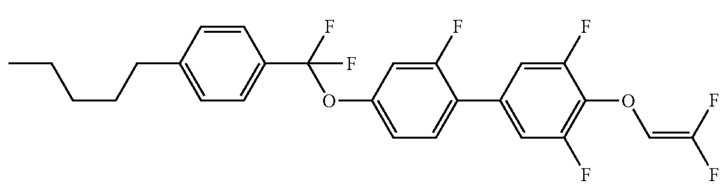 |
| 48 | 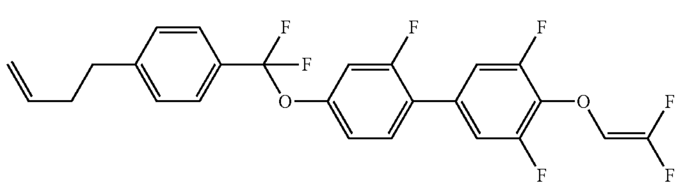 [SMILES: C=CCCc1ccc(C(F)(F)Oc2ccc(-c3cc(F)c(OC=C(F)F)c(F)c3)c(F)c2)cc1] |

| Formula 55 | |
|---|---|
| No. | |
| 49 | 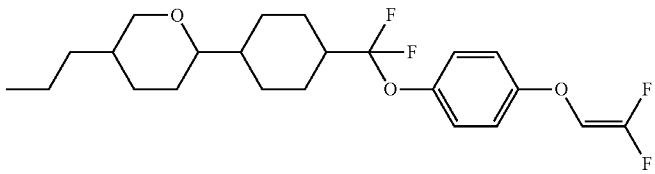 [SMILES: CCCC1CCC(C2CCC(C(F)(F)Oc3ccc(OC=C(F)F)cc3)CC2)OC1] |
| 50 | 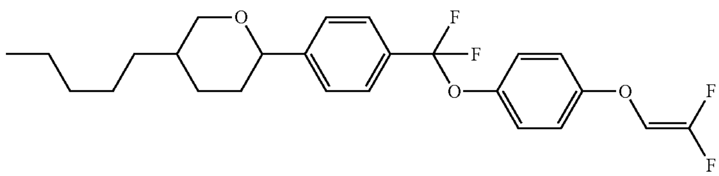 |
| 51 | 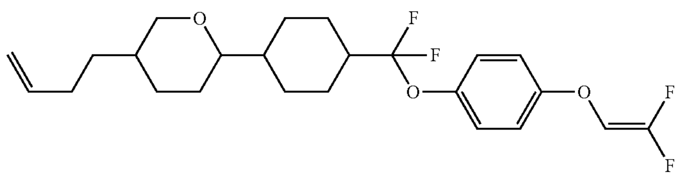 [SMILES: C=CCCC1CCC(C2CCC(C(F)(F)Oc3ccc(OC=C(F)F)cc3)CC2)OC1] |
| 52 | 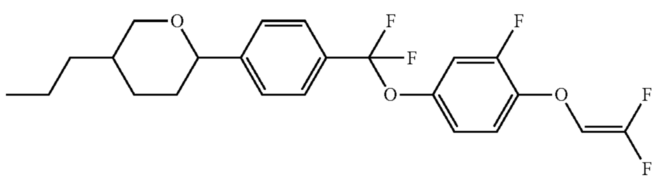 |
| 53 | 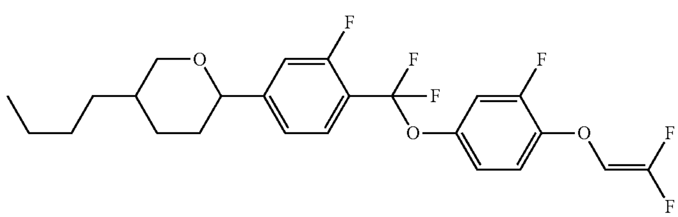 [SMILES: CCCCC1CCC(c2ccc(C(F)(F)Oc3ccc(OC=C(F)F)c(F)c3)c(F)c2)OC1] |
| 54 | 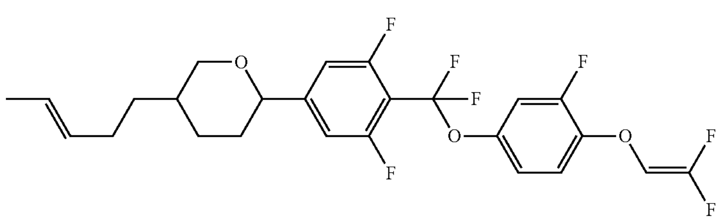 |
| 55 | 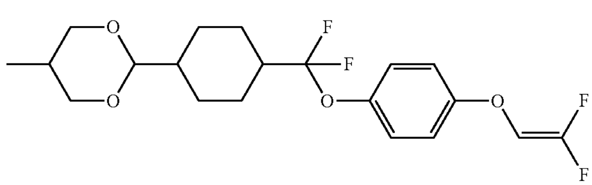 [SMILES: CC1COC(C2CCC(C(F)(F)Oc3ccc(OC=C(F)F)cc3)CC2)OC1] |
| 56 | 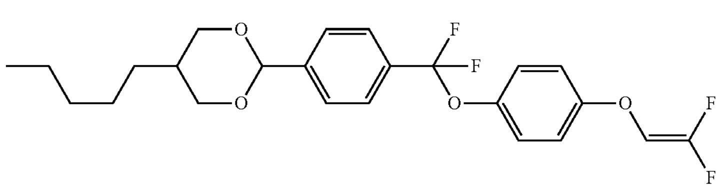 [SMILES: CCCCCC1COC(c2ccc(C(F)(F)Oc3ccc(OC=C(F)F)cc3)cc2)OC1] |

-continued
| Formula 55 | |
|---|---|
| No. | |
| 57 | 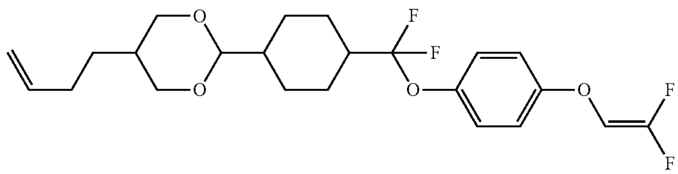 |
| 58 | 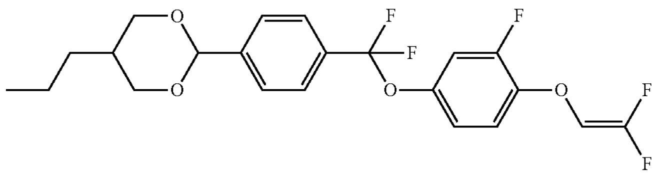 [SMILES: CCCC1COC(c2ccc(C(F)(F)Oc3ccc(OC=C(F)F)c(F)c3)cc2)OC1] |
| 59 | 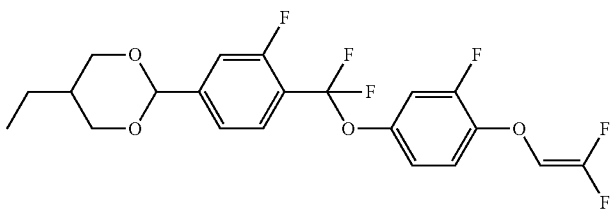 [SMILES: CCC1COC(c2ccc(C(F)(F)Oc3ccc(OC=C(F)F)c(F)c3)c(F)c2)OC1] |
| 60 | 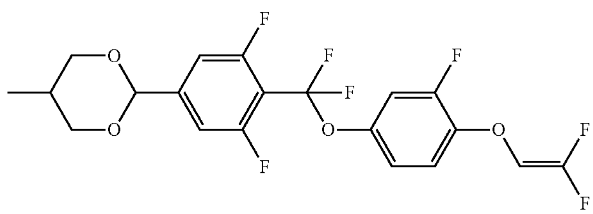 [SMILES: CC1COC(c2cc(F)c(C(F)(F)Oc3ccc(OC=C(F)F)c(F)c3)c(F)c2)OC1] |
| 61 | 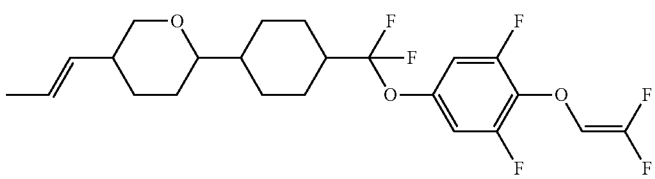 [SMILES: C/C=C/C1CCC(C2CCC(C(F)(F)Oc3cc(F)c(OC=C(F)F)c(F)c3)CC2)OC1] |
| 62 | 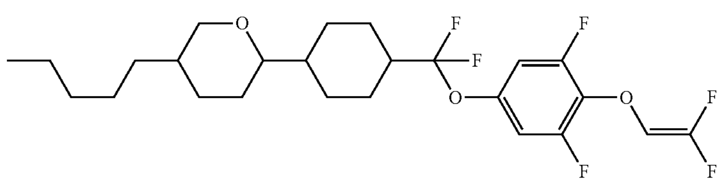 [SMILES: CCCCCC1CCC(C2CCC(C(F)(F)Oc3cc(F)c(OC=C(F)F)c(F)c3)CC2)OC1] |
| 63 | 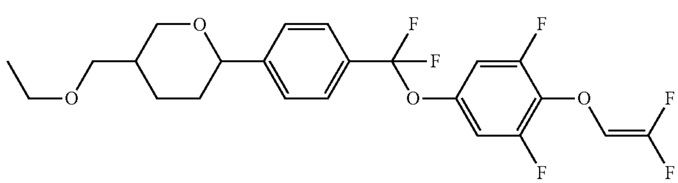 [SMILES: CCOCC1CCC(c2ccc(C(F)(F)Oc3cc(F)c(OC=C(F)F)c(F)c3)cc2)OC1] |
| 64 | 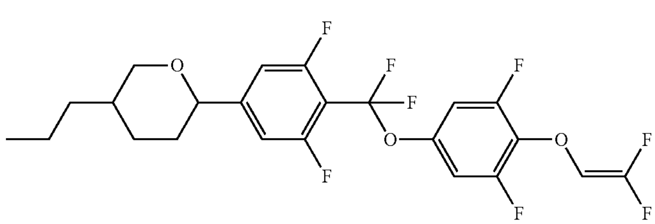 [SMILES: CCCC1CCC(c2cc(F)c(C(F)(F)Oc3cc(F)c(OC=C(F)F)c(F)c3)c(F)c2)OC1] |

-continued
| Formula 55 |
| --- |
| No. |
65
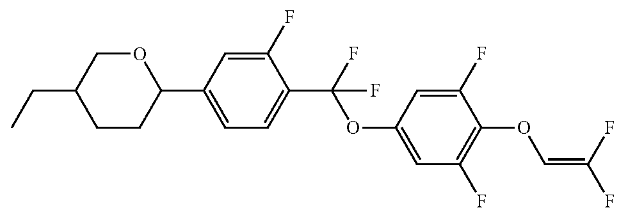 [SMILES: CCC1CCC(c2ccc(C(F)(F)Oc3cc(F)c(OC=C(F)F)c(F)c3)c(F)c2)OC1]
66
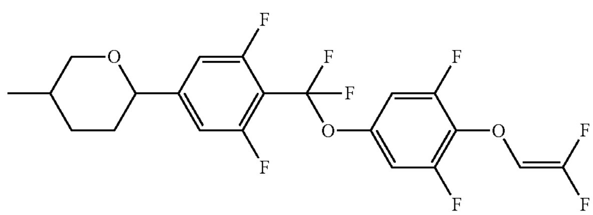
67
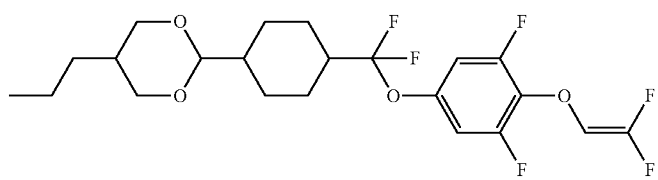
C 45.5 SB 64.5 N 101.9 I
$T_{NI}$ = 71.7° C., η = 44.5 mPa · S, Δ n = 0.0837, Δ ε = 29.9
68
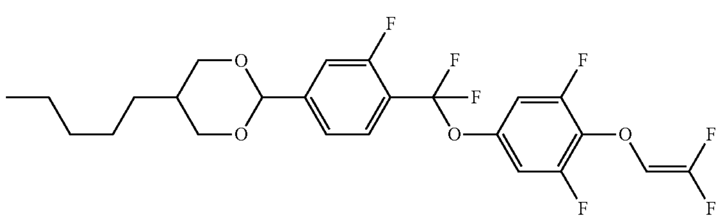 [SMILES: CCCCCC1COC(c2ccc(C(F)(F)Oc3cc(F)c(OC=C(F)F)c(F)c3)c(F)c2)OC1]
69
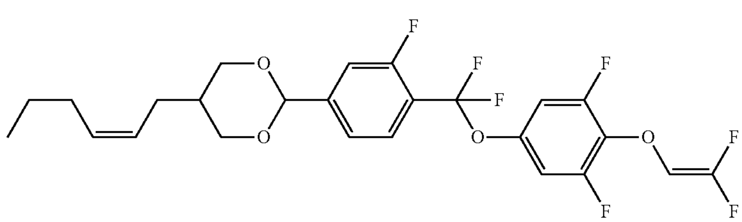 [SMILES: CCC/C=C\CC1COC(c2ccc(C(F)(F)Oc3cc(F)c(OC=C(F)F)c(F)c3)c(F)c2)OC1]
70
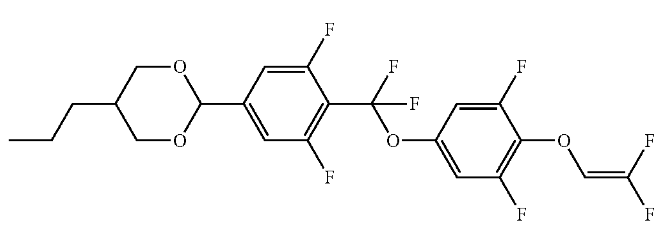
C 31.3 I
$T_{NI}$ = 6.4° C., η = 27.9 mPa · S, Δ n = 0.0837, Δ ε = 33.7

-continued
Formula 55
| No. | |
|---|---|
| 71 | 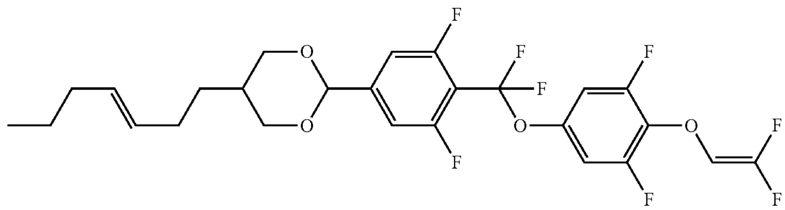 [SMILES: CCC/C=C/CCC1COC(c2cc(F)c(C(F)(F)Oc3cc(F)c(OC=C(F)F)c(F)c3)c(F)c2)OC1] |
| 72 | 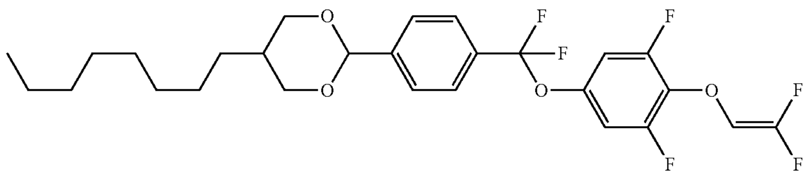 [SMILES: CCCCCCCCC1COC(c2ccc(C(F)(F)Oc3cc(F)c(OC=C(F)F)c(F)c3)cc2)OC1] |
Formula 56
| No. | |
|---|---|
| 73 | 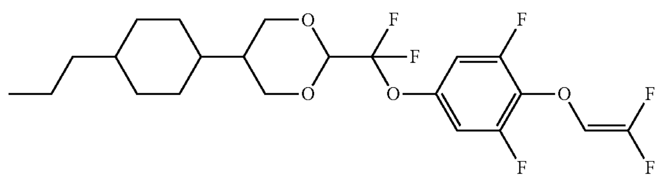 [SMILES: CCCC1CCC(C2COC(C(F)(F)Oc3cc(F)c(OC=C(F)F)c(F)c3)OC2)CC1] |
| 74 | 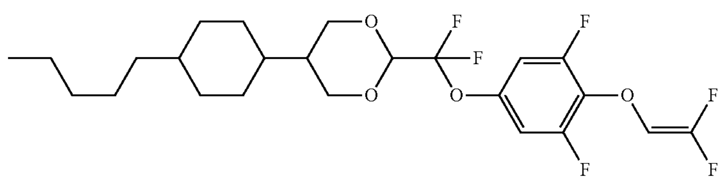 [SMILES: CCCCCC1CCC(C2COC(C(F)(F)Oc3cc(F)c(OC=C(F)F)c(F)c3)OC2)CC1] |
| 75 | 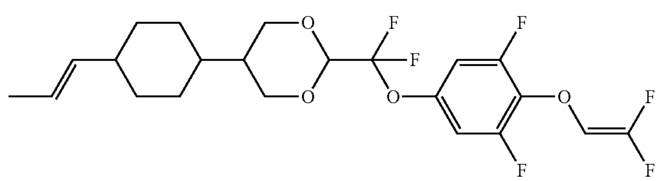 [SMILES: C/C=C/C1CCC(C2COC(C(F)(F)Oc3cc(F)c(OC=C(F)F)c(F)c3)OC2)CC1] |
| 76 | 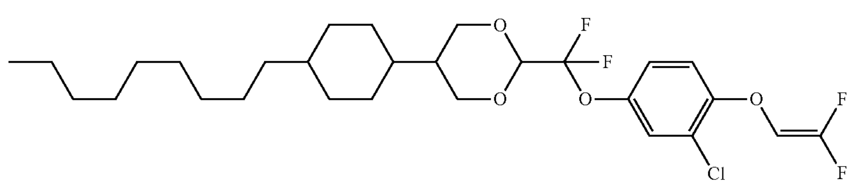 |
| 77 | 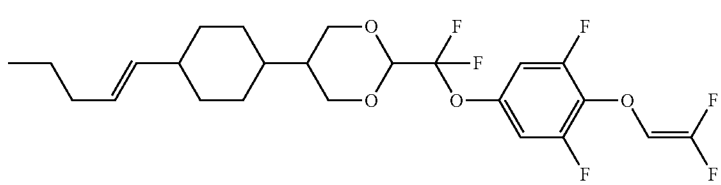 [SMILES: CCC/C=C/C1CCC(C2COC(C(F)(F)Oc3cc(F)c(OC=C(F)F)c(F)c3)OC2)CC1] |

-continued
| Formula 56 | |
|---|---|
| No. | |
| 78 | 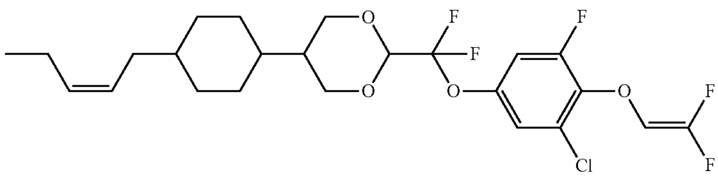 [SMILES: CC/C=C\CC1CCC(C2COC(C(F)(F)Oc3cc(F)c(OC=C(F)F)c(Cl)c3)OC2)CC1] |
| 79 | 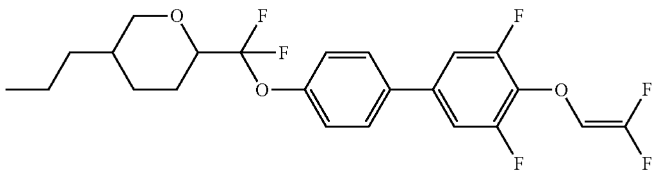 [SMILES: CCCC1CCC(C(F)(F)Oc2ccc(-c3cc(F)c(OC=C(F)F)c(F)c3)cc2)OC1] |
| 80 | 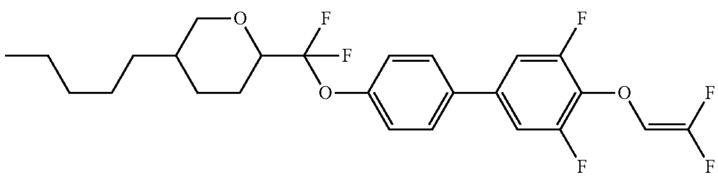 |
| 81 | 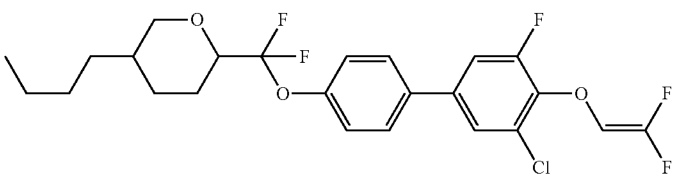 |
| 82 | 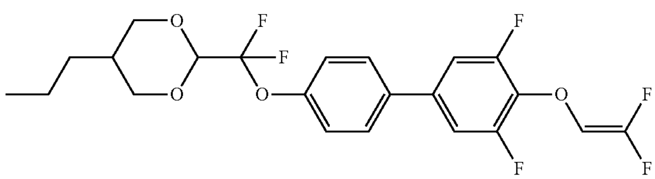 |
| 83 | 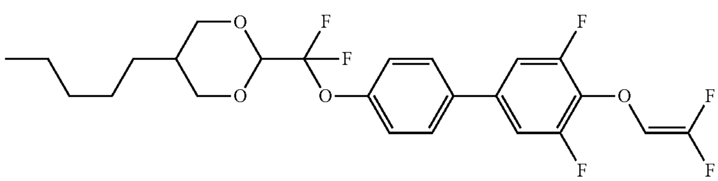 [SMILES: CCCCCC1CCC(C(F)(F)Oc2ccc(-c3cc(F)c(OC=C(F)F)c(F)c3)cc2)OC1] |
| 84 | 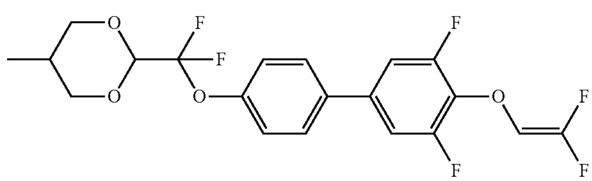 [SMILES: CC1COC(C(F)(F)Oc2ccc(-c3cc(F)c(OC=C(F)F)c(F)c3)cc2)OC1] |
| 85 | 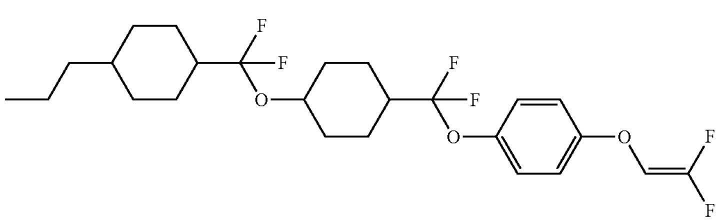 [SMILES: CCCC1CCC(C(F)(F)OC2CCC(C(F)(F)Oc3ccc(OC=C(F)F)cc3)CC2)CC1] |

-continued
| Formula 56 | |
|---|---|
| No. | |
| 86 | 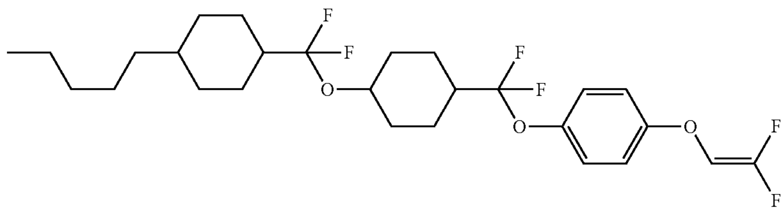 [SMILES: CCCCCC1CCC(C(F)(F)OC2CCC(C(F)(F)Oc3ccc(OC=C(F)F)cc3)CC2)CC1] |
| 87 | 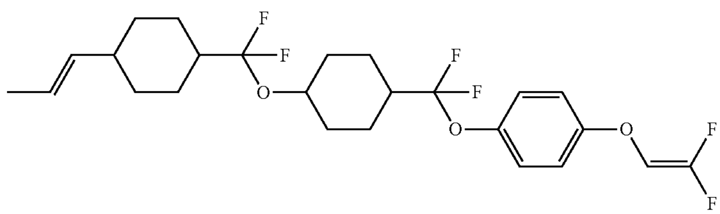 [SMILES: C/C=C/C1CCC(C(F)(F)OC2CCC(C(F)(F)Oc3ccc(OC=C(F)F)cc3)CC2)CC1] |
| 88 | 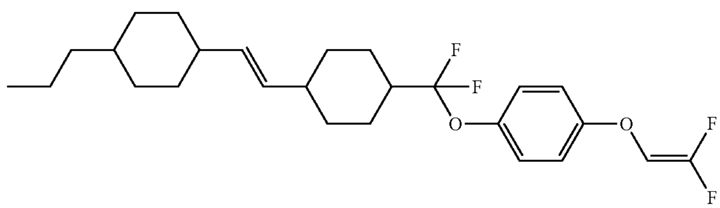 [SMILES: CCCC1CCC(/C=C/C2CCC(C(F)(F)Oc3ccc(OC=C(F)F)cc3)CC2)CC1] |
| 89 | 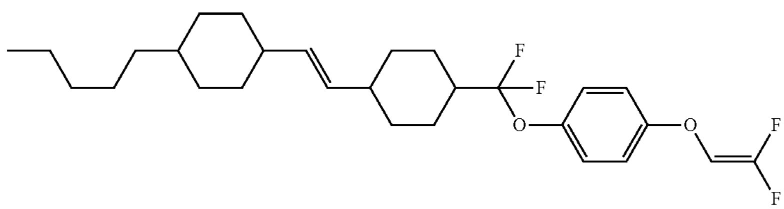 [SMILES: CCCCCC1CCC(/C=C/C2CCC(C(F)(F)Oc3ccc(OC=C(F)F)cc3)CC2)CC1] |
| 90 | 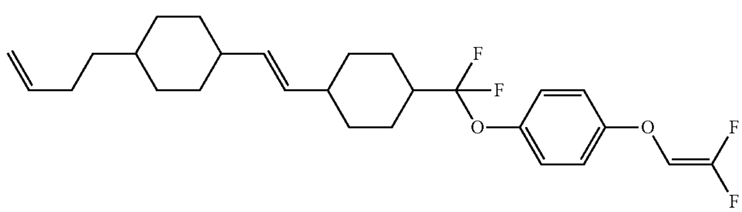 [SMILES: C=CCCC1CCC(/C=C/C2CCC(C(F)(F)Oc3ccc(OC=C(F)F)cc3)CC2)CC1] |
| 91 | 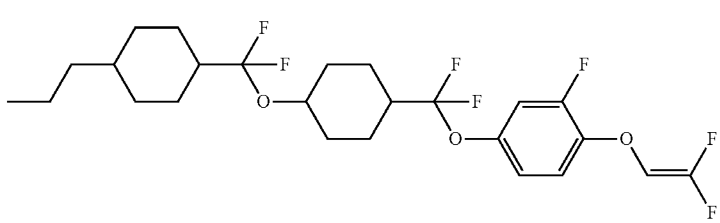 [SMILES: CCCC1CCC(C(F)(F)OC2CCC(C(F)(F)Oc3ccc(OC=C(F)F)c(F)c3)CC2)CC1] |
| 92 | 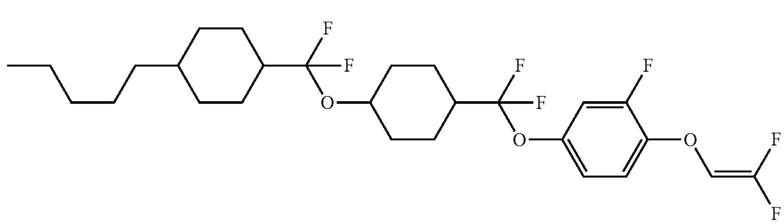 [SMILES: CCCCCC1CCC(C(F)(F)OC2CCC(C(F)(F)Oc3ccc(OC=C(F)F)c(F)c3)CC2)CC1] |

-continued
| Formula 56 | |
|---|---|
| No. | |
| 93 | 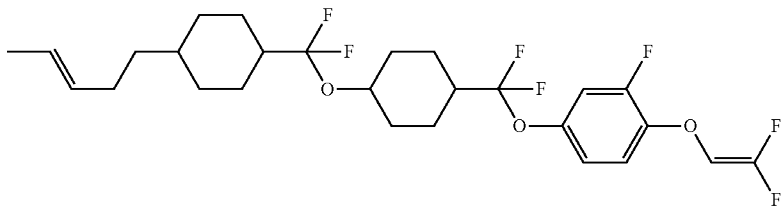 [SMILES: C/C=C/CCC1CCC(C(F)(F)OC2CCC(C(F)(F)Oc3ccc(OC=C(F)F)c(F)c3)CC2)CC1] |
| 94 | 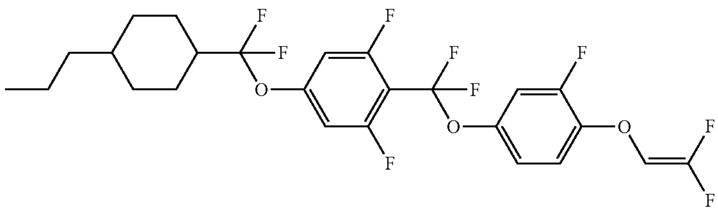 |
| 95 | 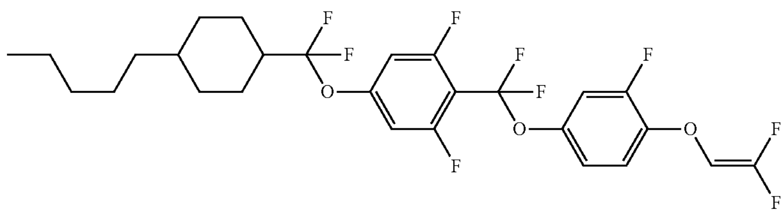 [SMILES: CCCCCC1CCC(C(F)(F)Oc2cc(F)c(C(F)(F)Oc3ccc(OC=C(F)F)c(F)c3)c(F)c2)CC1] |
| 96 | 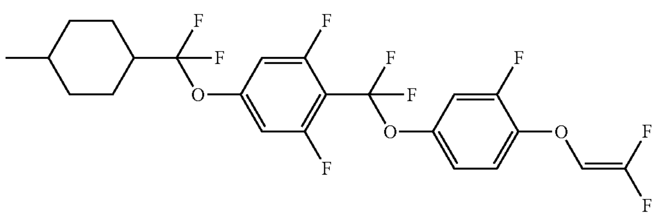 [SMILES: CC1CCC(C(F)(F)Oc2cc(F)c(C(F)(F)Oc3ccc(OC=C(F)F)c(F)c3)c(F)c2)CC1] |
| Formula 57 | |
|---|---|
| No. | |
| 97 | 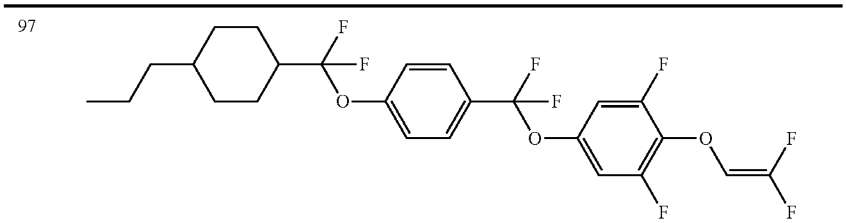 |
| 98 | 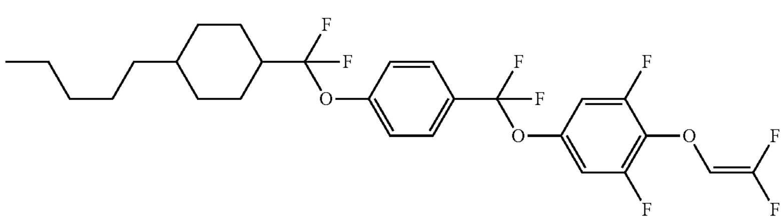 [SMILES: CCCCCC1CCC(C(F)(F)Oc2ccc(C(F)(F)Oc3cc(F)c(OC=C(F)F)c(F)c3)cc2)CC1] |

-continued
Formula 57
| No. | |
|---|---|
| 99 | 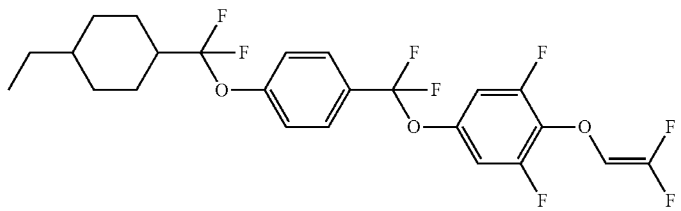 [SMILES: CCC1CCC(C(F)(F)Oc2ccc(C(F)(F)Oc3cc(F)c(OC=C(F)F)c(F)c3)cc2)CC1] |
| 100 | 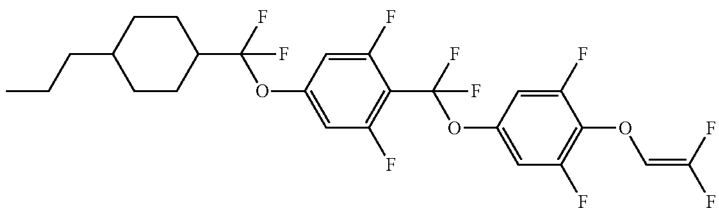 [SMILES: CCCC1CCC(C(F)(F)Oc2cc(F)c(C(F)(F)Oc3cc(F)c(OC=C(F)F)c(F)c3)c(F)c2)CC1] |
| 101 | 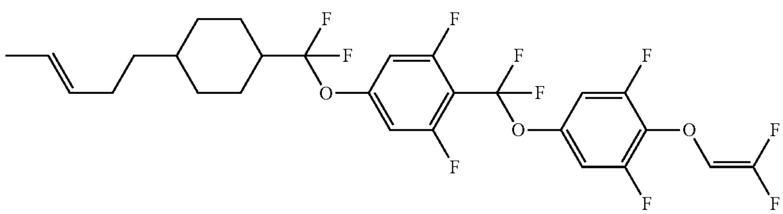 [SMILES: C/C=C/CCC1CCC(C(F)(F)Oc2cc(F)c(C(F)(F)Oc3cc(F)c(OC=C(F)F)c(F)c3)c(F)c2)CC1] |
| 102 | 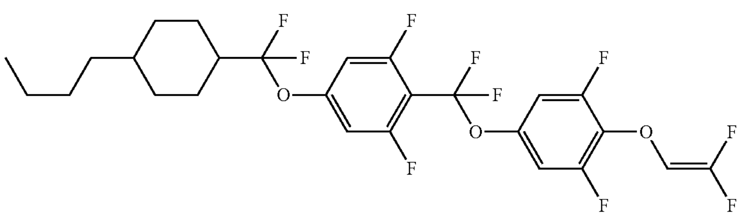 [SMILES: CCCCC1CCC(C(F)(F)Oc2cc(F)c(C(F)(F)Oc3cc(F)c(OC=C(F)F)c(F)c3)c(F)c2)CC1] |
| 103 | 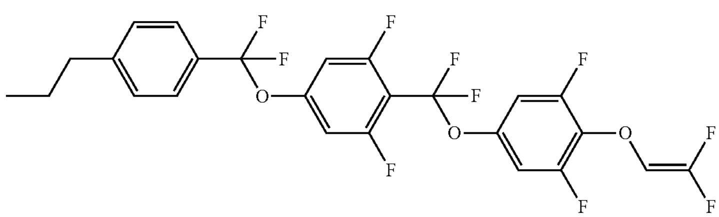 [SMILES: CCCc1ccc(C(F)(F)Oc2cc(F)c(C(F)(F)Oc3cc(F)c(OC=C(F)F)c(F)c3)c(F)c2)cc1] |
| 104 | 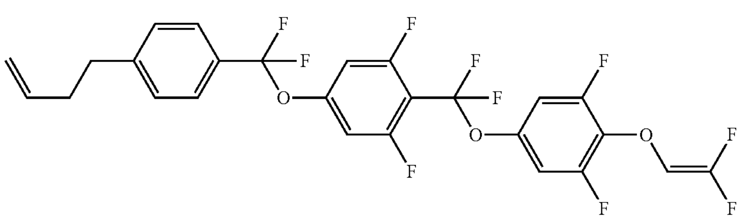 [SMILES: C=CCCc1ccc(C(F)(F)Oc2cc(F)c(C(F)(F)Oc3cc(F)c(OC=C(F)F)c(F)c3)c(F)c2)cc1] |
| 105 | 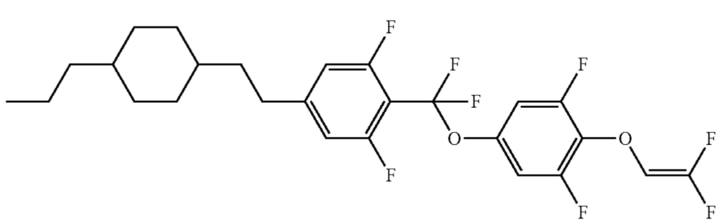 [SMILES: CCCC1CCC(CCc2cc(F)c(C(F)(F)Oc3cc(F)c(OC=C(F)F)c(F)c3)c(F)c2)CC1] |

-continued
Formula 57
No.
106
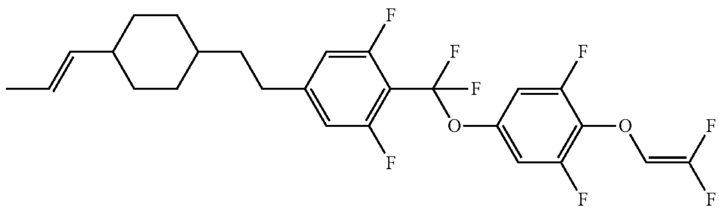 [SMILES: C/C=C/C1CCC(CCc2cc(F)c(C(F)(F)Oc3cc(F)c(OC=C(F)F)c(F)c3)c(F)c2)CC1]
107
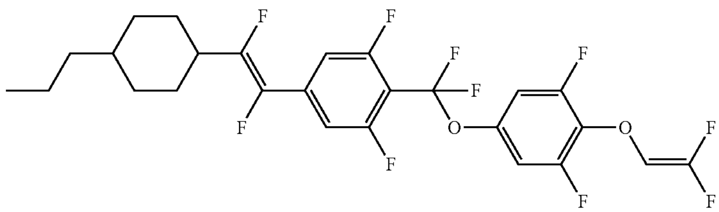 [SMILES: CCCC1CCC(/C(F)=C(\F)c2cc(F)c(C(F)(F)Oc3cc(F)c(OC=C(F)F)c(F)c3)c(F)c2)CC1]
108
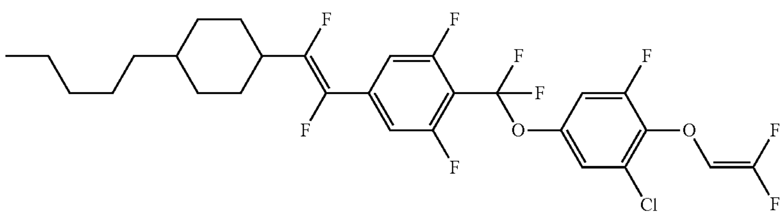 [SMILES: CCCCCC1CCC(/C(F)=C(\F)c2cc(F)c(C(F)(F)Oc3cc(F)c(OC=C(F)F)c(Cl)c3)c(F)c2)CC1]
109
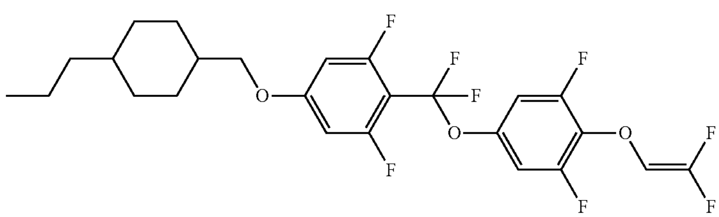
110
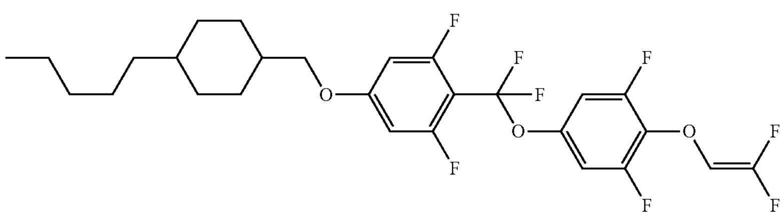 [SMILES: CCCCCC1CCC(COc2cc(F)c(C(F)(F)Oc3cc(F)c(OC=C(F)F)c(F)c3)c(F)c2)CC1]
111
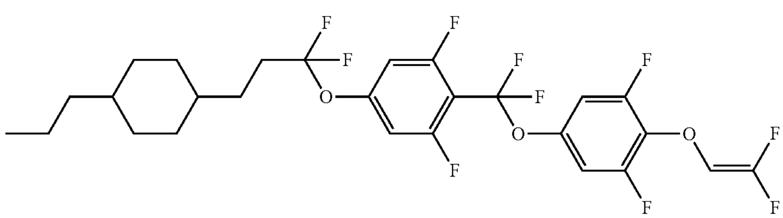 [SMILES: CCCC1CCC(CCC(F)(F)Oc2cc(F)c(C(F)(F)Oc3cc(F)c(OC=C(F)F)c(F)c3)c(F)c2)CC1]
112
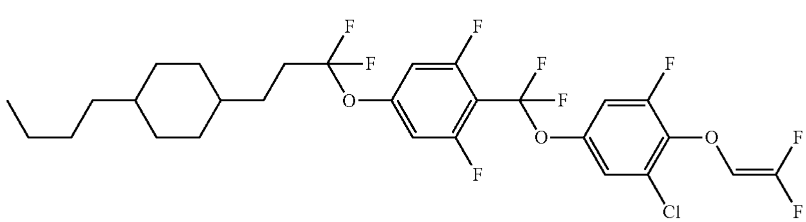 [SMILES: CCCCC1CCC(CCC(F)(F)Oc2cc(F)c(C(F)(F)Oc3cc(F)c(OC=C(F)F)c(Cl)c3)c(F)c2)CC1]

-continued
| Formula 57 | |
|---|---|
| No. | |
| 113 | 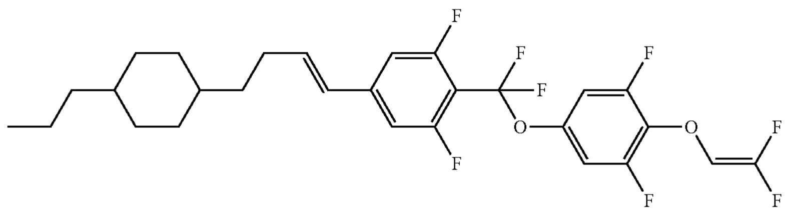 [SMILES: CCCC1CCC(CC/C=C/c2cc(F)c(C(F)(F)Oc3cc(F)c(OC=C(F)F)c(F)c3)c(F)c2)CC1] |
| 114 | 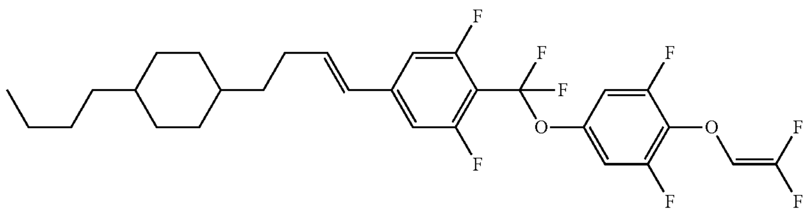 |
| 115 | 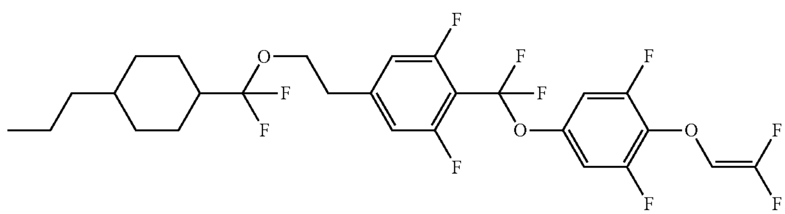 [SMILES: CCCC1CCC(C(F)(F)OCCc2cc(F)c(C(F)(F)Oc3cc(F)c(OC=C(F)F)c(F)c3)c(F)c2)CC1] |
| 116 | 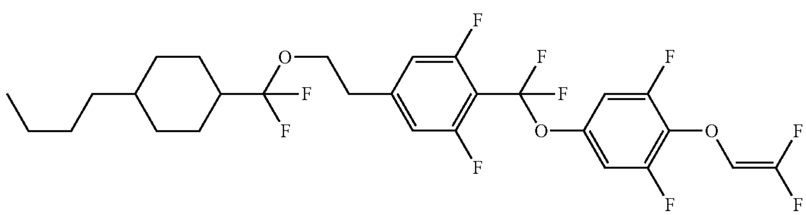 |
| 117 | 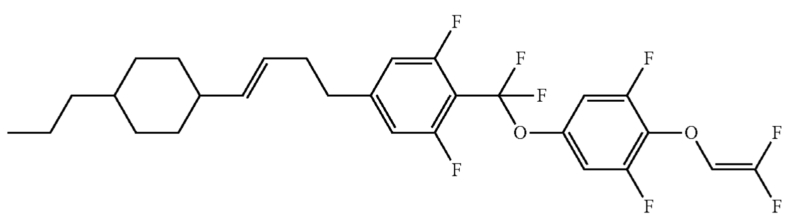 |
| 118 | 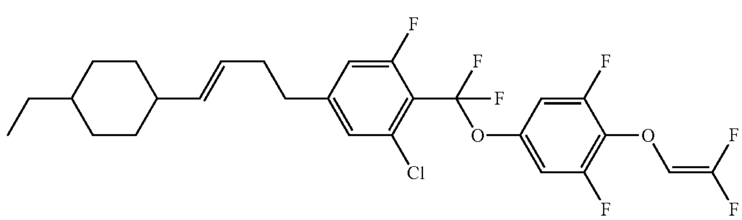 [SMILES: CCC1CCC(/C=C/CCc2cc(F)c(C(F)(F)Oc3cc(F)c(OC=C(F)F)c(F)c3)c(Cl)c2)CC1] |
| 119 | 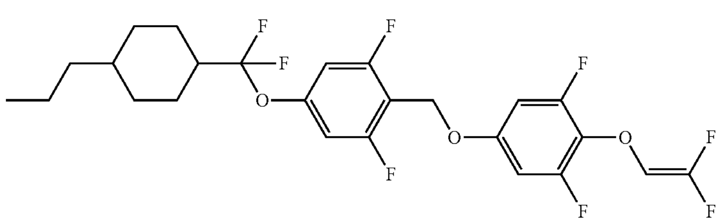 |

-continued
| Formula 57 |
| --- |
| No. |
| 120 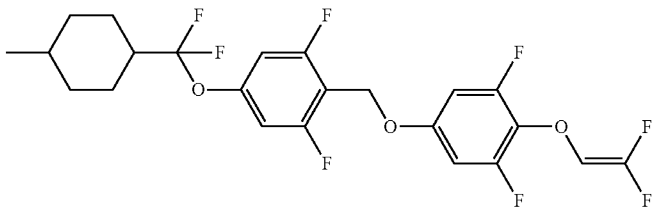 [SMILES: CC1CCC(C(F)(F)Oc2cc(F)c(COc3cc(F)c(OC=C(F)F)c(F)c3)c(F)c2)CC1] |
| Formula 58 |
| --- |
| No. |
| 121 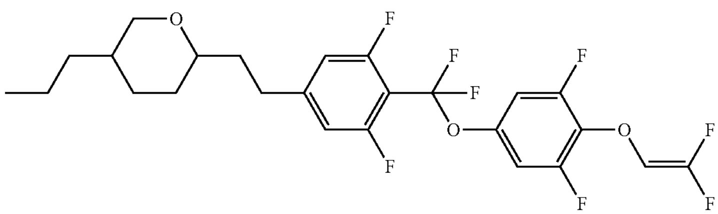 [SMILES: CCCC1CCC(CCc2cc(F)c(C(F)(F)Oc3cc(F)c(OC=C(F)F)c(F)c3)c(F)c2)OC1] |
| 122 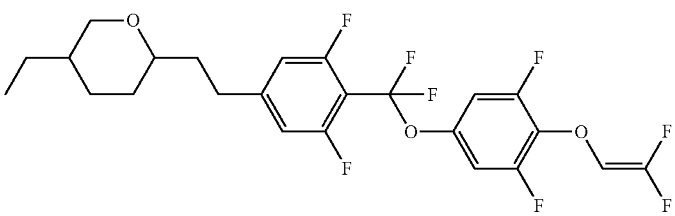 |
| 123 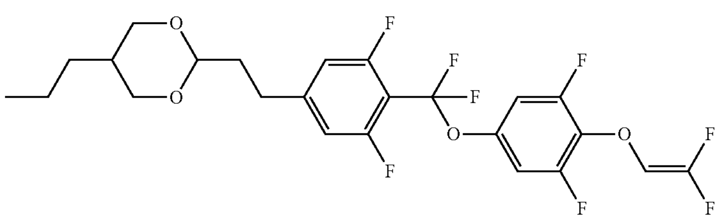 [SMILES: CCCC1COC(CCc2cc(F)c(C(F)(F)Oc3cc(F)c(OC=C(F)F)c(F)c3)c(F)c2)OC1] |
| 124 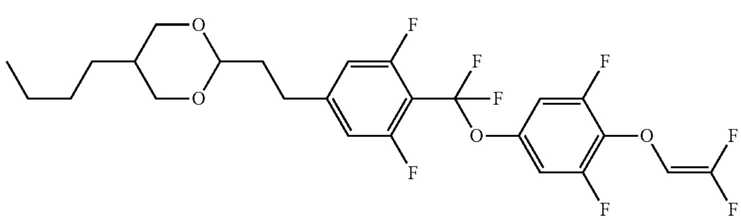 [SMILES: CCCCC1COC(CCc2cc(F)c(C(F)(F)Oc3cc(F)c(OC=C(F)F)c(F)c3)c(F)c2)OC1] |
| 125 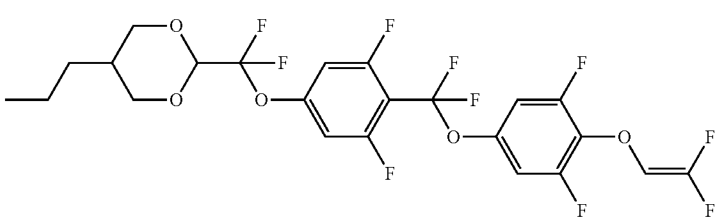 |

-continued
| Formula 58 | |
|---|---|
| No. | |
| 126 | 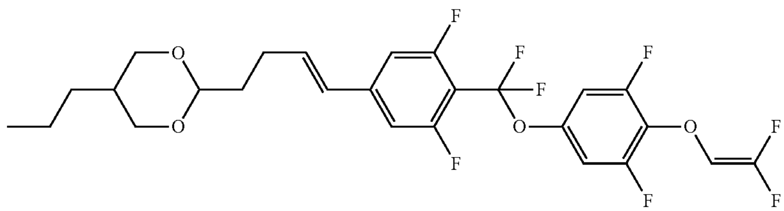 [SMILES: CCCC1COC(CC/C=C/c2cc(F)c(C(F)(F)Oc3cc(F)c(OC=C(F)F)c(F)c3)c(F)c2)OC1] |
| 127 | 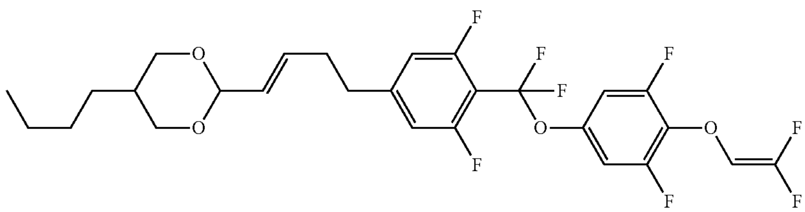 [SMILES: CCCCC1COC(/C=C/CCc2cc(F)c(C(F)(F)Oc3cc(F)c(OC=C(F)F)c(F)c3)c(F)c2)OC1] |
| 128 | 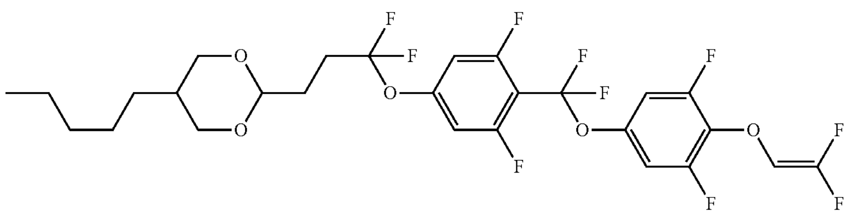 [SMILES: CCCCCC1COC(CCC(F)(F)Oc2cc(F)c(C(F)(F)Oc3cc(F)c(OC=C(F)F)c(F)c3)c(F)c2)OC1] |
| 129 | 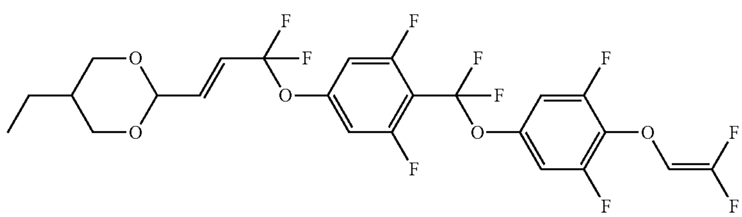 [SMILES: CCC1COC(/C=C/C(F)(F)Oc2cc(F)c(C(F)(F)Oc3cc(F)c(OC=C(F)F)c(F)c3)c(F)c2)OC1] |
| 130 | 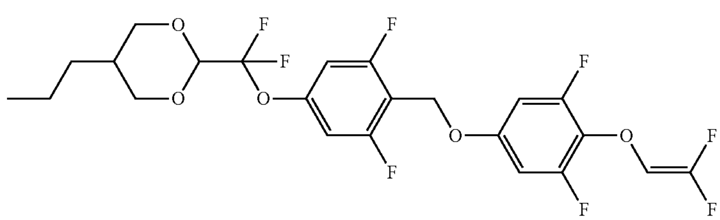 [SMILES: CCCC1COC(C(F)(F)Oc2cc(F)c(COc3cc(F)c(OC=C(F)F)c(F)c3)c(F)c2)OC1] |
| 131 | 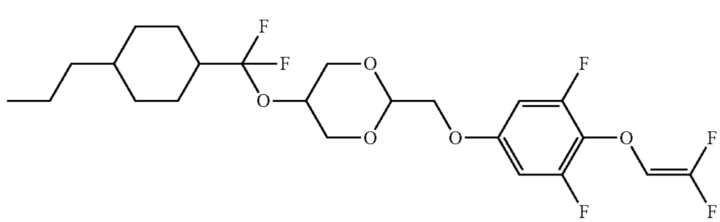 [SMILES: CCCC1CCC(C(F)(F)OC2COC(COc3cc(F)c(OC=C(F)F)c(F)c3)OC2)CC1] |
| 132 | 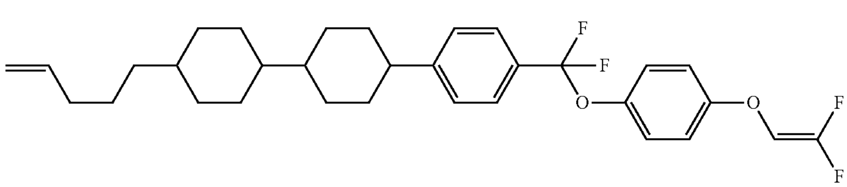 |

-continued
| Formula 58 | |
|---|---|
| No. | |
| 133 | 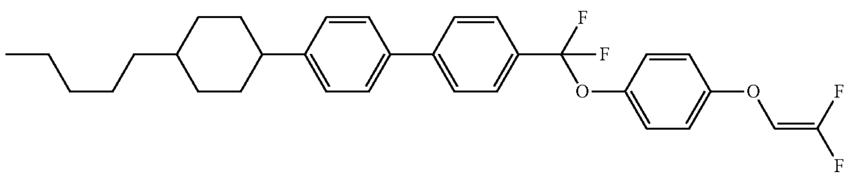 [SMILES: CCCCCC1CCC(c2ccc(-c3ccc(C(F)(F)Oc4ccc(OC=C(F)F)cc4)cc3)cc2)CC1] |
| 134 | 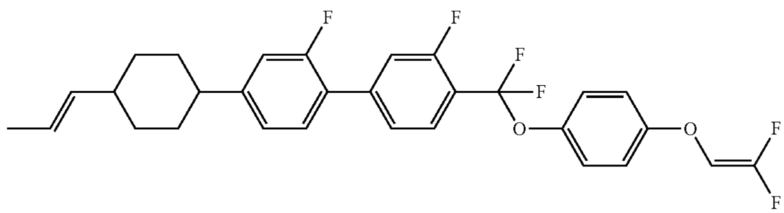 [SMILES: C/C=C/C1CCC(c2ccc(-c3ccc(C(F)(F)Oc4ccc(OC=C(F)F)cc4)c(F)c3)c(F)c2)CC1] |
| 135 | 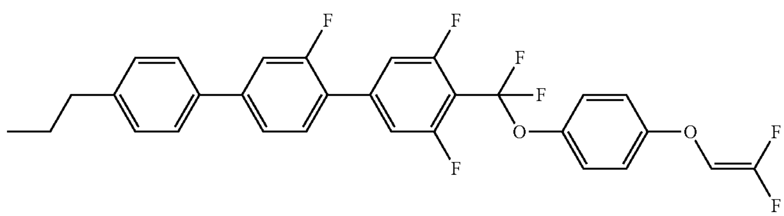 |
| 136 | 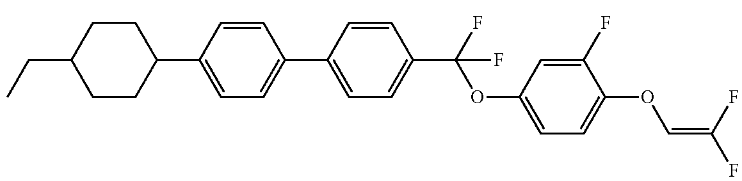 |
| 137 | 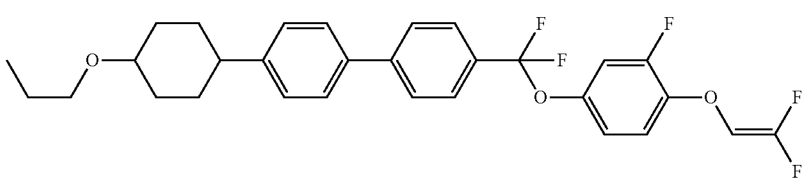 [SMILES: CCCOC1CCC(c2ccc(-c3ccc(C(F)(F)Oc4ccc(OC=C(F)F)c(F)c4)cc3)cc2)CC1] |
| 138 | 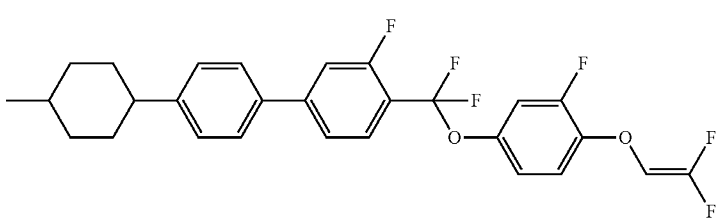 [SMILES: CC1CCC(c2ccc(-c3ccc(C(F)(F)Oc4ccc(OC=C(F)F)c(F)c4)c(F)c3)cc2)CC1] |
| 139 | 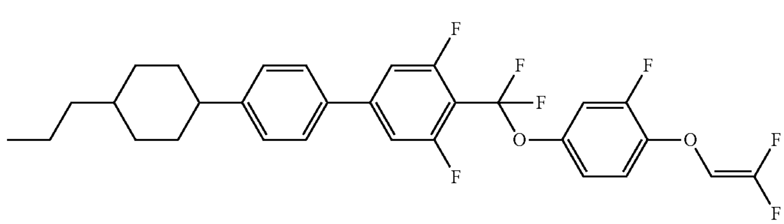 |

-continued
| Formula 58 | |
|---|---|
| No. | |
| 140 | 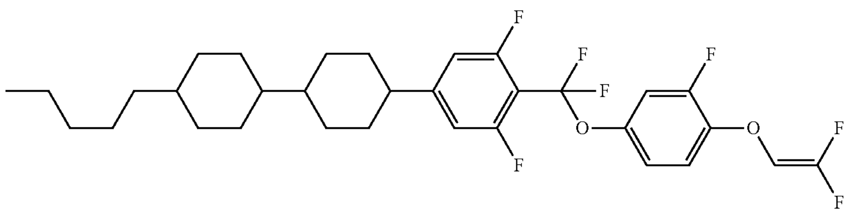 [SMILES: CCCCCC1CCC(C2CCC(c3cc(F)c(C(F)(F)Oc4ccc(OC=C(F)F)c(F)c4)c(F)c3)CC2)CC1] |
| 141 | 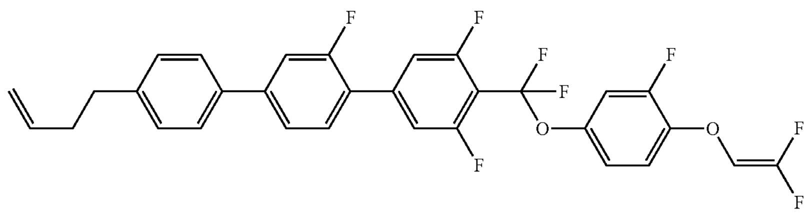 |
| 142 | 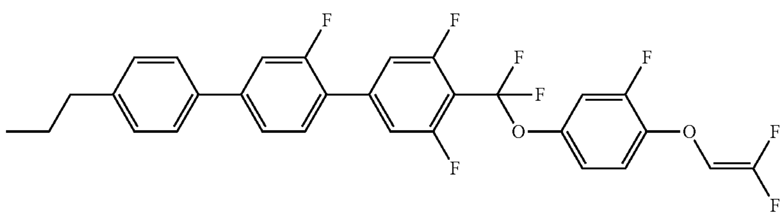 |
| 143 | 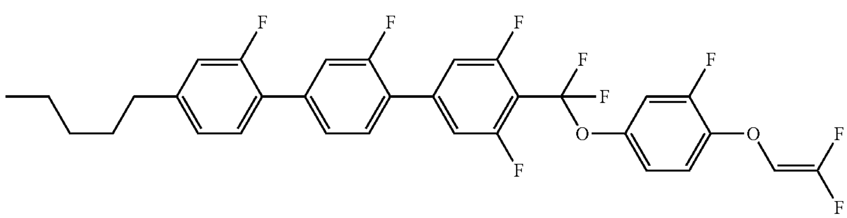 [SMILES: CCCCCc1ccc(-c2ccc(-c3cc(F)c(C(F)(F)Oc4ccc(OC=C(F)F)c(F)c4)c(F)c3)c(F)c2)c(F)c1] |
| 144 | 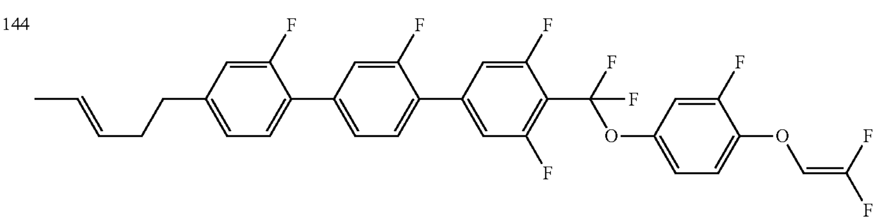 |
| Formula 59 | |
|---|---|
| No. | |
| 145 | 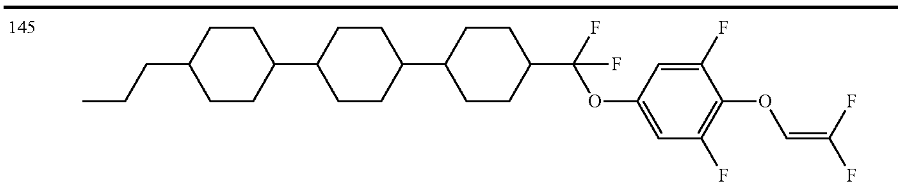 |

-continued
| Formula 59 |
|---|
| No. |
146
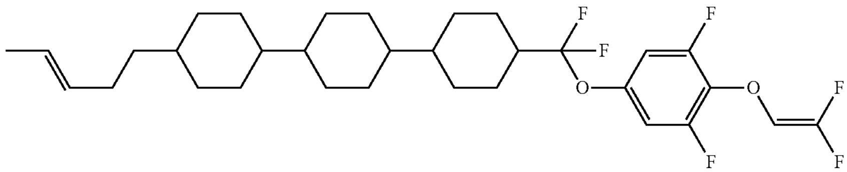
147
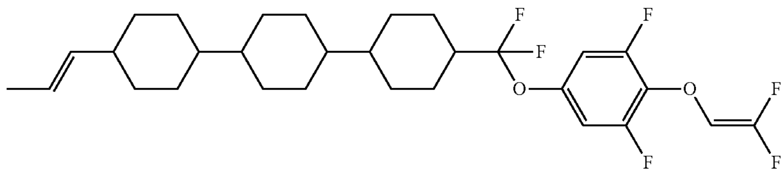 [SMILES: C/C=C/C1CCC(C2CCC(C3CCC(C(F)(F)Oc4cc(F)c(OC=C(F)F)c(F)c4)CC3)CC2)CC1]
148
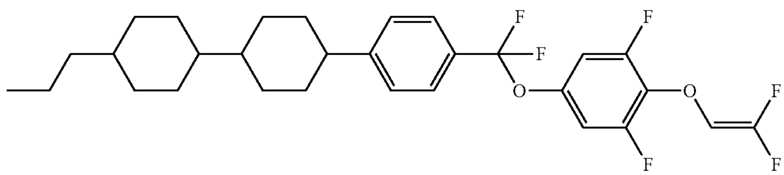
C 76.7 C 82.2 C 90.7 N 211.4 I
$T_{NI}$ = 161.7° C., η = 42.5 mPa · S, Δ n = 0.137, Δ ε = 19.6
149
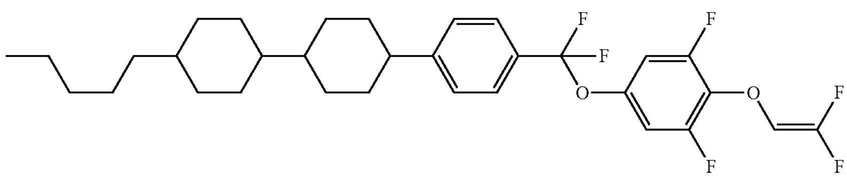
150
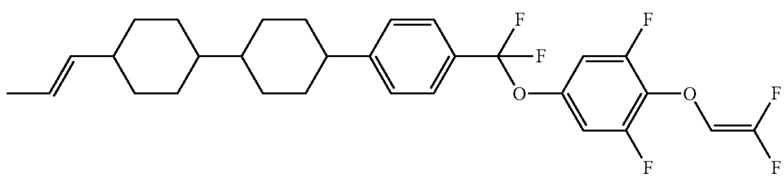 [SMILES: C/C=C/C1CCC(C2CCC(c3ccc(C(F)(F)Oc4cc(F)c(OC=C(F)F)c(F)c4)cc3)CC2)CC1]
151
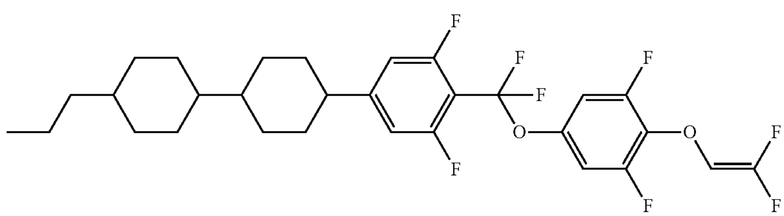
C 54.4 C 75.9 N 183.3 I
$T_{NI}$ = 124.4° C., η = 53.2 mPa · S, Δ n = 0.1237, Δ ε = 27.6
152
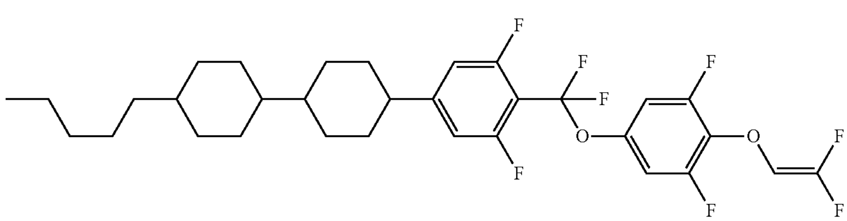

-continued
| Formula 59 |
|---|
| No. |
153
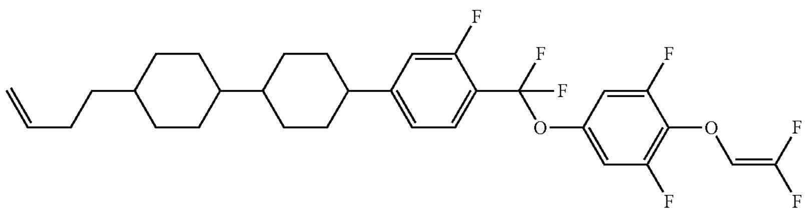
154
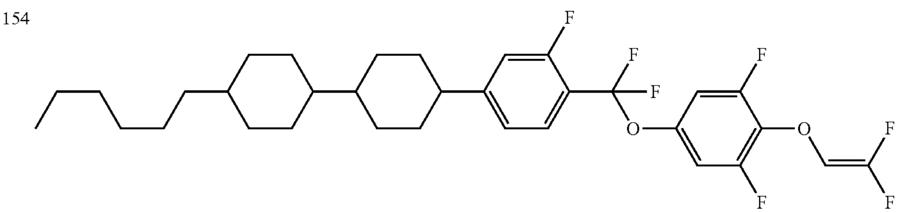
155
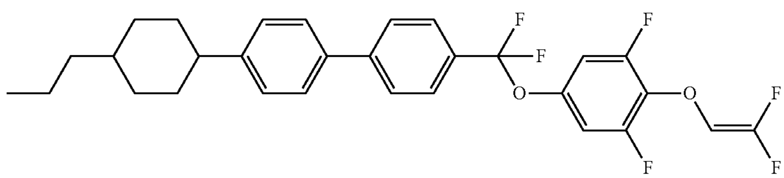
C 67.3 C 80.2 SG 98.6 SF 106 SB 109 SA 152.4 N 208.5 I
$T_{NI}$ = 163.7° C., η = 48.7 mPa · S, Δ n = 0.177, Δ ε = 21.8
156
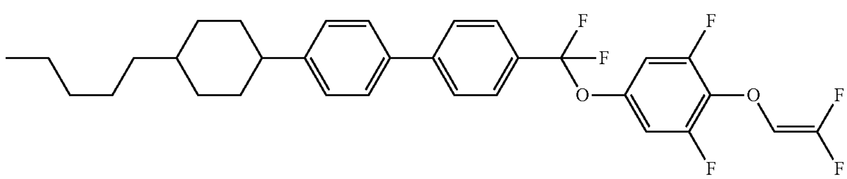 [SMILES: CCCCCC1CCC(c2ccc(-c3ccc(C(F)(F)Oc4cc(F)c(OC=C(F)F)c(F)c4)cc3)cc2)CC1]
157
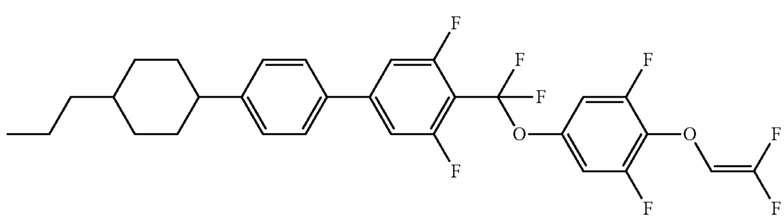
C 81 N 164 I
$T_{NI}$ = 94.4° C., η = 34.9 mPa · S, Δ n = 0.1503, Δ ε = 27.23
158
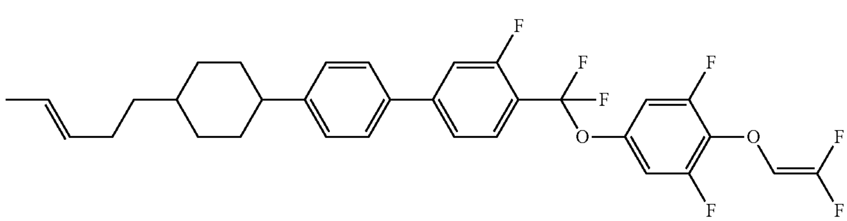

-continued
| Formula 59 | |
|---|---|
| No. | |
| 159 | 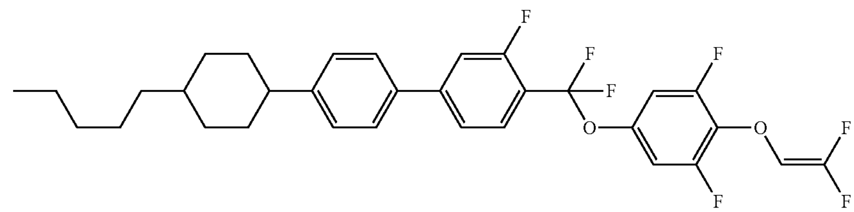 |
| 160 | 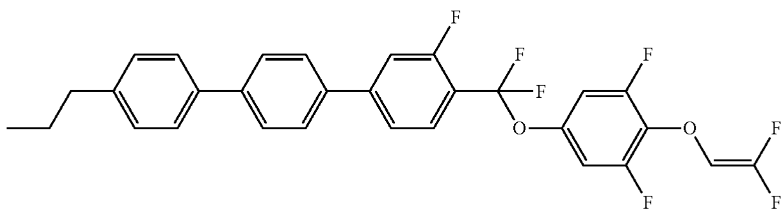 [SMILES: CCCc1ccc(-c2ccc(-c3ccc(C(F)(F)Oc4cc(F)c(OC=C(F)F)c(F)c4)c(F)c3)cc2)cc1] |
| 161 | 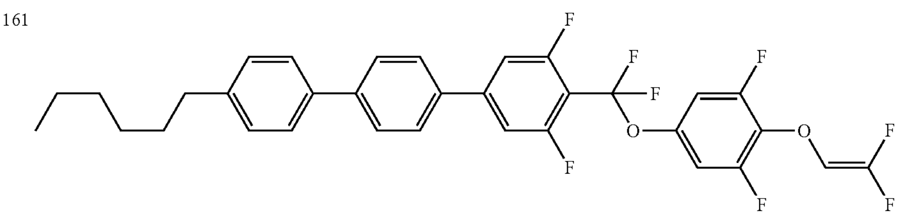 |
| 162 | 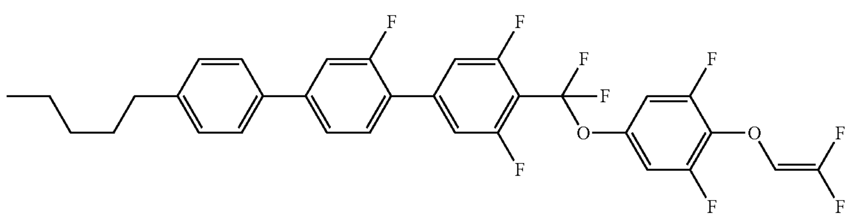 [SMILES: CCCCCc1ccc(-c2ccc(-c3cc(F)c(C(F)(F)Oc4cc(F)c(OC=C(F)F)c(F)c4)c(F)c3)c(F)c2)cc1] |
| 163 | 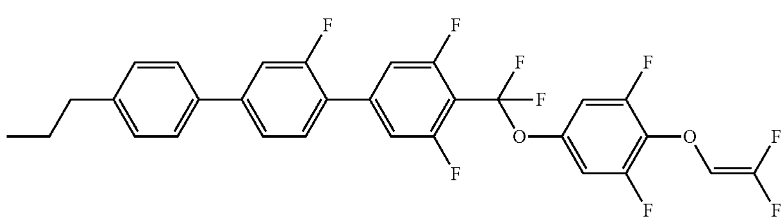<br>C 86.2 SA 126.9 N 156.9 I<br>$T_{NI}$ = 104.4° C., η = 53.9 mPa · S, Δ n = 0.2103, Δ ε = 39.23 |
| 164 | 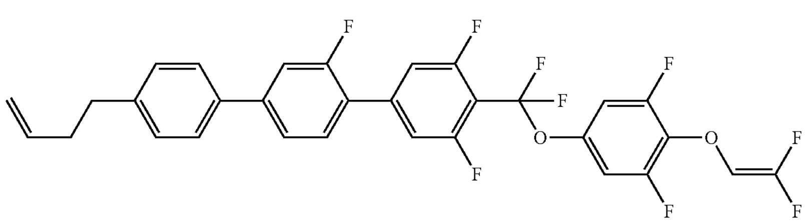 [SMILES: C=CCCc1ccc(-c2ccc(-c3cc(F)c(C(F)(F)Oc4cc(F)c(OC=C(F)F)c(F)c4)c(F)c3)c(F)c2)cc1] |

-continued
| Formula 59 |
|---|
| No. |
165
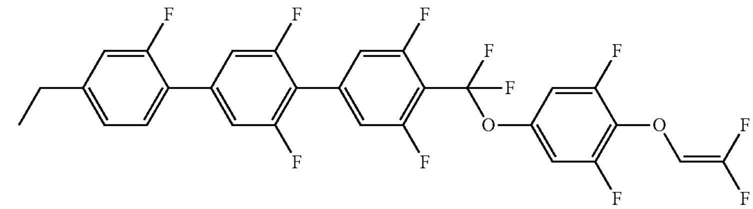 [SMILES: CCc1ccc(-c2cc(F)c(-c3cc(F)c(C(F)(F)Oc4cc(F)c(OC=C(F)F)c(F)c4)c(F)c3)c(F)c2)c(F)c1]
166
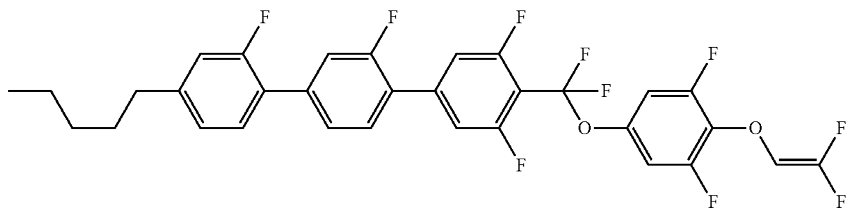 [SMILES: CCCCCc1ccc(-c2ccc(-c3cc(F)c(C(F)(F)Oc4cc(F)c(OC=C(F)F)c(F)c4)c(F)c3)c(F)c2)c(F)c1]
167
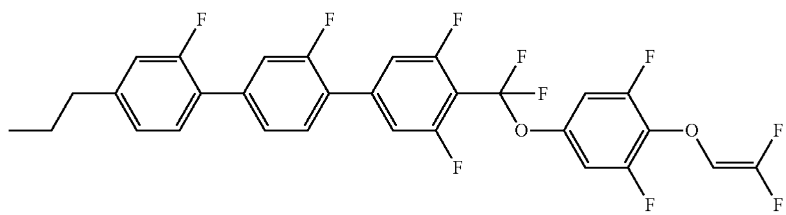
168
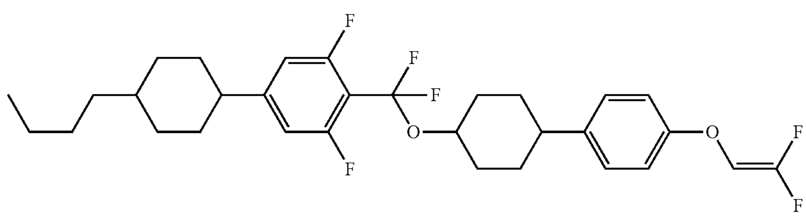 [SMILES: CCCCC1CCC(c2cc(F)c(C(F)(F)OC3CCC(c4ccc(OC=C(F)F)cc4)CC3)c(F)c2)CC1]
| Formula 60 |
|---|
| No. |
169
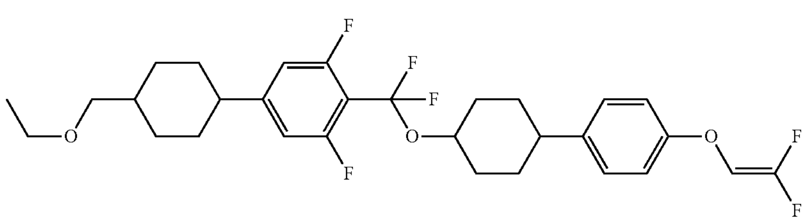 [SMILES: CCOCC1CCC(c2cc(F)c(C(F)(F)OC3CCC(c4ccc(OC=C(F)F)cc4)CC3)c(F)c2)CC1]
170
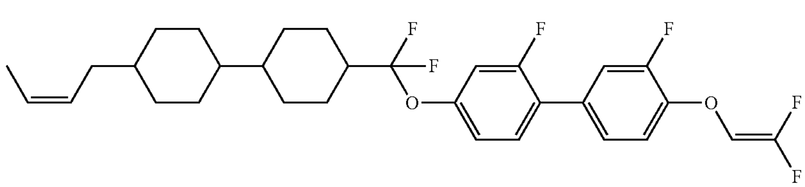

-continued
Formula 60
| No. | |
|---|---|
| 171 | 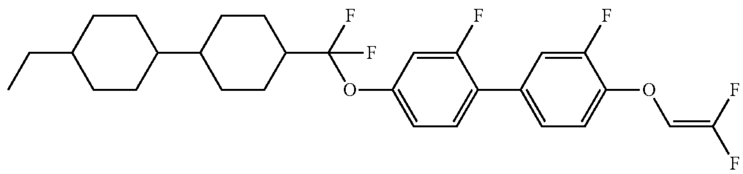 |
| 172 | 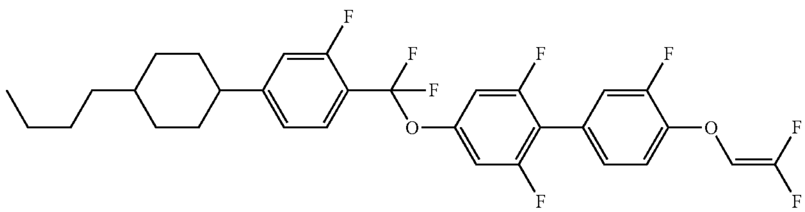 [SMILES: CCCCC1CCC(c2ccc(C(F)(F)Oc3cc(F)c(-c4ccc(OC=C(F)F)c(F)c4)c(F)c3)c(F)c2)CC1] |
| 173 | 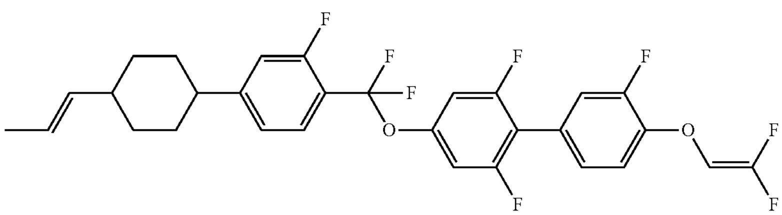 [SMILES: C/C=C/C1CCC(c2ccc(C(F)(F)Oc3cc(F)c(-c4ccc(OC=C(F)F)c(F)c4)c(F)c3)c(F)c2)CC1] |
| 174 | 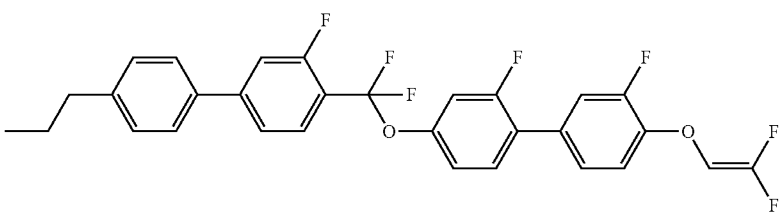 [SMILES: CCCc1ccc(-c2ccc(C(F)(F)Oc3ccc(-c4ccc(OC=C(F)F)c(F)c4)c(F)c3)c(F)c2)cc1] |
| 175 | 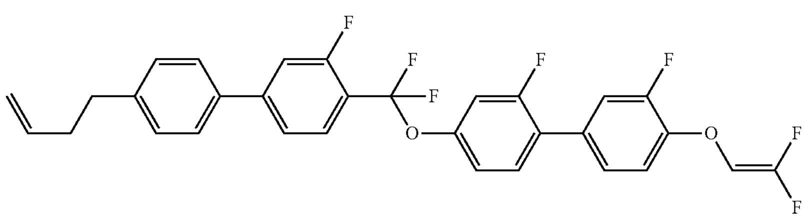 |
| 176 | 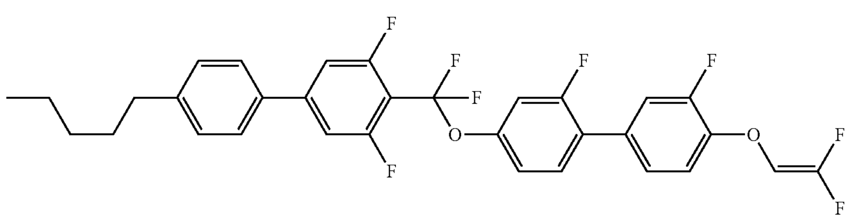 |
| 177 | 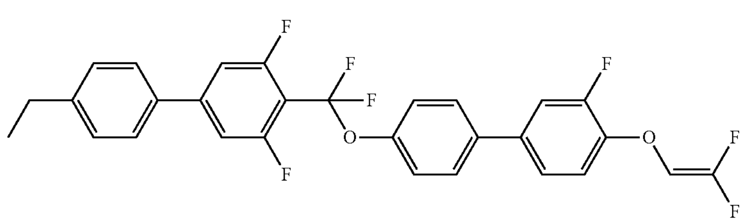 [SMILES: CCc1ccc(-c2cc(F)c(C(F)(F)Oc3ccc(-c4ccc(OC=C(F)F)c(F)c4)cc3)c(F)c2)cc1] |

-continued
| Formula 60 | |
|---|---|
| No. | |
| 178 | 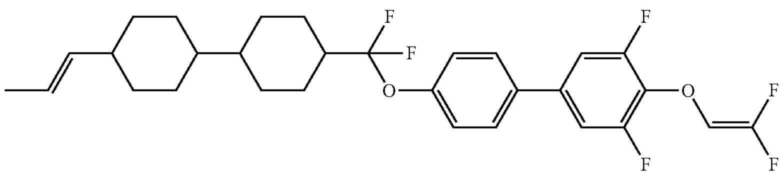 [SMILES: C/C=C/C1CCC(C2CCC(C(F)(F)Oc3ccc(-c4cc(F)c(OC=C(F)F)c(F)c4)cc3)CC2)CC1] |
| 179 | 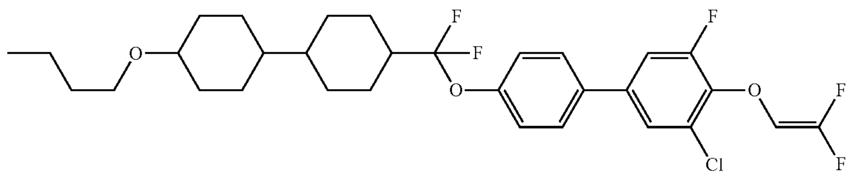 |
| 180 | 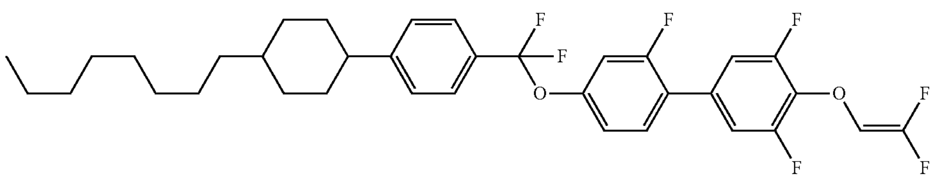 [SMILES: CCCCCCCCC1CCC(c2ccc(C(F)(F)Oc3ccc(-c4cc(F)c(OC=C(F)F)c(F)c4)c(F)c3)cc2)CC1] |
| 181 | 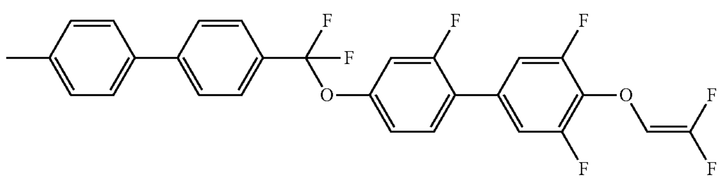 [SMILES: Cc1ccc(-c2ccc(C(F)(F)Oc3ccc(-c4cc(F)c(OC=C(F)F)c(F)c4)c(F)c3)cc2)cc1] |
| 182 | 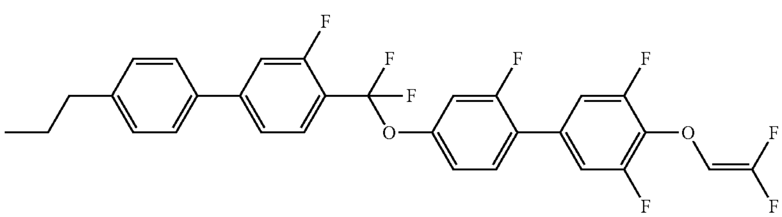 |
| 183 | 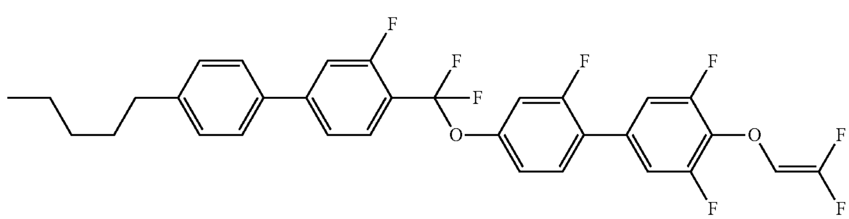 [SMILES: CCCCCc1ccc(-c2ccc(C(F)(F)Oc3ccc(-c4cc(F)c(OC=C(F)F)c(F)c4)c(F)c3)c(F)c2)cc1] |
| 184 | 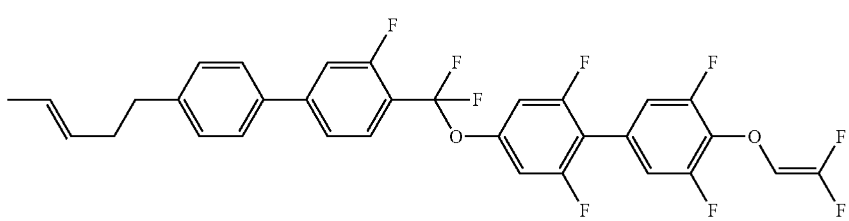 [SMILES: C/C=C/CCc1ccc(-c2ccc(C(F)(F)Oc3cc(F)c(-c4cc(F)c(OC=C(F)F)c(F)c4)c(F)c3)c(F)c2)cc1] |

-continued
| Formula 60 | |
|---|---|
| No. | |
| 185 | 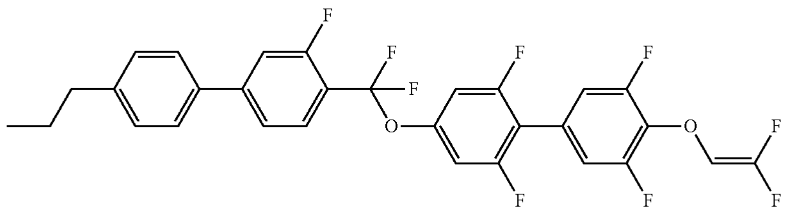 [SMILES: CCCc1ccc(-c2ccc(C(F)(F)Oc3cc(F)c(-c4cc(F)c(OC=C(F)F)c(F)c4)c(F)c3)c(F)c2)cc1] |
| 186 | 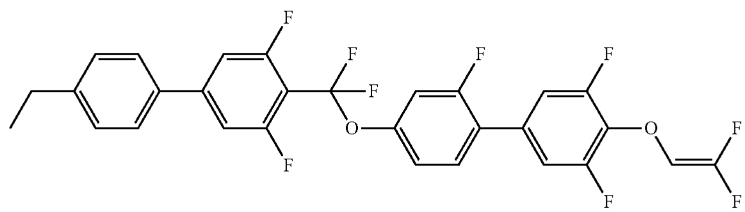 [SMILES: CCc1ccc(-c2cc(F)c(C(F)(F)Oc3ccc(-c4cc(F)c(OC=C(F)F)c(F)c4)c(F)c3)c(F)c2)cc1] |
| 187 | 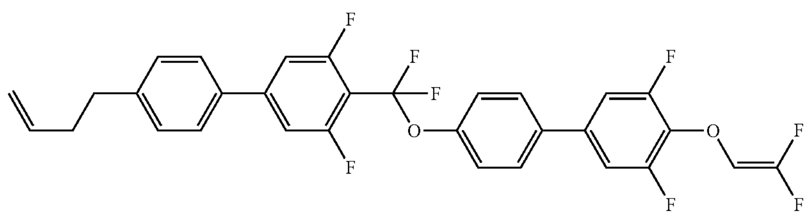 [SMILES: C=CCCc1ccc(-c2cc(F)c(C(F)(F)Oc3ccc(-c4cc(F)c(OC=C(F)F)c(F)c4)cc3)c(F)c2)cc1] |
| 188 | 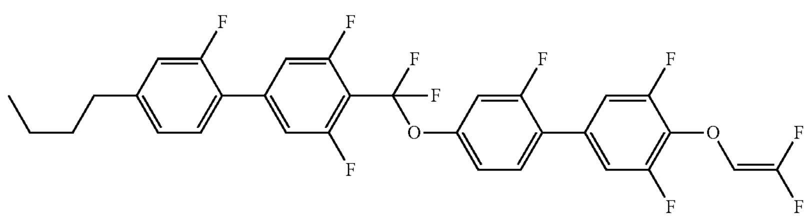 |
| 189 | 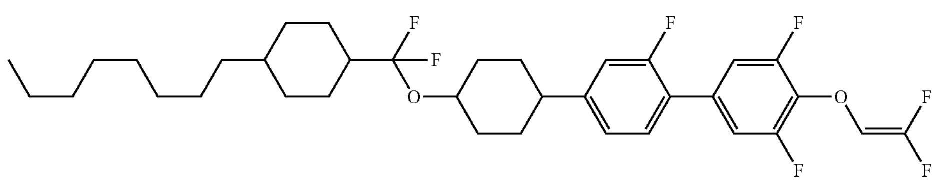 [SMILES: CCCCCCCCC1CCC(C(F)(F)OC2CCC(c3ccc(-c4cc(F)c(OC=C(F)F)c(F)c4)c(F)c3)CC2)CC1] |
| 190 | 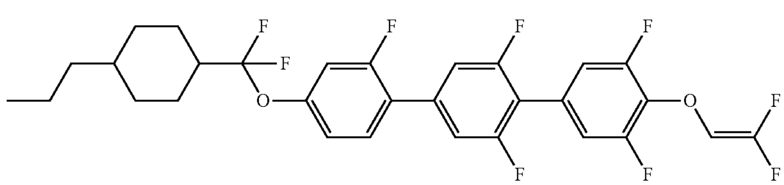 |
| 191 | 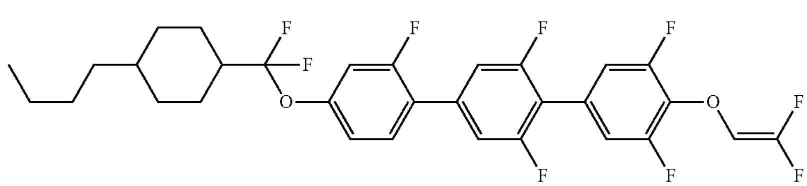 [SMILES: CCCCC1CCC(C(F)(F)Oc2ccc(-c3cc(F)c(-c4cc(F)c(OC=C(F)F)c(F)c4)c(F)c3)c(F)c2)CC1] |

-continued
| Formula 60 | |
|---|---|
| No. | |
| 192 | 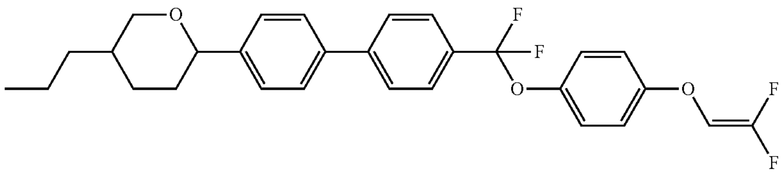 |
| Formula 61 | |
|---|---|
| No. | |
| 193 | 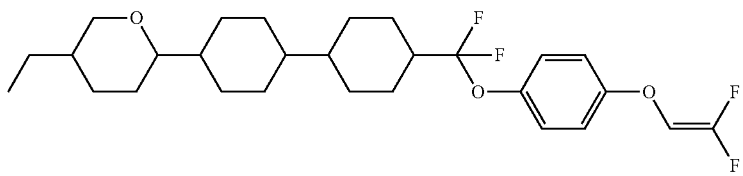 [SMILES: CCC1CCC(C2CCC(C3CCC(C(F)(F)Oc4ccc(OC=C(F)F)cc4)CC3)CC2)OC1] |
| 194 | 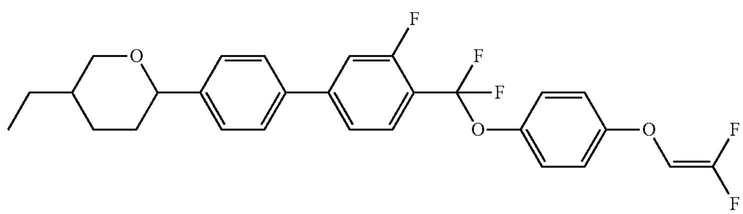 [SMILES: CCC1CCC(c2ccc(-c3ccc(C(F)(F)Oc4ccc(OC=C(F)F)cc4)c(F)c3)cc2)OC1] |
| 195 | 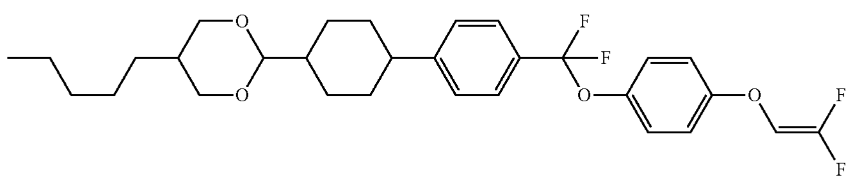 [SMILES: CCCCCC1COC(C2CCC(c3ccc(C(F)(F)Oc4ccc(OC=C(F)F)cc4)cc3)CC2)OC1] |
| 196 | 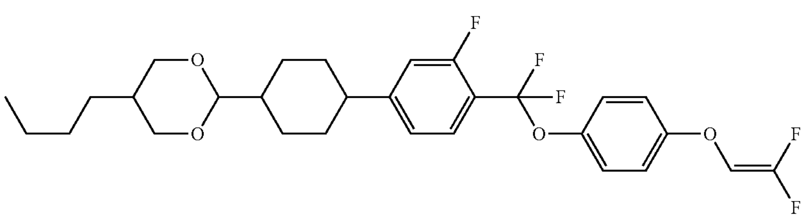 [SMILES: CCCCC1COC(C2CCC(c3ccc(C(F)(F)Oc4ccc(OC=C(F)F)cc4)c(F)c3)CC2)OC1] |
| 197 | 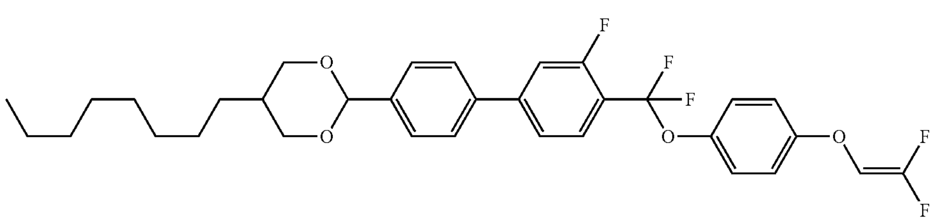 [SMILES: CCCCCCCCC1COC(c2ccc(-c3ccc(C(F)(F)Oc4ccc(OC=C(F)F)cc4)c(F)c3)cc2)OC1] |
| 198 | 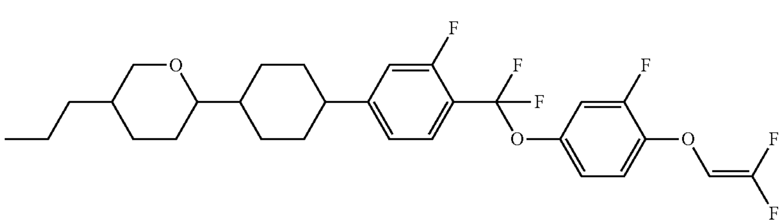 [SMILES: CCCC1CCC(C2CCC(c3ccc(C(F)(F)Oc4ccc(OC=C(F)F)c(F)c4)c(F)c3)CC2)OC1] |

-continued
| Formula 61 | |
| --- | --- |
| No. | |
| 199 | 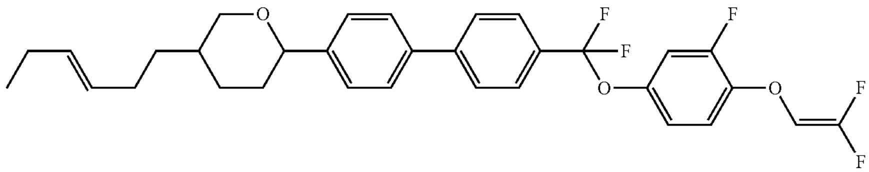 [SMILES: CC/C=C/CCC1CCC(c2ccc(-c3ccc(C(F)(F)Oc4ccc(OC=C(F)F)c(F)c4)cc3)cc2)OC1] |
| 200 | 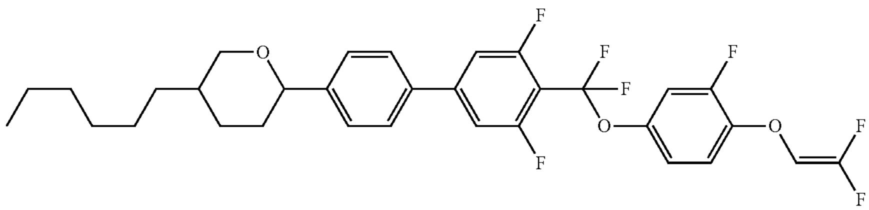 [SMILES: CCCCCCC1CCC(c2ccc(-c3cc(F)c(C(F)(F)Oc4ccc(OC=C(F)F)c(F)c4)c(F)c3)cc2)OC1] |
| 201 | 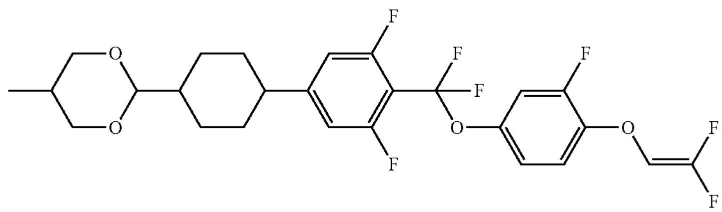 [SMILES: CC1COC(C2CCC(c3cc(F)c(C(F)(F)Oc4ccc(OC=C(F)F)c(F)c4)c(F)c3)CC2)OC1] |
| 202 | 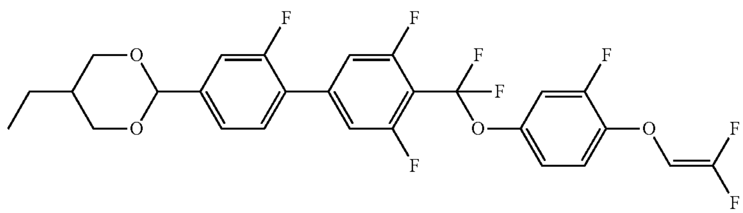 |
| 203 | 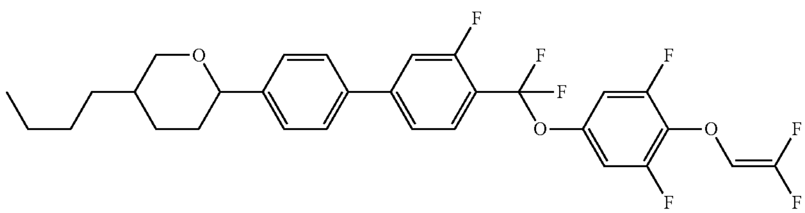 |
| 204 | 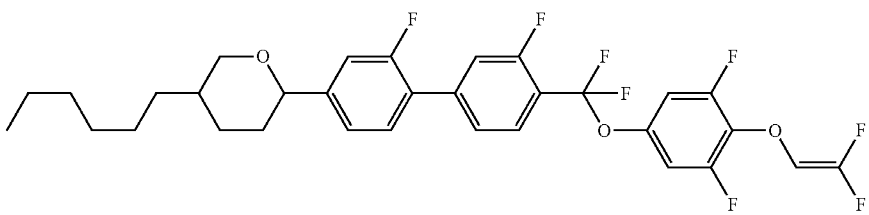 |
| 205 | 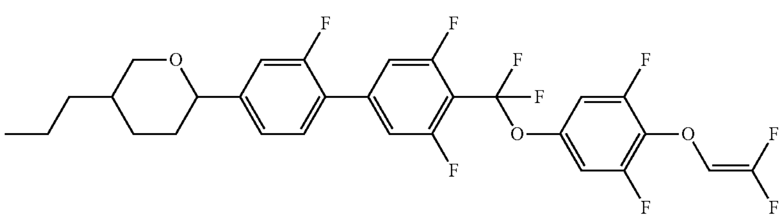<br>C 63.2 N 128.2 I<br>$T_{NI}$ = 95.0° C., η = 55.9 mPa · S, Δ n = 0.1437, Δ ε = 37.4 |

-continued
| Formula 61 | |
|---|---|
| No. | |
| 206 | 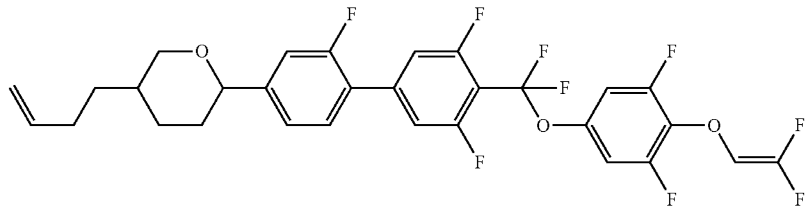 [SMILES: C=CCCC1CCC(c2ccc(-c3cc(F)c(C(F)(F)Oc4cc(F)c(OC=C(F)F)c(F)c4)c(F)c3)c(F)c2)OC1] |
| 207 | 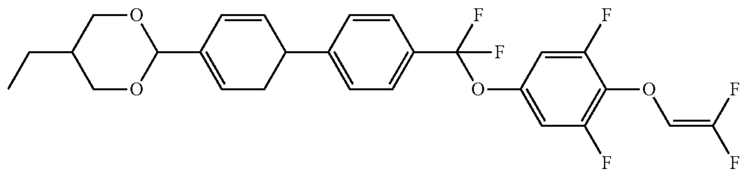 [SMILES: CCC1COC(C2=CCC(c3ccc(C(F)(F)Oc4cc(F)c(OC=C(F)F)c(F)c4)cc3)C=C2)OC1] |
| 208 | 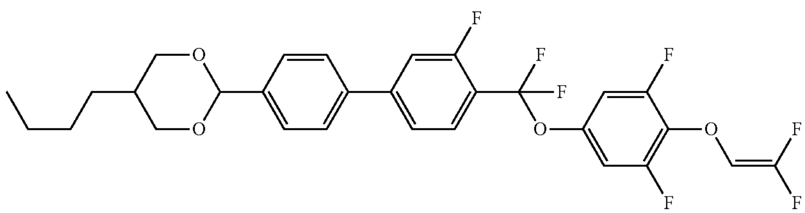 [SMILES: CCCCC1COC(c2ccc(-c3ccc(C(F)(F)Oc4cc(F)c(OC=C(F)F)c(F)c4)c(F)c3)cc2)OC1] |
| 209 | 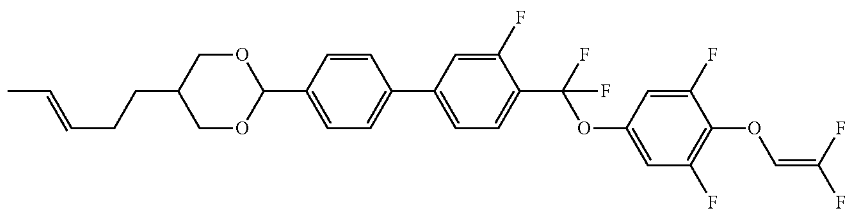 [SMILES: C/C=C/CCC1COC(c2ccc(-c3ccc(C(F)(F)Oc4cc(F)c(OC=C(F)F)c(F)c4)c(F)c3)cc2)OC1] |
| 210 | 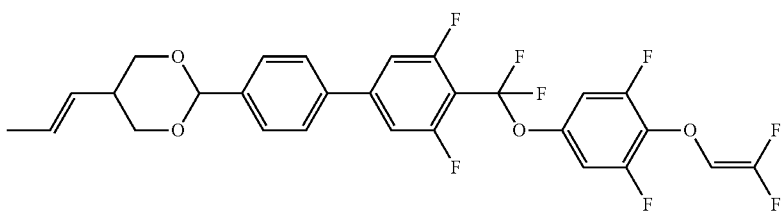 [SMILES: C/C=C/C1COC(c2ccc(-c3cc(F)c(C(F)(F)Oc4cc(F)c(OC=C(F)F)c(F)c4)c(F)c3)cc2)OC1] |
| 211 | 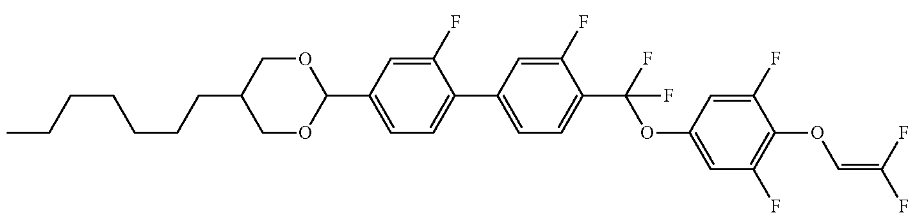 [SMILES: CCCCCCCC1COC(c2ccc(-c3ccc(C(F)(F)Oc4cc(F)c(OC=C(F)F)c(F)c4)c(F)c3)c(F)c2)OC1] |
| 212 | 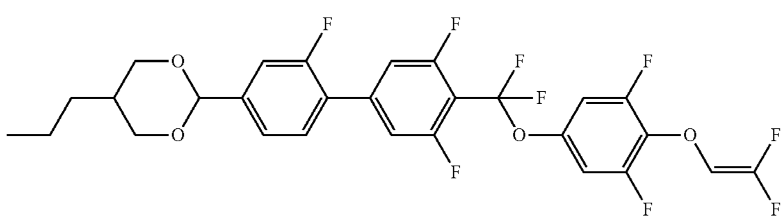 C 78.4 N 129.9 I $T_{NI}$ = 101.7° C., η = 64.2 mPa · S, Δ n = 0.157, Δ ε = 41.7 |

-continued
| Formula 61 |
| --- |
| No. |
213 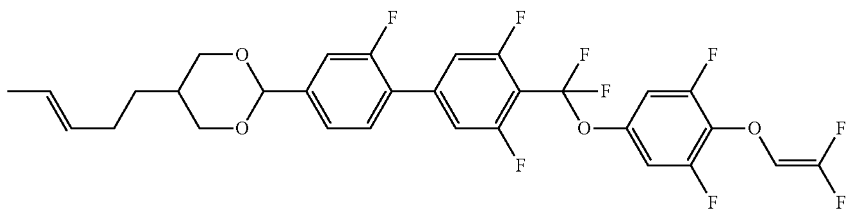
214 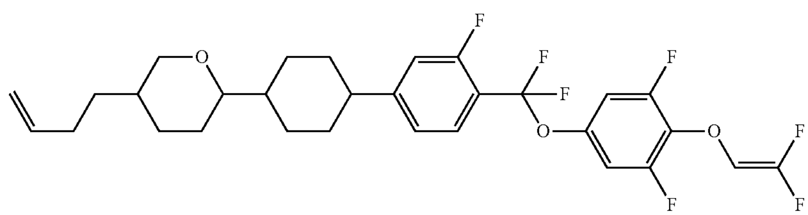 [SMILES: C=CCCC1CCC(C2CCC(c3ccc(C(F)(F)Oc4cc(F)c(OC=C(F)F)c(F)c4)c(F)c3)CC2)OC1]
215 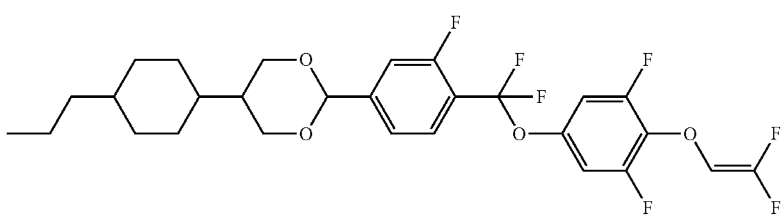 [SMILES: CCCC1CCC(C2COC(c3ccc(C(F)(F)Oc4cc(F)c(OC=C(F)F)c(F)c4)c(F)c3)OC2)CC1]
216 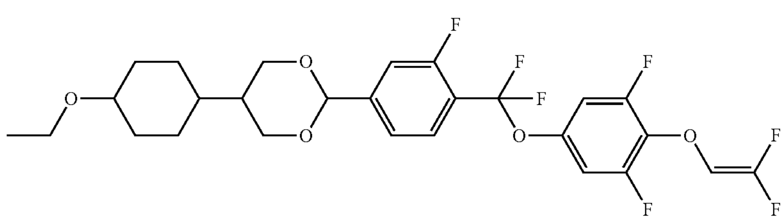 [SMILES: CCOC1CCC(C2COC(c3ccc(C(F)(F)Oc4cc(F)c(OC=C(F)F)c(F)c4)c(F)c3)OC2)CC1]
| Formula 62 |
| --- |
| No. |
217 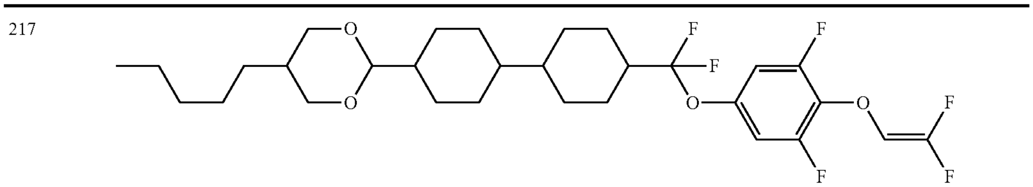
218 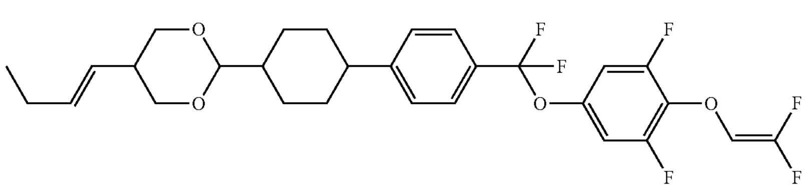 [SMILES: CC/C=C/C1COC(C2CCC(c3ccc(C(F)(F)Oc4cc(F)c(OC=C(F)F)c(F)c4)cc3)CC2)OC1]

-continued
| Formula 62 |
|---|
| No. |
219
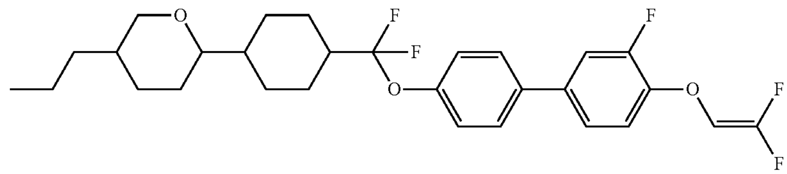
220
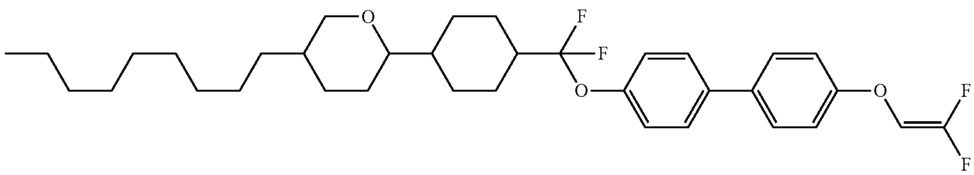 [SMILES: CCCCCCCCCC1CCC(C2CCC(C(F)(F)Oc3ccc(-c4ccc(OC=C(F)F)cc4)cc3)CC2)OC1]
221
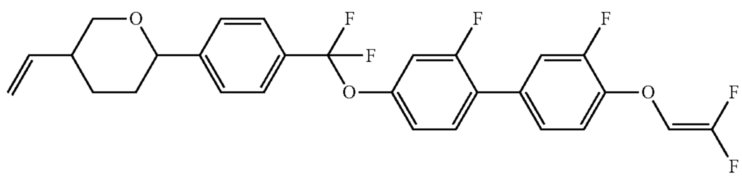 [SMILES: C=CC1CCC(c2ccc(C(F)(F)Oc3ccc(-c4ccc(OC=C(F)F)c(F)c4)c(F)c3)cc2)OC1]
222
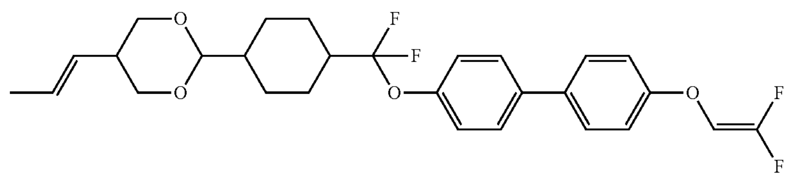
223
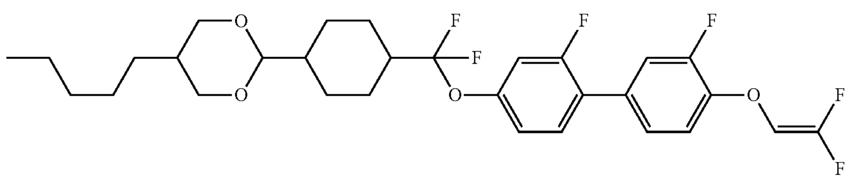
224
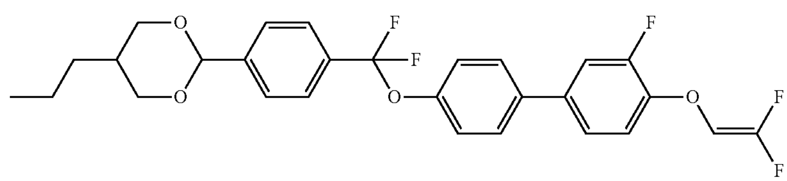
225
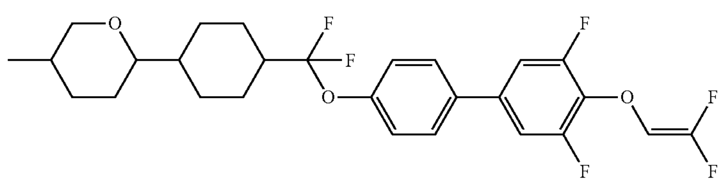
226
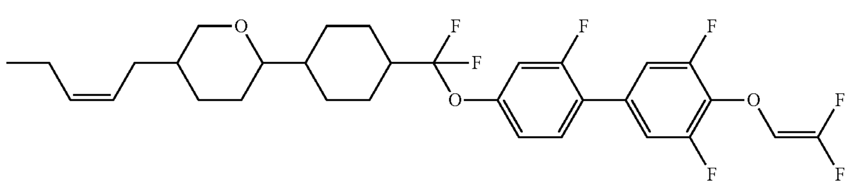

-continued
| No. | Formula 62 |
| --- | --- |
| 227 | 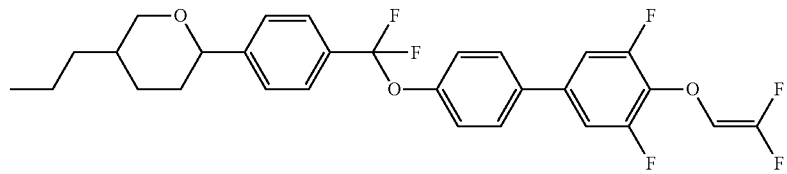 [SMILES: CCCC1COC(c2ccc(C(F)(F)Oc3ccc(-c4ccc(OC=C(F)F)c(F)c4)cc3)cc2)OC1] |
| 228 | 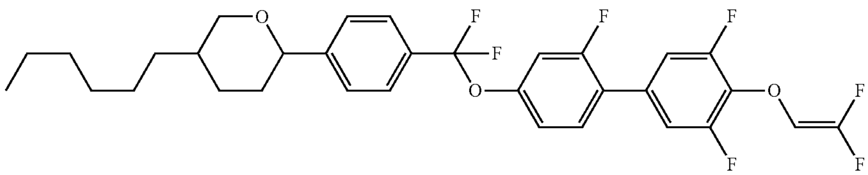 [SMILES: CCCCCCC1CCC(c2ccc(C(F)(F)Oc3ccc(-c4cc(F)c(OC=C(F)F)c(F)c4)c(F)c3)cc2)OC1] |
| 229 | 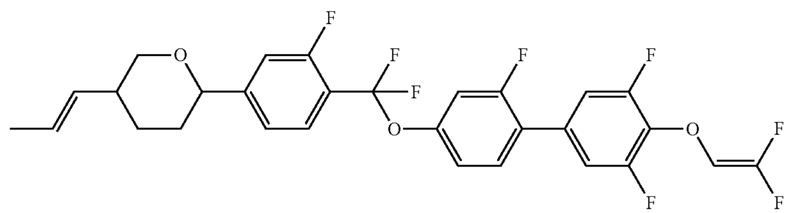 [SMILES: C/C=C/C1CCC(c2ccc(C(F)(F)Oc3ccc(-c4cc(F)c(OC=C(F)F)c(F)c4)c(F)c3)c(F)c2)OC1] |
| 230 | 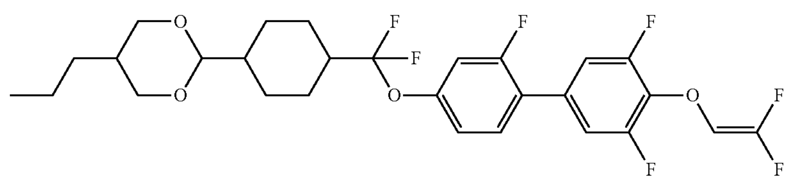 |
| 232 | 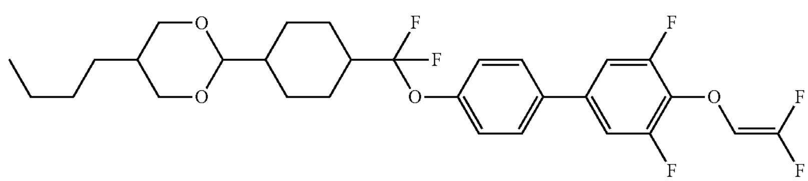 [SMILES: CCCCC1COC(C2CCC(C(F)(F)Oc3ccc(-c4cc(F)c(OC=C(F)F)c(F)c4)cc3)CC2)OC1] |
| 232 | 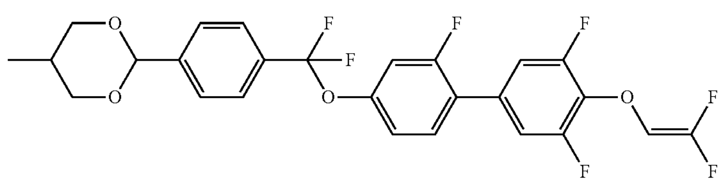 [SMILES: CC1COC(c2ccc(C(F)(F)Oc3ccc(-c4cc(F)c(OC=C(F)F)c(F)c4)c(F)c3)cc2)OC1] |
| 233 | 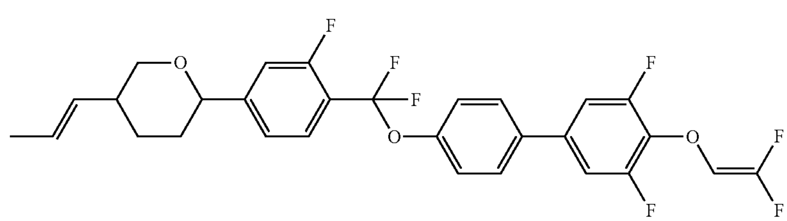 |
| 234 | 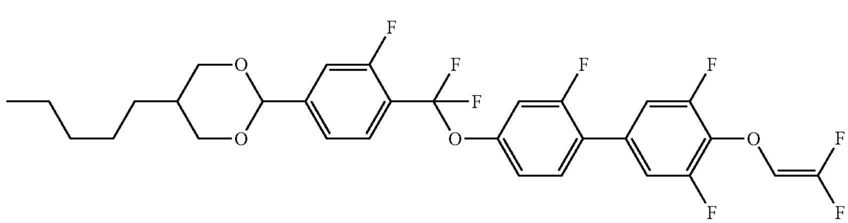 |

-continued
| Formula 62 |
|---|
| No. |
235
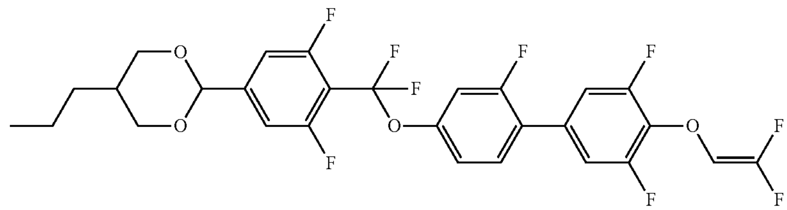
236
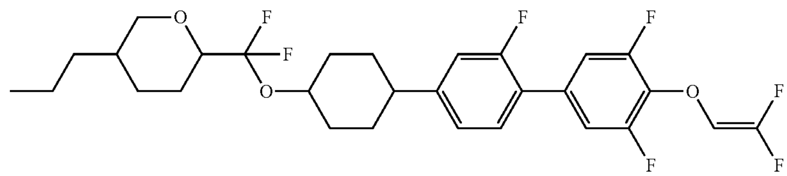
237
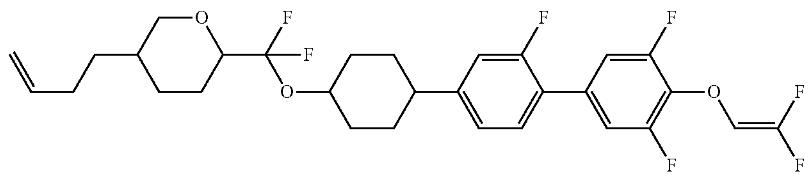 [SMILES: C=CCCC1CCC(C(F)(F)OC2CCC(c3ccc(-c4cc(F)c(OC=C(F)F)c(F)c4)c(F)c3)CC2)OC1]
238
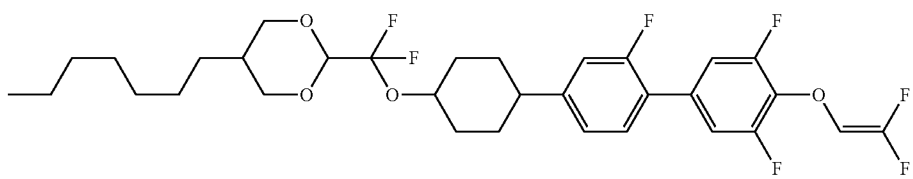 [SMILES: CCCCCCCC1COC(C(F)(F)OC2CCC(c3ccc(-c4cc(F)c(OC=C(F)F)c(F)c4)c(F)c3)CC2)OC1]
239
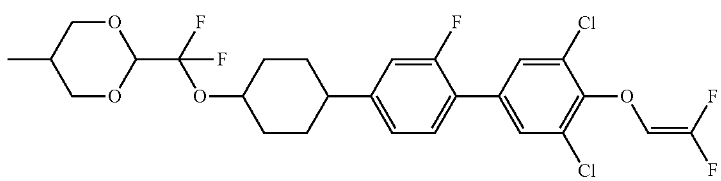 [SMILES: CC1COC(C(F)(F)OC2CCC(c3ccc(-c4cc(Cl)c(OC=C(F)F)c(Cl)c4)c(F)c3)CC2)OC1]
240
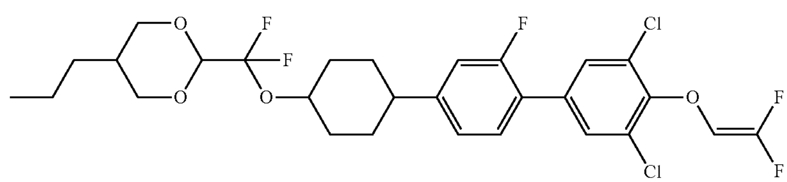 [SMILES: CCCC1COC(C(F)(F)OC2CCC(c3ccc(-c4cc(Cl)c(OC=C(F)F)c(Cl)c4)c(F)c3)CC2)OC1]
| Formula 63 |
|---|
| No. |
241
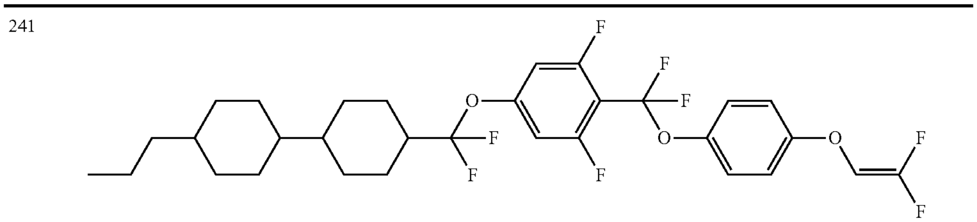

-continued
| Formula 63 | |
|---|---|
| No. | |
| 242 | 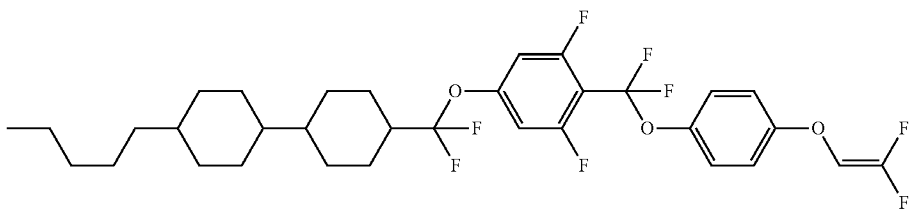 |
| 243 | 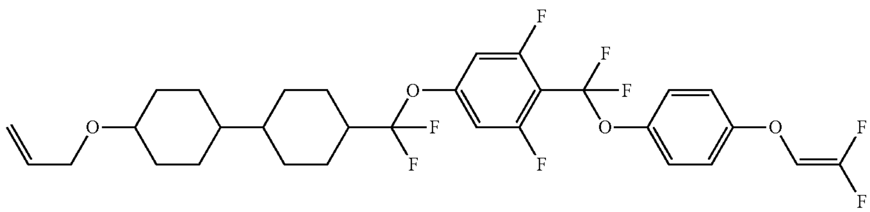 |
| 244 | 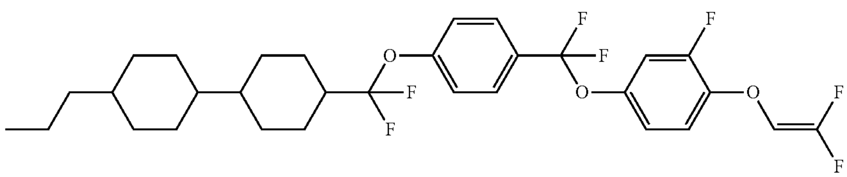 [SMILES: CCCC1CCC(C2CCC(C(F)(F)Oc3ccc(C(F)(F)Oc4ccc(OC=C(F)F)c(F)c4)cc3)CC2)CC1] |
| 245 | 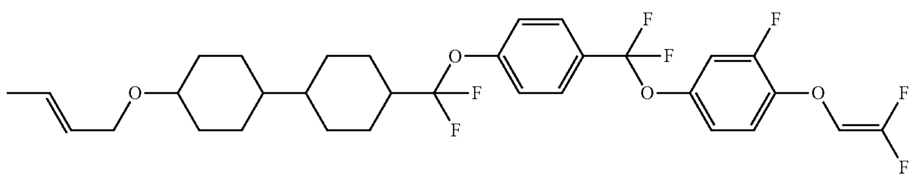 [SMILES: C/C=C/COC1CCC(C2CCC(C(F)(F)Oc3ccc(C(F)(F)Oc4ccc(OC=C(F)F)c(F)c4)cc3)CC2)CC1] |
| 246 | 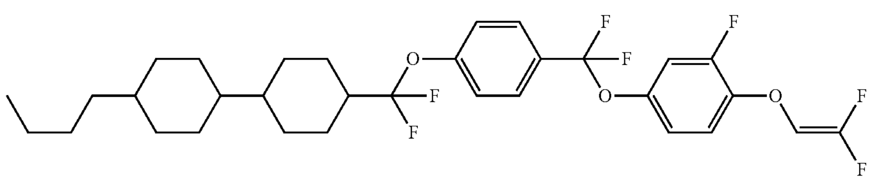 [SMILES: CCCCC1CCC(C2CCC(C(F)(F)Oc3ccc(C(F)(F)Oc4ccc(OC=C(F)F)c(F)c4)cc3)CC2)CC1] |
| 247 | 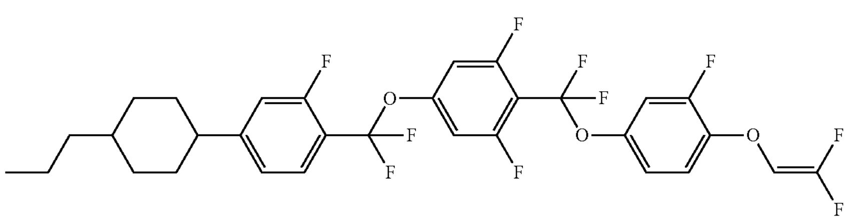 |
| 248 | 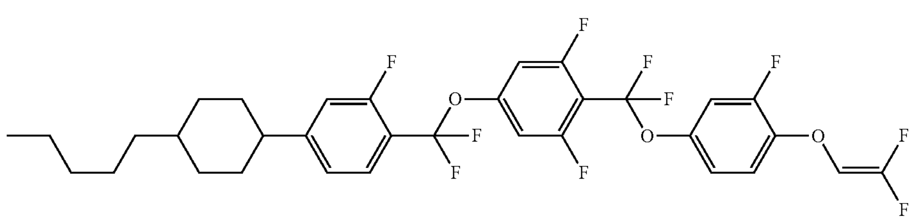 |

-continued
| Formula 63 |
| --- |
| No. | |
| --- | --- |
| 249 | 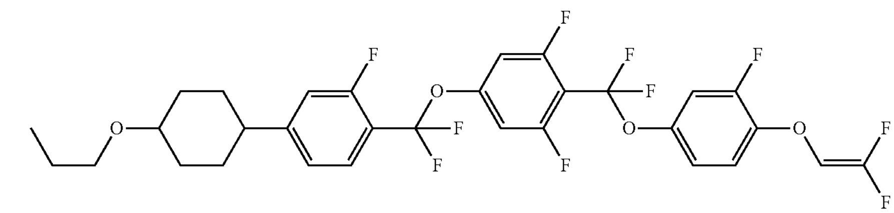 |
| 250 | 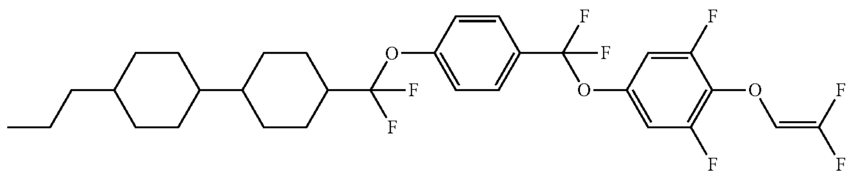 |
| 251 | 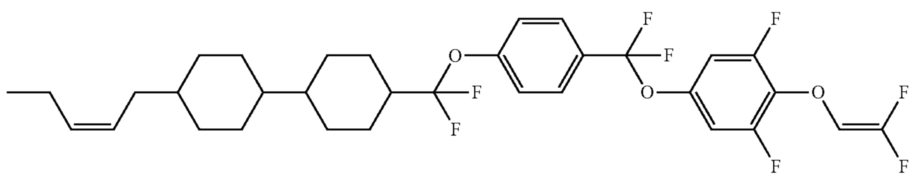 |
| 252 | 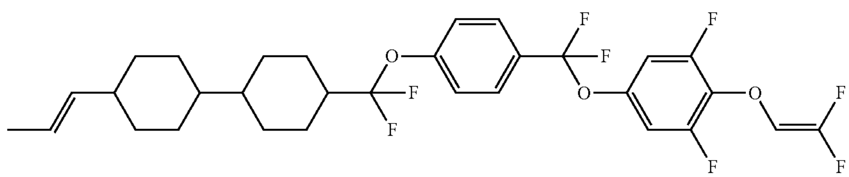 |
| 253 | 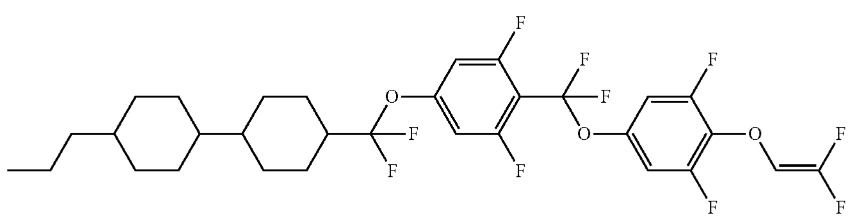 [SMILES: CCCC1CCC(C2CCC(C(F)(F)Oc3cc(F)c(C(F)(F)Oc4cc(F)c(OC=C(F)F)c(F)c4)c(F)c3)CC2)CC1] |
| 254 | 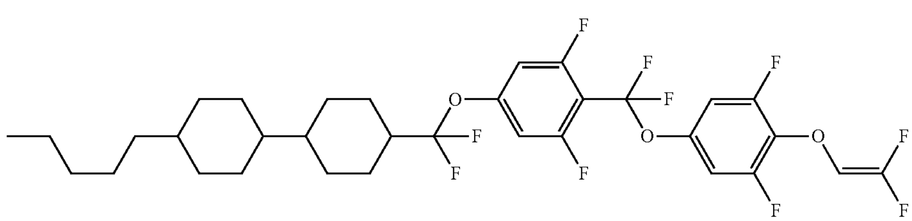 |
| 255 | 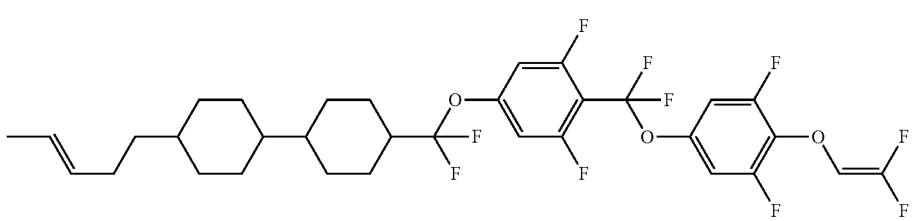 [SMILES: CCCCCC1CCC(C2CCC(C(F)(F)Oc3cc(F)c(C(F)(F)Oc4cc(F)c(OC=C(F)F)c(F)c4)c(F)c3)CC2)CC1] |

-continued
| Formula 63 | |
|---|---|
| No. | |
| 256 | 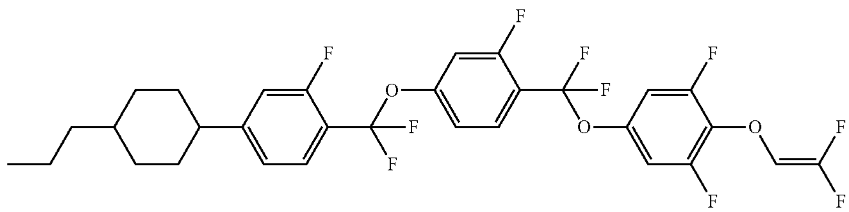 [SMILES: CCCC1CCC(c2ccc(C(F)(F)Oc3ccc(C(F)(F)Oc4cc(F)c(OC=C(F)F)c(F)c4)c(F)c3)c(F)c2)CC1] |
| 257 | 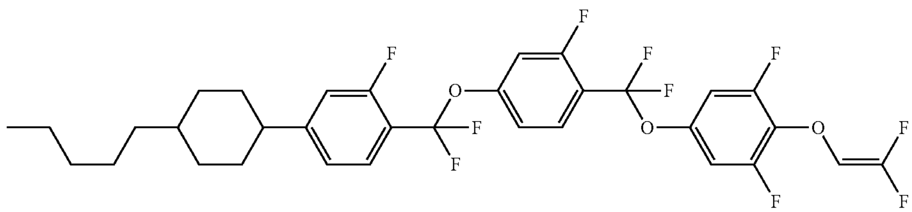 |
| 258 | 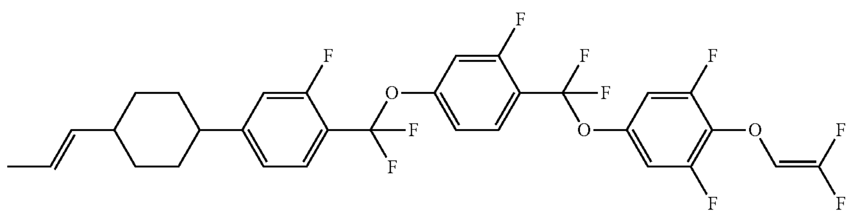 |
| 259 | 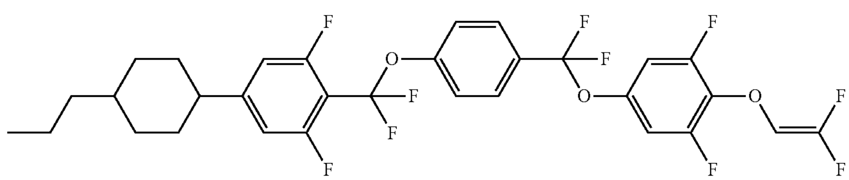 |
| 260 | 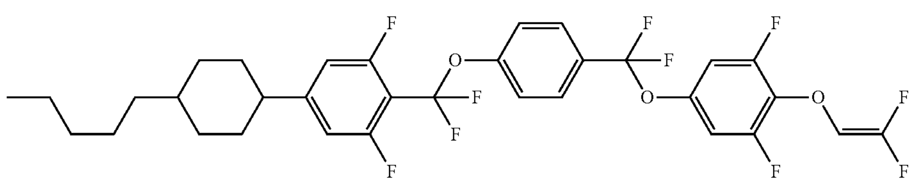 [SMILES: CCCCCC1CCC(c2cc(F)c(C(F)(F)Oc3ccc(C(F)(F)Oc4cc(F)c(OC=C(F)F)c(F)c4)cc3)c(F)c2)CC1] |
| 261 | 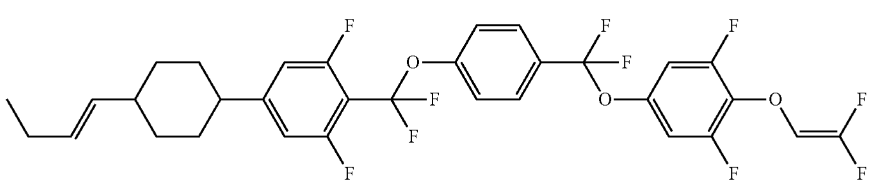 [SMILES: CC/C=C/C1CCC(c2cc(F)c(C(F)(F)Oc3ccc(C(F)(F)Oc4cc(F)c(OC=C(F)F)c(F)c4)cc3)c(F)c2)CC1] |
| 262 | 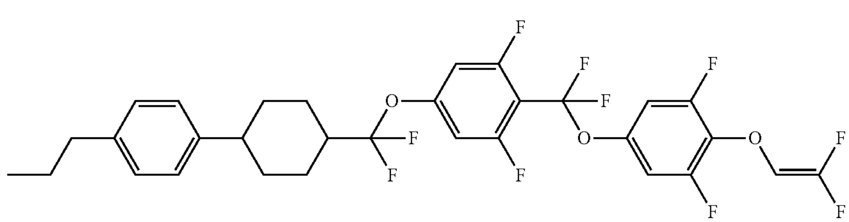 [SMILES: CCCc1ccc(C2CCC(C(F)(F)Oc3cc(F)c(C(F)(F)Oc4cc(F)c(OC=C(F)F)c(F)c4)c(F)c3)CC2)cc1] |

-continued
| Formula 63 | |
|---|---|
| No. | |
| 263 | 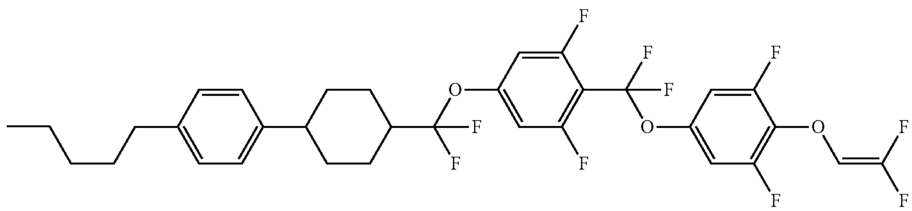 [SMILES: CCCCCc1ccc(C2CCC(C(F)(F)Oc3cc(F)c(C(F)(F)Oc4cc(F)c(OC=C(F)F)c(F)c4)c(F)c3)CC2)cc1] |
| 264 | 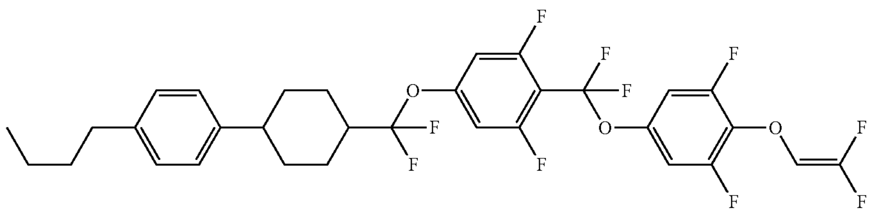 [SMILES: CCCCc1ccc(C2CCC(C(F)(F)Oc3cc(F)c(C(F)(F)Oc4cc(F)c(OC=C(F)F)c(F)c4)c(F)c3)CC2)cc1] |
| Formula 64 | |
|---|---|
| No. | |
| 265 | 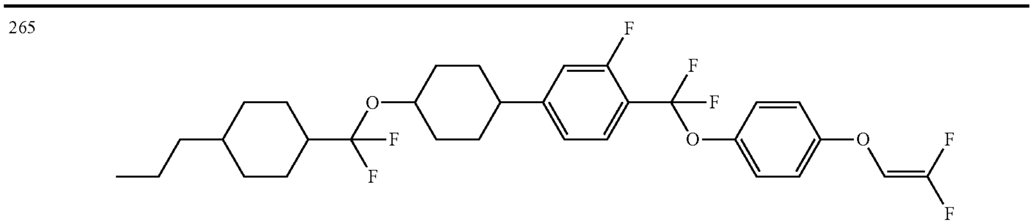 |
| 266 | 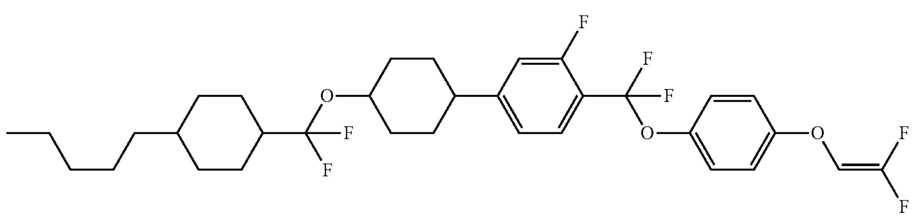 [SMILES: CCCCCC1CCC(C(F)(F)OC2CCC(c3ccc(C(F)(F)Oc4ccc(OC=C(F)F)cc4)c(F)c3)CC2)CC1] |
| 257 | 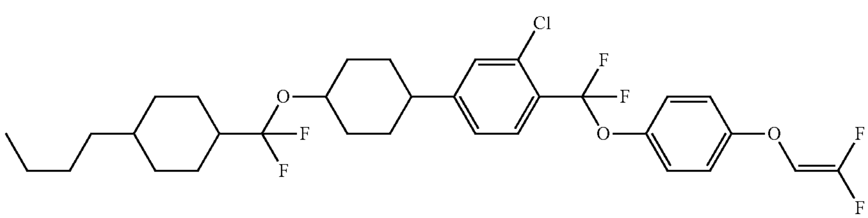 [SMILES: CCCCC1CCC(C(F)(F)OC2CCC(c3ccc(C(F)(F)Oc4ccc(OC=C(F)F)cc4)c(Cl)c3)CC2)CC1] |
| 268 | 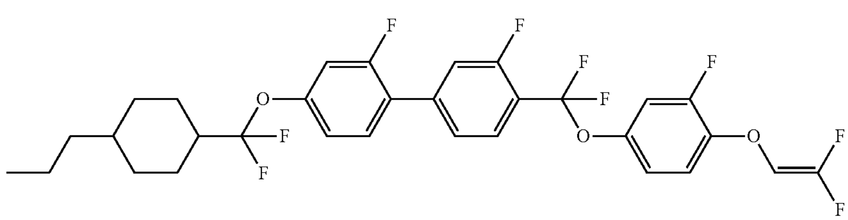 [SMILES: CCCC1CCC(C(F)(F)Oc2ccc(-c3ccc(C(F)(F)Oc4ccc(OC=C(F)F)c(F)c4)c(F)c3)c(F)c2)CC1] |

-continued
| Formula 64 | |
|---|---|
| No. | |
| 269 | 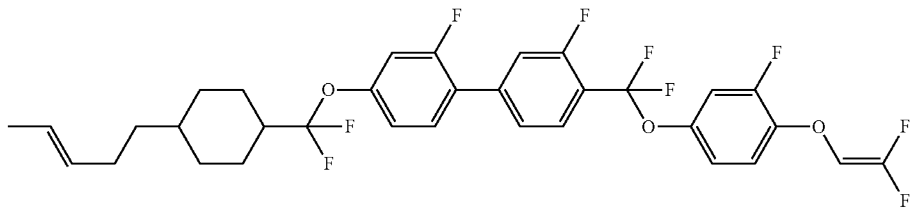 [SMILES: C/C=C/CCC1CCC(C(F)(F)Oc2ccc(-c3ccc(C(F)(F)Oc4ccc(OC=C(F)F)c(F)c4)c(F)c3)c(F)c2)CC1] |
| 270 | 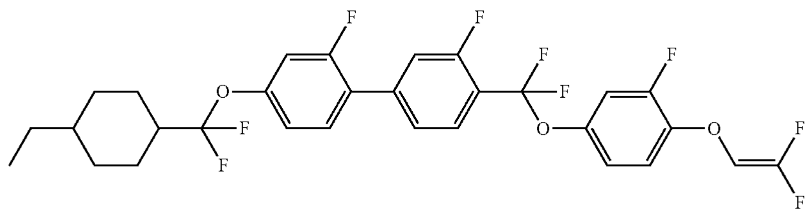 [SMILES: CCC1CCC(C(F)(F)Oc2ccc(-c3ccc(C(F)(F)Oc4ccc(OC=C(F)F)c(F)c4)c(F)c3)c(F)c2)CC1] |
| 271 | 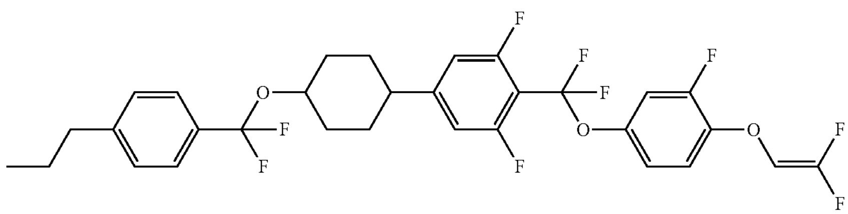 [SMILES: CCCc1ccc(C(F)(F)OC2CCC(c3cc(F)c(C(F)(F)Oc4ccc(OC=C(F)F)c(F)c4)c(F)c3)CC2)cc1] |
| 272 | 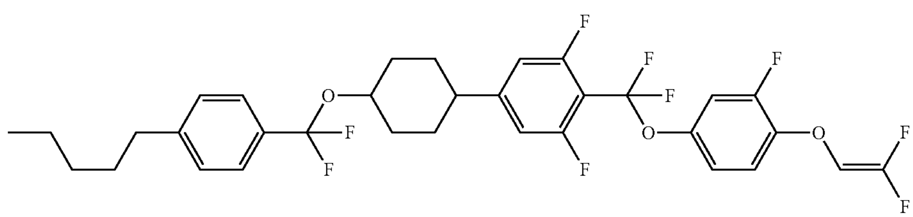 [SMILES: CCCCCc1ccc(C(F)(F)OC2CCC(c3cc(F)c(C(F)(F)Oc4ccc(OC=C(F)F)c(F)c4)c(F)c3)CC2)cc1] |
| 273 | 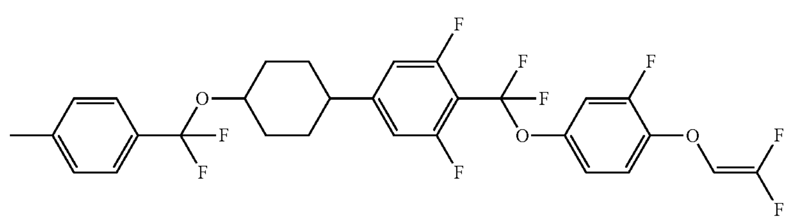 [SMILES: Cc1ccc(C(F)(F)OC2CCC(c3cc(F)c(C(F)(F)Oc4ccc(OC=C(F)F)c(F)c4)c(F)c3)CC2)cc1] |
| 274 | 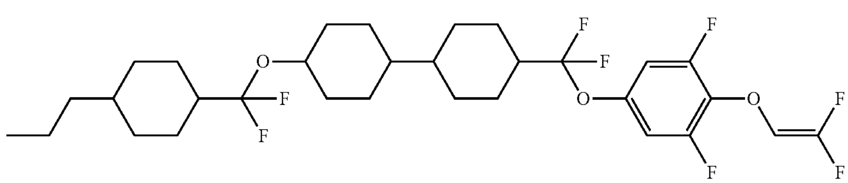 [SMILES: CCCC1CCC(C(F)(F)OC2CCC(C3CCC(C(F)(F)Oc4cc(F)c(OC=C(F)F)c(F)c4)CC3)CC2)CC1] |
| 275 | 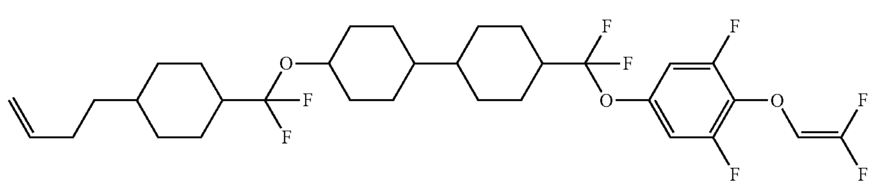 |

-continued
Formula 64
| No. | |
|---|---|
| 276 | 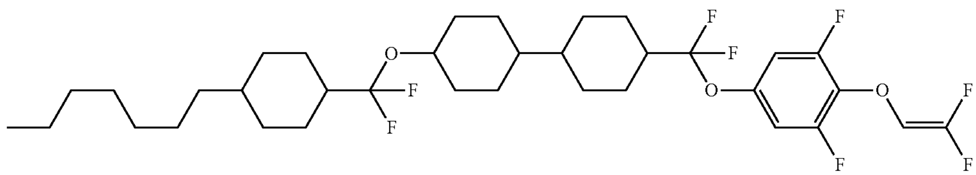 [SMILES: CCCCCCCC1CCC(C(F)(F)OC2CCC(C3CCC(C(F)(F)Oc4cc(F)c(OC=C(F)F)c(F)c4)CC3)CC2)CC1] |
| 277 | 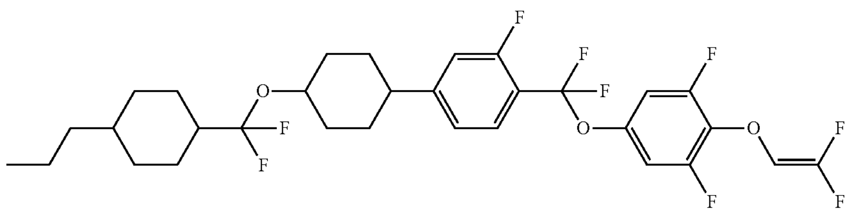 [SMILES: CCCC1CCC(C(F)(F)OC2CCC(c3ccc(C(F)(F)Oc4cc(F)c(OC=C(F)F)c(F)c4)c(F)c3)CC2)CC1] |
| 278 | 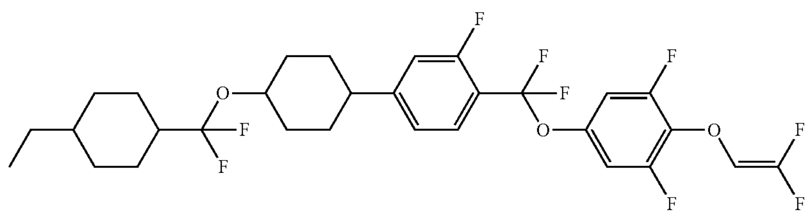 [SMILES: CCC1CCC(C(F)(F)OC2CCC(c3ccc(C(F)(F)Oc4cc(F)c(OC=C(F)F)c(F)c4)c(F)c3)CC2)CC1] |
| 279 | 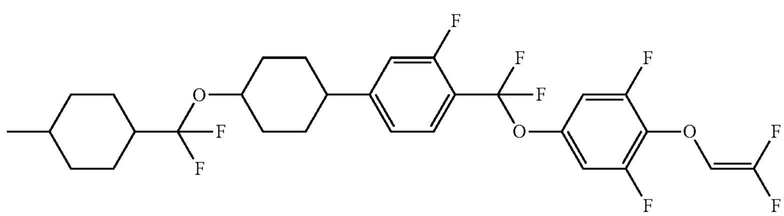 [SMILES: CC1CCC(C(F)(F)OC2CCC(c3ccc(C(F)(F)Oc4cc(F)c(OC=C(F)F)c(F)c4)c(F)c3)CC2)CC1] |
| 280 | 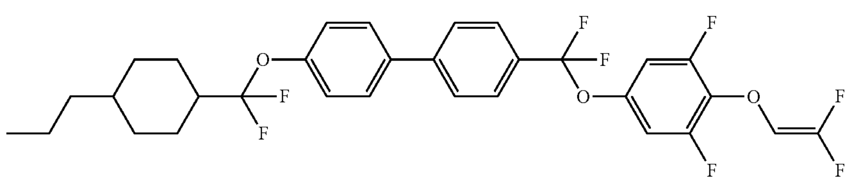 [SMILES: CCCC1CCC(C(F)(F)Oc2ccc(-c3ccc(C(F)(F)Oc4cc(F)c(OC=C(F)F)c(F)c4)cc3)cc2)CC1] |
| 281 | 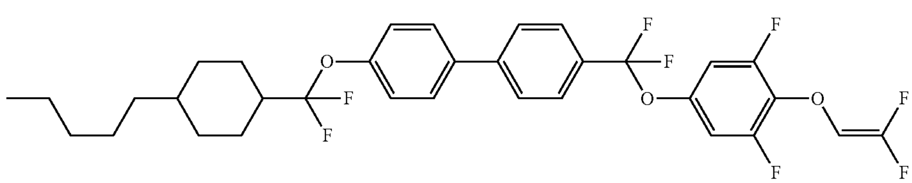 |
| 282 | 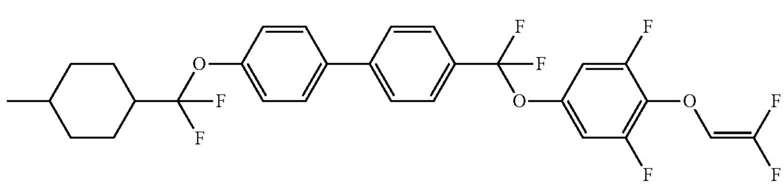 [SMILES: CC1CCC(C(F)(F)Oc2ccc(-c3ccc(C(F)(F)Oc4cc(F)c(OC=C(F)F)c(F)c4)cc3)cc2)CC1] |

-continued
| Formula 64 |
|---|
| No. | |
|---|---|
| 283 | 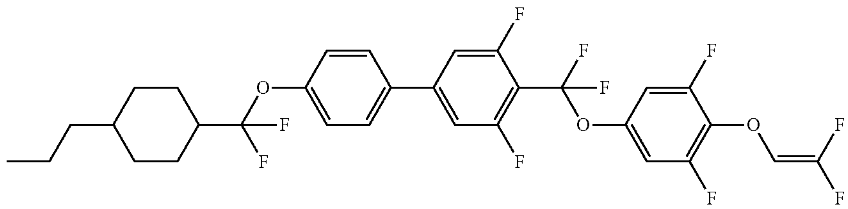 [SMILES: CCCC1CCC(C(F)(F)Oc2ccc(-c3cc(F)c(C(F)(F)Oc4cc(F)c(OC=C(F)F)c(F)c4)c(F)c3)cc2)CC1] |
| 284 | 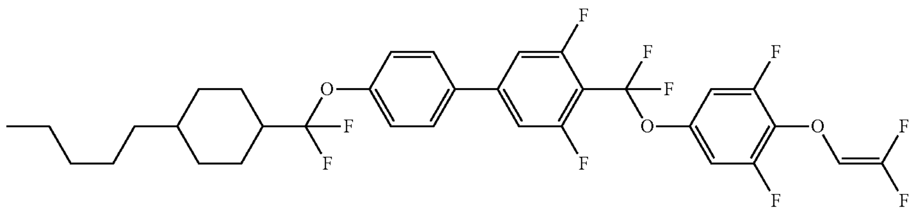 |
| 285 | 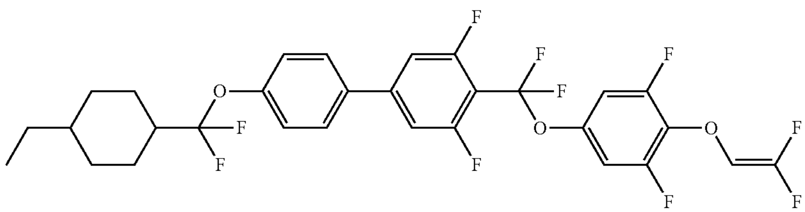 |
| 286 | 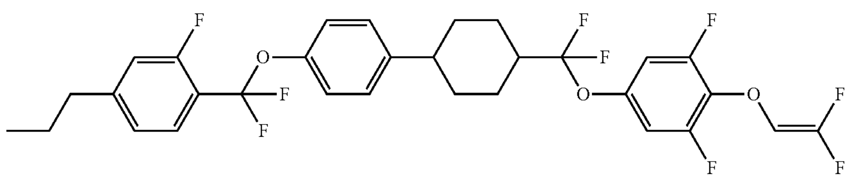 [SMILES: CCCc1ccc(C(F)(F)Oc2ccc(C3CCC(C(F)(F)Oc4cc(F)c(OC=C(F)F)c(F)c4)CC3)cc2)c(F)c1] |
| 287 | 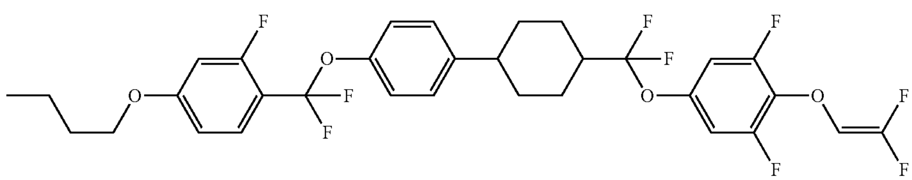 [SMILES: CCCCOc1ccc(C(F)(F)Oc2ccc(C3CCC(C(F)(F)Oc4cc(F)c(OC=C(F)F)c(F)c4)CC3)cc2)c(F)c1] |
| 288 | 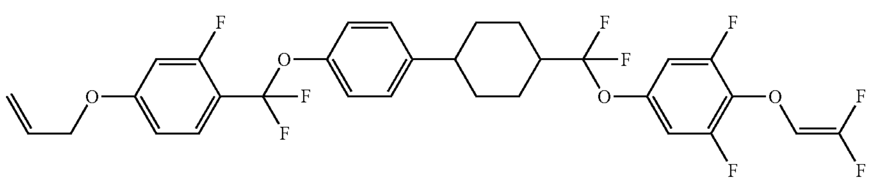 [SMILES: C=CCOc1ccc(C(F)(F)Oc2ccc(C3CCC(C(F)(F)Oc4cc(F)c(OC=C(F)F)c(F)c4)CC3)cc2)c(F)c1] |
| Formula 65 |
|---|
| No. | |
|---|---|
| 289 | 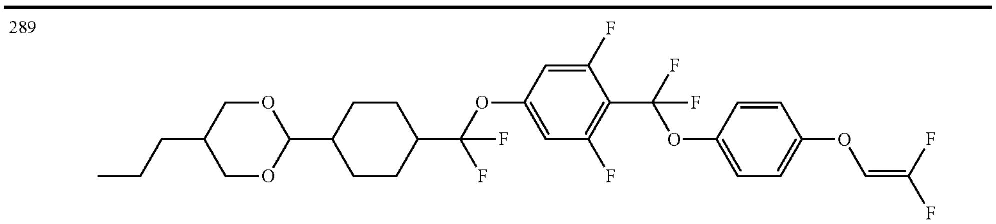 |

-continued
| Formula 65 |
|---|
| No. |
290
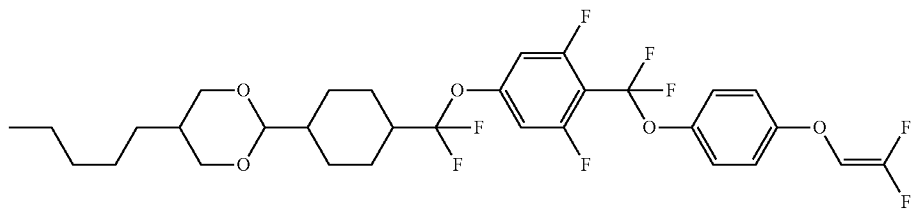
291
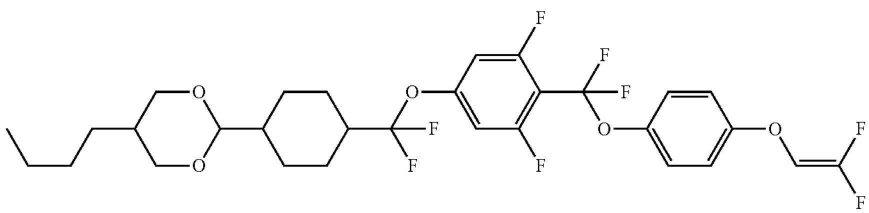 [SMILES: CCCCC1COC(C2CCC(C(F)(F)Oc3cc(F)c(C(F)(F)Oc4ccc(OC=C(F)F)cc4)c(F)c3)CC2)OC1]
292
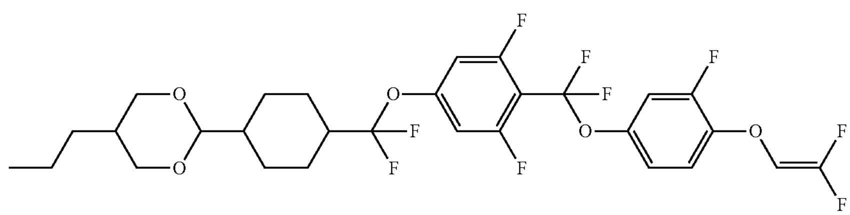
293
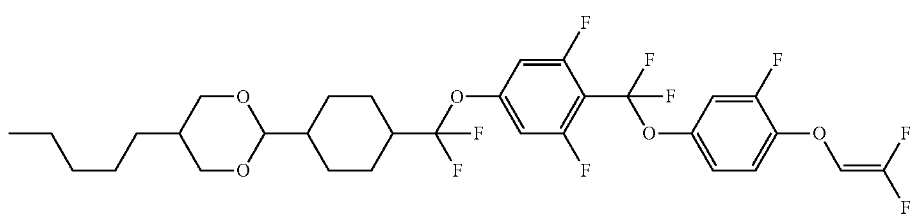 [SMILES: CCCCCC1COC(C2CCC(C(F)(F)Oc3cc(F)c(C(F)(F)Oc4ccc(OC=C(F)F)c(F)c4)c(F)c3)CC2)OC1]
294
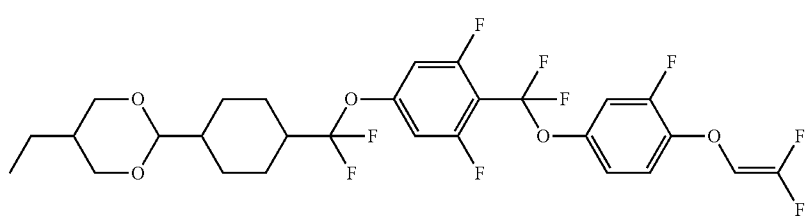 [SMILES: CCC1COC(C2CCC(C(F)(F)Oc3cc(F)c(C(F)(F)Oc4ccc(OC=C(F)F)c(F)c4)c(F)c3)CC2)OC1]
295
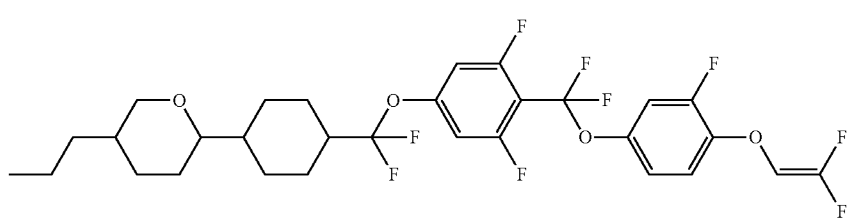 [SMILES: CCCC1CCC(C2CCC(C(F)(F)Oc3cc(F)c(C(F)(F)Oc4ccc(OC=C(F)F)c(F)c4)c(F)c3)CC2)OC1]
296
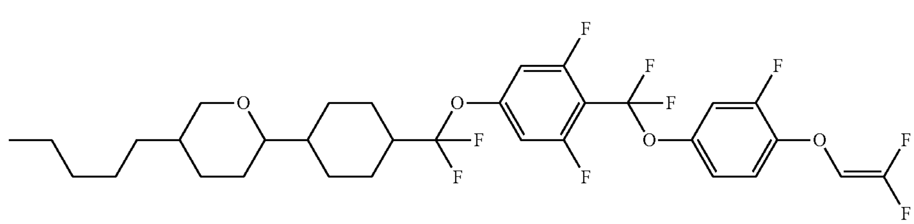 [SMILES: CCCCCC1CCC(C2CCC(C(F)(F)Oc3cc(F)c(C(F)(F)Oc4ccc(OC=C(F)F)c(F)c4)c(F)c3)CC2)OC1]

-continued
| Formula 65 | |
|---|---|
| No. | |
| 297 | 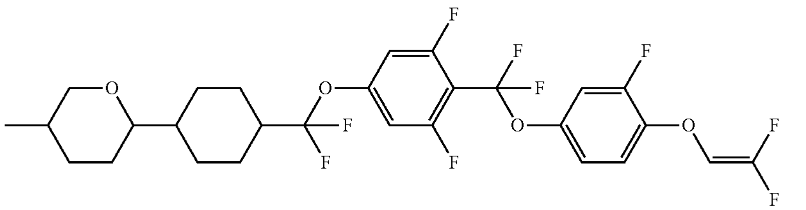 [SMILES: CC1CCC(C2CCC(C(F)(F)Oc3cc(F)c(C(F)(F)Oc4ccc(OC=C(F)F)c(F)c4)c(F)c3)CC2)OC1] |
| 298 | 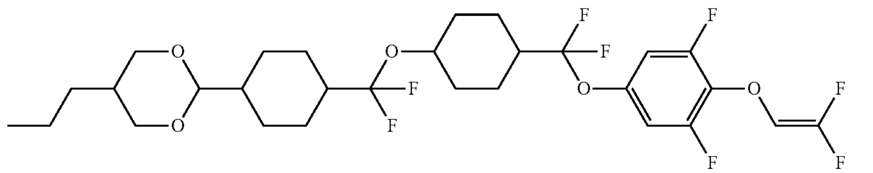 [SMILES: CCCC1COC(C2CCC(C(F)(F)OC3CCC(C(F)(F)Oc4cc(F)c(OC=C(F)F)c(F)c4)CC3)CC2)OC1] |
| 299 | 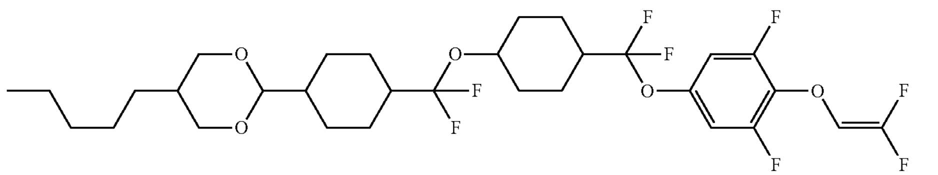 |
| 300 | 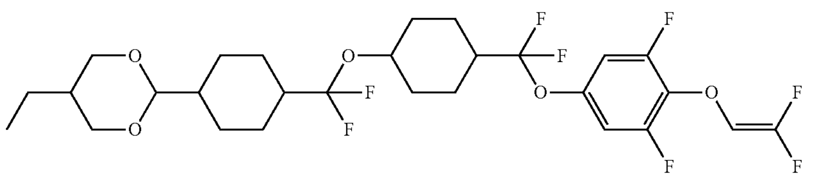 [SMILES: CCC1COC(C2CCC(C(F)(F)OC3CCC(C(F)(F)Oc4cc(F)c(OC=C(F)F)c(F)c4)CC3)CC2)OC1] |
| 301 | 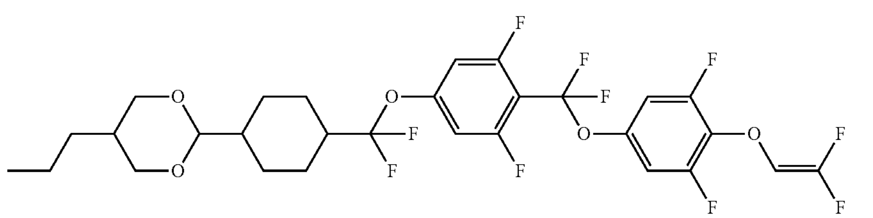 |
| 302 | 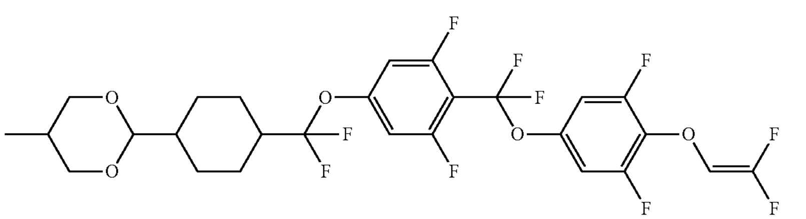 |
| 303 | 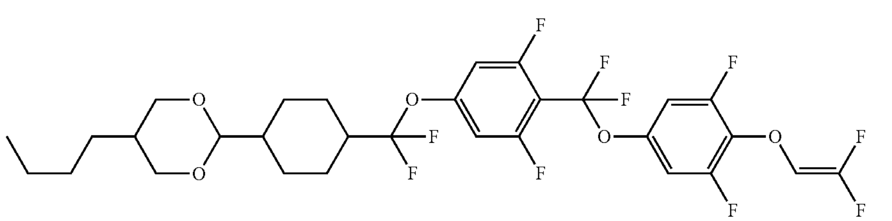 [SMILES: CCCCC1COC(C2CCC(C(F)(F)Oc3cc(F)c(C(F)(F)Oc4cc(F)c(OC=C(F)F)c(F)c4)c(F)c3)CC2)OC1] |

-continued
| Formula 65 |
| --- |
| No. |
| 304 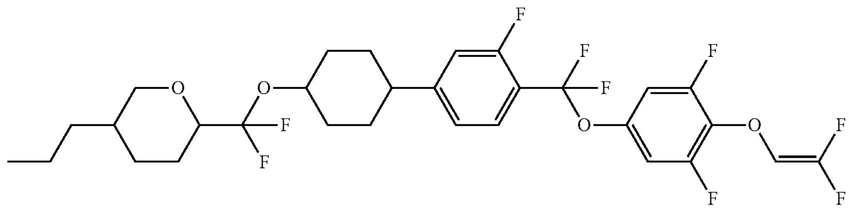 |
| 305 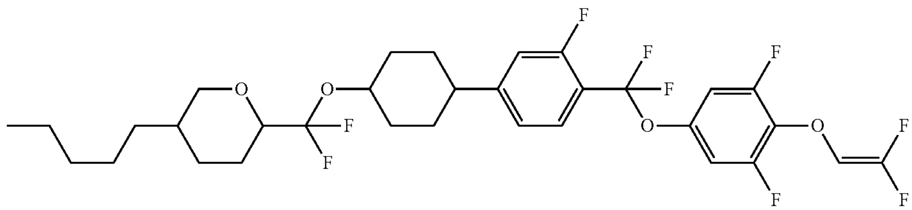 |
| 306 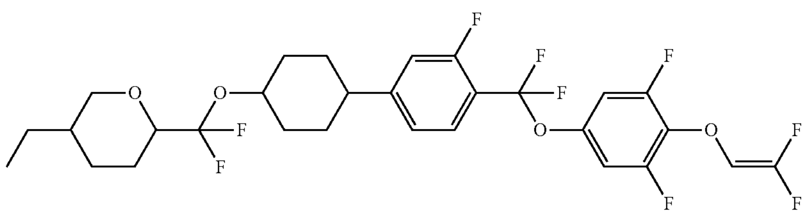 [SMILES: CCC1CCC(C(F)(F)OC2CCC(c3ccc(C(F)(F)Oc4cc(F)c(OC=C(F)F)c(F)c4)c(F)c3)CC2)OC1] |
| 307 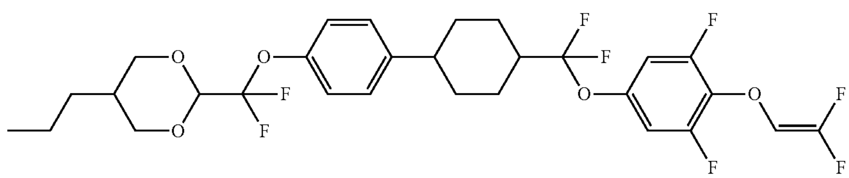 |
| 308 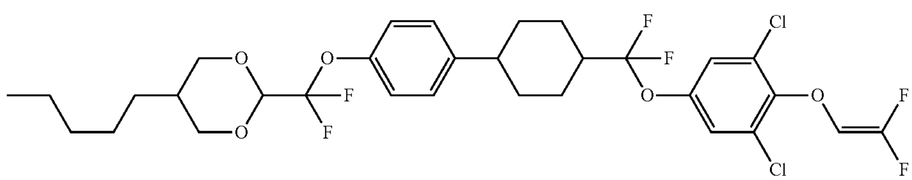 [SMILES: CCCCCC1COC(C(F)(F)Oc2ccc(C3CCC(C(F)(F)Oc4cc(Cl)c(OC=C(F)F)c(Cl)c4)CC3)cc2)OC1] |
| 309 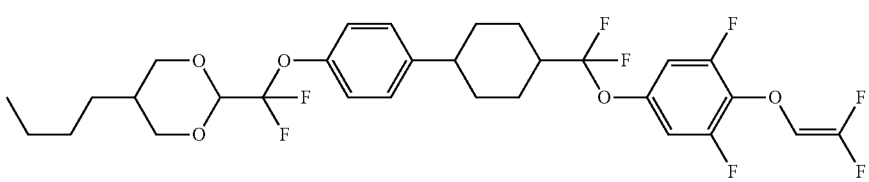 [SMILES: CCCCC1COC(C(F)(F)Oc2ccc(C3CCC(C(F)(F)Oc4cc(F)c(OC=C(F)F)c(F)c4)CC3)cc2)OC1] |
| 310 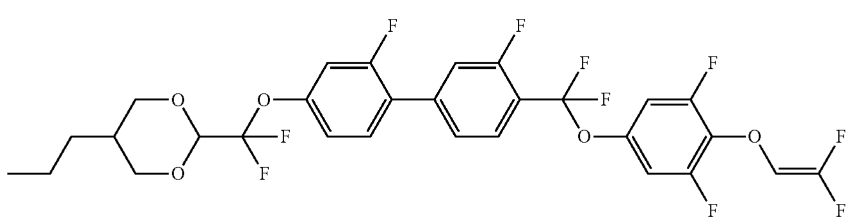 |

-continued
| Formula 65 | |
|---|---|
| No. | |
| 311 | 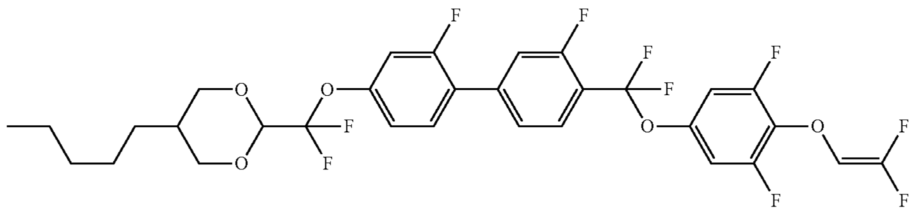 |
| 312 | 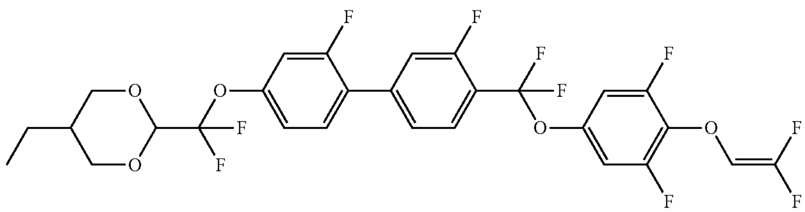 [SMILES: CCC1COC(C(F)(F)Oc2ccc(-c3ccc(C(F)(F)Oc4cc(F)c(OC=C(F)F)c(F)c4)c(F)c3)c(F)c2)OC1] |
| Formula 66 | |
|---|---|
| No. | |
| 313 | 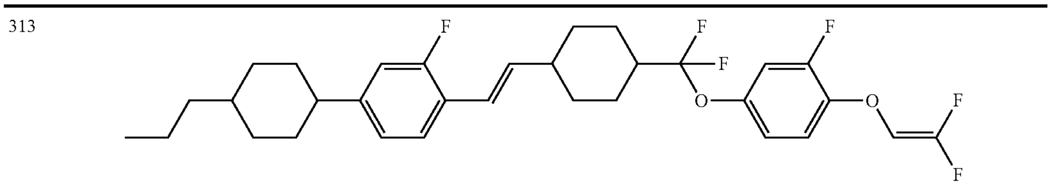 |
| 314 | 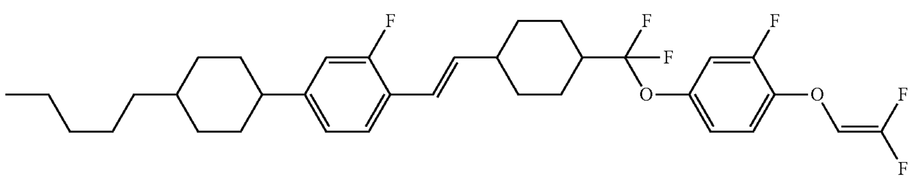 [SMILES: CCCCCC1CCC(c2ccc(/C=C/C3CCC(C(F)(F)Oc4ccc(OC=C(F)F)c(F)c4)CC3)c(F)c2)CC1] |
| 315 | 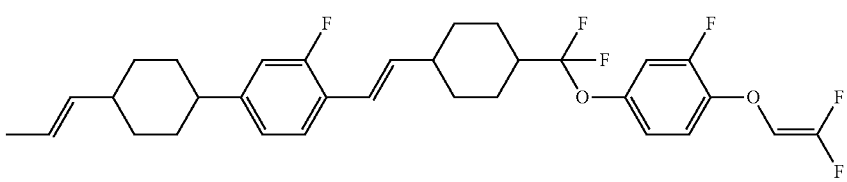 [SMILES: C/C=C/C1CCC(c2ccc(/C=C/C3CCC(C(F)(F)Oc4ccc(OC=C(F)F)c(F)c4)CC3)c(F)c2)CC1] |
| 316 | 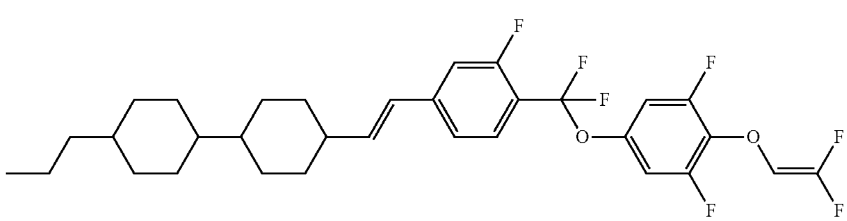 [SMILES: CCCC1CCC(C2CCC(/C=C/c3ccc(C(F)(F)Oc4cc(F)c(OC=C(F)F)c(F)c4)c(F)c3)CC2)CC1] |
| 317 | 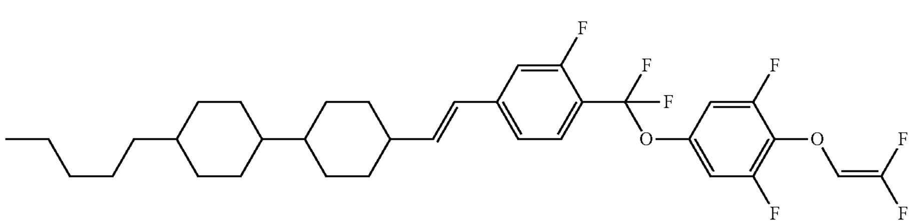 [SMILES: CCCCCC1CCC(C2CCC(/C=C/c3ccc(C(F)(F)Oc4cc(F)c(OC=C(F)F)c(F)c4)c(F)c3)CC2)CC1] |

-continued
| Formula 66 | |
|---|---|
| No. | |
| 318 | 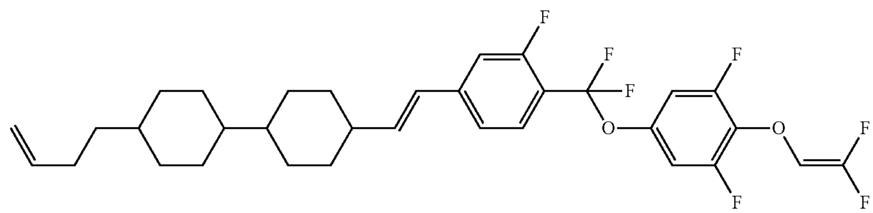 [SMILES: C=CCCC1CCC(C2CCC(/C=C/c3ccc(C(F)(F)Oc4cc(F)c(OC=C(F)F)c(F)c4)c(F)c3)CC2)CC1] |
| 319 | 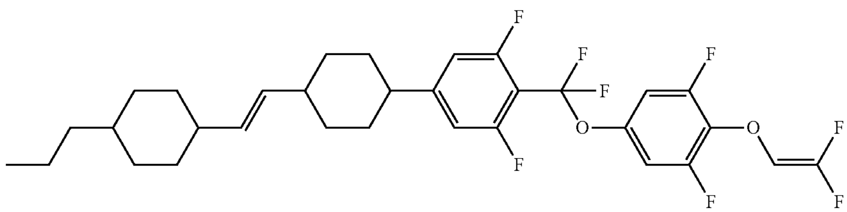 [SMILES: CCCC1CCC(/C=C/C2CCC(c3cc(F)c(C(F)(F)Oc4cc(F)c(OC=C(F)F)c(F)c4)c(F)c3)CC2)CC1] |
| 320 | 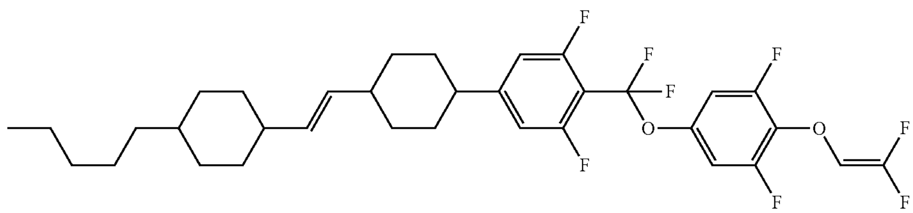 [SMILES: CCCCCC1CCC(/C=C/C2CCC(c3cc(F)c(C(F)(F)Oc4cc(F)c(OC=C(F)F)c(F)c4)c(F)c3)CC2)CC1] |
| 321 | 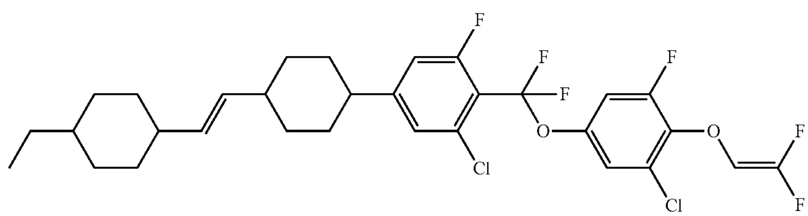 [SMILES: CCC1CCC(/C=C/C2CCC(c3cc(F)c(C(F)(F)Oc4cc(F)c(OC=C(F)F)c(Cl)c4)c(Cl)c3)CC2)CC1] |
| 322 | 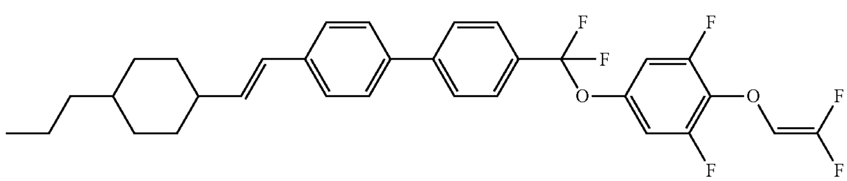 |
| 323 | 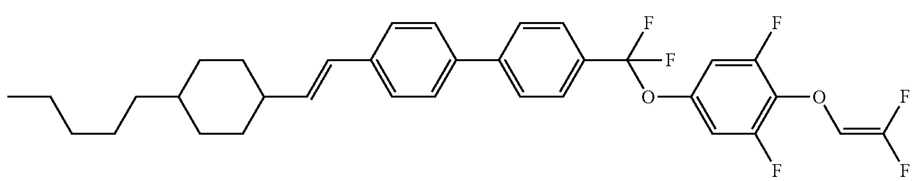 [SMILES: CCCCCC1CCC(/C=C/c2ccc(-c3ccc(C(F)(F)Oc4cc(F)c(OC=C(F)F)c(F)c4)cc3)cc2)CC1] |
| 324 | 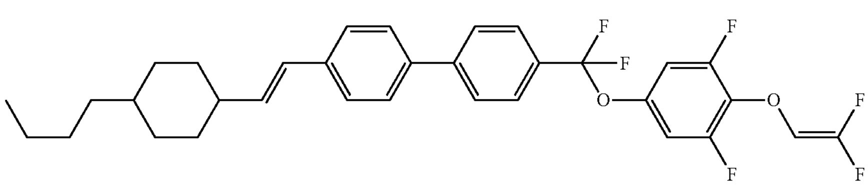 [SMILES: CCCCC1CCC(/C=C/c2ccc(-c3ccc(C(F)(F)Oc4cc(F)c(OC=C(F)F)c(F)c4)cc3)cc2)CC1] |

-continued
| Formula 66 | |
|---|---|
| No. | |
| 325 | 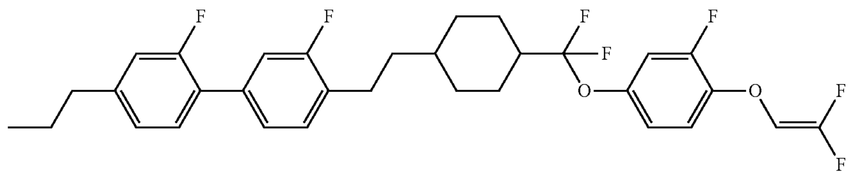 |
| 326 | 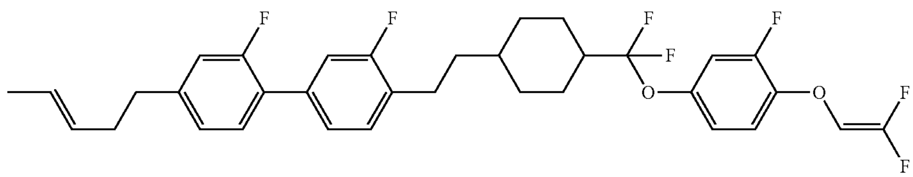 |
| 327 | 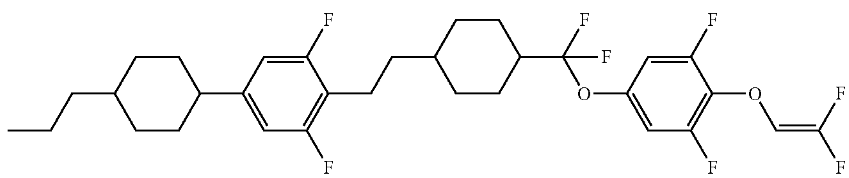 |
| 328 | 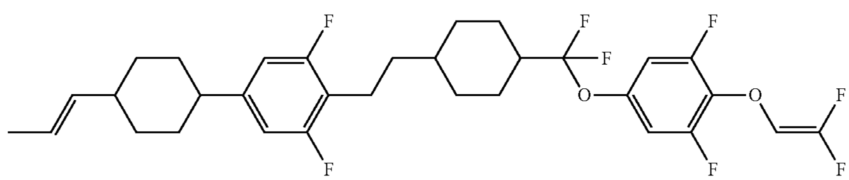 [SMILES: C/C=C/C1CCC(c2cc(F)c(CCC3CCC(C(F)(F)Oc4cc(F)c(OC=C(F)F)c(F)c4)CC3)c(F)c2)CC1] |
| 329 | 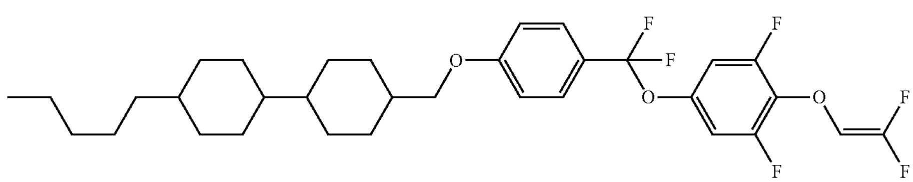 [SMILES: CCCCCC1CCC(C2CCC(COc3ccc(C(F)(F)Oc4cc(F)c(OC=C(F)F)c(F)c4)cc3)CC2)CC1] |
| 330 | 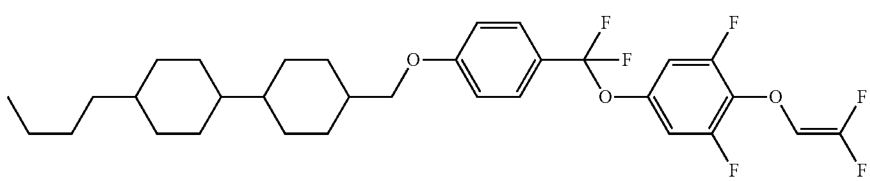 [SMILES: CCCCC1CCC(C2CCC(COc3ccc(C(F)(F)Oc4cc(F)c(OC=C(F)F)c(F)c4)cc3)CC2)CC1] |
| 331 | 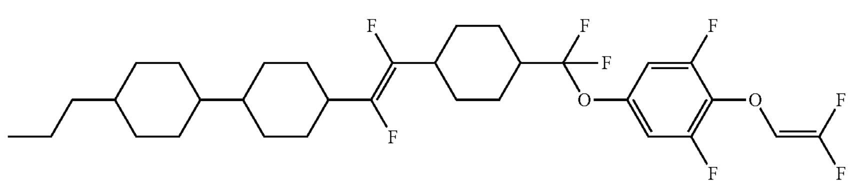 [SMILES: CCCC1CCC(C2CCC(/C(F)=C(\F)C3CCC(C(F)(F)Oc4cc(F)c(OC=C(F)F)c(F)c4)CC3)CC2)CC1] |
| 332 | 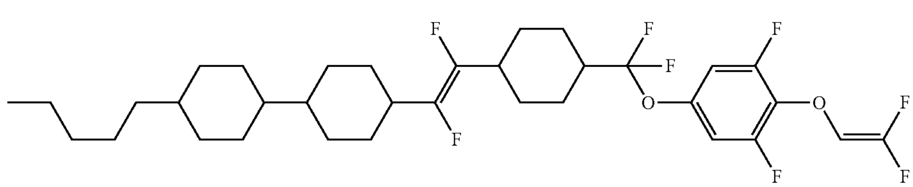 [SMILES: CCCCCC1CCC(C2CCC(/C(F)=C(\F)C3CCC(C(F)(F)Oc4cc(F)c(OC=C(F)F)c(F)c4)CC3)CC2)CC1] |

-continued
Formula 66
| No. | |
|---|---|
| 333 | 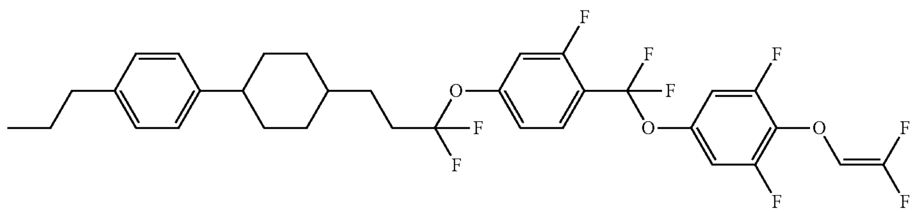 [SMILES: CCCc1ccc(C2CCC(CCC(F)(F)Oc3ccc(C(F)(F)Oc4cc(F)c(OC=C(F)F)c(F)c4)c(F)c3)CC2)cc1] |
| 334 | 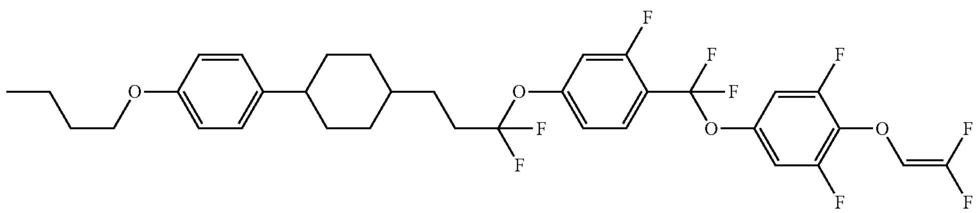 [SMILES: CCCCOc1ccc(C2CCC(CCC(F)(F)Oc3ccc(C(F)(F)Oc4cc(F)c(OC=C(F)F)c(F)c4)c(F)c3)CC2)cc1] |
| 335 | 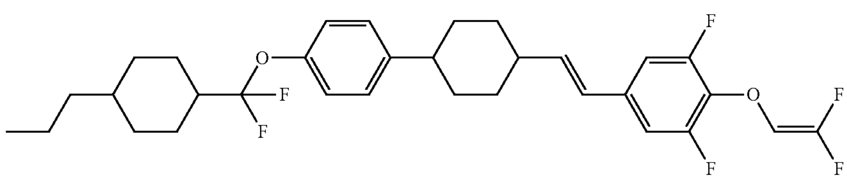 [SMILES: CCCC1CCC(C(F)(F)Oc2ccc(C3CCC(/C=C/c4cc(F)c(OC=C(F)F)c(F)c4)CC3)cc2)CC1] |
| 336 | 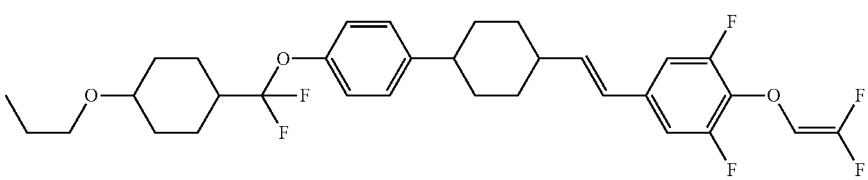 [SMILES: CCCOC1CCC(C(F)(F)Oc2ccc(C3CCC(/C=C/c4cc(F)c(OC=C(F)F)c(F)c4)CC3)cc2)CC1] |
Formula 67
| No. | |
|---|---|
| 337 | 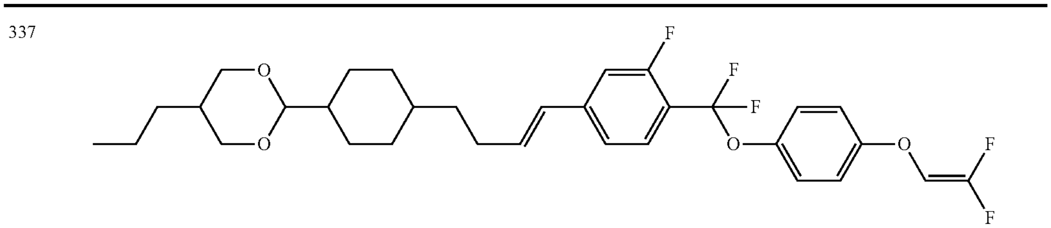 |
| 338 | 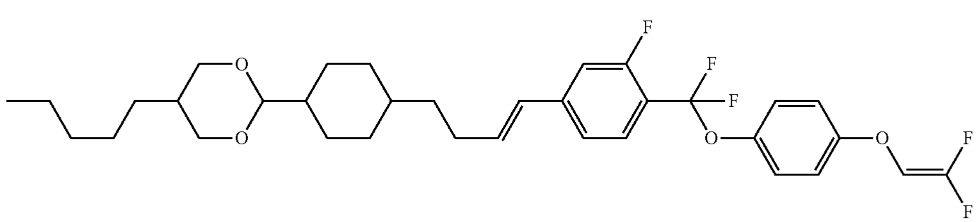 [SMILES: CCCCCC1COC(C2CCC(CC/C=C/c3ccc(C(F)(F)Oc4ccc(OC=C(F)F)cc4)c(F)c3)CC2)OC1] |

-continued
| Formula 67 |
| --- |
| No. |
339
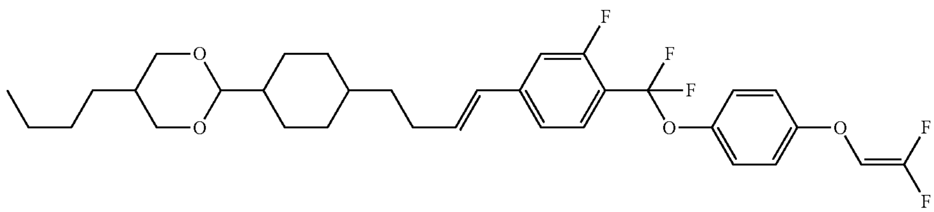 [SMILES: CCCCC1COC(C2CCC(CC/C=C/c3ccc(C(F)(F)Oc4ccc(OC=C(F)F)cc4)c(F)c3)CC2)OC1]
340
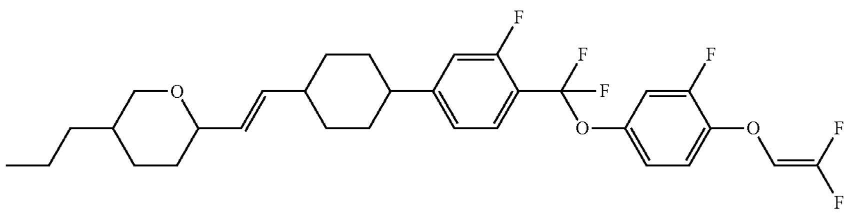
341
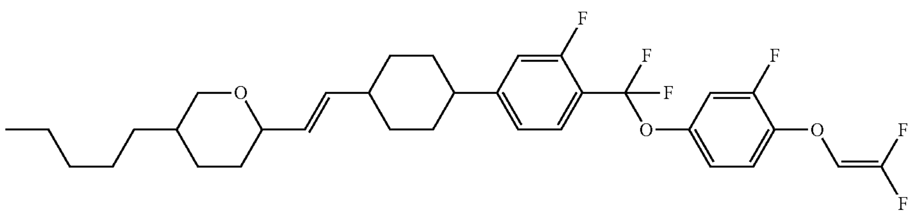
342
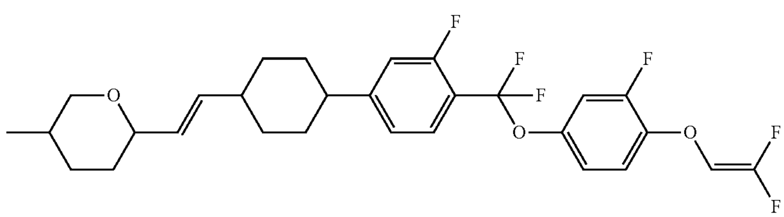 [SMILES: CC1CCC(/C=C/C2CCC(c3ccc(C(F)(F)Oc4ccc(OC=C(F)F)c(F)c4)c(F)c3)CC2)OC1]
343
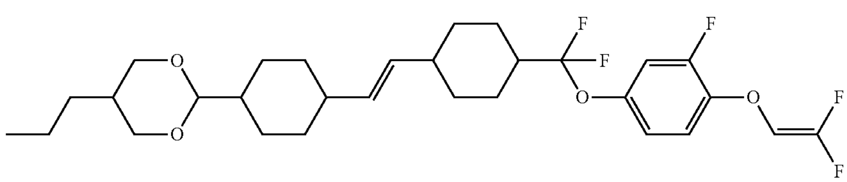 [SMILES: CCCC1COC(C2CCC(/C=C/C3CCC(C(F)(F)Oc4ccc(OC=C(F)F)c(F)c4)CC3)CC2)OC1]
344
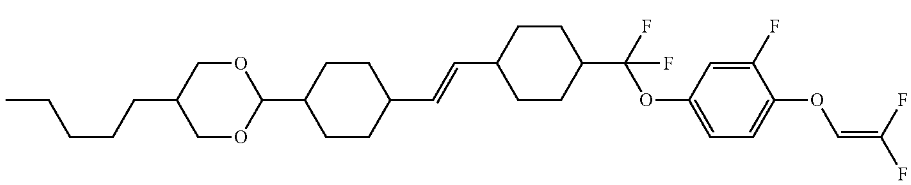 [SMILES: CCCCCC1COC(C2CCC(/C=C/C3CCC(C(F)(F)Oc4ccc(OC=C(F)F)c(F)c4)CC3)CC2)OC1]
345
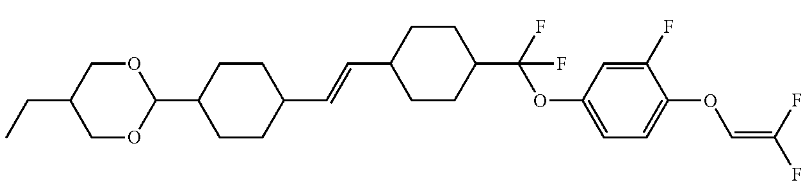 [SMILES: CCC1COC(C2CCC(/C=C/C3CCC(C(F)(F)Oc4ccc(OC=C(F)F)c(F)c4)CC3)CC2)OC1]

-continued
| Formula 67 | |
|---|---|
| No. | |
| 346 | 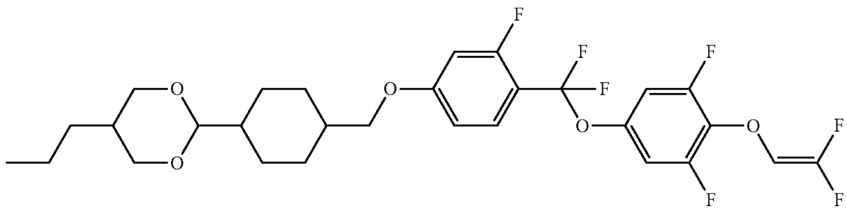 |
| 347 | 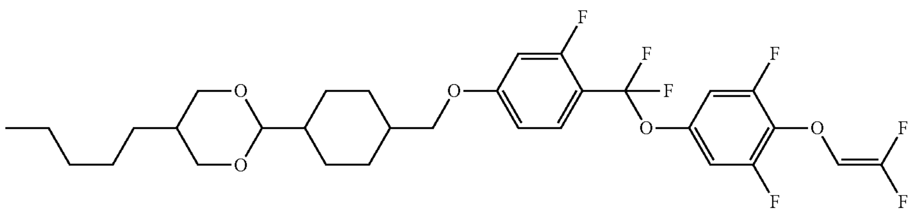 |
| 348 | 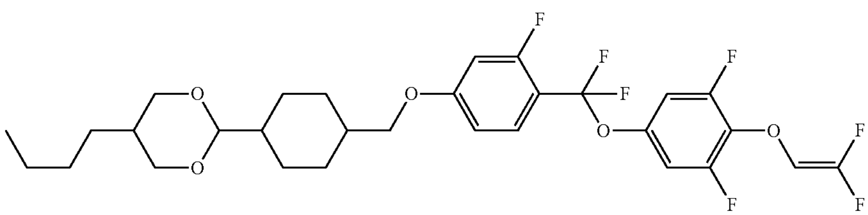 |
| 349 | 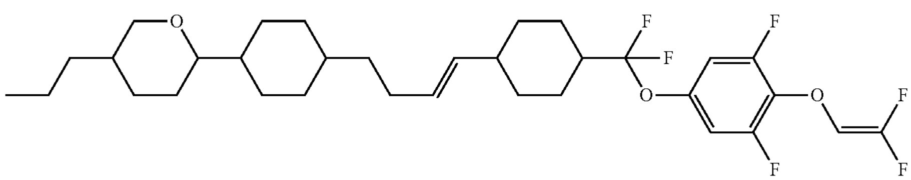 [SMILES: CCCC1CCC(C2CCC(CC/C=C/C3CCC(C(F)(F)Oc4cc(F)c(OC=C(F)F)c(F)c4)CC3)CC2)OC1] |
| 350 | 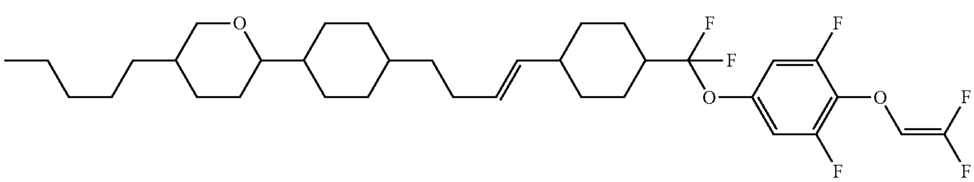 [SMILES: CCCCCC1CCC(C2CCC(CC/C=C/C3CCC(C(F)(F)Oc4cc(F)c(OC=C(F)F)c(F)c4)CC3)CC2)OC1] |
| 351 | 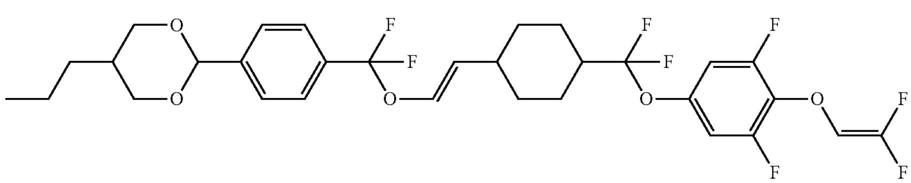 [SMILES: CCCC1COC(c2ccc(C(F)(F)O/C=C/C3CCC(C(F)(F)Oc4cc(F)c(OC=C(F)F)c(F)c4)CC3)cc2)OC1] |
| 352 | 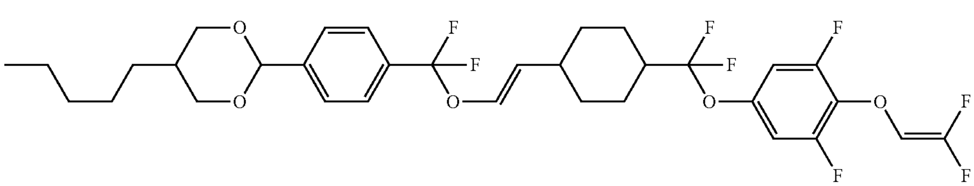 [SMILES: CCCCCC1COC(c2ccc(C(F)(F)O/C=C/C3CCC(C(F)(F)Oc4cc(F)c(OC=C(F)F)c(F)c4)CC3)cc2)OC1] |

-continued
Formula 67
| No. | |
|---|---|
| 353 | 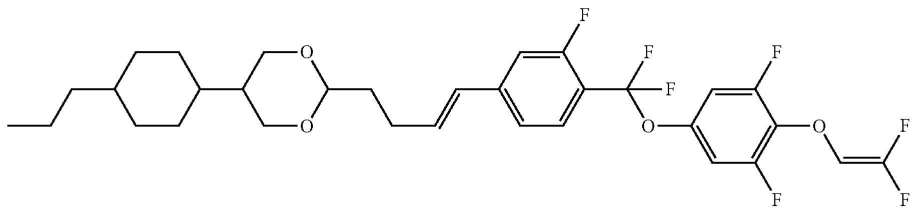 [SMILES: CCCC1CCC(C2COC(CC/C=C/c3ccc(C(F)(F)Oc4cc(F)c(OC=C(F)F)c(F)c4)c(F)c3)OC2)CC1] |
| 354 | 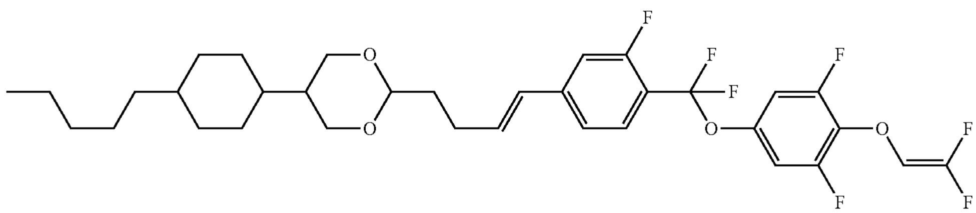 [SMILES: CCCCCC1CCC(C2COC(CC/C=C/c3ccc(C(F)(F)Oc4cc(F)c(OC=C(F)F)c(F)c4)c(F)c3)OC2)CC1] |
| 355 | 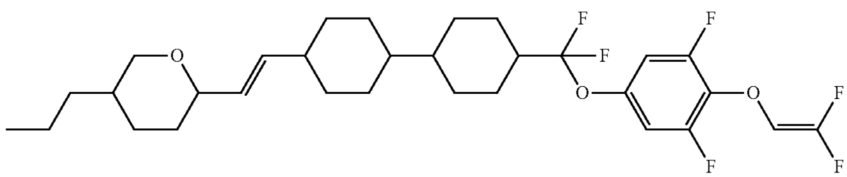 [SMILES: CCCC1CCC(/C=C/C2CCC(C3CCC(C(F)(F)Oc4cc(F)c(OC=C(F)F)c(F)c4)CC3)CC2)OC1] |
| 356 | 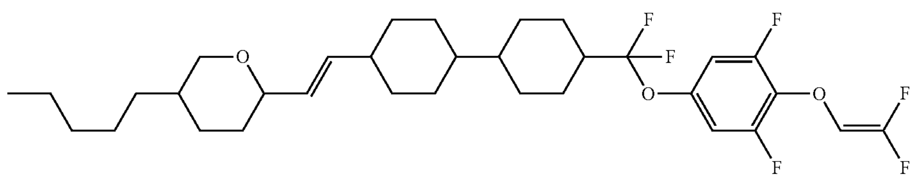 [SMILES: CCCCCC1CCC(/C=C/C2CCC(C3CCC(C(F)(F)Oc4cc(F)c(OC=C(F)F)c(F)c4)CC3)CC2)OC1] |
| 357 | 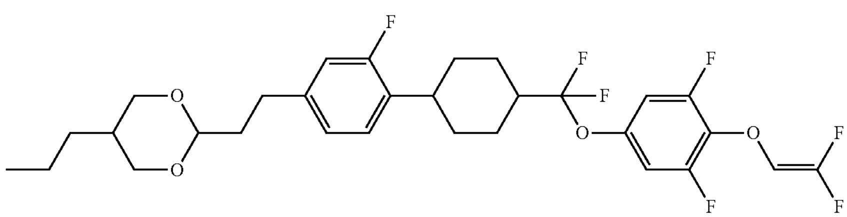 [SMILES: CCCC1COC(CCc2ccc(C3CCC(C(F)(F)Oc4cc(F)c(OC=C(F)F)c(F)c4)CC3)c(F)c2)OC1] |
| 358 | 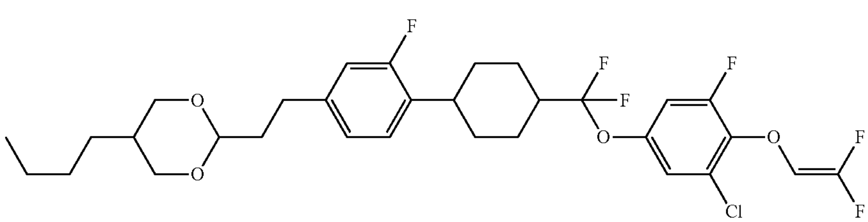 [SMILES: CCCCC1COC(CCc2ccc(C3CCC(C(F)(F)Oc4cc(F)c(OC=C(F)F)c(Cl)c4)CC3)c(F)c2)OC1] |
| 359 | 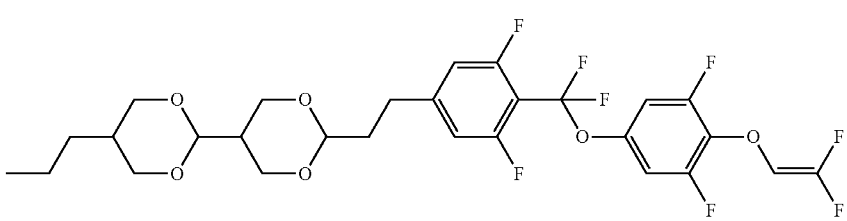 [SMILES: CCCC1COC(C2COC(CCc3cc(F)c(C(F)(F)Oc4cc(F)c(OC=C(F)F)c(F)c4)c(F)c3)OC2)OC1] |

-continued
| Formula 67 |
| --- |
| No. |
| 360 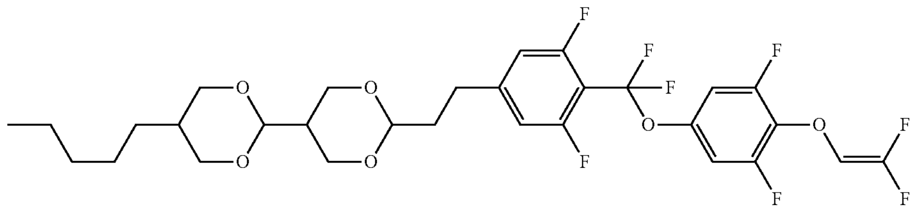 [SMILES: CCCCCC1COC(C2COC(CCc3cc(F)c(C(F)(F)Oc4cc(F)c(OC=C(F)F)c(F)c4)c(F)c3)OC2)OC1] |
| Formula 68 |
| --- |
| No. |
| 361 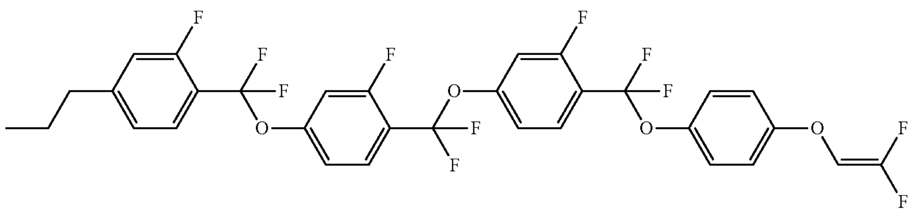 [SMILES: CCCc1ccc(C(F)(F)Oc2ccc(C(F)(F)Oc3ccc(C(F)(F)Oc4ccc(OC=C(F)F)cc4)c(F)c3)c(F)c2)c(F)c1] |
| 362 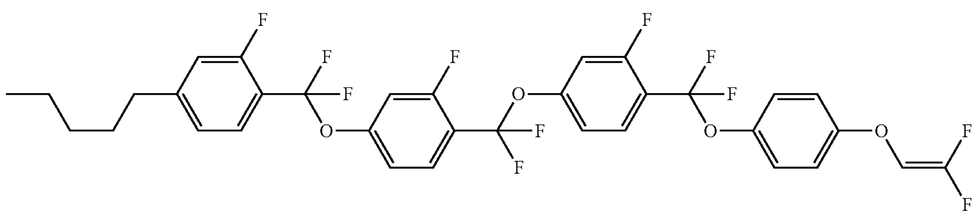 [SMILES: CCCCCc1ccc(C(F)(F)Oc2ccc(C(F)(F)Oc3ccc(C(F)(F)Oc4ccc(OC=C(F)F)cc4)c(F)c3)c(F)c2)c(F)c1] |
| 363 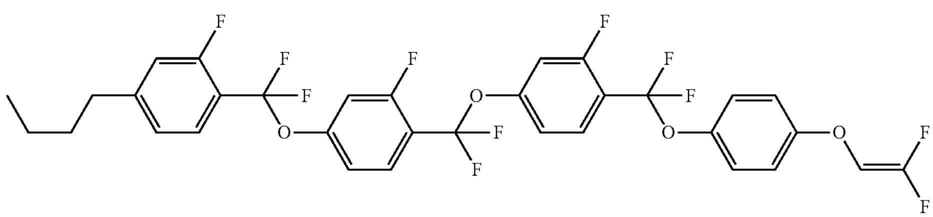 [SMILES: CCCCc1ccc(C(F)(F)Oc2ccc(C(F)(F)Oc3ccc(C(F)(F)Oc4ccc(OC=C(F)F)cc4)c(F)c3)c(F)c2)c(F)c1] |
| 364 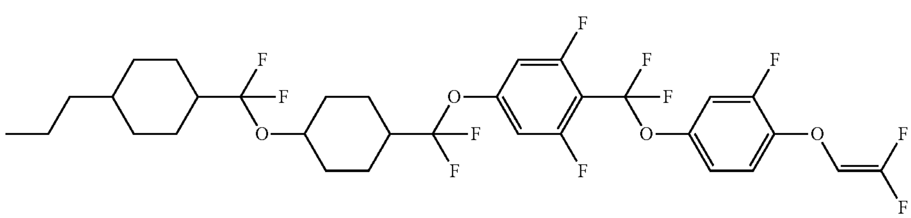 |
| 365 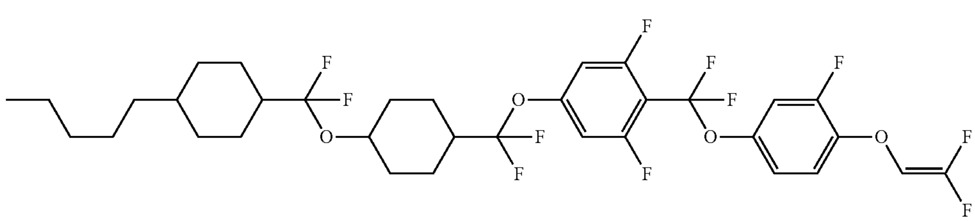 |

-continued
| Formula 68 |
| --- |
| No. | |
| --- | --- |
| 366 | 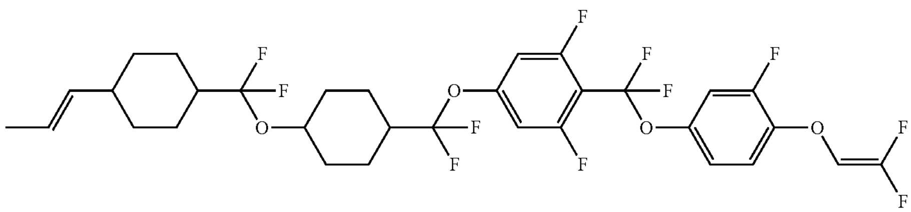 [SMILES: CCCC1CCC(C(F)(F)OC2CCC(C(F)(F)Oc3cc(F)c(C(F)(F)Oc4ccc(OC=C(F)F)c(F)c4)c(F)c3)CC2)CC1] |
| 367 | 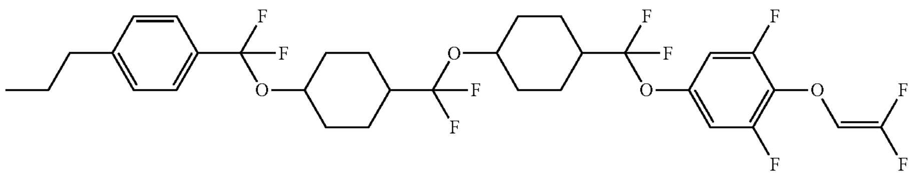 [SMILES: CCCc1ccc(C(F)(F)OC2CCC(C(F)(F)OC3CCC(C(F)(F)Oc4cc(F)c(OC=C(F)F)c(F)c4)CC3)CC2)cc1] |
| 368 | 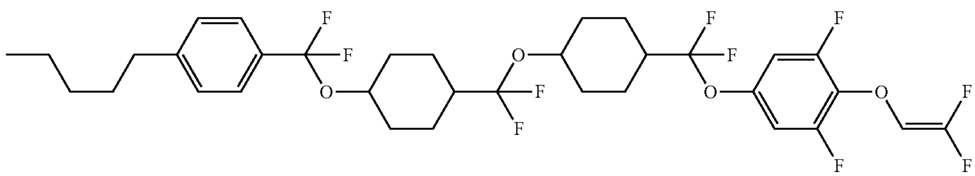 [SMILES: CCCCCc1ccc(C(F)(F)OC2CCC(C(F)(F)OC3CCC(C(F)(F)Oc4cc(F)c(OC=C(F)F)c(F)c4)CC3)CC2)cc1] |
| 369 | 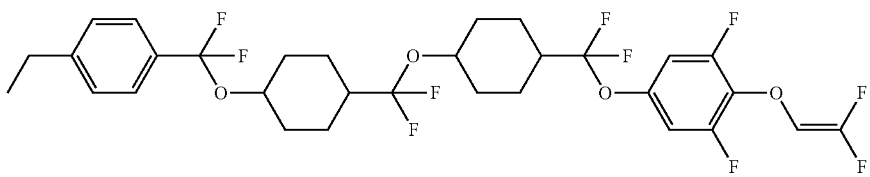 [SMILES: CCc1ccc(C(F)(F)OC2CCC(C(F)(F)OC3CCC(C(F)(F)Oc4cc(F)c(OC=C(F)F)c(F)c4)CC3)CC2)cc1] |
| 370 | 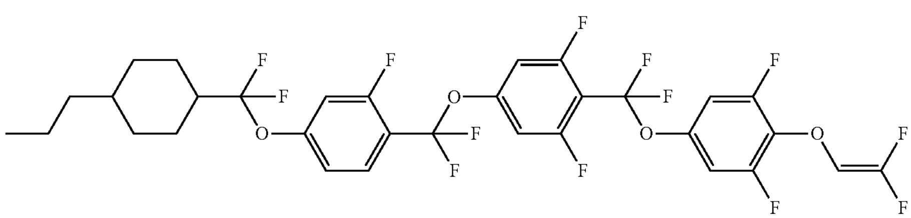 [SMILES: CCCC1CCC(C(F)(F)Oc2ccc(C(F)(F)Oc3cc(F)c(C(F)(F)Oc4cc(F)c(OC=C(F)F)c(F)c4)c(F)c3)c(F)c2)CC1] |
| 371 | 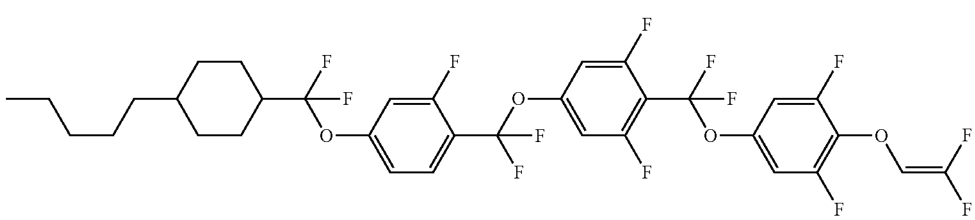 [SMILES: CCCCCC1CCC(C(F)(F)Oc2ccc(C(F)(F)Oc3cc(F)c(C(F)(F)Oc4cc(F)c(OC=C(F)F)c(F)c4)c(F)c3)c(F)c2)CC1] |
| 372 | 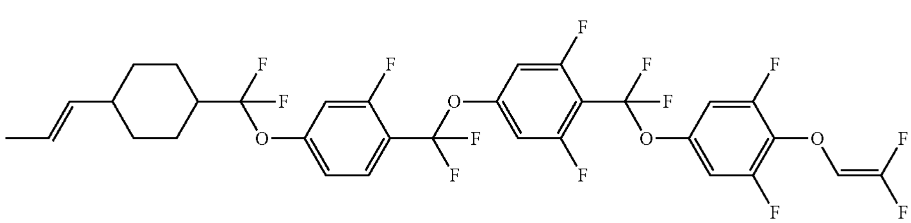 [SMILES: C/C=C/C1CCC(C(F)(F)Oc2ccc(C(F)(F)Oc3cc(F)c(C(F)(F)Oc4cc(F)c(OC=C(F)F)c(F)c4)c(F)c3)c(F)c2)CC1] |

-continued
| Formula 68 |
| --- |
| No. |
373
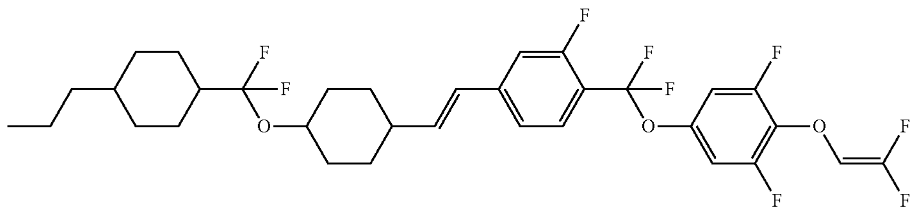 [SMILES: CCCC1CCC(C(F)(F)OC2CCC(/C=C/c3ccc(C(F)(F)Oc4cc(F)c(OC=C(F)F)c(F)c4)c(F)c3)CC2)CC1]
374
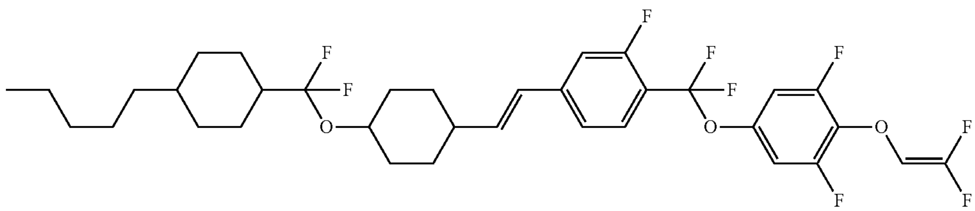 [SMILES: CCCCCC1CCC(C(F)(F)OC2CCC(/C=C/c3ccc(C(F)(F)Oc4cc(F)c(OC=C(F)F)c(F)c4)c(F)c3)CC2)CC1]
375
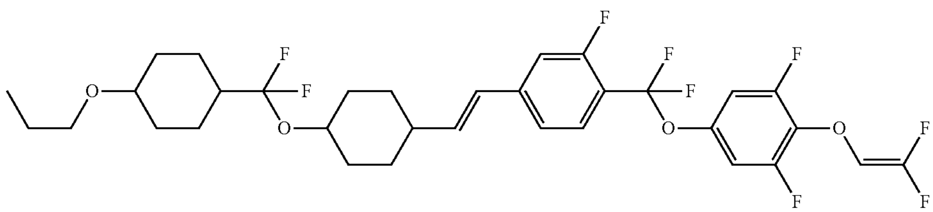 [SMILES: CCCOC1CCC(C(F)(F)OC2CCC(/C=C/c3ccc(C(F)(F)Oc4cc(F)c(OC=C(F)F)c(F)c4)c(F)c3)CC2)CC1]
376
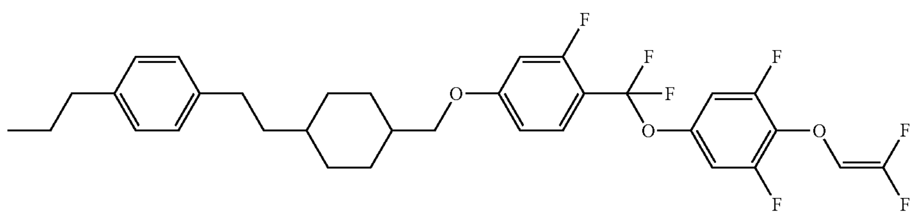 [SMILES: CCCc1ccc(CCC2CCC(COc3ccc(C(F)(F)Oc4cc(F)c(OC=C(F)F)c(F)c4)c(F)c3)CC2)cc1]
377
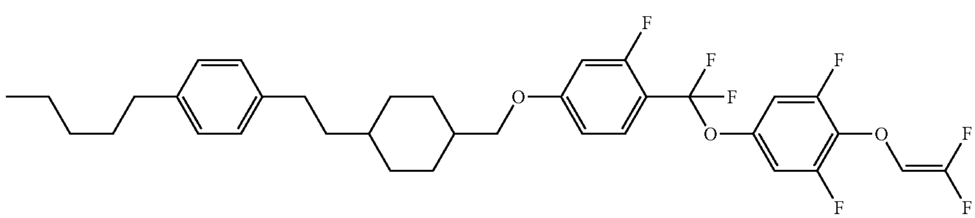
378
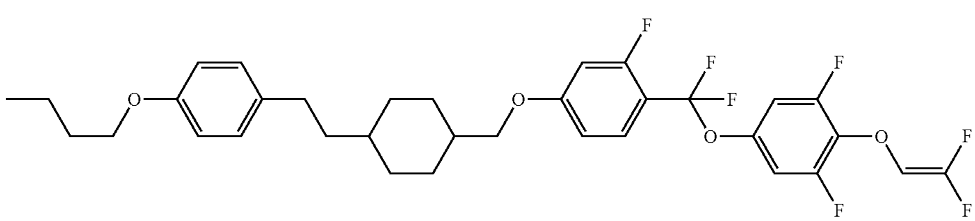 [SMILES: CCCCOc1ccc(CCC2CCC(COc3ccc(C(F)(F)Oc4cc(F)c(OC=C(F)F)c(F)c4)c(F)c3)CC2)cc1]
379
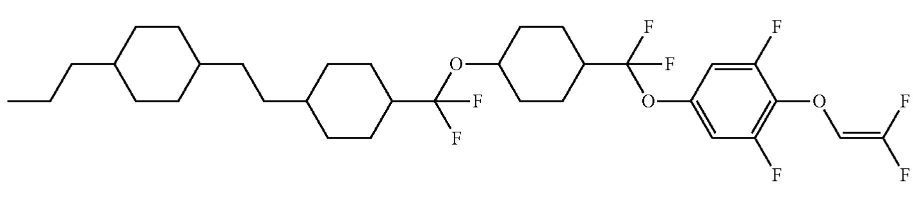

-continued
Formula 68
| No. | |
|---|---|
| 380 | 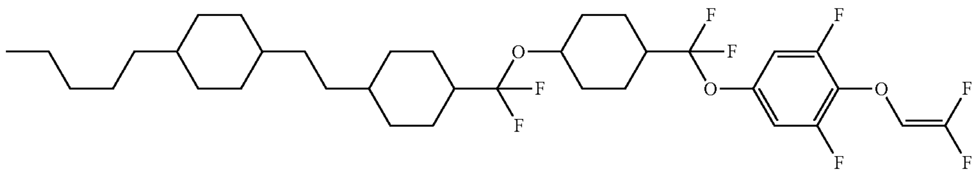 [SMILES: CCCCCC1CCC(CCC2CCC(C(F)(F)OC3CCC(C(F)(F)Oc4cc(F)c(OC=C(F)F)c(F)c4)CC3)CC2)CC1] |
| 381 | 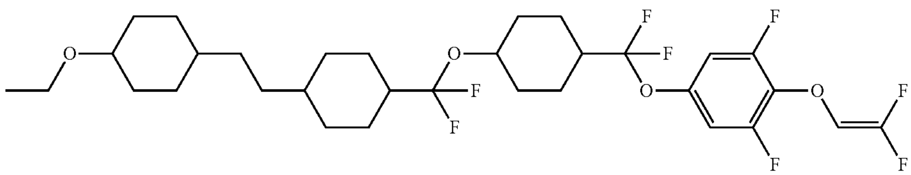 |
| 382 | 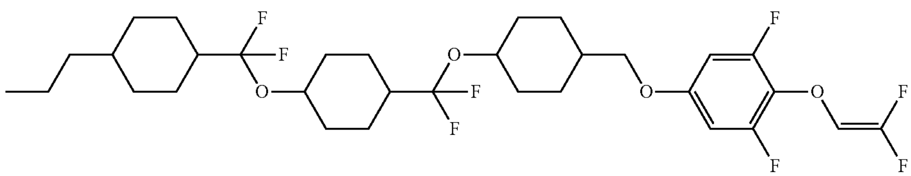 [SMILES: CCCC1CCC(C(F)(F)OC2CCC(C(F)(F)OC3CCC(COc4cc(F)c(OC=C(F)F)c(F)c4)CC3)CC2)CC1] |
| 383 | 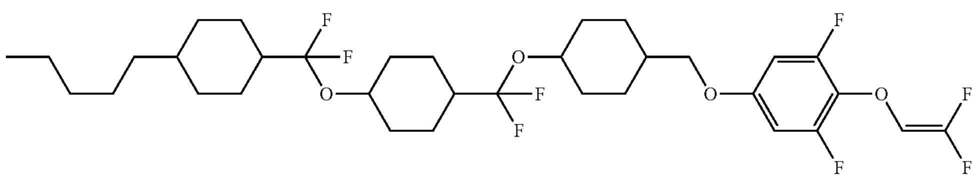 [SMILES: CCCCCC1CCC(C(F)(F)OC2CCC(C(F)(F)OC3CCC(COc4cc(F)c(OC=C(F)F)c(F)c4)CC3)CC2)CC1] |
| 384 | 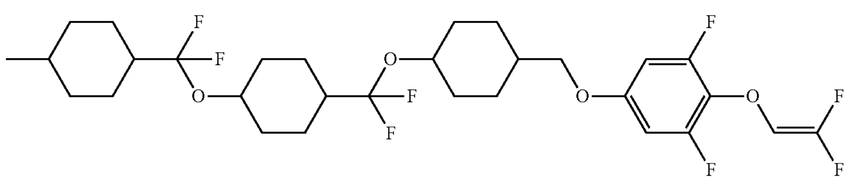 [SMILES: CC1CCC(C(F)(F)OC2CCC(C(F)(F)OC3CCC(COc4cc(F)c(OC=C(F)F)c(F)c4)CC3)CC2)CC1] |
Formula 69
| No. | |
|---|---|
| 385 | 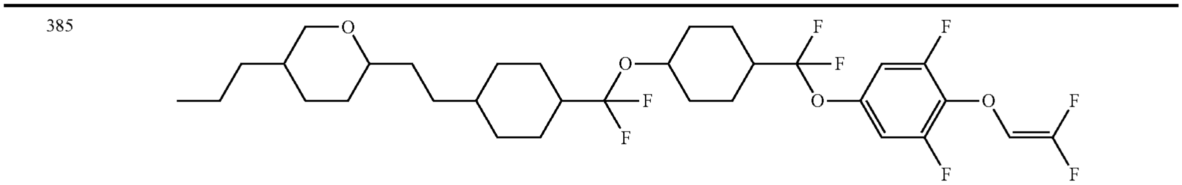 |
| 386 | 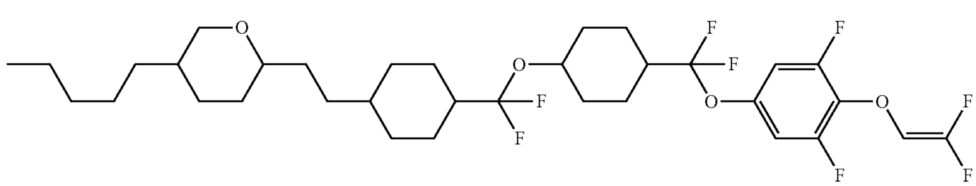 |

-continued
Formula 69
| No. | |
|---|---|
| 387 | 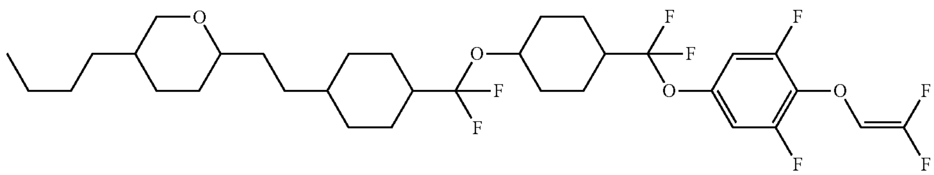 [SMILES: CCCCC1CCC(CCC2CCC(C(F)(F)OC3CCC(C(F)(F)Oc4cc(F)c(OC=C(F)F)c(F)c4)CC3)CC2)OC1] |
| 388 | 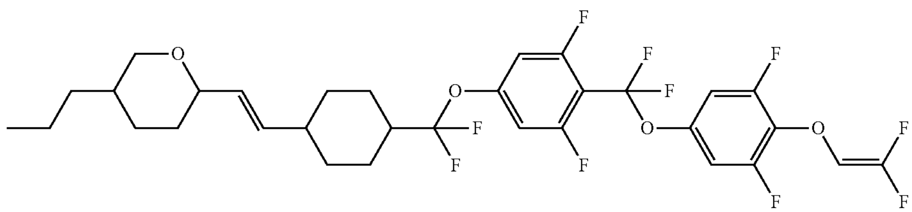 [SMILES: CCCC1CCC(/C=C/C2CCC(C(F)(F)Oc3cc(F)c(C(F)(F)Oc4cc(F)c(OC=C(F)F)c(F)c4)c(F)c3)CC2)OC1] |
| 389 | 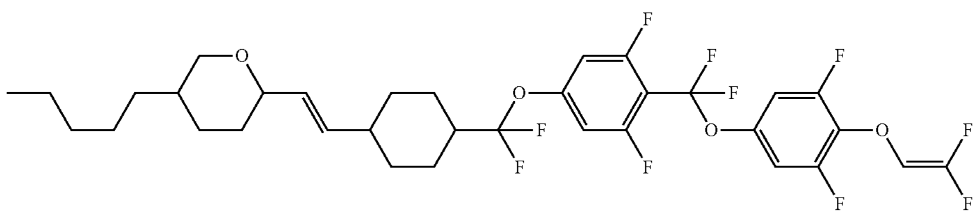 [SMILES: CCCCCC1CCC(/C=C/C2CCC(C(F)(F)Oc3cc(F)c(C(F)(F)Oc4cc(F)c(OC=C(F)F)c(F)c4)c(F)c3)CC2)OC1] |
| 390 | 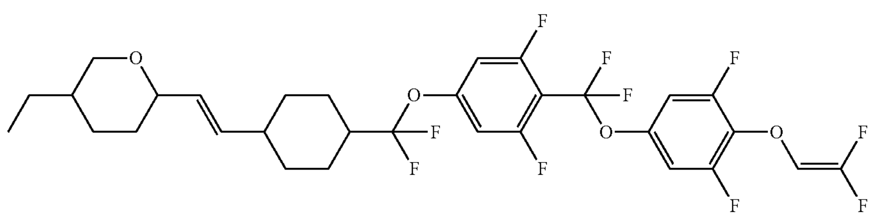 [SMILES: CCC1CCC(/C=C/C2CCC(C(F)(F)Oc3cc(F)c(C(F)(F)Oc4cc(F)c(OC=C(F)F)c(F)c4)c(F)c3)CC2)OC1] |
| 391 | 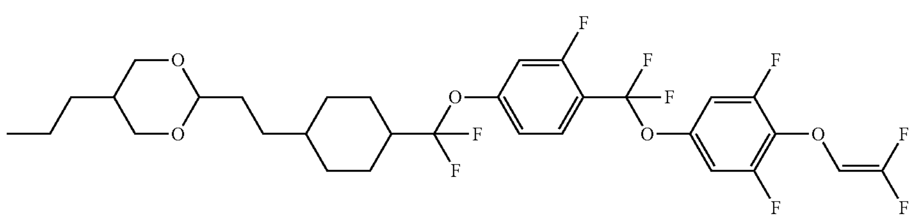 |
| 392 | 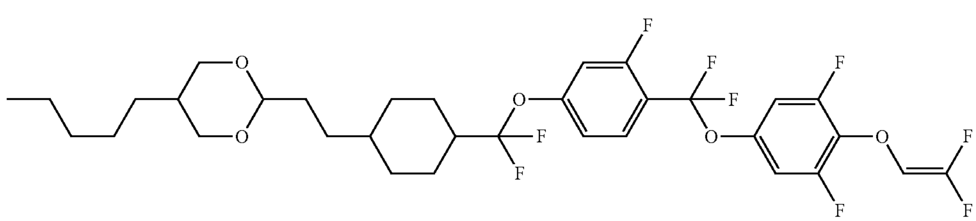 [SMILES: CCCCCC1COC(CCC2CCC(C(F)(F)Oc3ccc(C(F)(F)Oc4cc(F)c(OC=C(F)F)c(F)c4)c(F)c3)CC2)OC1] |
| 393 | 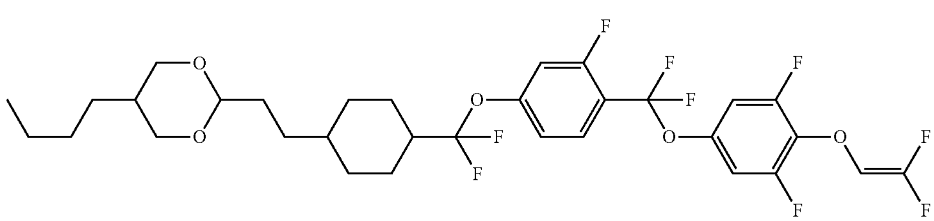 [SMILES: CCCCC1COC(CCC2CCC(C(F)(F)Oc3ccc(C(F)(F)Oc4cc(F)c(OC=C(F)F)c(F)c4)c(F)c3)CC2)OC1] |

-continued
| Formula 69 | |
|---|---|
| No. | |
| 394 | 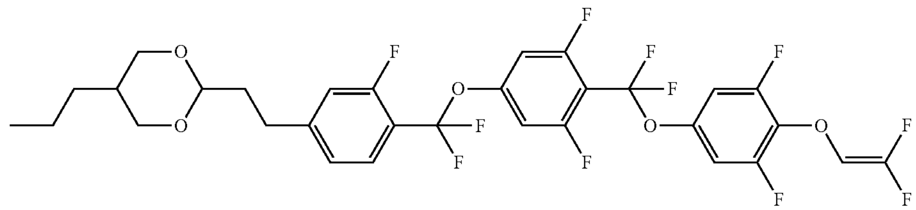 |
| 395 | 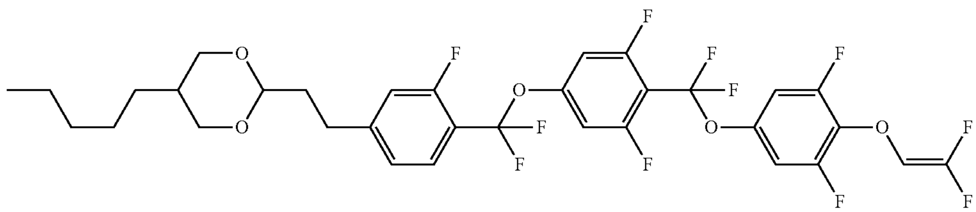 [SMILES: CCCCCC1COC(CCc2ccc(C(F)(F)Oc3cc(F)c(C(F)(F)Oc4cc(F)c(OC=C(F)F)c(F)c4)c(F)c3)c(F)c2)OC1] |
| 396 | 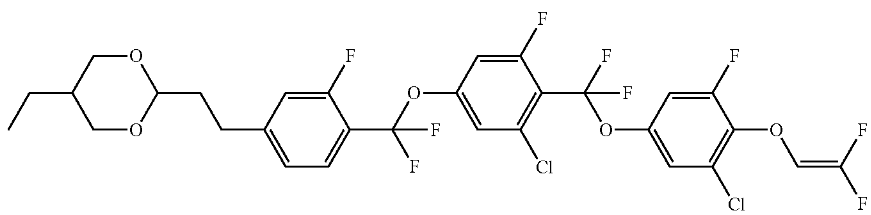 [SMILES: CCC1COC(CCc2ccc(C(F)(F)Oc3cc(F)c(C(F)(F)Oc4cc(F)c(OC=C(F)F)c(Cl)c4)c(Cl)c3)c(F)c2)OC1] |
| 397 | 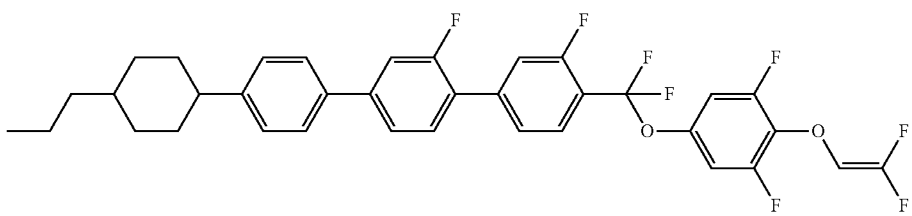 |
| 398 | 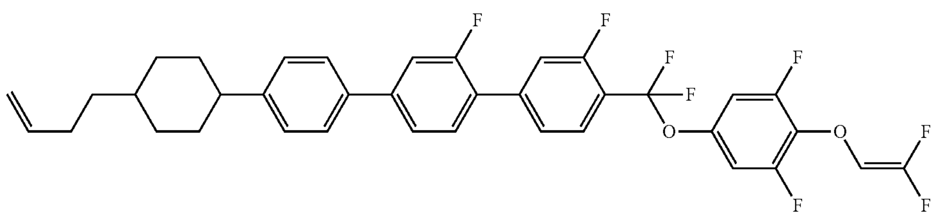 |
| 399 | 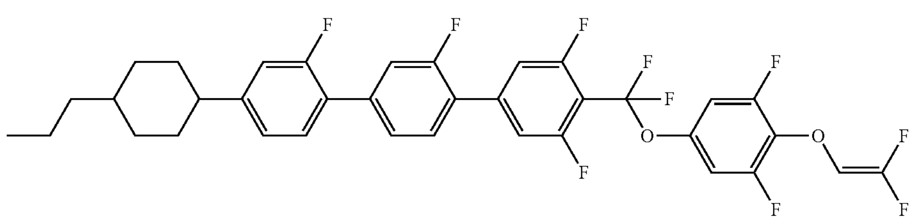 [SMILES: CCCC1CCC(c2ccc(-c3ccc(-c4cc(F)c(C(F)(F)Oc5cc(F)c(OC=C(F)F)c(F)c5)c(F)c4)c(F)c3)c(F)c2)CC1] |
| 400 | 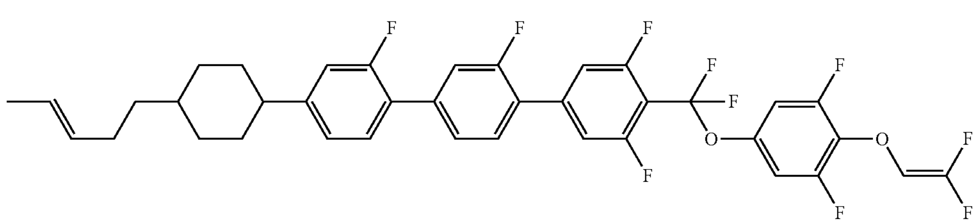 |

-continued
Formula 69
| No. | |
|---|---|
| 401 | 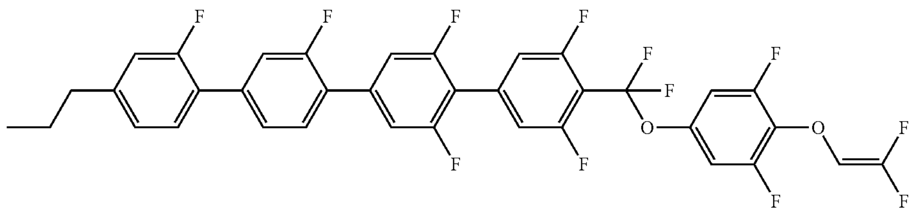 |
| 402 | 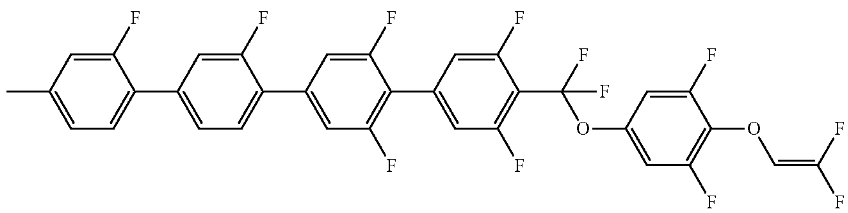 [SMILES: Cc1ccc(-c2ccc(-c3cc(F)c(-c4cc(F)c(C(F)(F)Oc5cc(F)c(OC=C(F)F)c(F)c5)c(F)c4)c(F)c3)c(F)c2)c(F)c1] |
| 403 | 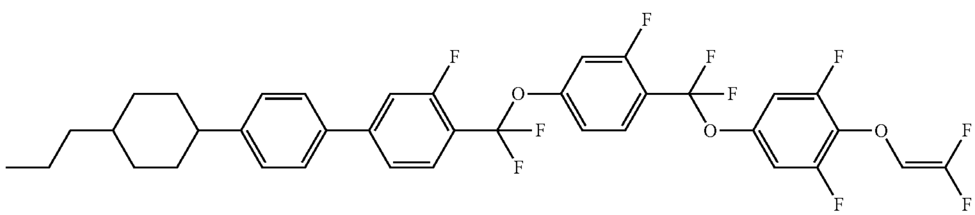 [SMILES: CCCC1CCC(c2ccc(-c3ccc(C(F)(F)Oc4ccc(C(F)(F)Oc5cc(F)c(OC=C(F)F)c(F)c5)c(F)c4)c(F)c3)cc2)CC1] |
| 404 | 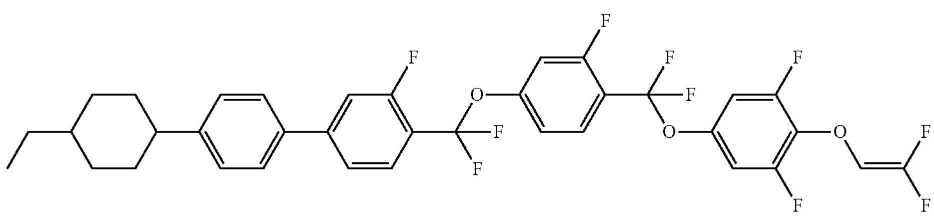 [SMILES: CCC1CCC(c2ccc(-c3ccc(C(F)(F)Oc4ccc(C(F)(F)Oc5cc(F)c(OC=C(F)F)c(F)c5)c(F)c4)c(F)c3)cc2)CC1] |
| 405 | 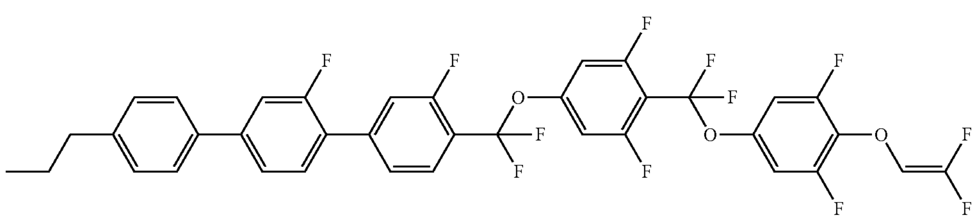 [SMILES: CCCc1ccc(-c2ccc(-c3ccc(C(F)(F)Oc4cc(F)c(C(F)(F)Oc5cc(F)c(OC=C(F)F)c(F)c5)c(F)c4)c(F)c3)c(F)c2)cc1] |
| 406 | 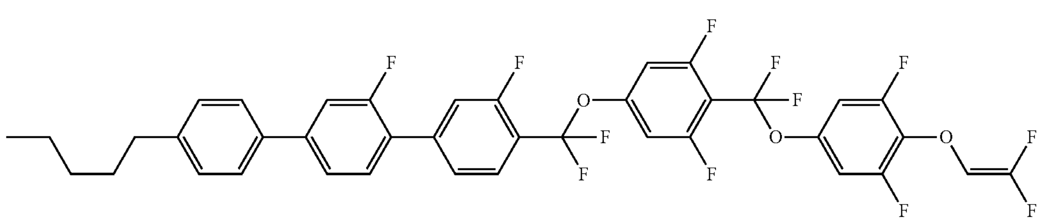 [SMILES: CCCCCc1ccc(-c2ccc(-c3ccc(C(F)(F)Oc4cc(F)c(C(F)(F)Oc5cc(F)c(OC=C(F)F)c(F)c5)c(F)c4)c(F)c3)c(F)c2)cc1] |
| 407 | 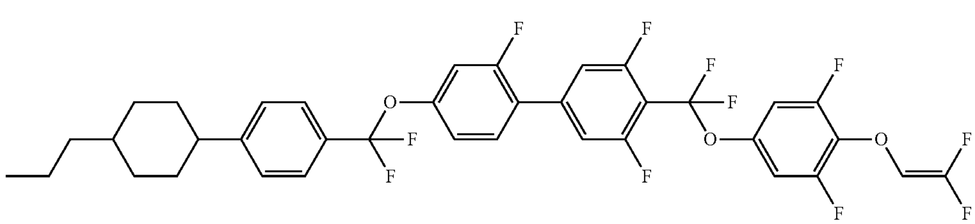 [SMILES: CCCC1CCC(c2ccc(C(F)(F)Oc3ccc(-c4cc(F)c(C(F)(F)Oc5cc(F)c(OC=C(F)F)c(F)c5)c(F)c4)c(F)c3)cc2)CC1] |

-continued
| Formula 69 | |
|---|---|
| No. | |
| 408 | 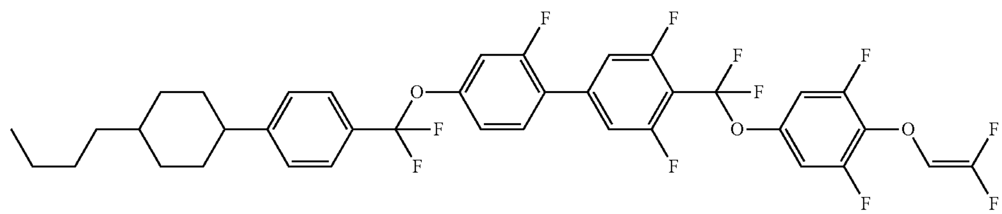 [SMILES: CCCCC1CCC(c2ccc(C(F)(F)Oc3ccc(-c4cc(F)c(C(F)(F)Oc5cc(F)c(OC=C(F)F)c(F)c5)c(F)c4)c(F)c3)cc2)CC1] |
| Formula 70 | |
|---|---|
| No. | |
| 409 | 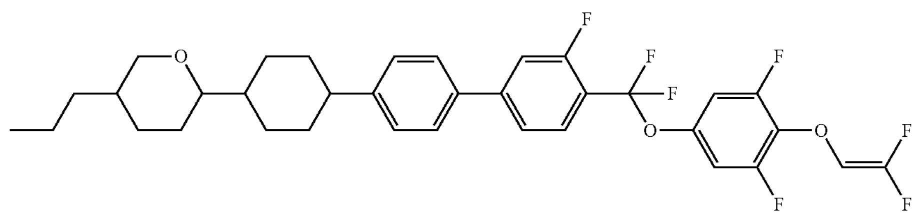 [SMILES: CCCC1CCC(C2CCC(c3ccc(-c4ccc(C(F)(F)Oc5cc(F)c(OC=C(F)F)c(F)c5)c(F)c4)cc3)CC2)OC1] |
| 410 | 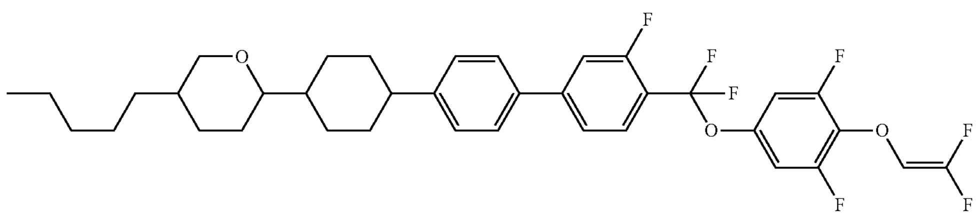 [SMILES: CCCCCC1CCC(C2CCC(c3ccc(-c4ccc(C(F)(F)Oc5cc(F)c(OC=C(F)F)c(F)c5)c(F)c4)cc3)CC2)OC1] |
| 411 | 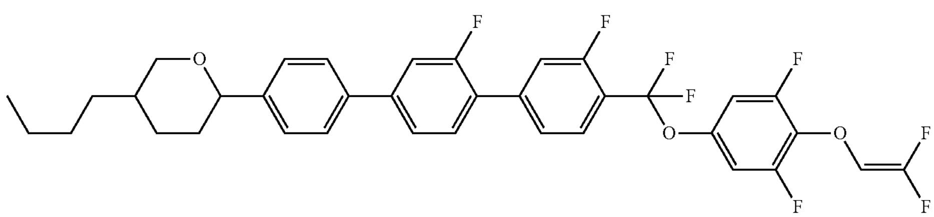 |
| 412 | 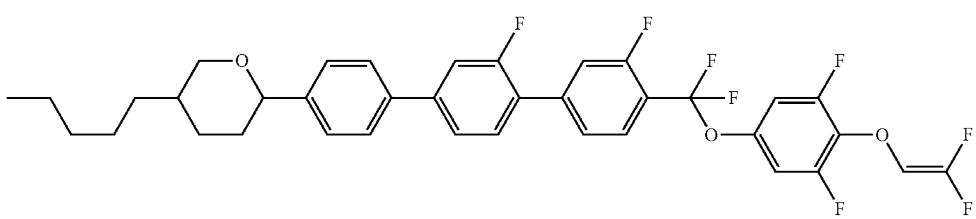 [SMILES: CCCCCC1CCC(c2ccc(-c3ccc(-c4ccc(C(F)(F)Oc5cc(F)c(OC=C(F)F)c(F)c5)c(F)c4)c(F)c3)cc2)OC1] |
| 413 | 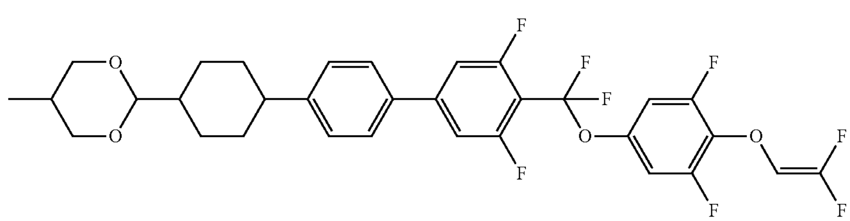 [SMILES: CC1COC(C2CCC(c3ccc(-c4cc(F)c(C(F)(F)Oc5cc(F)c(OC=C(F)F)c(F)c5)c(F)c4)cc3)CC2)OC1] |

-continued
| | Formula 70 |
|---|---|
| No. | |
| 414 | 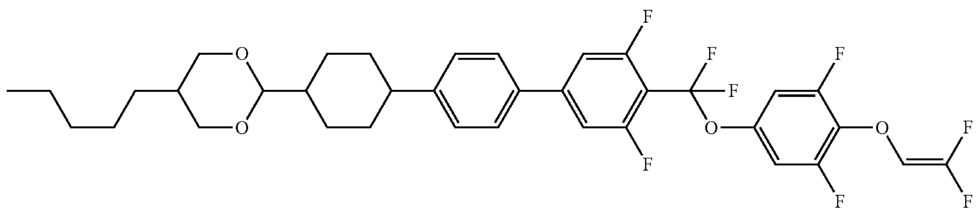 |
| 415 | 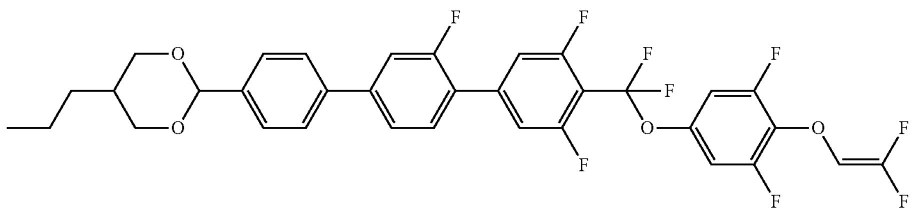 |
| 416 | 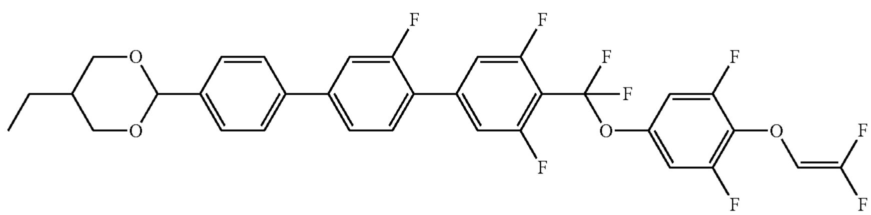 |
| 417 | 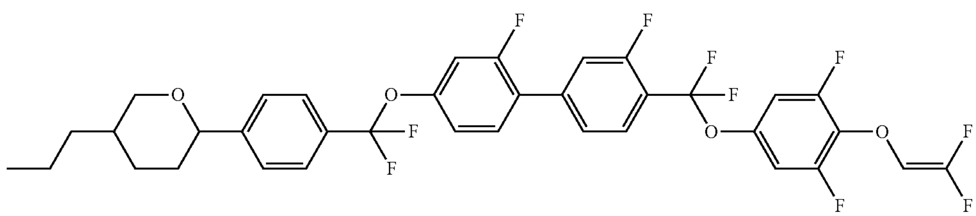 |
| 418 | 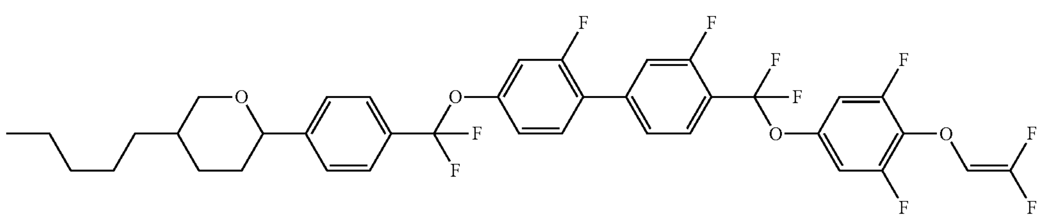 [SMILES: CCCCCC1CCC(c2ccc(C(F)(F)Oc3ccc(-c4ccc(C(F)(F)Oc5cc(F)c(OC=C(F)F)c(F)c5)c(F)c4)c(F)c3)cc2)OC1] |
| 419 | 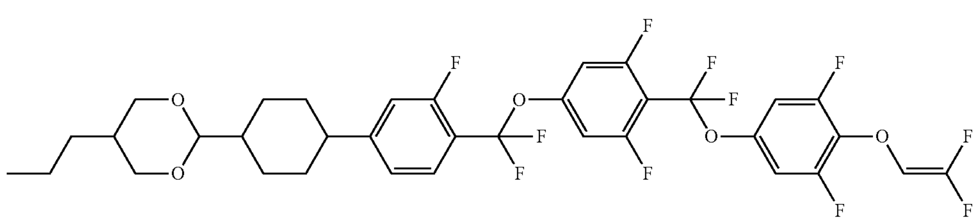 [SMILES: CCCC1COC(C2CCC(c3ccc(C(F)(F)Oc4cc(F)c(C(F)(F)Oc5cc(F)c(OC=C(F)F)c(F)c5)c(F)c4)c(F)c3)CC2)OC1] |
| 420 | 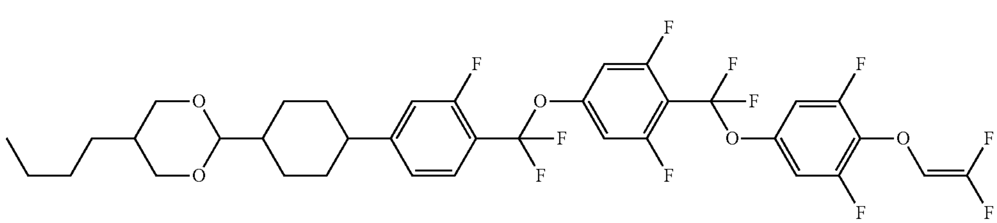 [SMILES: CCCCC1COC(C2CCC(c3ccc(C(F)(F)Oc4cc(F)c(C(F)(F)Oc5cc(F)c(OC=C(F)F)c(F)c5)c(F)c4)c(F)c3)CC2)OC1] |

-continued
| Formula 70 | |
|---|---|
| No. | |
| 421 | 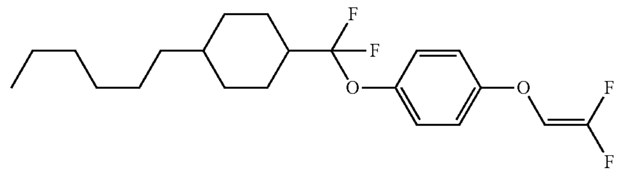 [SMILES: CCCCCCC1CCC(C(F)(F)Oc2ccc(OC=C(F)F)cc2)CC1] |
| 422 | 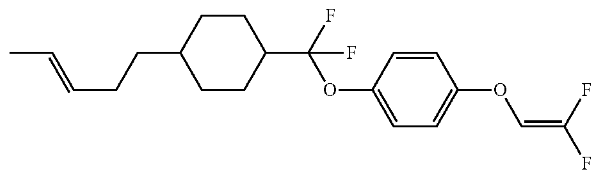 [SMILES: C/C=C/CCC1CCC(C(F)(F)Oc2ccc(OC=C(F)F)cc2)CC1] |
| 423 | 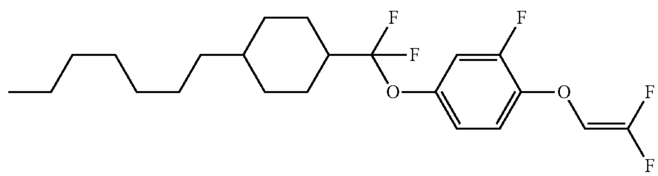 [SMILES: CCCCCCCC1CCC(C(F)(F)Oc2ccc(OC=C(F)F)c(F)c2)CC1] |
| 424 | 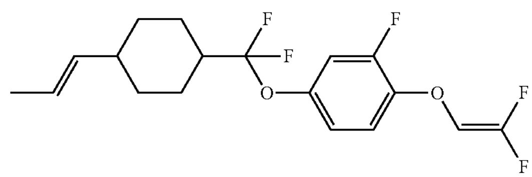 [SMILES: C/C=C/C1CCC(C(F)(F)Oc2ccc(OC=C(F)F)c(F)c2)CC1] |
| 425 | 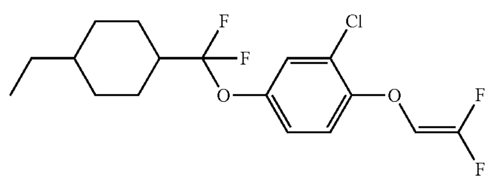 [SMILES: CCC1CCC(C(F)(F)Oc2ccc(OC=C(F)F)c(Cl)c2)CC1] |
| 426 | 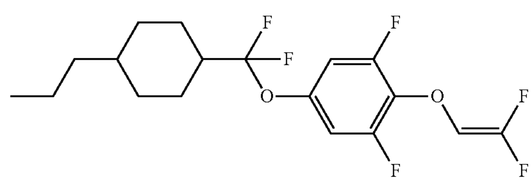 [SMILES: CCCC1CCC(C(F)(F)Oc2cc(F)c(OC=C(F)F)c(F)c2)CC1] |
| 427 | 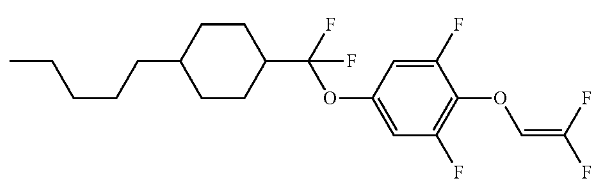 [SMILES: CCCCCC1CCC(C(F)(F)Oc2cc(F)c(OC=C(F)F)c(F)c2)CC1] |
| 428 | 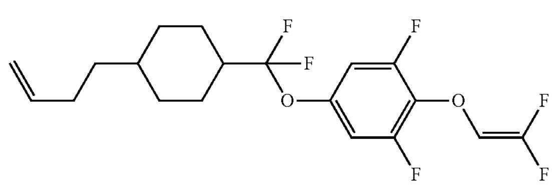 |

-continued
Formula 70
| No. | |
|---|---|
| 429 | 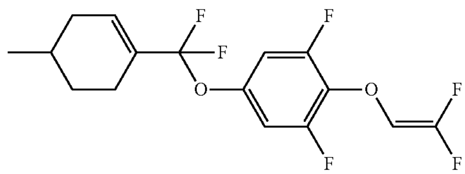 [SMILES: CC1CC=C(C(F)(F)Oc2cc(F)c(OC=C(F)F)c(F)c2)CC1] |
| 430 | 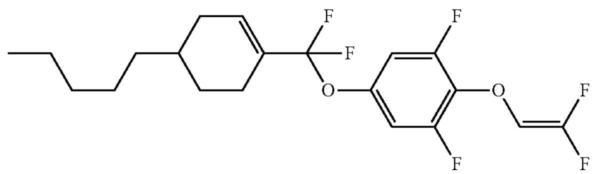 |
| 431 | 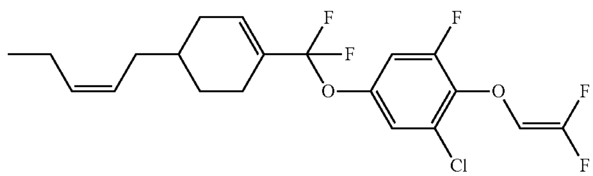 [SMILES: CC/C=C\CC1CC=C(C(F)(F)Oc2cc(F)c(OC=C(F)F)c(Cl)c2)CC1] |
| 432 | 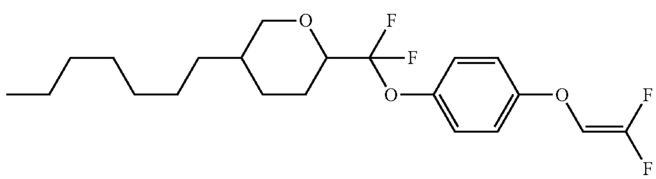 |
Formula 71
| No. | |
|---|---|
| 433 | 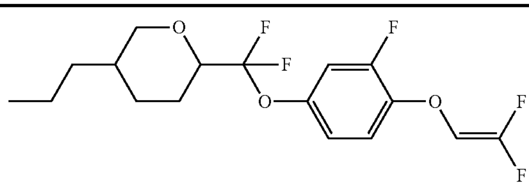 |
| 434 | 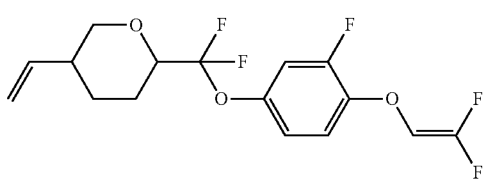 |
| 435 | 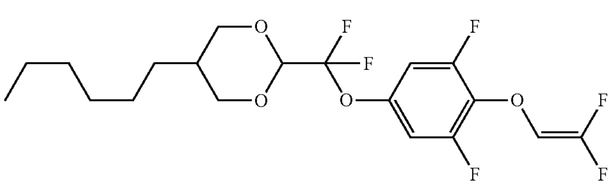 [SMILES: CCCCCCC1COC(C(F)(F)Oc2cc(F)c(OC=C(F)F)c(F)c2)OC1] |

-continued
Formula 71
No.
436
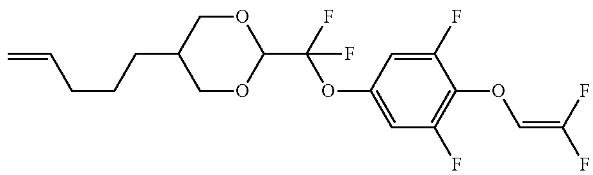 [SMILES: C=CCCCC1COC(C(F)(F)Oc2cc(F)c(OC=C(F)F)c(F)c2)OC1]
437
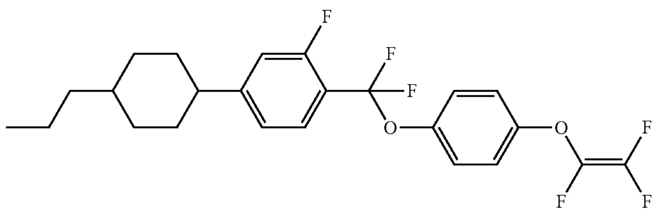 [SMILES: CCCC1CCC(c2ccc(C(F)(F)Oc3ccc(OC(F)=C(F)F)cc3)c(F)c2)CC1]
438
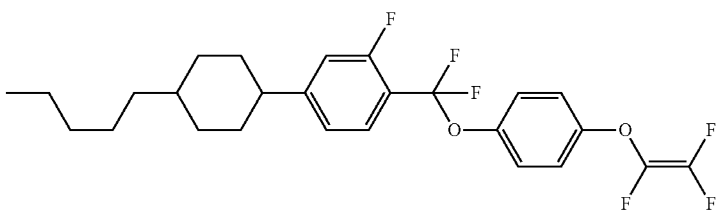 [SMILES: CCCCCC1CCC(c2ccc(C(F)(F)Oc3ccc(OC(F)=C(F)F)cc3)c(F)c2)CC1]
439
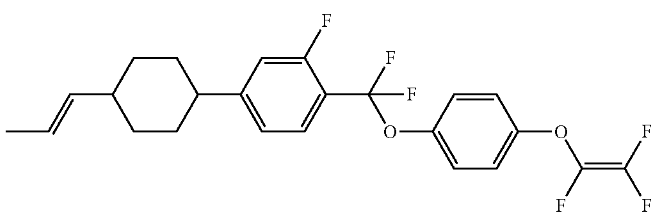 [SMILES: C/C=C/C1CCC(c2ccc(C(F)(F)Oc3ccc(OC(F)=C(F)F)cc3)c(F)c2)CC1]
440
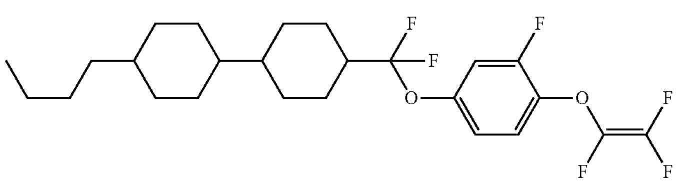
441
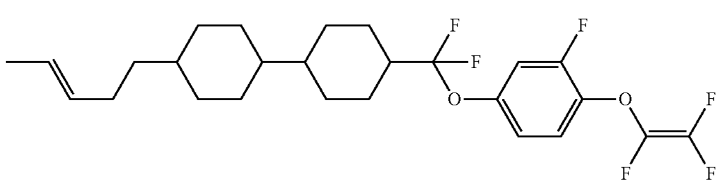 [SMILES: C/C=C/CCC1CCC(C2CCC(C(F)(F)Oc3ccc(OC(F)=C(F)F)c(F)c3)CC2)CC1]
442
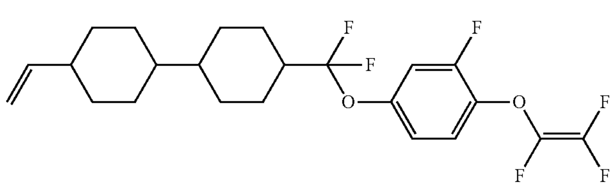 [SMILES: C=CC1CCC(C2CCC(C(F)(F)Oc3ccc(OC(F)=C(F)F)c(F)c3)CC2)CC1]

-continued
Formula 71
No.
443
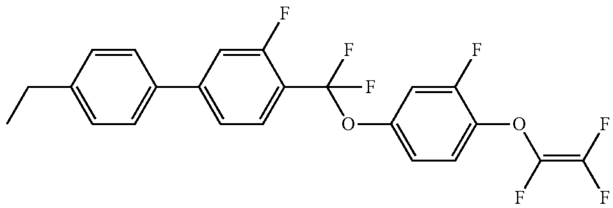 [SMILES: CCc1ccc(-c2ccc(C(F)(F)Oc3ccc(OC(F)=C(F)F)c(F)c3)c(F)c2)cc1]
444
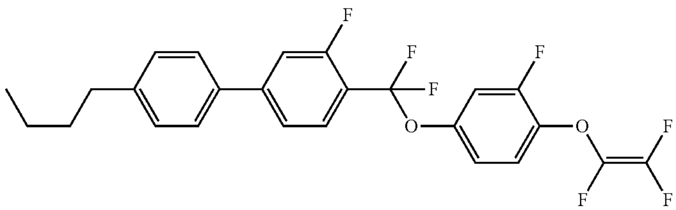
445
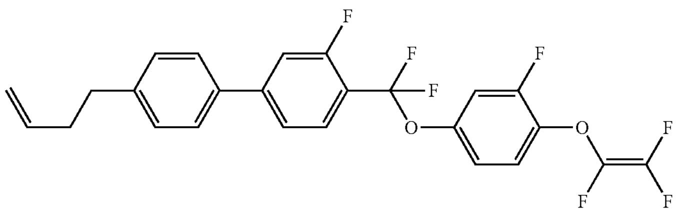 [SMILES: CCCCc1ccc(-c2ccc(C(F)(F)Oc3ccc(OC(F)=C(F)F)c(F)c3)c(F)c2)cc1]
446
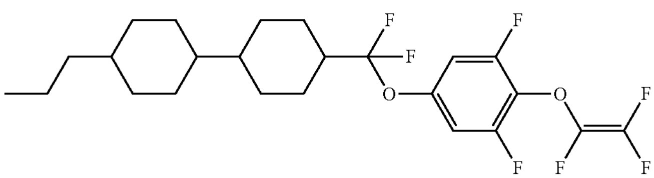
C 32.1 N 93.4 I
$T_{NI}$ = 73.7° C., η = 53.2 mPa · S, Δ n = 0.07, Δ ε = 13.2
447
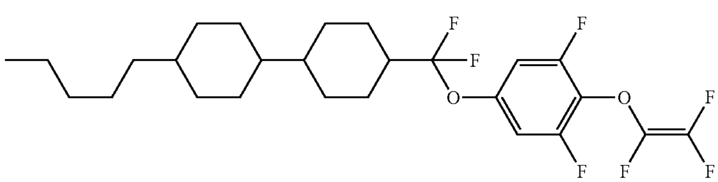
448
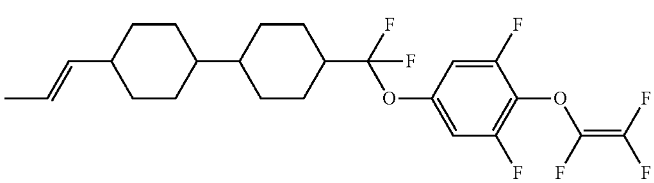 [SMILES: C/C=C/C1CCC(C2CCC(C(F)(F)Oc3cc(F)c(OC(F)=C(F)F)c(F)c3)CC2)CC1]
449
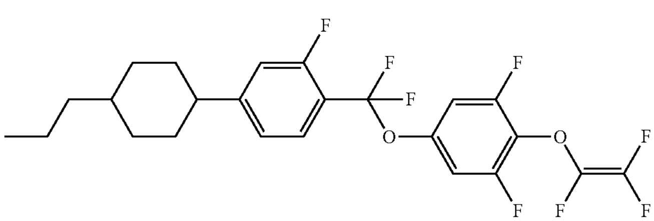

-continued
| Formula 71 |
|---|
| No. |
450
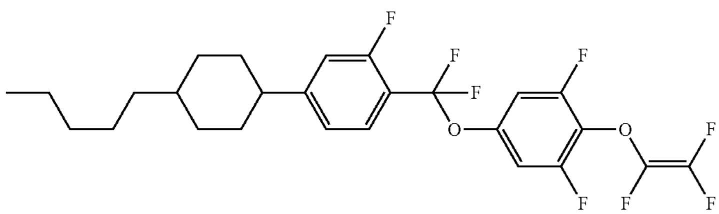 [SMILES: CCCCCC1CCC(c2ccc(C(F)(F)Oc3cc(F)c(OC(F)=C(F)F)c(F)c3)c(F)c2)CC1]
451
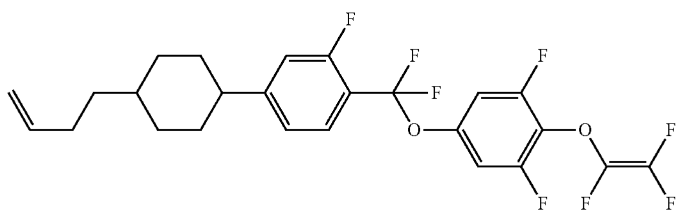 [SMILES: C=CCCC1CCC(c2ccc(C(F)(F)Oc3cc(F)c(OC(F)=C(F)F)c(F)c3)c(F)c2)CC1]
452
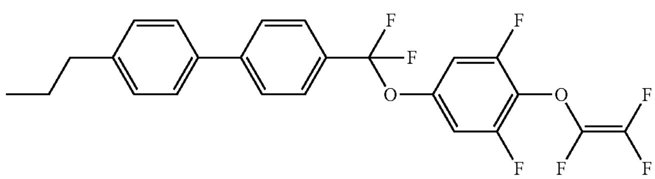 [SMILES: CCCc1ccc(-c2ccc(C(F)(F)Oc3cc(F)c(OC(F)=C(F)F)c(F)c3)cc2)cc1]
453
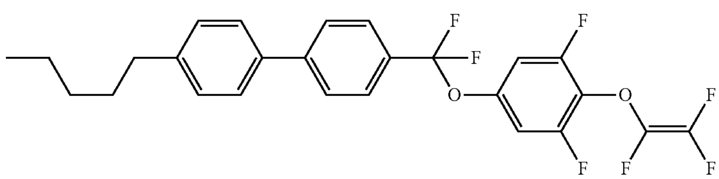
454
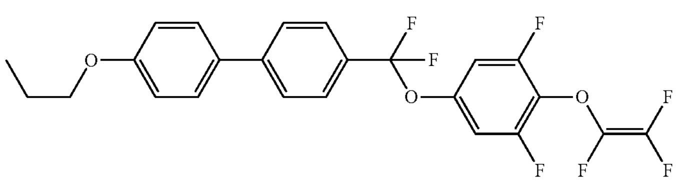
455
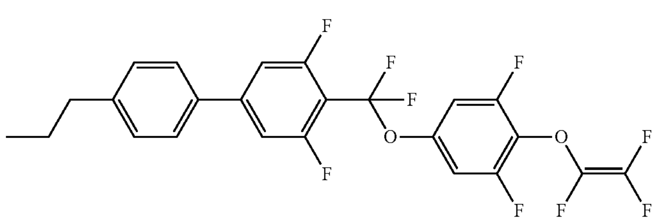 [SMILES: CCCc1ccc(-c2cc(F)c(C(F)(F)Oc3cc(F)c(OC(F)=C(F)F)c(F)c3)c(F)c2)cc1]
456
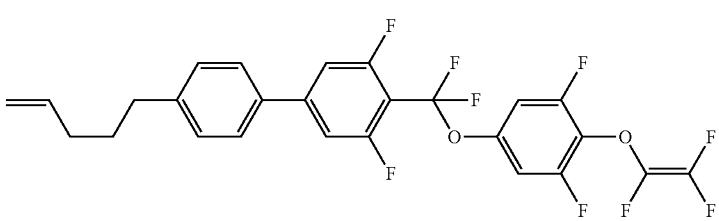 [SMILES: C=CCCCc1ccc(-c2cc(F)c(C(F)(F)Oc3cc(F)c(OC(F)=C(F)F)c(F)c3)c(F)c2)cc1]

| Formula 72 | |
|---|---|
| No. | |
| 457 | 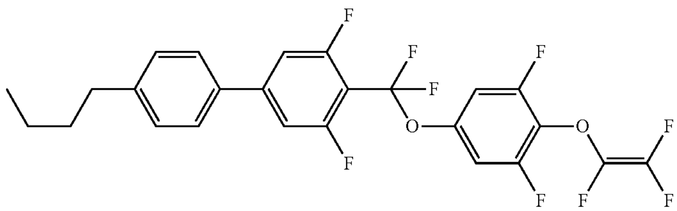 |
| 458 | 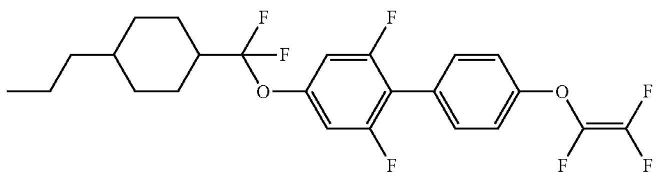 [SMILES: CCCC1CCC(C(F)(F)Oc2cc(F)c(-c3ccc(OC(F)=C(F)F)cc3)c(F)c2)CC1] |
| 459 | 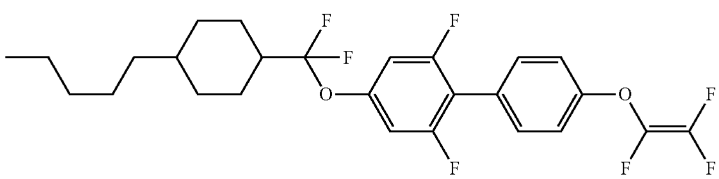 [SMILES: CCCCCC1CCC(C(F)(F)Oc2cc(F)c(-c3ccc(OC(F)=C(F)F)cc3)c(F)c2)CC1] |
| 460 | 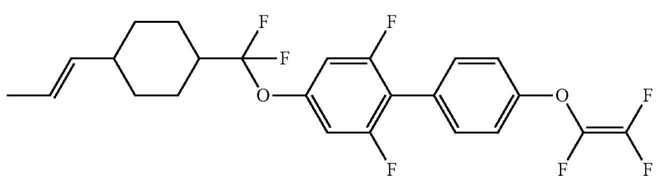 |
| 461 | 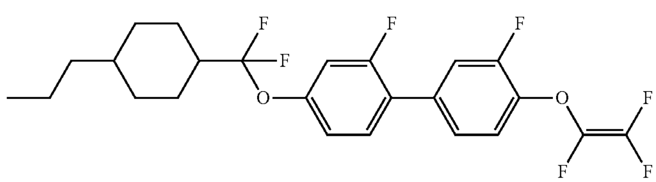 [SMILES: CCCC1CCC(C(F)(F)Oc2ccc(-c3ccc(OC(F)=C(F)F)c(F)c3)c(F)c2)CC1] |
| 462 | 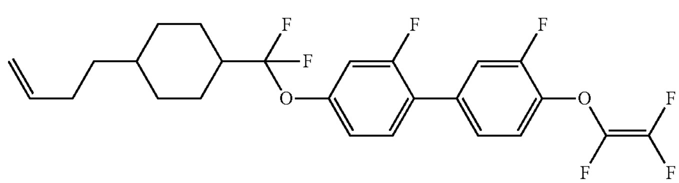 |
| 463 | 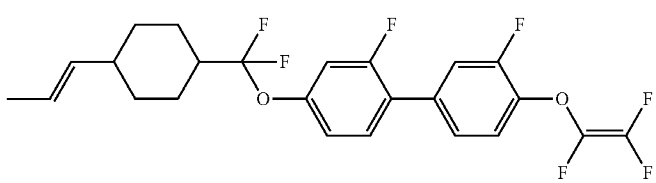 [SMILES: C/C=C/C1CCC(C(F)(F)Oc2ccc(-c3ccc(OC(F)=C(F)F)c(F)c3)c(F)c2)CC1] |
| 464 | 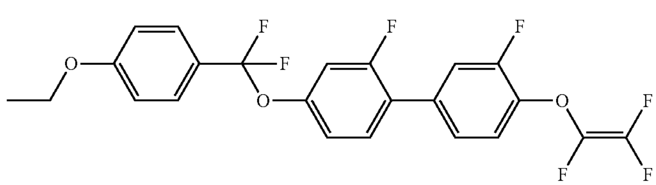 [SMILES: CCOc1ccc(C(F)(F)Oc2ccc(-c3ccc(OC(F)=C(F)F)c(F)c3)c(F)c2)cc1] |

-continued
| Formula 72 |
|---|
| No. |
465
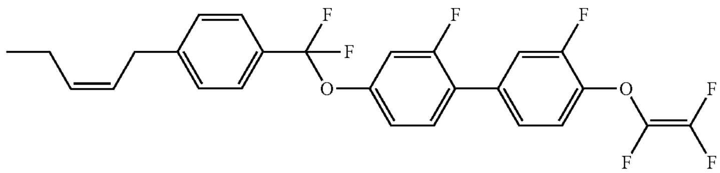 [SMILES: CC/C=C\Cc1ccc(C(F)(F)Oc2ccc(-c3ccc(OC(F)=C(F)F)c(F)c3)c(F)c2)cc1]
466
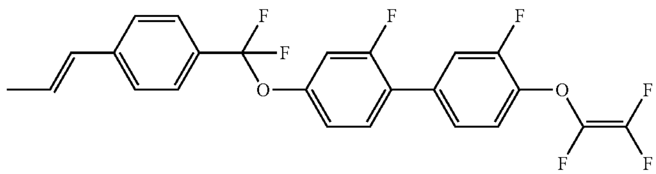 [SMILES: C/C=C/c1ccc(C(F)(F)Oc2ccc(-c3ccc(OC(F)=C(F)F)c(F)c3)c(F)c2)cc1]
467
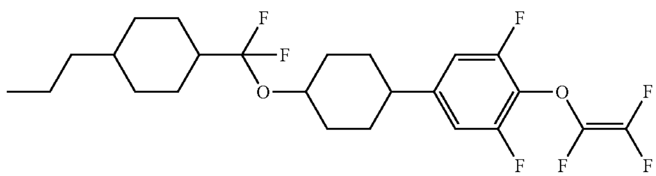
468
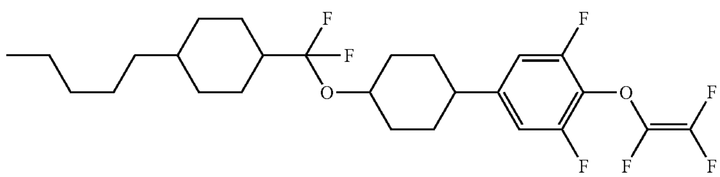 [SMILES: CCCCCC1CCC(C(F)(F)OC2CCC(c3cc(F)c(OC(F)=C(F)F)c(F)c3)CC2)CC1]
469
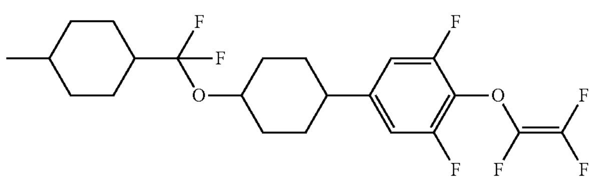 [SMILES: CC1CCC(C(F)(F)OC2CCC(c3cc(F)c(OC(F)=C(F)F)c(F)c3)CC2)CC1]
470
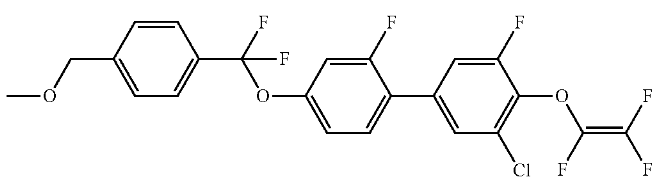
471
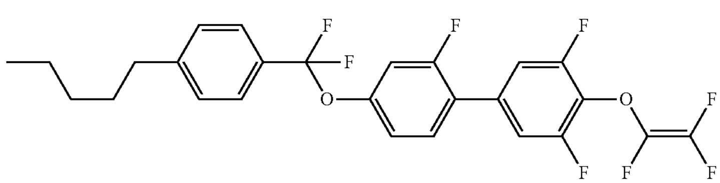 [SMILES: CCCCCc1ccc(C(F)(F)Oc2ccc(-c3cc(F)c(OC(F)=C(F)F)c(F)c3)c(F)c2)cc1]
472
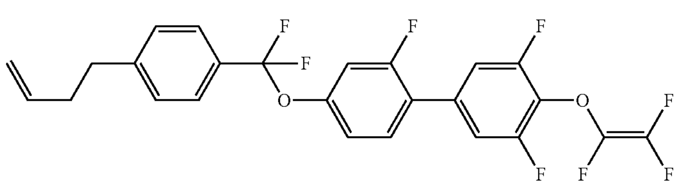

-continued
Formula 72
| No. | |
|---|---|
| 473 | 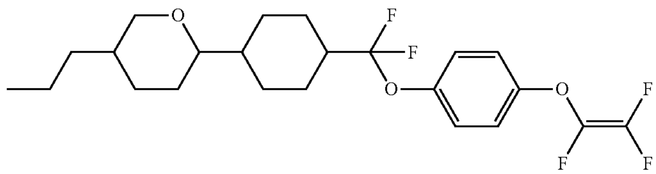 |
| 474 | 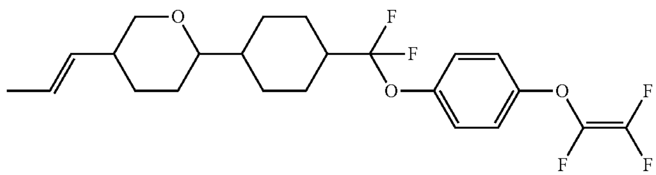 |
| 475 | 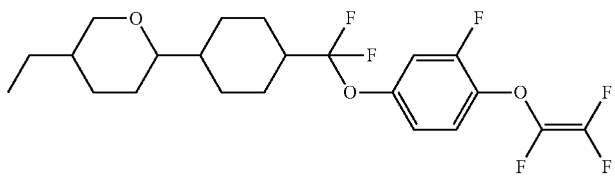 |
| 476 | 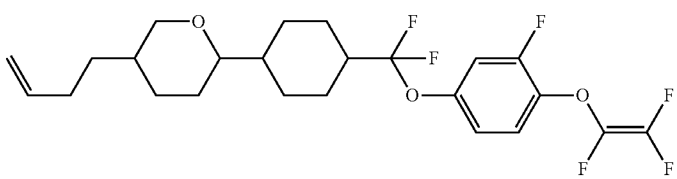 [SMILES: C=CCCC1CCC(C2CCC(C(F)(F)Oc3ccc(OC(F)=C(F)F)c(F)c3)CC2)OC1] |
| 477 | 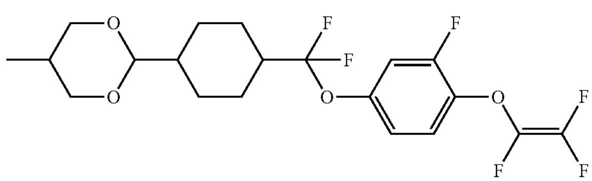 [SMILES: CC1COC(C2CCC(C(F)(F)Oc3ccc(OC(F)=C(F)F)c(F)c3)CC2)OC1] |
| 478 | 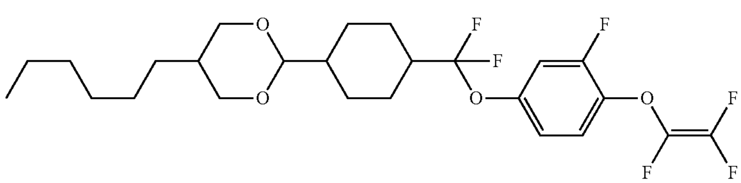 [SMILES: CCCCCCC1COC(C2CCC(C(F)(F)Oc3ccc(OC(F)=C(F)F)c(F)c3)CC2)OC1] |
| 479 | 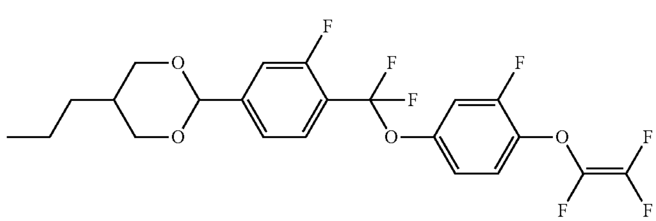 [SMILES: CCCC1COC(c2ccc(C(F)(F)Oc3ccc(OC(F)=C(F)F)c(F)c3)c(F)c2)OC1] |
| 480 | 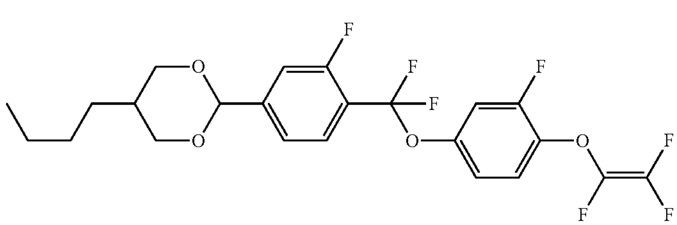 |

| Formula 73 | |
|---|---|
| No. | |
| 481 | 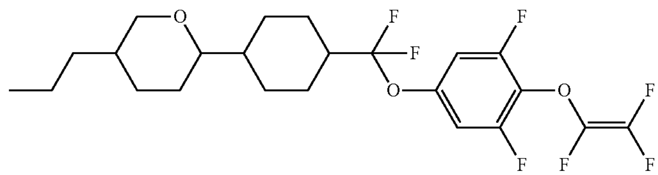 |
| 482 | 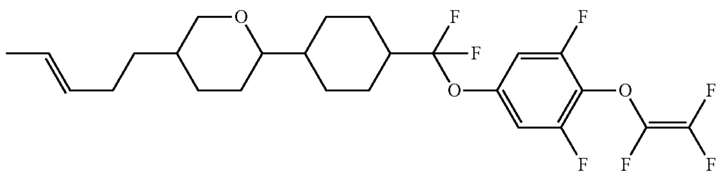 [SMILES: C/C=C/CCC1CCC(C2CCC(C(F)(F)Oc3cc(F)c(OC(F)=C(F)F)c(F)c3)CC2)OC1] |
| 483 | 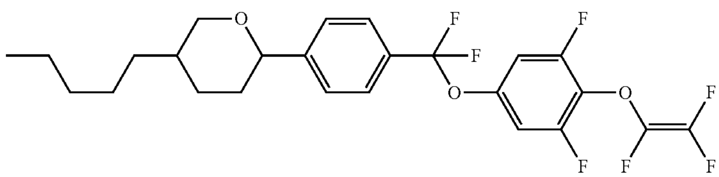 [SMILES: CCCCCC1CCC(c2ccc(C(F)(F)Oc3cc(F)c(OC(F)=C(F)F)c(F)c3)cc2)OC1] |
| 484 | 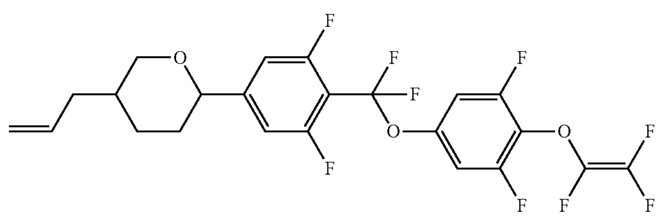 |
| 485 | 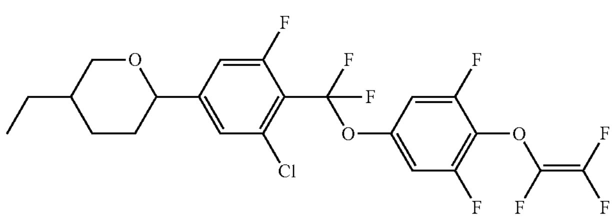 [SMILES: CCC1CCC(c2cc(F)c(C(F)(F)Oc3cc(F)c(OC(F)=C(F)F)c(F)c3)c(Cl)c2)OC1] |
| 486 | 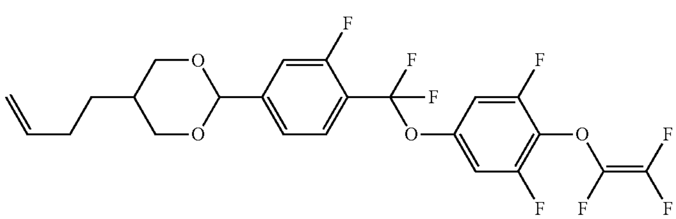 |
| 487 | 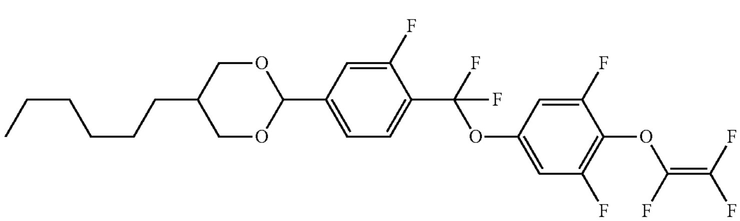 [SMILES: CCCCCCC1COC(c2ccc(C(F)(F)Oc3cc(F)c(OC(F)=C(F)F)c(F)c3)c(F)c2)OC1] |

-continued
| Formula 73 | |
|---|---|
| No. | |
| 488 | 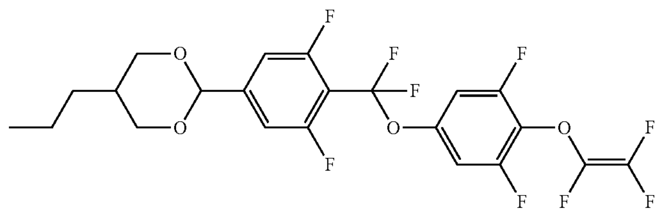 [SMILES: CCCC1COC(c2cc(F)c(C(F)(F)Oc3cc(F)c(OC(F)=C(F)F)c(F)c3)c(F)c2)OC1] |
| 489 | 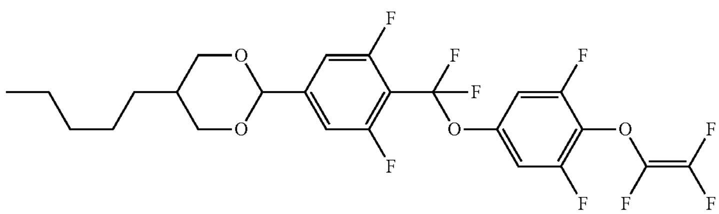 |
| 490 | 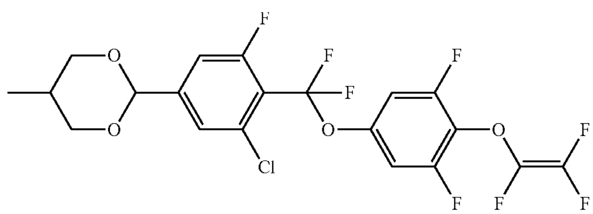 |
| 491 | 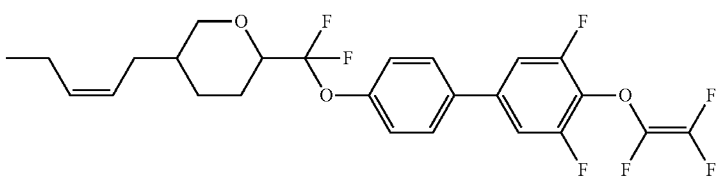 [SMILES: CC/C=C\CC1CCC(C(F)(F)Oc2ccc(-c3cc(F)c(OC(F)=C(F)F)c(F)c3)cc2)OC1] |
| 492 | 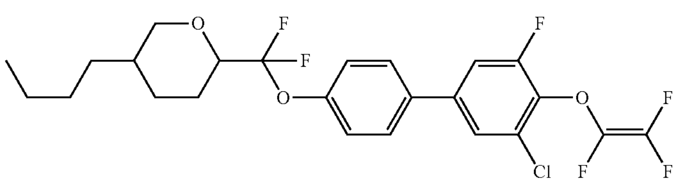 [SMILES: CCCCC1CCC(C(F)(F)Oc2ccc(-c3cc(F)c(OC(F)=C(F)F)c(Cl)c3)cc2)OC1] |
| 493 | 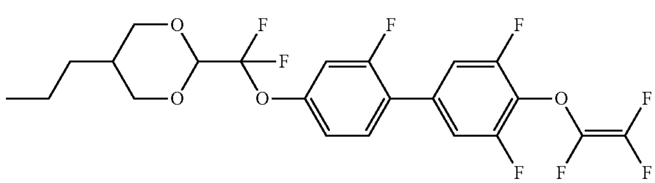 [SMILES: CCCC1COC(C(F)(F)Oc2ccc(-c3cc(F)c(OC(F)=C(F)F)c(F)c3)c(F)c2)OC1] |
| 494 | 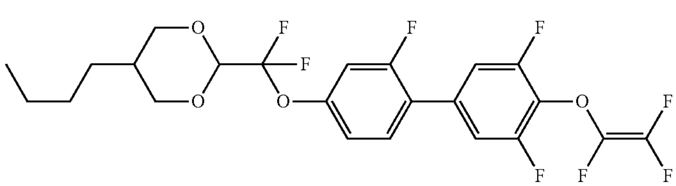 [SMILES: CCCCC1COC(C(F)(F)Oc2ccc(-c3cc(F)c(OC(F)=C(F)F)c(F)c3)c(F)c2)OC1] |

-continued
| Formula 73 | |
|---|---|
| No. | |
| 495 | 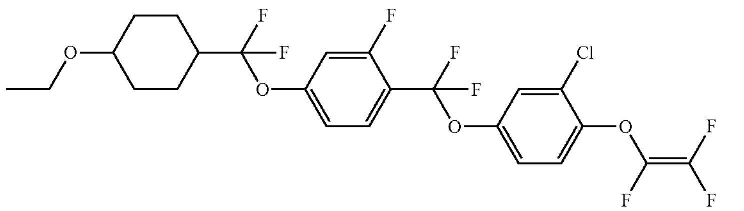 |
| 496 | 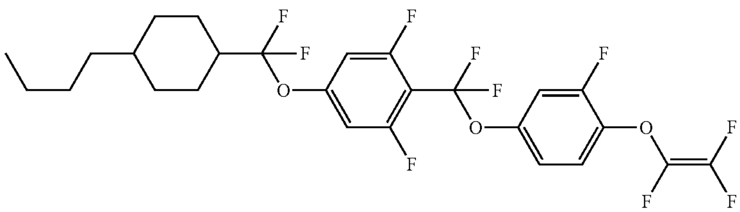 [SMILES: CCCCC1CCC(C(F)(F)Oc2cc(F)c(C(F)(F)Oc3ccc(OC(F)=C(F)F)c(F)c3)c(F)c2)CC1] |
| 497 | 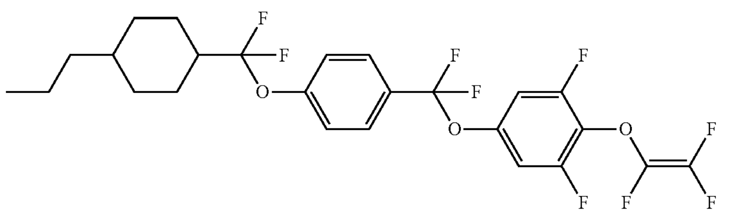 [SMILES: CCCC1CCC(C(F)(F)Oc2ccc(C(F)(F)Oc3cc(F)c(OC(F)=C(F)F)c(F)c3)cc2)CC1] |
| 498 | 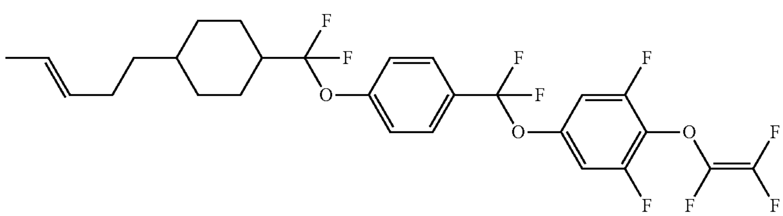 [SMILES: C/C=C/CCC1CCC(C(F)(F)Oc2ccc(C(F)(F)Oc3cc(F)c(OC(F)=C(F)F)c(F)c3)cc2)CC1] |
| 499 | 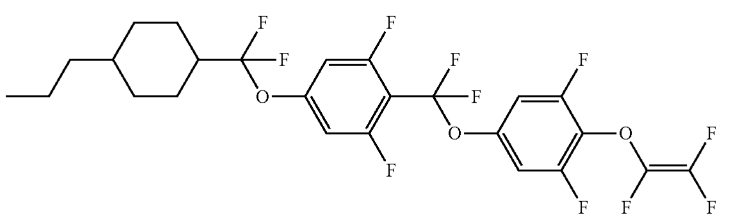 |
| 500 | 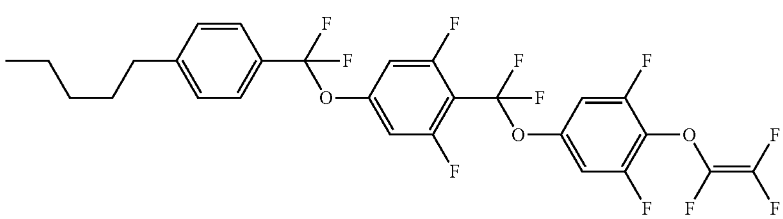 [SMILES: CCCCCc1ccc(C(F)(F)Oc2cc(F)c(C(F)(F)Oc3cc(F)c(OC(F)=C(F)F)c(F)c3)c(F)c2)cc1] |
| 501 | 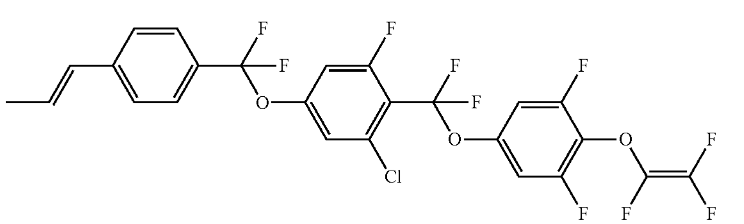 [SMILES: C/C=C/c1ccc(C(F)(F)Oc2cc(F)c(C(F)(F)Oc3cc(F)c(OC(F)=C(F)F)c(F)c3)c(Cl)c2)cc1] |

-continued
| Formula 73 | |
|---|---|
| No. | |
| 502 | 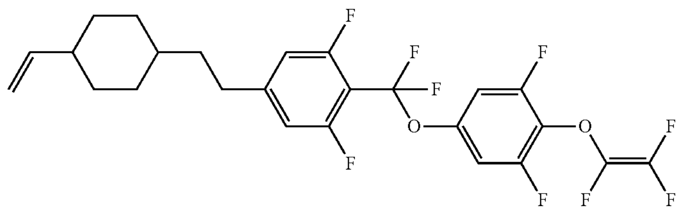 [SMILES: C=CC1CCC(CCc2cc(F)c(C(F)(F)Oc3cc(F)c(OC(F)=C(F)F)c(F)c3)c(F)c2)CC1] |
| 503 | 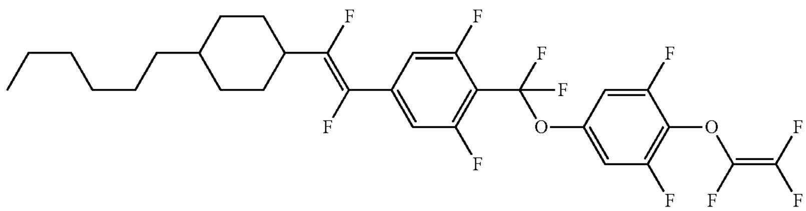 [SMILES: CCCCCCC1CCC(/C(F)=C(\F)c2cc(F)c(C(F)(F)Oc3cc(F)c(OC(F)=C(F)F)c(F)c3)c(F)c2)CC1] |
| 504 | 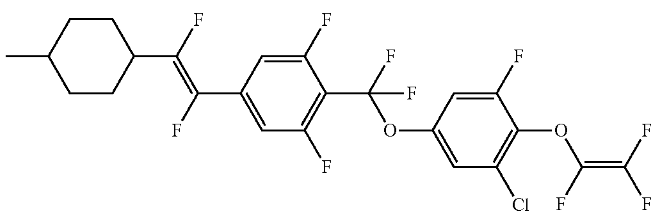 [SMILES: CC1CCC(/C(F)=C(\F)c2cc(F)c(C(F)(F)Oc3cc(F)c(OC(F)=C(F)F)c(Cl)c3)c(F)c2)CC1] |
| Formula 74 | |
|---|---|
| No. | |
| 505 | 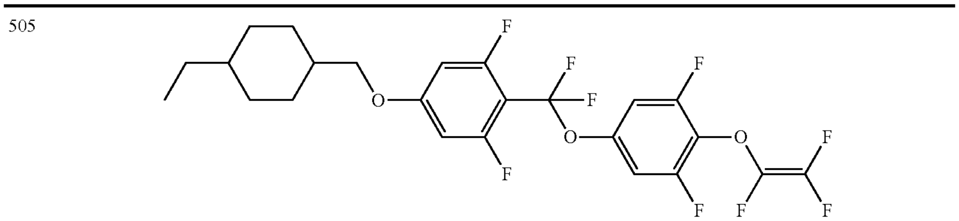 |
| 506 | 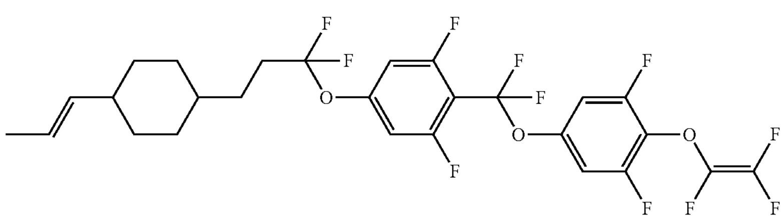 [SMILES: C/C=C/C1CCC(CCC(F)(F)Oc2cc(F)c(C(F)(F)Oc3cc(F)c(OC(F)=C(F)F)c(F)c3)c(F)c2)CC1] |
| 507 | 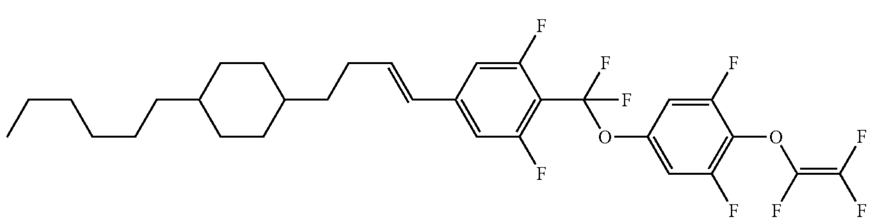 |

-continued
| Formula 74 | |
|---|---|
| No. | |
| 508 | 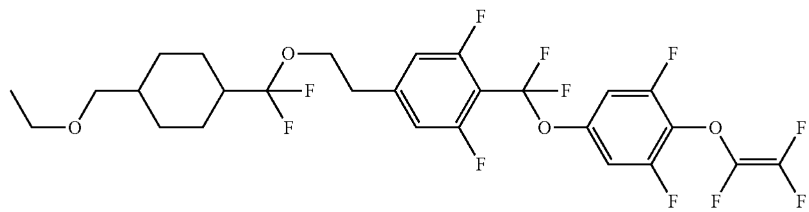 [SMILES: CCOCC1CCC(C(F)(F)OCCc2cc(F)c(C(F)(F)Oc3cc(F)c(OC(F)=C(F)F)c(F)c3)c(F)c2)CC1] |
| 509 | 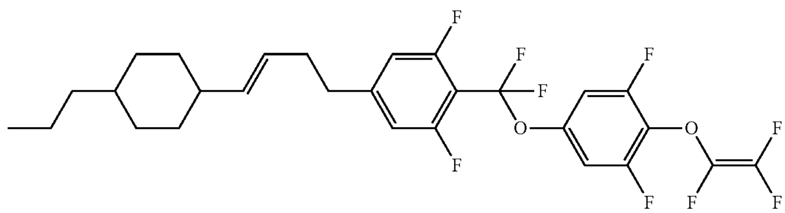 |
| 510 | 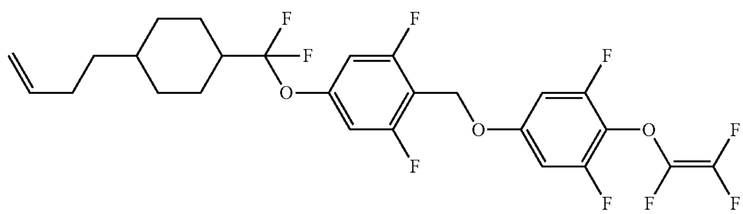 [SMILES: C=CCCC1CCC(C(F)(F)Oc2cc(F)c(COc3cc(F)c(OC(F)=C(F)F)c(F)c3)c(F)c2)CC1] |
| 511 | 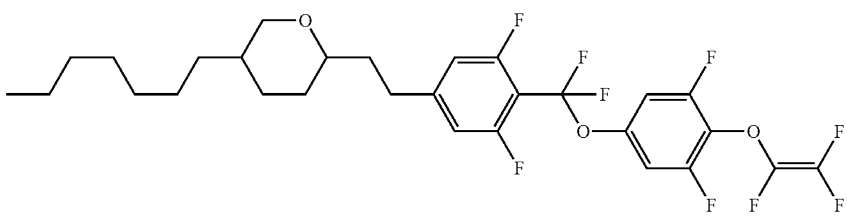 [SMILES: CCCCCCCC1CCC(CCc2cc(F)c(C(F)(F)Oc3cc(F)c(OC(F)=C(F)F)c(F)c3)c(F)c2)OC1] |
| 512 | 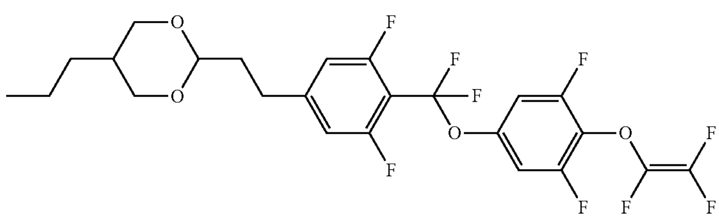 [SMILES: CCCC1COC(CCc2cc(F)c(C(F)(F)Oc3cc(F)c(OC(F)=C(F)F)c(F)c3)c(F)c2)OC1] |
| 513 | 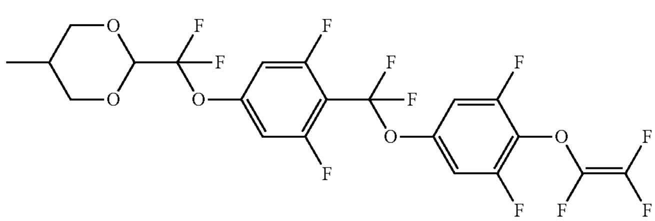 [SMILES: CC1COC(C(F)(F)Oc2cc(F)c(C(F)(F)Oc3cc(F)c(OC(F)=C(F)F)c(F)c3)c(F)c2)OC1] |
| 514 | 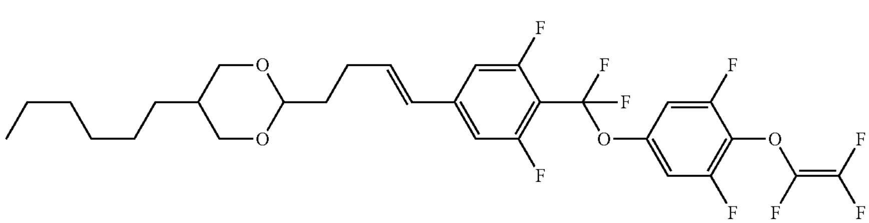 [SMILES: CCCCCCC1COC(CC/C=C/c2cc(F)c(C(F)(F)Oc3cc(F)c(OC(F)=C(F)F)c(F)c3)c(F)c2)OC1] |

-continued
Formula 74
| No. | |
|---|---|
| 515 | 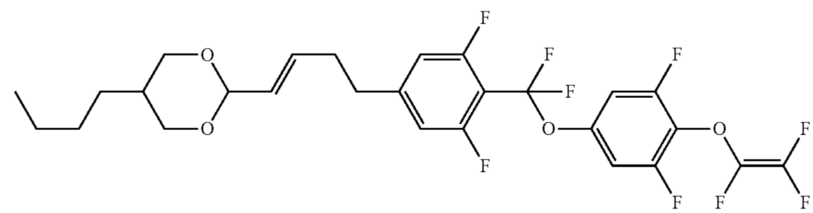 |
| 516 | 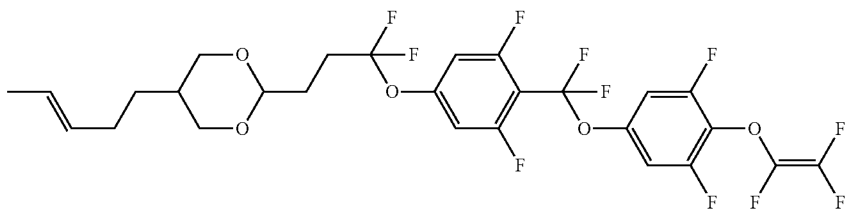 [SMILES: C/C=C/CCC1COC(CCC(F)(F)Oc2cc(F)c(C(F)(F)Oc3cc(F)c(OC(F)=C(F)F)c(F)c3)c(F)c2)OC1] |
| 517 | 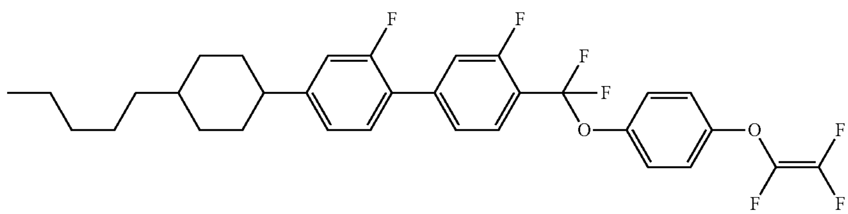 [SMILES: CCCCCC1CCC(c2ccc(-c3ccc(C(F)(F)Oc4ccc(OC(F)=C(F)F)cc4)c(F)c3)c(F)c2)CC1] |
| 518 | 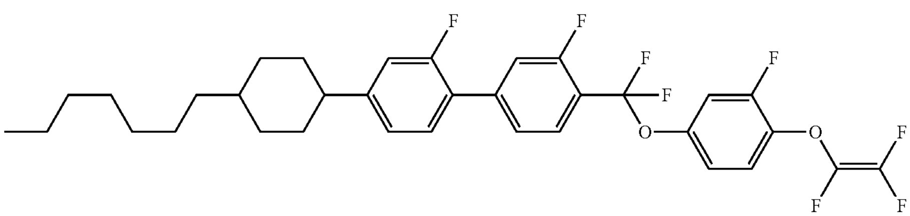 [SMILES: CCCCCCCC1CCC(c2ccc(-c3ccc(C(F)(F)Oc4ccc(OC(F)=C(F)F)c(F)c4)c(F)c3)c(F)c2)CC1] |
| 519 | 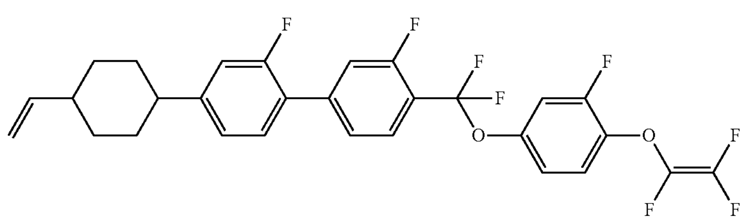 [SMILES: C=CC1CCC(c2ccc(-c3ccc(C(F)(F)Oc4ccc(OC(F)=C(F)F)c(F)c4)c(F)c3)c(F)c2)CC1] |
| 520 | 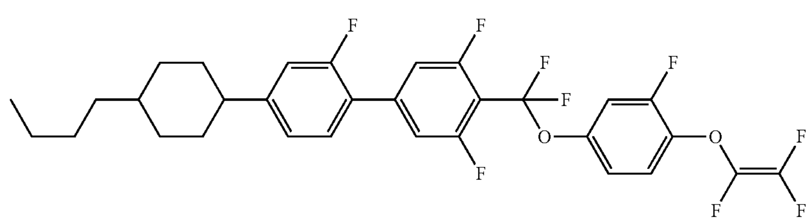 [SMILES: CCCCC1CCC(c2ccc(-c3cc(F)c(C(F)(F)Oc4ccc(OC(F)=C(F)F)c(F)c4)c(F)c3)c(F)c2)CC1] |
| 521 | 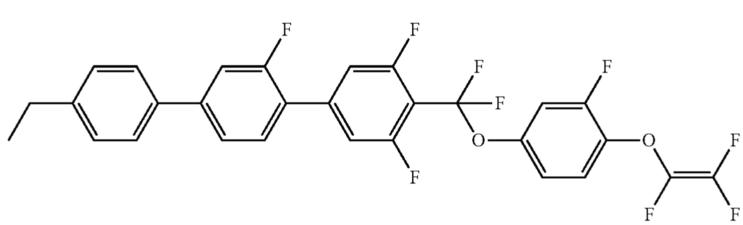 |

-continued
| Formula 74 |
|---|
| No. |
522
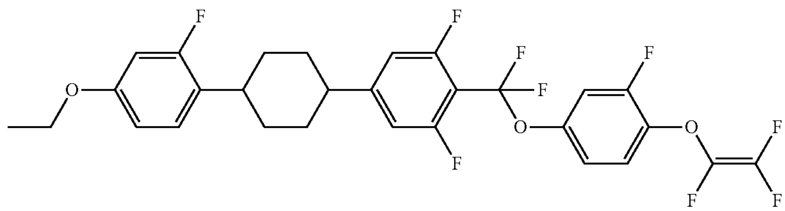 [SMILES: CCOc1ccc(C2CCC(c3cc(F)c(C(F)(F)Oc4ccc(OC(F)=C(F)F)c(F)c4)c(F)c3)CC2)c(F)c1]
523
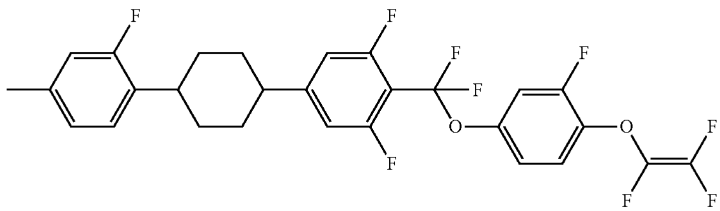 [SMILES: Cc1ccc(C2CCC(c3cc(F)c(C(F)(F)Oc4ccc(OC(F)=C(F)F)c(F)c4)c(F)c3)CC2)c(F)c1]
524
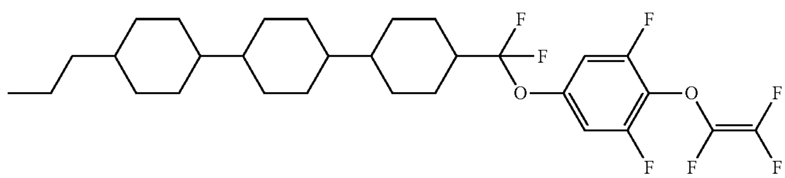
525
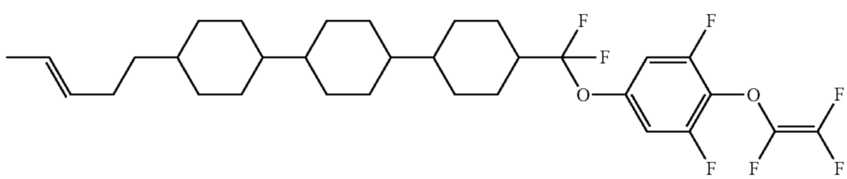
526
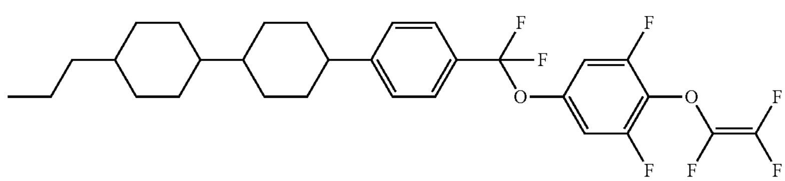
527
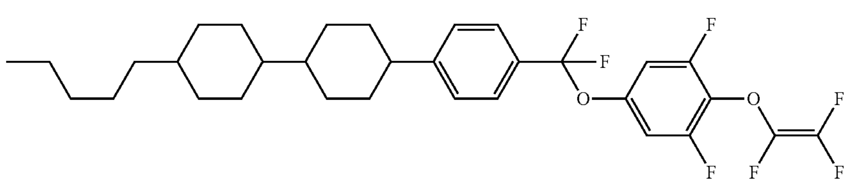
528
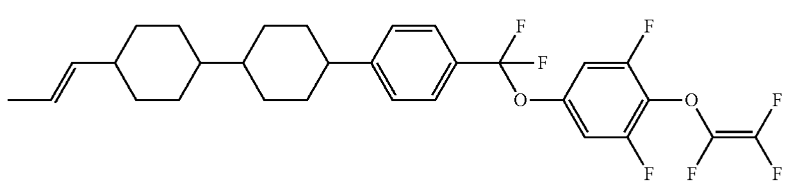 [SMILES: CCCC1CCC(C2CCC(c3ccc(C(F)(F)Oc4cc(F)c(OC(F)=C(F)F)c(F)c4)cc3)CC2)CC1]

Formula 75
No.
529
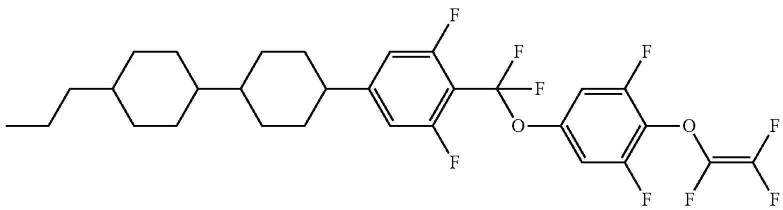 [SMILES: CCCC1CCC(C2CCC(c3cc(F)c(C(F)(F)Oc4cc(F)c(OC(F)=C(F)F)c(F)c4)c(F)c3)CC2)CC1]
530
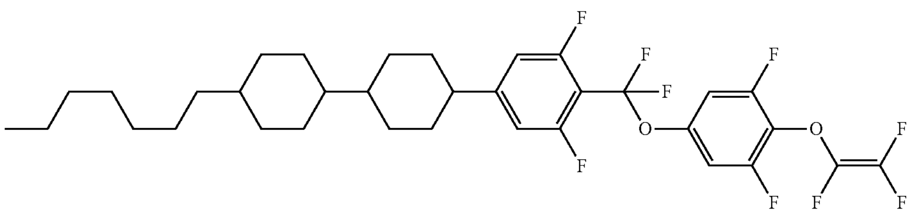 [SMILES: CCCCCCCC1CCC(C2CCC(c3cc(F)c(C(F)(F)Oc4cc(F)c(OC(F)=C(F)F)c(F)c4)c(F)c3)CC2)CC1]
531
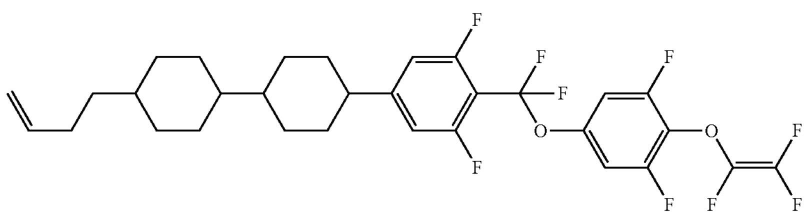 [SMILES: C=CCCC1CCC(C2CCC(c3cc(F)c(C(F)(F)Oc4cc(F)c(OC(F)=C(F)F)c(F)c4)c(F)c3)CC2)CC1]
532
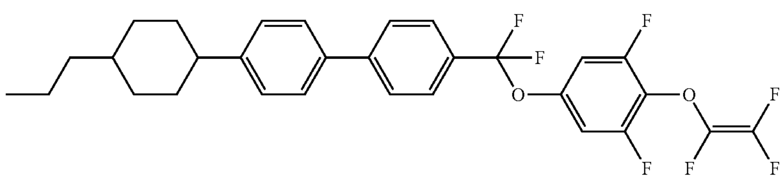
533
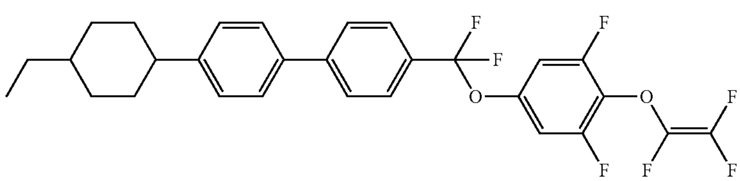
534
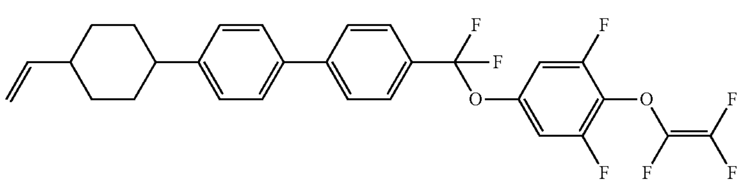
535
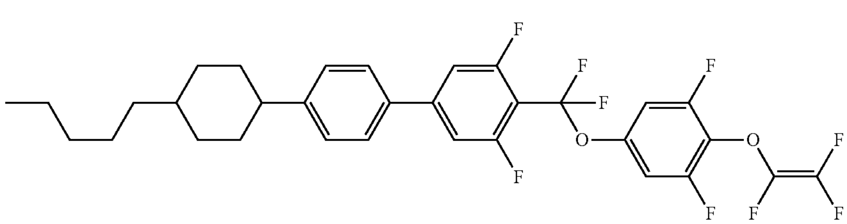 [SMILES: CCCCCC1CCC(c2ccc(-c3cc(F)c(C(F)(F)Oc4cc(F)c(OC(F)=C(F)F)c(F)c4)c(F)c3)cc2)CC1]

-continued
| Formula 75 | |
|---|---|
| No. | |
| 536 | 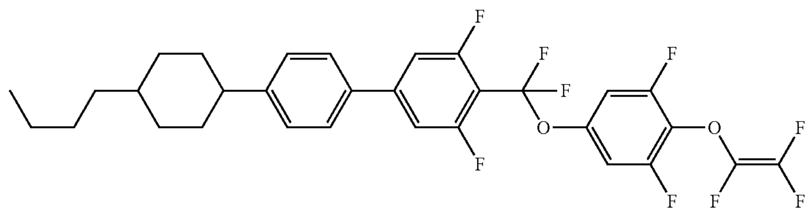 |
| 537 | 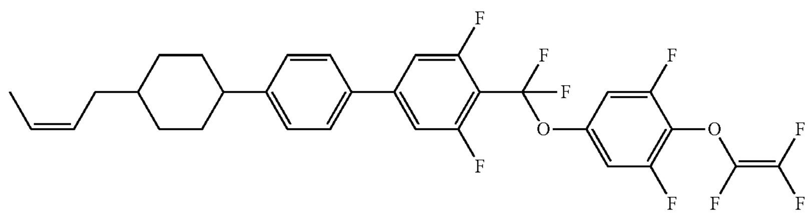 |
| 538 | 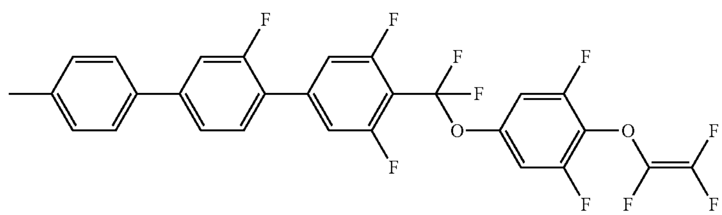 [SMILES: Cc1ccc(-c2ccc(-c3cc(F)c(C(F)(F)Oc4cc(F)c(OC(F)=C(F)F)c(F)c4)c(F)c3)c(F)c2)cc1] |
| 539 | 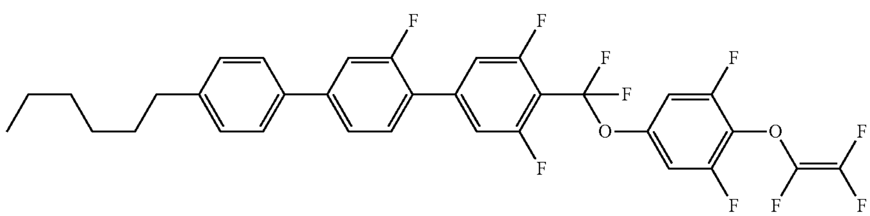 [SMILES: CCCCCCc1ccc(-c2ccc(-c3cc(F)c(C(F)(F)Oc4cc(F)c(OC(F)=C(F)F)c(F)c4)c(F)c3)c(F)c2)cc1] |
| 540 | 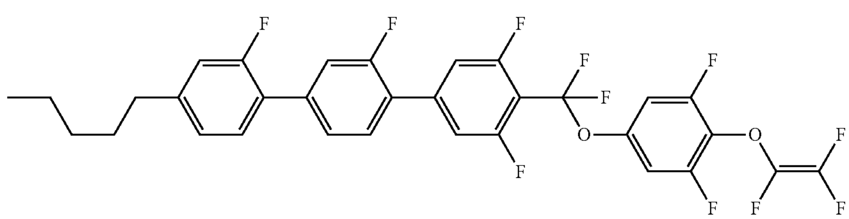 |
| 541 | 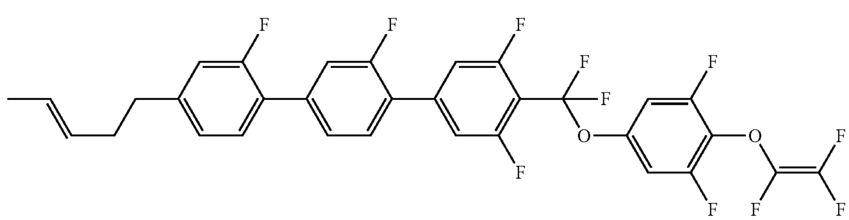 |
| 542 | 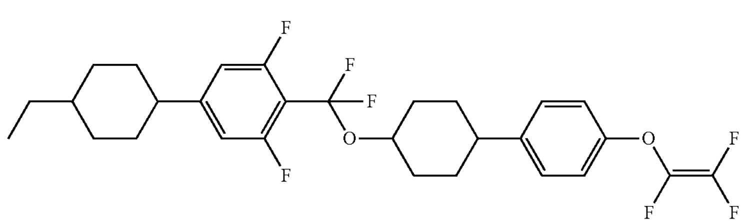 [SMILES: CCC1CCC(c2cc(F)c(C(F)(F)OC3CCC(c4ccc(OC(F)=C(F)F)cc4)CC3)c(F)c2)CC1] |

-continued
| Formula 75 | |
|---|---|
| No. | |
| 543 | 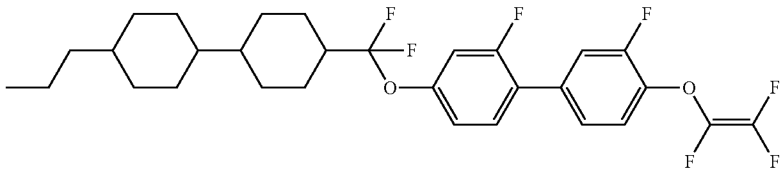 |
| 544 | 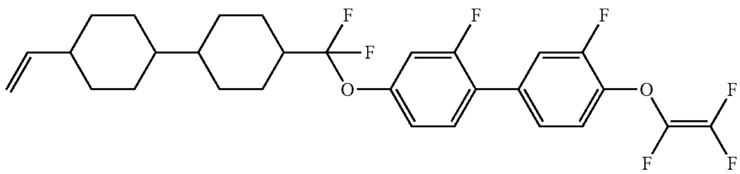 [SMILES: C=CC1CCC(C2CCC(C(F)(F)Oc3ccc(-c4ccc(OC(F)=C(F)F)c(F)c4)c(F)c3)CC2)CC1] |
| 545 | 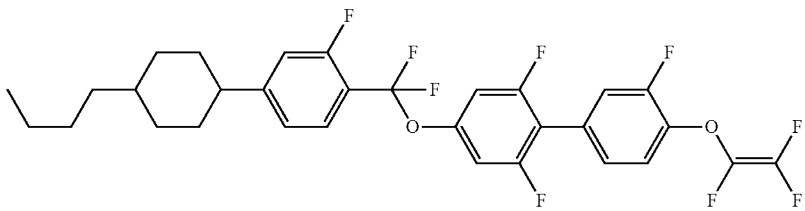 [SMILES: CCCCC1CCC(c2ccc(C(F)(F)Oc3cc(F)c(-c4ccc(OC(F)=C(F)F)c(F)c4)c(F)c3)c(F)c2)CC1] |
| 546 | 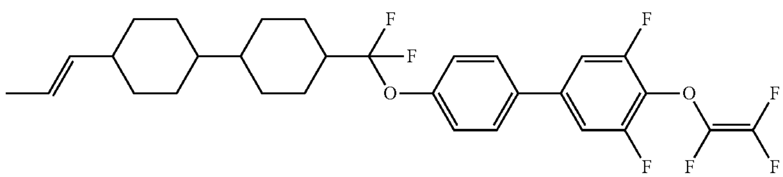 |
| 547 | 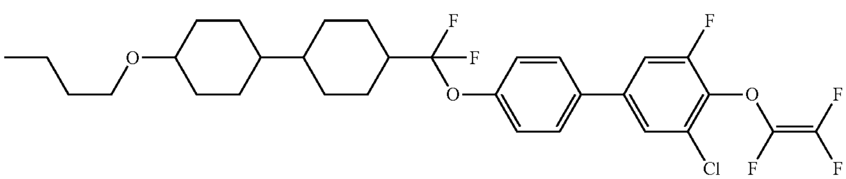 [SMILES: CCCCOC1CCC(C2CCC(C(F)(F)Oc3ccc(-c4cc(F)c(OC(F)=C(F)F)c(Cl)c4)cc3)CC2)CC1] |
| 548 | 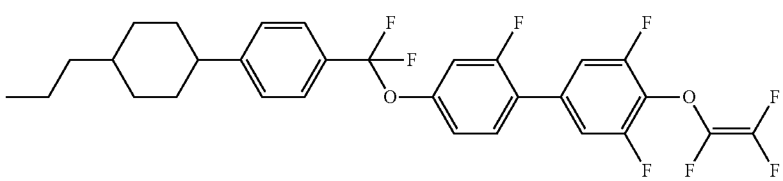 |
| 549 | 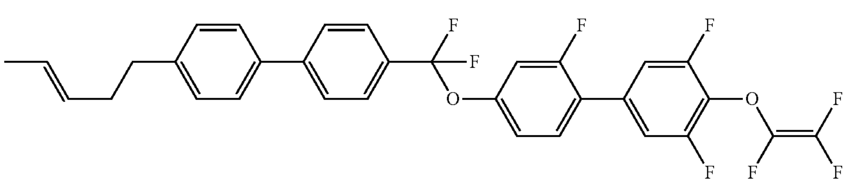 [SMILES: C/C=C/CCc1ccc(-c2ccc(C(F)(F)Oc3ccc(-c4cc(F)c(OC(F)=C(F)F)c(F)c4)c(F)c3)cc2)cc1] |
| 550 | 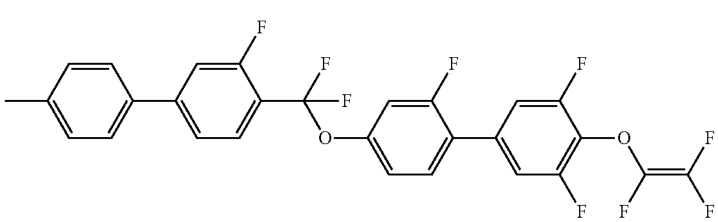 [SMILES: Cc1ccc(-c2ccc(C(F)(F)Oc3ccc(-c4cc(F)c(OC(F)=C(F)F)c(F)c4)c(F)c3)c(F)c2)cc1] |

-continued
| Formula 75 | |
|---|---|
| No. | |
| 551 | 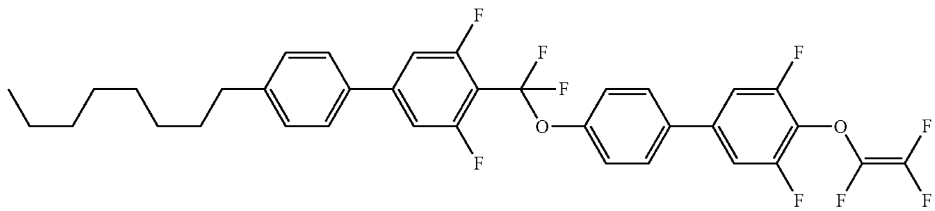 [SMILES: CCCCCCCCc1ccc(-c2cc(F)c(C(F)(F)Oc3ccc(-c4cc(F)c(OC(F)=C(F)F)c(F)c4)cc3)c(F)c2)cc1] |
| 552 | 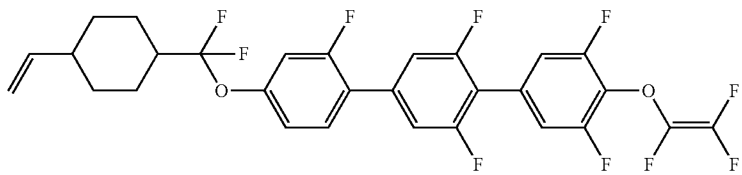 [SMILES: C=CC1CCC(C(F)(F)Oc2ccc(-c3cc(F)c(-c4cc(F)c(OC(F)=C(F)F)c(F)c4)c(F)c3)c(F)c2)CC1] |
| Formula 76 | |
|---|---|
| No. | |
| 553 | 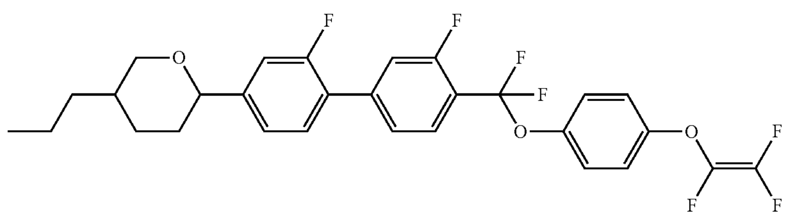 [SMILES: CCCC1CCC(c2ccc(-c3ccc(C(F)(F)Oc4ccc(OC(F)=C(F)F)cc4)c(F)c3)c(F)c2)OC1] |
| 554 | 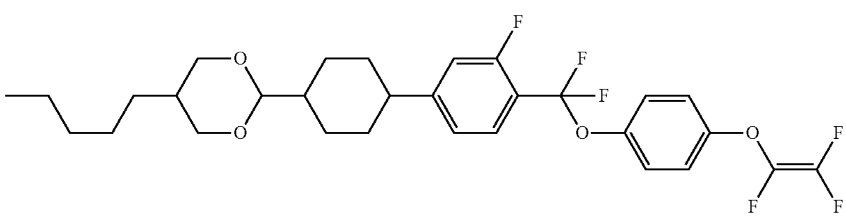 [SMILES: CCCCCC1COC(C2CCC(c3ccc(C(F)(F)Oc4ccc(OC(F)=C(F)F)cc4)c(F)c3)CC2)OC1] |
| 555 | 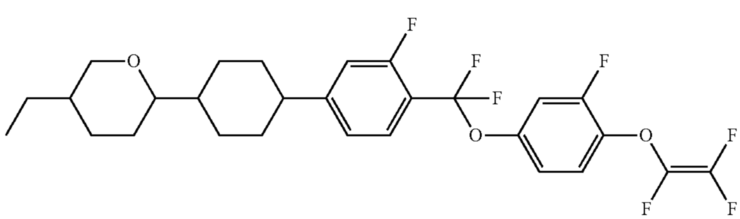 [SMILES: CCC1CCC(C2CCC(c3ccc(C(F)(F)Oc4ccc(OC(F)=C(F)F)c(F)c4)c(F)c3)CC2)OC1] |
| 556 | 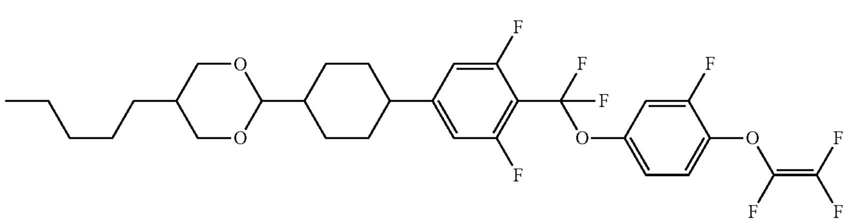 |

-continued
| No. | Formula 76 |
|---|---|
| 557 | 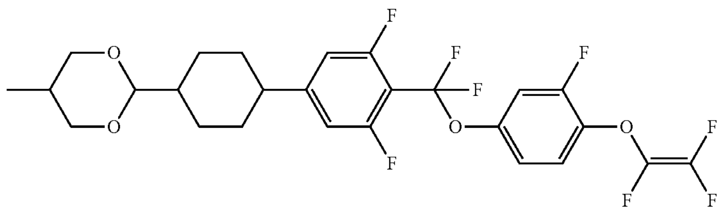 |
| 558 | 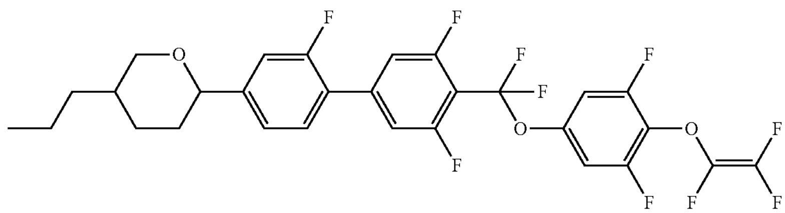 [SMILES: CCCC1CCC(c2ccc(-c3cc(F)c(C(F)(F)Oc4cc(F)c(OC(F)=C(F)F)c(F)c4)c(F)c3)c(F)c2)OC1] |
| 559 | 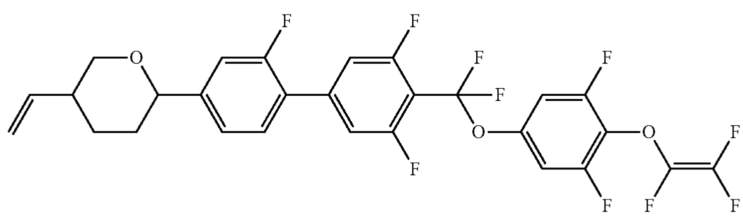 [SMILES: C=CC1CCC(c2ccc(-c3cc(F)c(C(F)(F)Oc4cc(F)c(OC(F)=C(F)F)c(F)c4)c(F)c3)c(F)c2)OC1] |
| 560 | 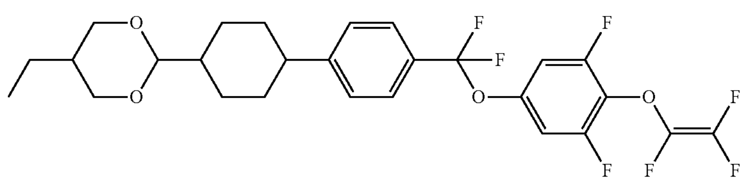 |
| 561 | 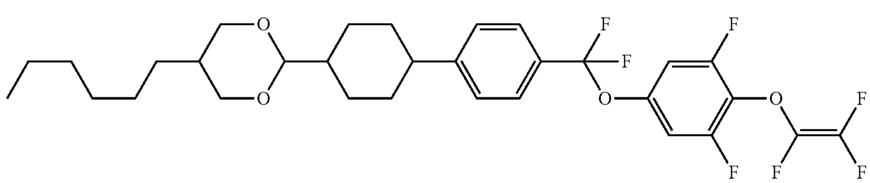 [SMILES: CCCCCCC1COC(C2CCC(c3ccc(C(F)(F)Oc4cc(F)c(OC(F)=C(F)F)c(F)c4)cc3)CC2)OC1] |
| 562 | 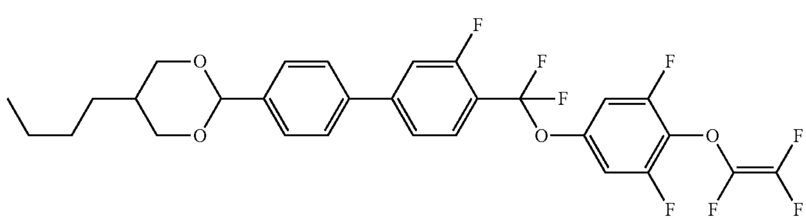 [SMILES: CCCCC1COC(c2ccc(-c3ccc(C(F)(F)Oc4cc(F)c(OC(F)=C(F)F)c(F)c4)c(F)c3)cc2)OC1] |
| 563 | 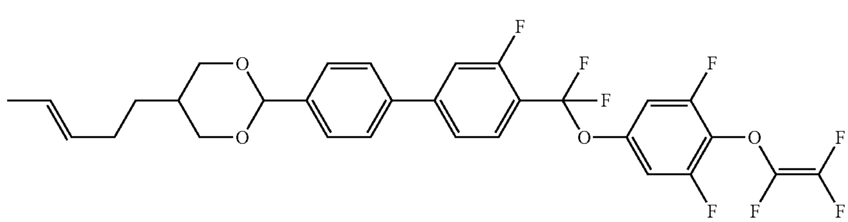 [SMILES: C/C=C/CCC1COC(c2ccc(-c3ccc(C(F)(F)Oc4cc(F)c(OC(F)=C(F)F)c(F)c4)c(F)c3)cc2)OC1] |

-continued
Formula 76
No.
564
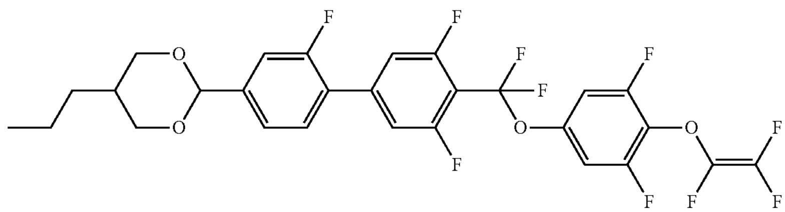 [SMILES: CCCC1COC(c2ccc(-c3cc(F)c(C(F)(F)Oc4cc(F)c(OC(F)=C(F)F)c(F)c4)c(F)c3)c(F)c2)OC1]
565
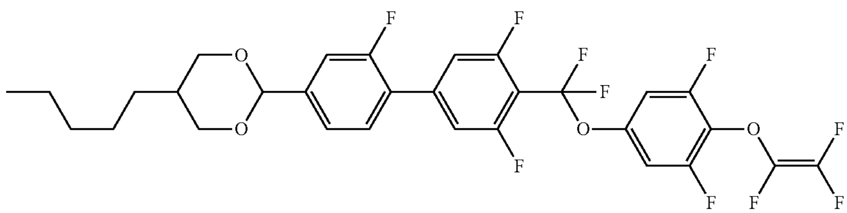 [SMILES: CCCCCC1COC(c2ccc(-c3cc(F)c(C(F)(F)Oc4cc(F)c(OC(F)=C(F)F)c(F)c4)c(F)c3)c(F)c2)OC1]
566
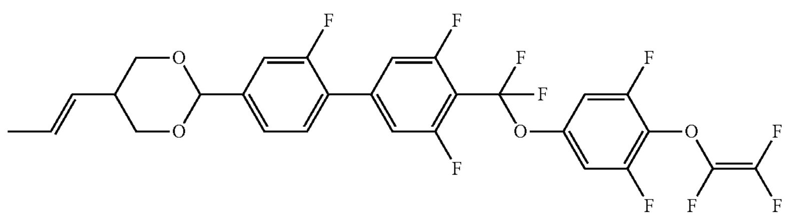 [SMILES: C/C=C/C1COC(c2ccc(-c3cc(F)c(C(F)(F)Oc4cc(F)c(OC(F)=C(F)F)c(F)c4)c(F)c3)c(F)c2)OC1]
567
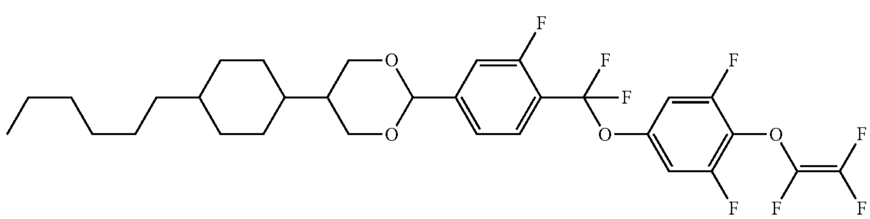 [SMILES: CCCCCCC1CCC(C2COC(c3ccc(C(F)(F)Oc4cc(F)c(OC(F)=C(F)F)c(F)c4)c(F)c3)OC2)CC1]
568
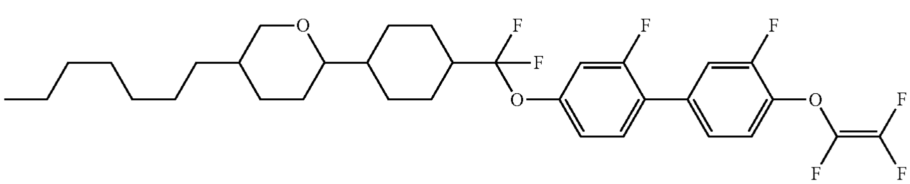 [SMILES: CCCCCCCC1CCC(C2CCC(C(F)(F)Oc3ccc(-c4ccc(OC(F)=C(F)F)c(F)c4)c(F)c3)CC2)OC1]
569
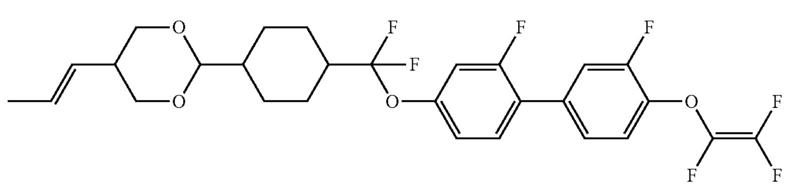 [SMILES: C/C=C/C1COC(C2CCC(C(F)(F)Oc3ccc(-c4ccc(OC(F)=C(F)F)c(F)c4)c(F)c3)CC2)OC1]
570
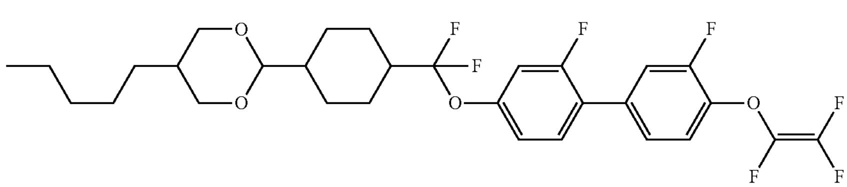

-continued
| Formula 76 | |
|---|---|
| No. | |
| 571 | 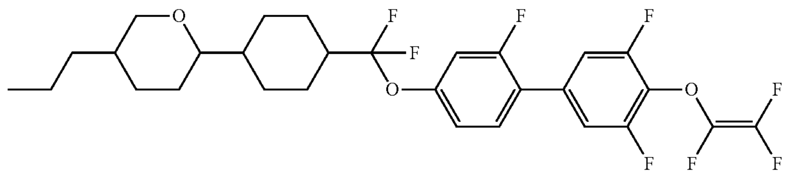 [SMILES: CCCC1COC(C2CCC(C(F)(F)Oc3ccc(-c4cc(F)c(OC(F)=C(F)F)c(F)c4)c(F)c3)CC2)OC1] |
| 572 | 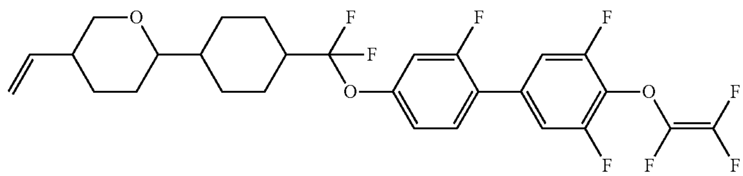 |
| 573 | 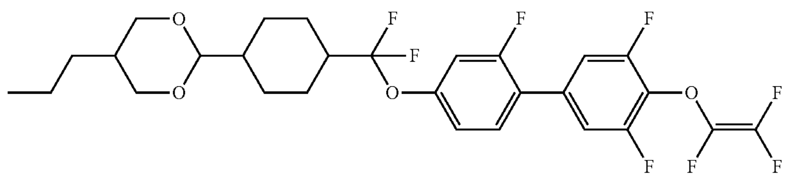 |
| 574 | 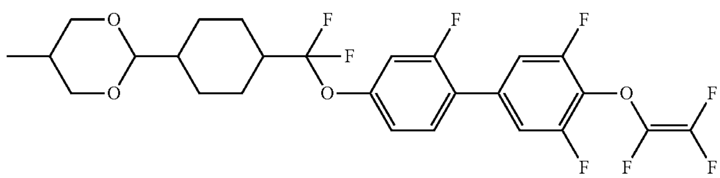 [SMILES: CC1COC(C2CCC(C(F)(F)Oc3ccc(-c4cc(F)c(OC(F)=C(F)F)c(F)c4)c(F)c3)CC2)OC1] |
| 575 | 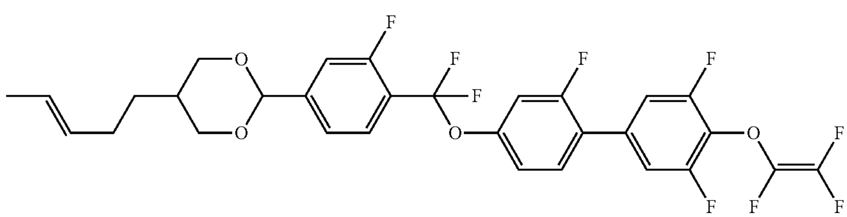 [SMILES: C/C=C/CCC1COC(c2ccc(C(F)(F)Oc3ccc(-c4cc(F)c(OC(F)=C(F)F)c(F)c4)c(F)c3)c(F)c2)OC1] |
| 576 | 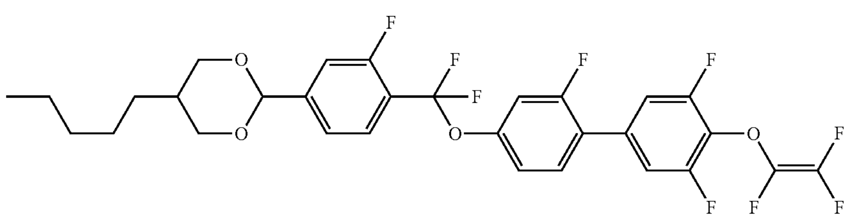 [SMILES: CCCCCC1COC(c2ccc(C(F)(F)Oc3ccc(-c4cc(F)c(OC(F)=C(F)F)c(F)c4)c(F)c3)c(F)c2)OC1] |
| Formula 77 | |
|---|---|
| No. | |
| 577 | 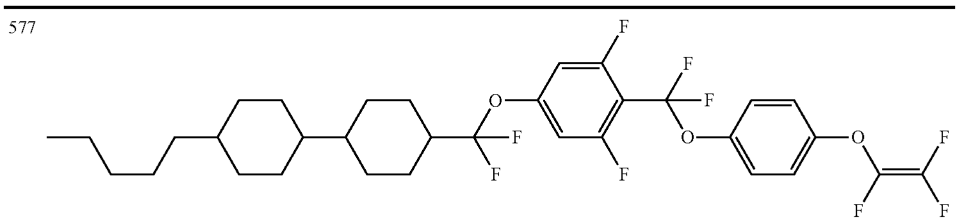 |

-continued
| Formula 77 | |
|---|---|
| No. | |
| 578 | 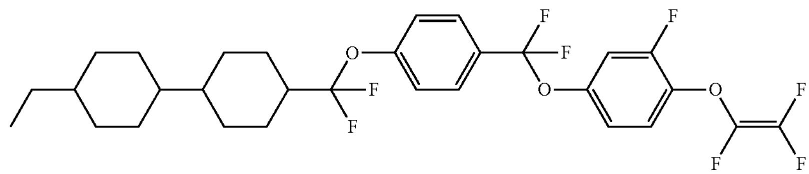 [SMILES: CCC1CCC(C2CCC(C(F)(F)Oc3ccc(C(F)(F)Oc4ccc(OC(F)=C(F)F)c(F)c4)cc3)CC2)CC1] |
| 579 | 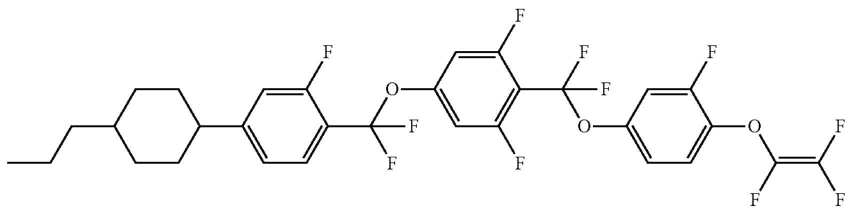 |
| 580 | 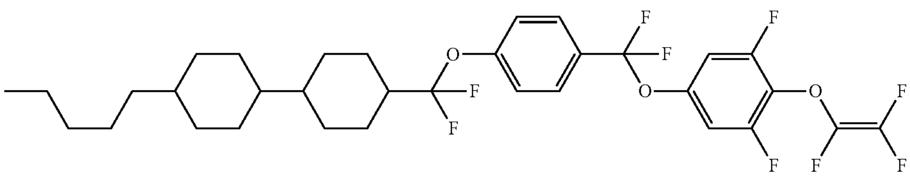 [SMILES: CCCCCC1CCC(C2CCC(C(F)(F)Oc3ccc(C(F)(F)Oc4cc(F)c(OC(F)=C(F)F)c(F)c4)cc3)CC2)CC1] |
| 581 | 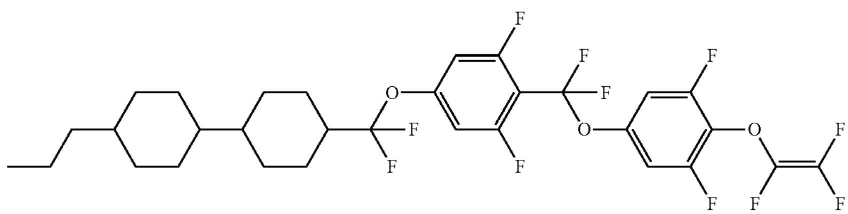 |
| 582 | 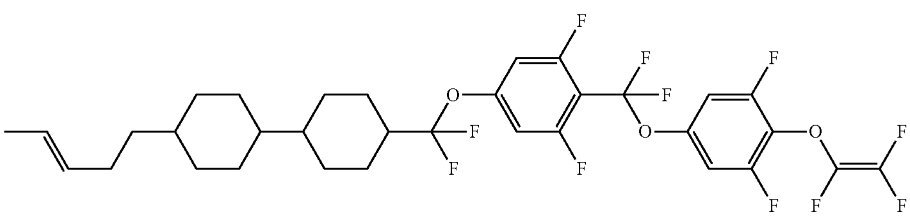 |
| 583 | 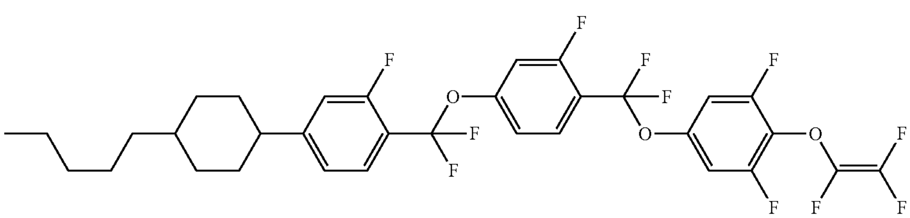 |
| 584 | 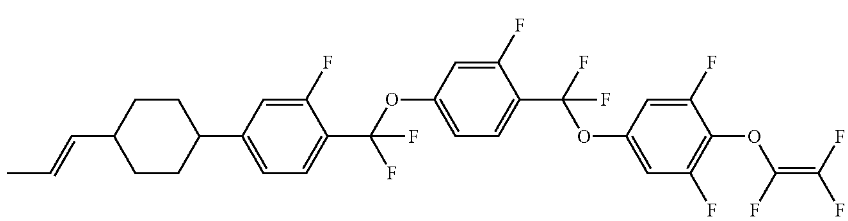 |

-continued
| Formula 77 |
| --- |
| No. |
585
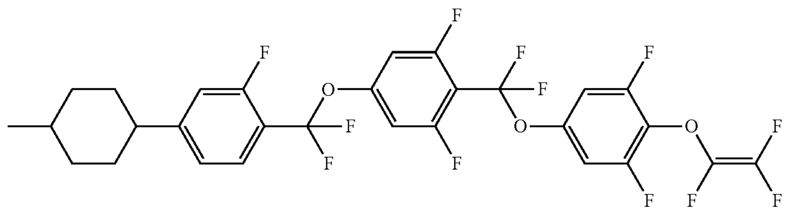 [SMILES: CC1CCC(c2ccc(C(F)(F)Oc3cc(F)c(C(F)(F)Oc4cc(F)c(OC(F)=C(F)F)c(F)c4)c(F)c3)c(F)c2)CC1]
586
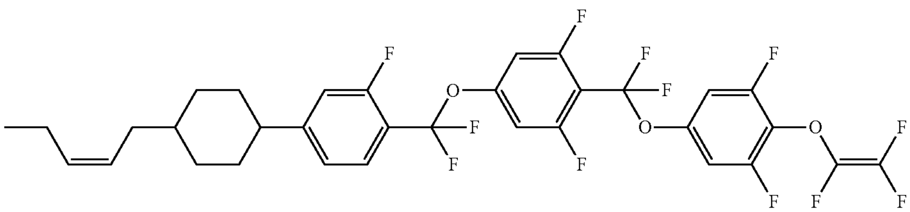
587
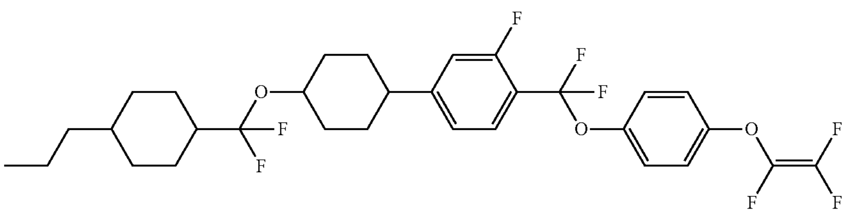 [SMILES: CCCC1CCC(C(F)(F)OC2CCC(c3ccc(C(F)(F)Oc4ccc(OC(F)=C(F)F)cc4)c(F)c3)CC2)CC1]
588
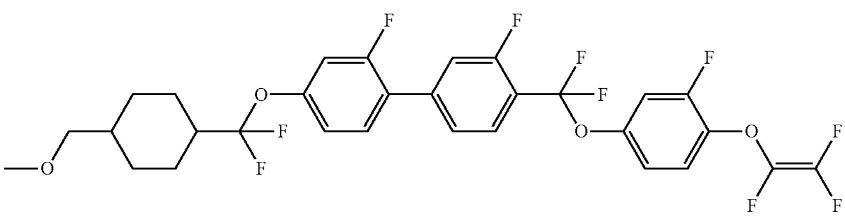 [SMILES: COCC1CCC(C(F)(F)Oc2ccc(-c3ccc(C(F)(F)Oc4ccc(OC(F)=C(F)F)c(F)c4)c(F)c3)c(F)c2)CC1]
589
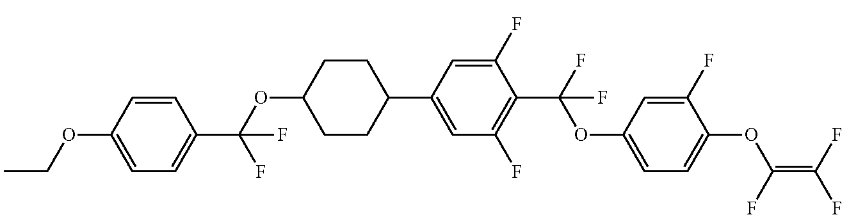 [SMILES: CCOc1ccc(C(F)(F)OC2CCC(c3cc(F)c(C(F)(F)Oc4ccc(OC(F)=C(F)F)c(F)c4)c(F)c3)CC2)cc1]
590
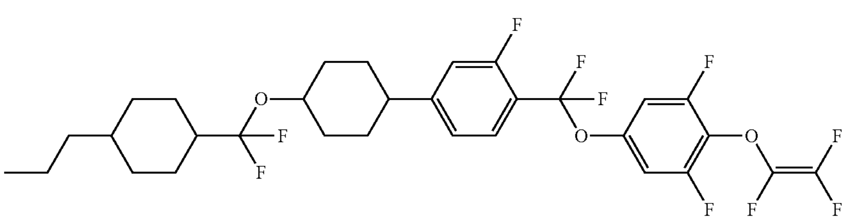
591
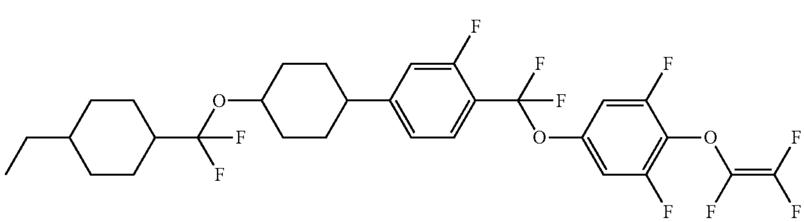

-continued
Formula 77
No.
592
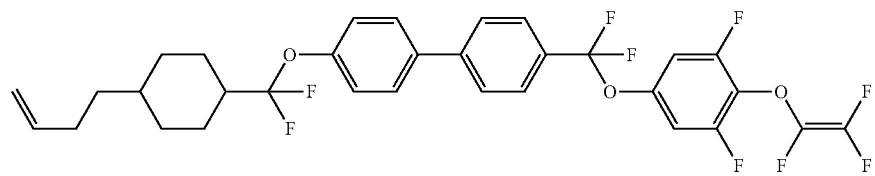 [SMILES: C=CCCC1CCC(C(F)(F)Oc2ccc(-c3ccc(C(F)(F)Oc4cc(F)c(OC(F)=C(F)F)c(F)c4)cc3)cc2)CC1]
593
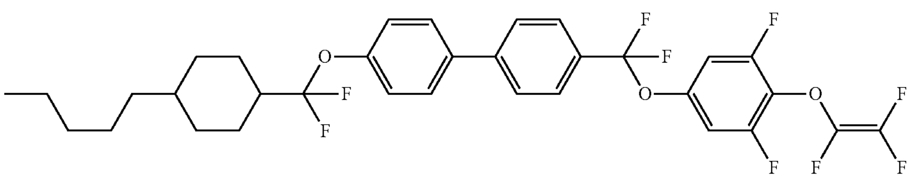 [SMILES: CCCCCC1CCC(C(F)(F)Oc2ccc(-c3ccc(C(F)(F)Oc4cc(F)c(OC(F)=C(F)F)c(F)c4)cc3)cc2)CC1]
594
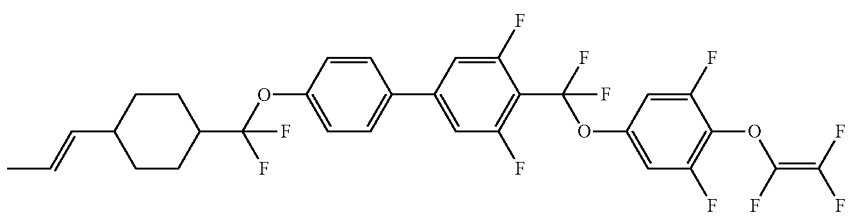
595
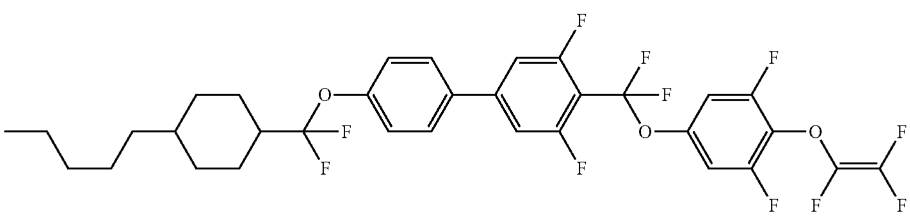 [SMILES: CCCCCC1CCC(C(F)(F)Oc2ccc(-c3cc(F)c(C(F)(F)Oc4cc(F)c(OC(F)=C(F)F)c(F)c4)c(F)c3)cc2)CC1]
596
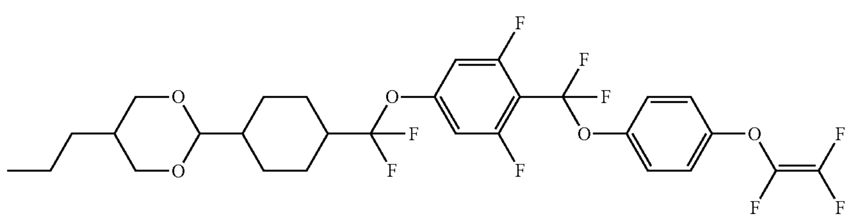 [SMILES: CCCC1COC(C2CCC(C(F)(F)Oc3cc(F)c(C(F)(F)Oc4ccc(OC(F)=C(F)F)cc4)c(F)c3)CC2)OC1]
597
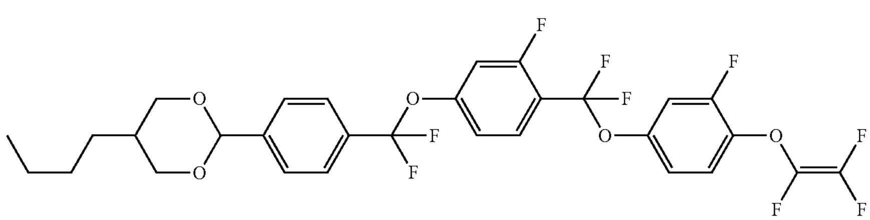 [SMILES: CCCCC1COC(c2ccc(C(F)(F)Oc3ccc(C(F)(F)Oc4ccc(OC(F)=C(F)F)c(F)c4)c(F)c3)cc2)OC1]
598
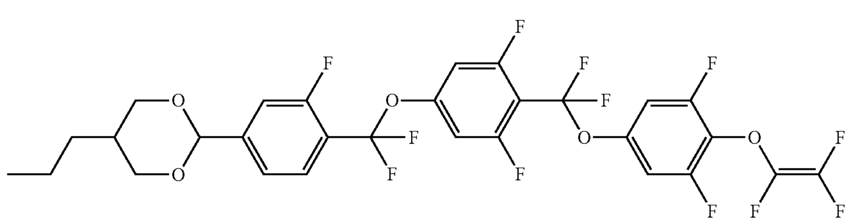 [SMILES: CCCC1COC(c2ccc(C(F)(F)Oc3cc(F)c(C(F)(F)Oc4cc(F)c(OC(F)=C(F)F)c(F)c4)c(F)c3)c(F)c2)OC1]

-continued
| Formula 77 |
| --- |
| No. | |
| --- | --- |
| 599 | 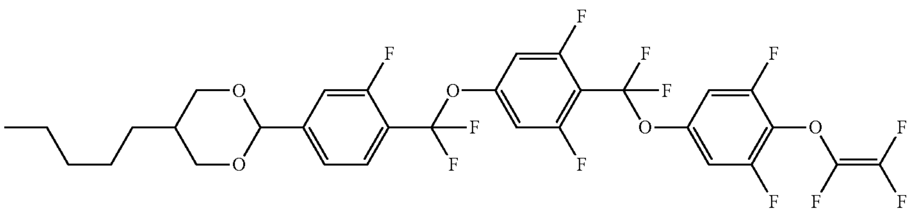 [SMILES: CCCCCC1COC(c2ccc(C(F)(F)Oc3cc(F)c(C(F)(F)Oc4cc(F)c(OC(F)=C(F)F)c(F)c4)c(F)c3)c(F)c2)OC1] |
| 600 | 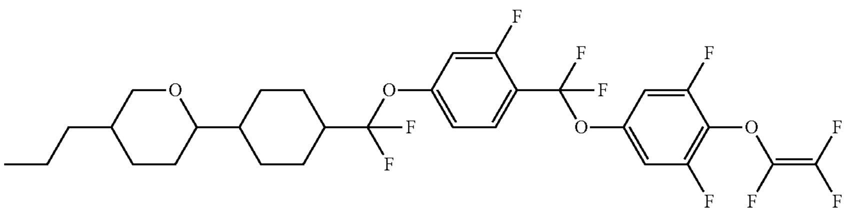 [SMILES: CCCC1CCC(C2CCC(C(F)(F)Oc3ccc(C(F)(F)Oc4cc(F)c(OC(F)=C(F)F)c(F)c4)c(F)c3)CC2)OC1] |
| Formula 78 |
| --- |
| No. | |
| --- | --- |
| 601 | 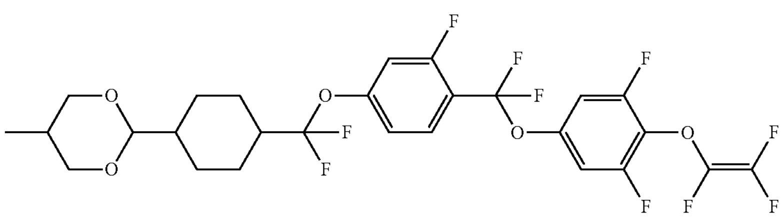 [SMILES: CC1COC(C2CCC(C(F)(F)Oc3ccc(C(F)(F)Oc4cc(F)c(OC(F)=C(F)F)c(F)c4)c(F)c3)CC2)OC1] |
| 602 | 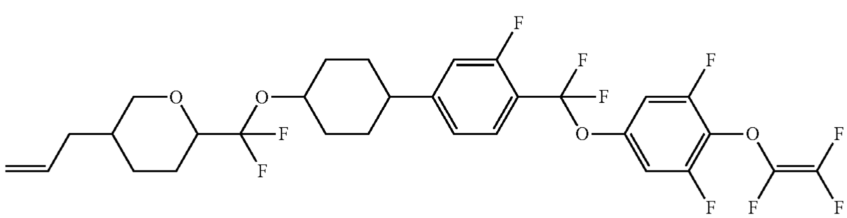 [SMILES: C=CCC1CCC(C(F)(F)OC2CCC(c3ccc(C(F)(F)Oc4cc(F)c(OC(F)=C(F)F)c(F)c4)c(F)c3)CC2)OC1] |
| 603 | 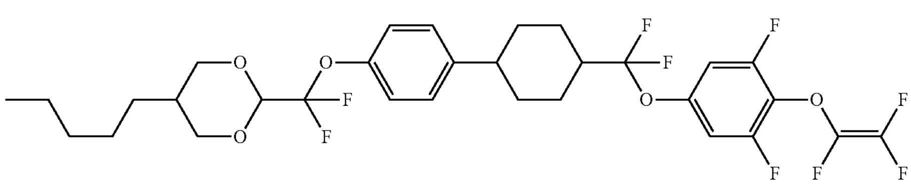 [SMILES: CCCCCC1COC(C(F)(F)Oc2ccc(C3CCC(C(F)(F)Oc4cc(F)c(OC(F)=C(F)F)c(F)c4)CC3)cc2)OC1] |
| 604 | 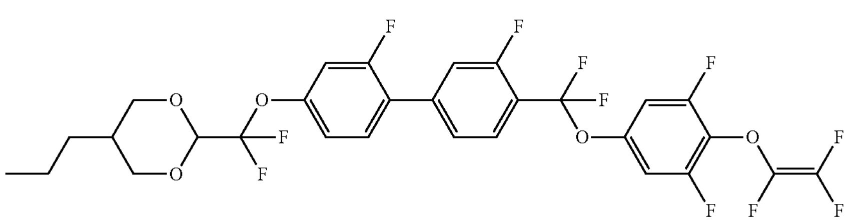 [SMILES: CCCC1COC(C(F)(F)Oc2ccc(-c3ccc(C(F)(F)Oc4cc(F)c(OC(F)=C(F)F)c(F)c4)c(F)c3)c(F)c2)OC1] |

-continued
| Formula 78 |
|---|
| No. |
| 605 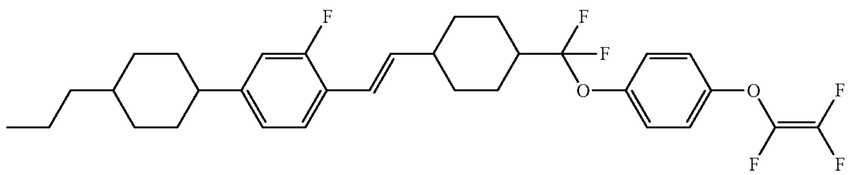 [SMILES: CCCC1CCC(c2ccc(/C=C/C3CCC(C(F)(F)Oc4ccc(OC(F)=C(F)F)cc4)CC3)c(F)c2)CC1] |
| 606 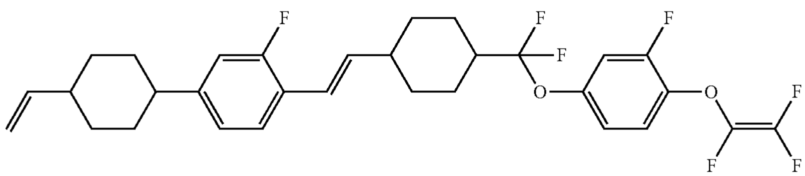 [SMILES: C=CC1CCC(c2ccc(/C=C/C3CCC(C(F)(F)Oc4ccc(OC(F)=C(F)F)c(F)c4)CC3)c(F)c2)CC1] |
| 607 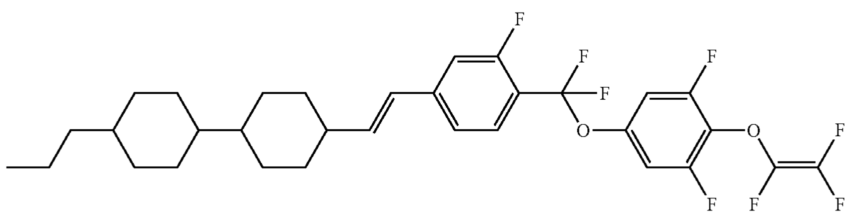 |
| 608 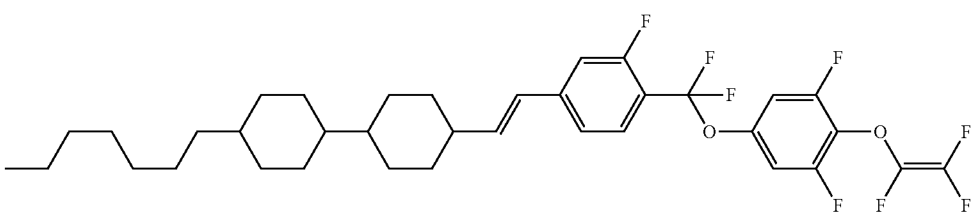 [SMILES: CCCCCCCC1CCC(C2CCC(/C=C/c3ccc(C(F)(F)Oc4cc(F)c(OC(F)=C(F)F)c(F)c4)c(F)c3)CC2)CC1] |
| 609 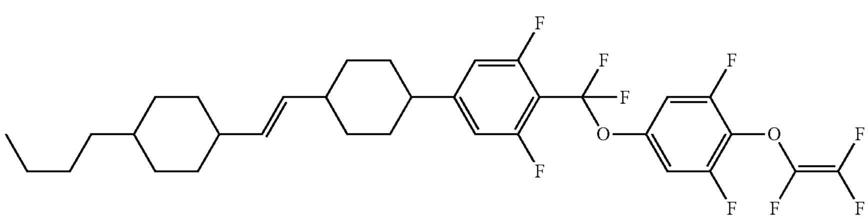 [SMILES: CCCCC1CCC(/C=C/C2CCC(c3cc(F)c(C(F)(F)Oc4cc(F)c(OC(F)=C(F)F)c(F)c4)c(F)c3)CC2)CC1] |
| 610 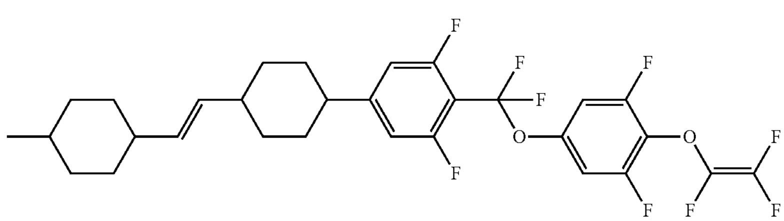 [SMILES: CC1CCC(/C=C/C2CCC(c3cc(F)c(C(F)(F)Oc4cc(F)c(OC(F)=C(F)F)c(F)c4)c(F)c3)CC2)CC1] |
| 611 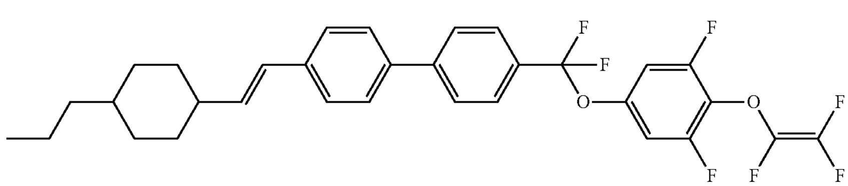 |

-continued
| Formula 78 | |
|---|---|
| No. | |
| 612 | 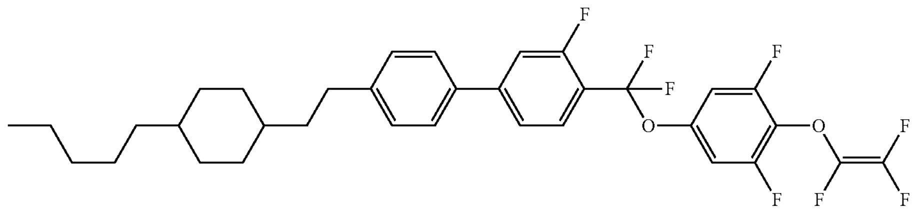 [SMILES: CCCCCC1CCC(CCc2ccc(-c3ccc(C(F)(F)Oc4cc(F)c(OC(F)=C(F)F)c(F)c4)c(F)c3)cc2)CC1] |
| 613 | 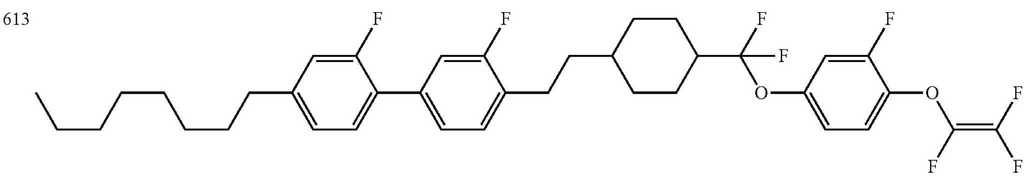 |
| 614 | 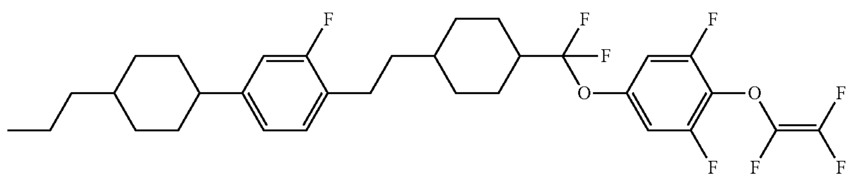 [SMILES: CCCC1CCC(c2ccc(CCC3CCC(C(F)(F)Oc4cc(F)c(OC(F)=C(F)F)c(F)c4)CC3)c(F)c2)CC1] |
| 615 | 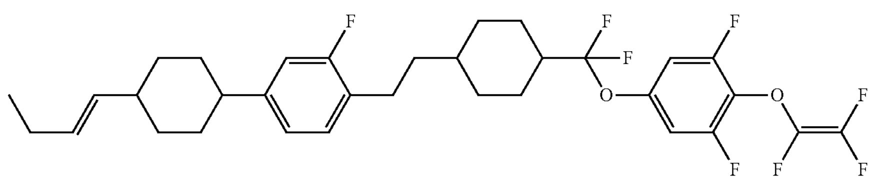 [SMILES: CC/C=C/C1CCC(c2ccc(CCC3CCC(C(F)(F)Oc4cc(F)c(OC(F)=C(F)F)c(F)c4)CC3)c(F)c2)CC1] |
| 616 | 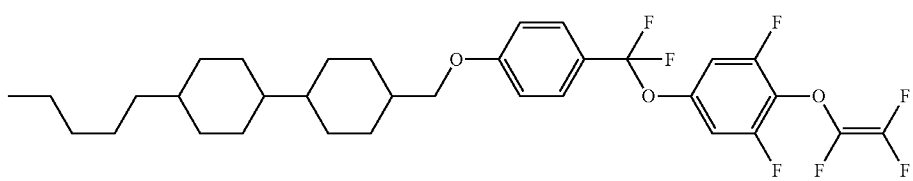 [SMILES: CCCCCC1CCC(C2CCC(COc3ccc(C(F)(F)Oc4cc(F)c(OC(F)=C(F)F)c(F)c4)cc3)CC2)CC1] |
| 617 | 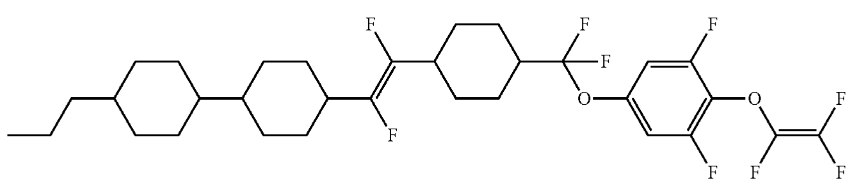 |
| 618 | 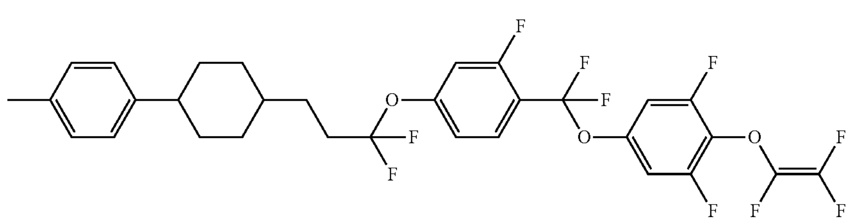 [SMILES: Cc1ccc(C2CCC(CCC(F)(F)Oc3ccc(C(F)(F)Oc4cc(F)c(OC(F)=C(F)F)c(F)c4)c(F)c3)CC2)cc1] |
| 619 | 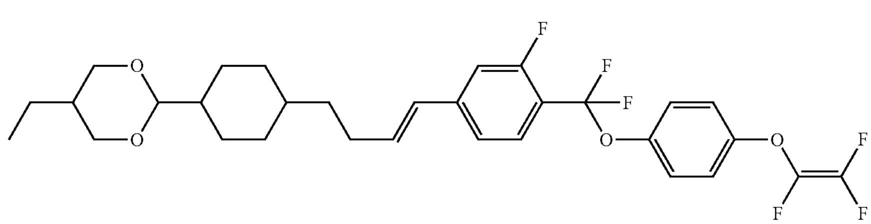 [SMILES: CCC1COC(C2CCC(CC/C=C/c3ccc(C(F)(F)Oc4ccc(OC(F)=C(F)F)cc4)c(F)c3)CC2)OC1] |

-continued
| Formula 78 |
| --- |
| No. |
620 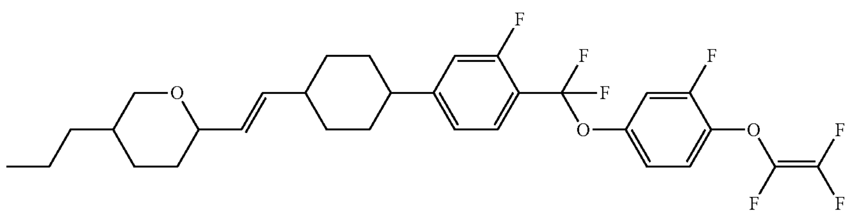 [SMILES: CCCC1CCC(/C=C/C2CCC(c3ccc(C(F)(F)Oc4ccc(OC(F)=C(F)F)c(F)c4)c(F)c3)CC2)OC1]
621 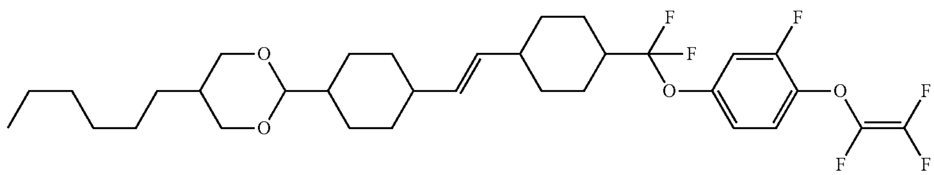 [SMILES: CCCCCCC1COC(C2CCC(/C=C/C3CCC(C(F)(F)Oc4ccc(OC(F)=C(F)F)c(F)c4)CC3)CC2)OC1]
622 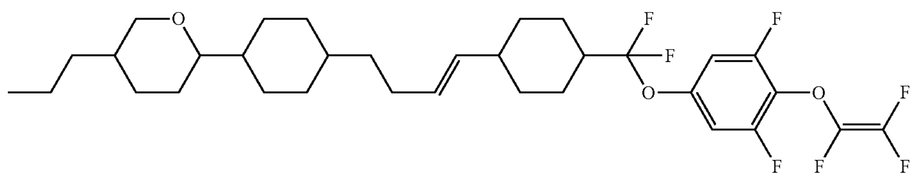 [SMILES: CCCC1CCC(C2CCC(CC/C=C/C3CCC(C(F)(F)Oc4cc(F)c(OC(F)=C(F)F)c(F)c4)CC3)CC2)OC1]
623 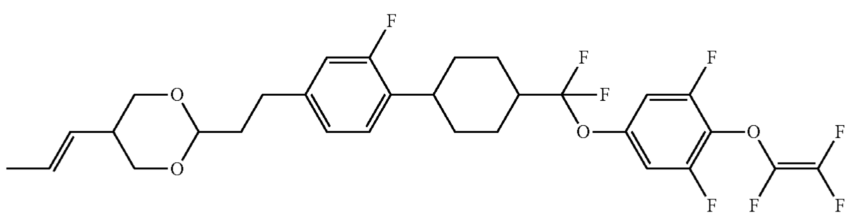 [SMILES: C/C=C/C1COC(CCc2ccc(C3CCC(C(F)(F)Oc4cc(F)c(OC(F)=C(F)F)c(F)c4)CC3)c(F)c2)OC1]
624 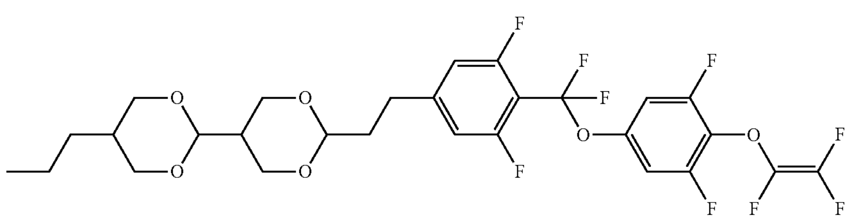
| Formula 79 |
| --- |
| No. |
625 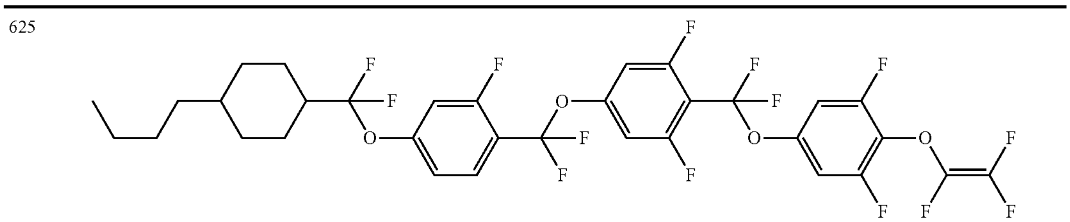

-continued
| Formula 79 |
| --- |
| No. |
| 626 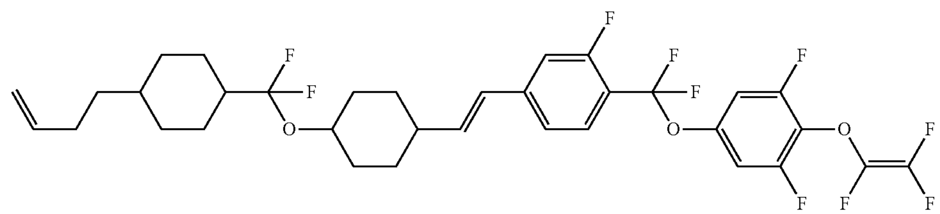 |
| 627 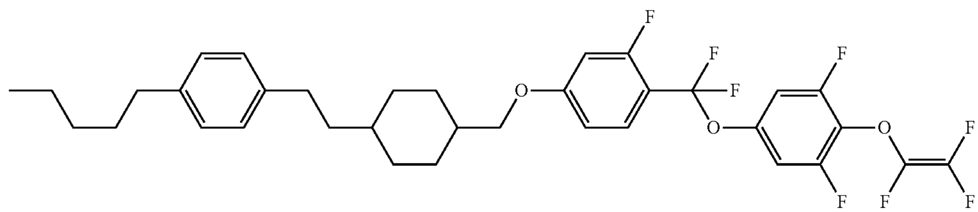 |
| 628 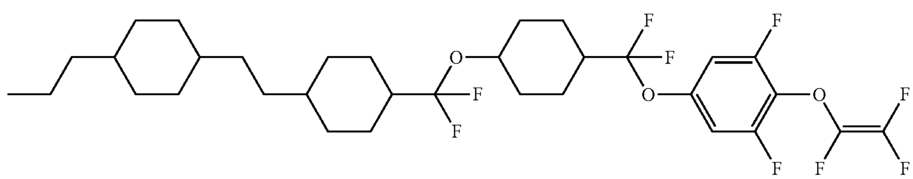 |
| 629 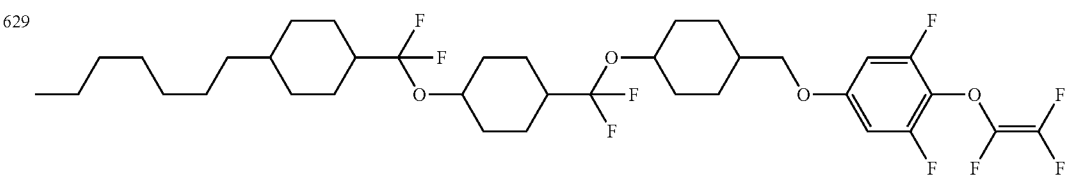 |
| 630 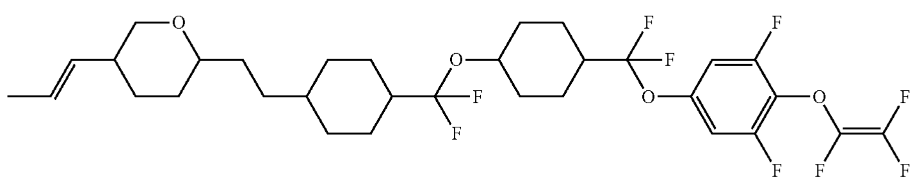 |
| 631 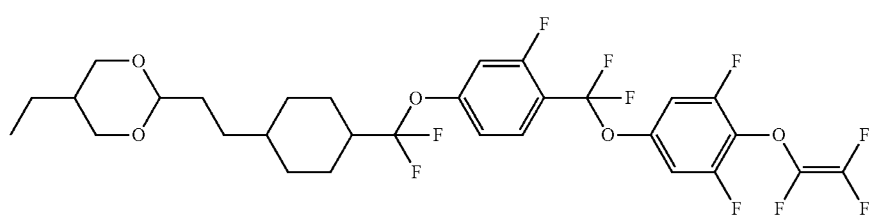 [SMILES: CCC1COC(CCC2CCC(C(F)(F)Oc3ccc(C(F)(F)Oc4cc(F)c(OC(F)=C(F)F)c(F)c4)c(F)c3)CC2)OC1] |
| 632 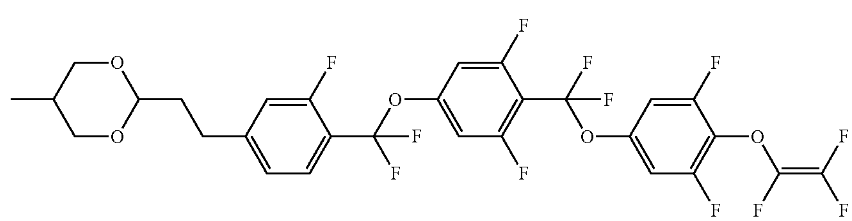 [SMILES: CC1COC(CCc2ccc(C(F)(F)Oc3cc(F)c(C(F)(F)Oc4cc(F)c(OC(F)=C(F)F)c(F)c4)c(F)c3)c(F)c2)OC1] |

-continued
| Formula 79 | |
|---|---|
| No. | |
| 633 | 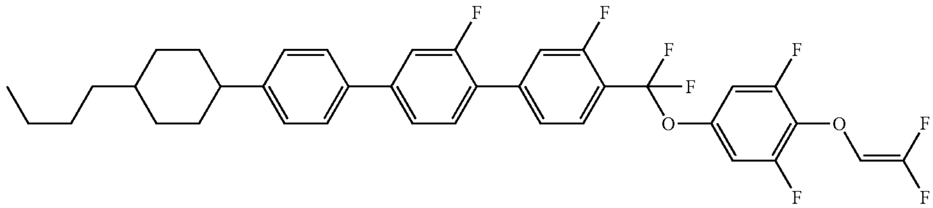 [SMILES: CCCCC1CCC(c2ccc(-c3ccc(-c4ccc(C(F)(F)Oc5cc(F)c(OC=C(F)F)c(F)c5)c(F)c4)c(F)c3)cc2)CC1] |
| 634 | 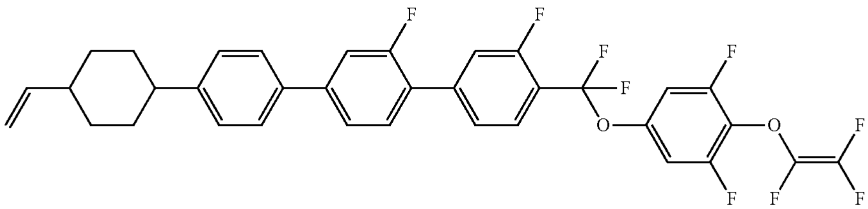 [SMILES: C=CC1CCC(c2ccc(-c3ccc(-c4ccc(C(F)(F)Oc5cc(F)c(OC(F)=C(F)F)c(F)c5)c(F)c4)c(F)c3)cc2)CC1] |
| 635 | 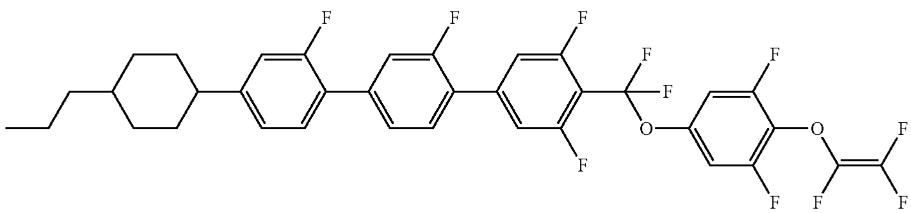 [SMILES: CCCC1CCC(c2ccc(-c3ccc(-c4cc(F)c(C(F)(F)Oc5cc(F)c(OC(F)=C(F)F)c(F)c5)c(F)c4)c(F)c3)c(F)c2)CC1] |
| 636 | 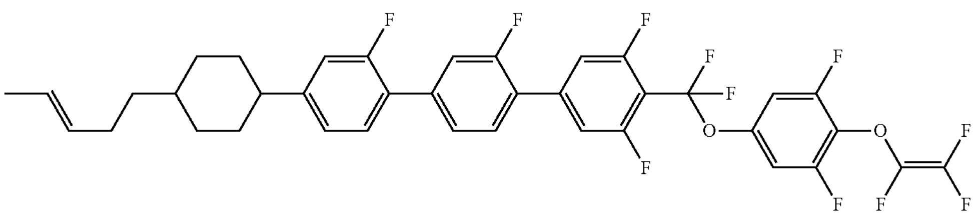 [SMILES: C/C=C/CCC1CCC(c2ccc(-c3ccc(-c4cc(F)c(C(F)(F)Oc5cc(F)c(OC(F)=C(F)F)c(F)c5)c(F)c4)c(F)c3)c(F)c2)CC1] |
| 637 | 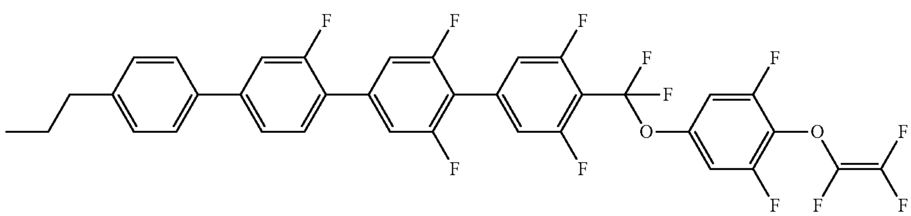 [SMILES: CCCc1ccc(-c2ccc(-c3cc(F)c(-c4cc(F)c(C(F)(F)Oc5cc(F)c(OC(F)=C(F)F)c(F)c5)c(F)c4)c(F)c3)c(F)c2)cc1] |
| 638 | 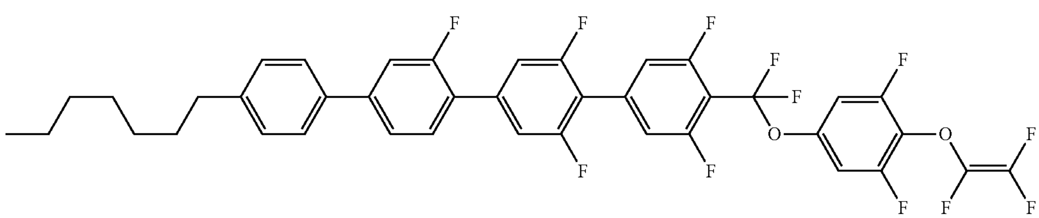 [SMILES: CCCCCCCc1ccc(-c2ccc(-c3cc(F)c(-c4cc(F)c(C(F)(F)Oc5cc(F)c(OC(F)=C(F)F)c(F)c5)c(F)c4)c(F)c3)c(F)c2)cc1] |
| 639 | 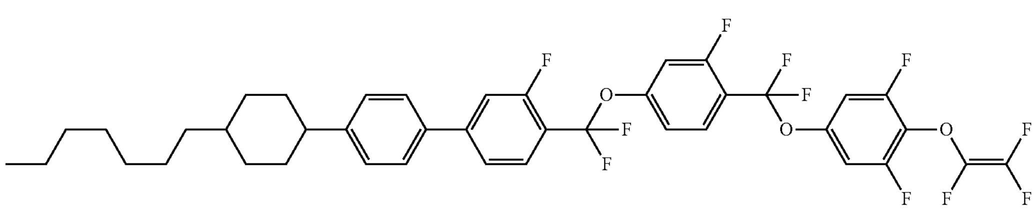 [SMILES: CCCCCCCC1CCC(c2ccc(-c3ccc(C(F)(F)Oc4ccc(C(F)(F)Oc5cc(F)c(OC(F)=C(F)F)c(F)c5)c(F)c4)c(F)c3)cc2)CC1] |

-continued
| Formula 79 |
| --- |
No.
640
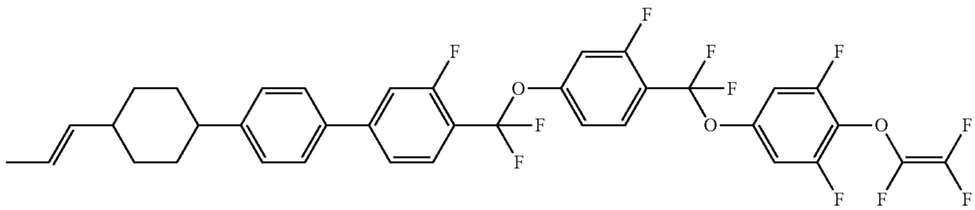 [SMILES: C/C=C/C1CCC(c2ccc(-c3ccc(C(F)(F)Oc4ccc(C(F)(F)Oc5cc(F)c(OC(F)=C(F)F)c(F)c5)c(F)c4)c(F)c3)cc2)CC1]
641
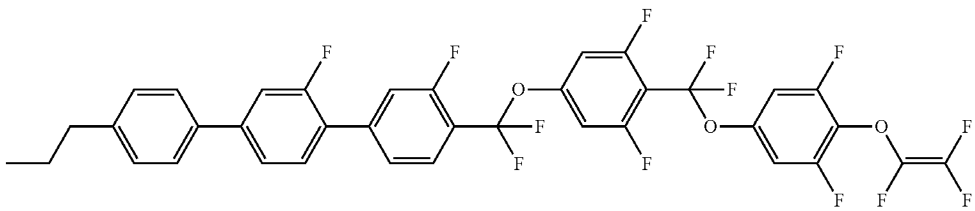
642
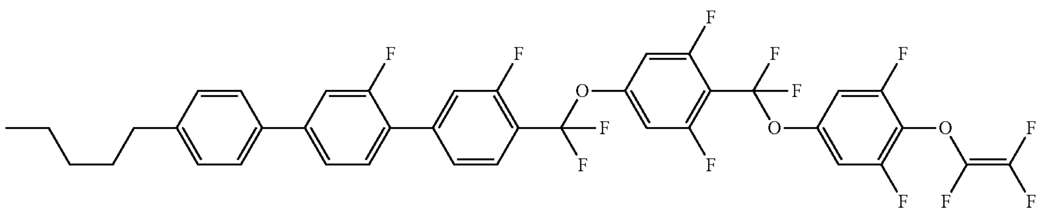 [SMILES: CCCCCc1ccc(-c2ccc(-c3ccc(C(F)(F)Oc4cc(F)c(C(F)(F)Oc5cc(F)c(OC(F)=C(F)F)c(F)c5)c(F)c4)c(F)c3)c(F)c2)cc1]
643
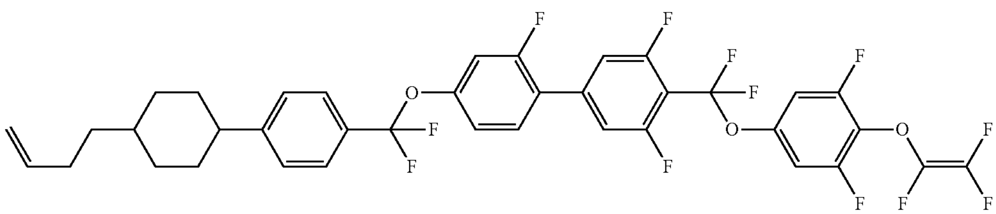
644
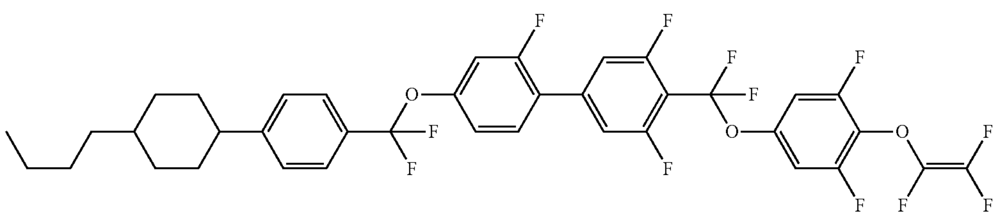
645
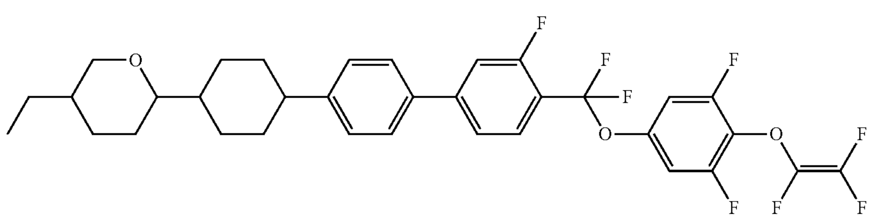 [SMILES: CCC1CCC(C2CCC(c3ccc(-c4ccc(C(F)(F)Oc5cc(F)c(OC(F)=C(F)F)c(F)c5)c(F)c4)cc3)CC2)OC1]
646
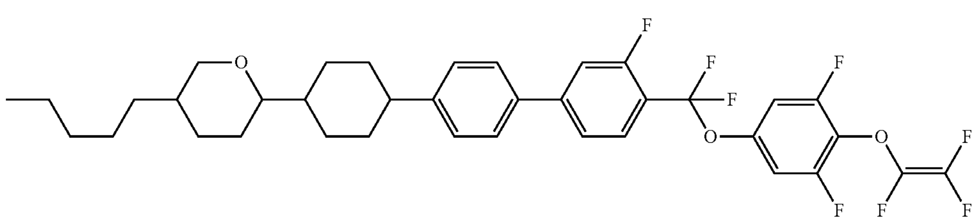 [SMILES: CCCCCC1CCC(C2CCC(c3ccc(-c4ccc(C(F)(F)Oc5cc(F)c(OC(F)=C(F)F)c(F)c5)c(F)c4)cc3)CC2)OC1]

-continued
| Formula 79 | |
|---|---|
| No. | |
| 647 | 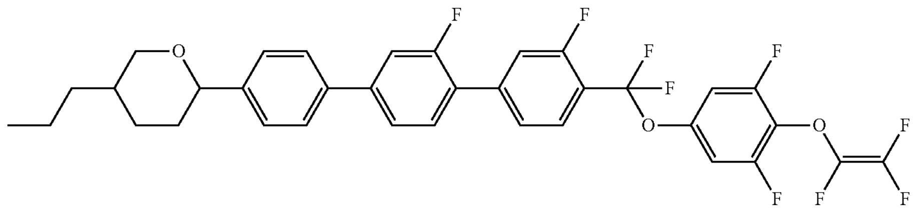 [SMILES: CCCC1CCC(c2ccc(-c3ccc(-c4ccc(C(F)(F)Oc5cc(F)c(OC(F)=C(F)F)c(F)c5)c(F)c4)c(F)c3)cc2)OC1] |
| 648 | 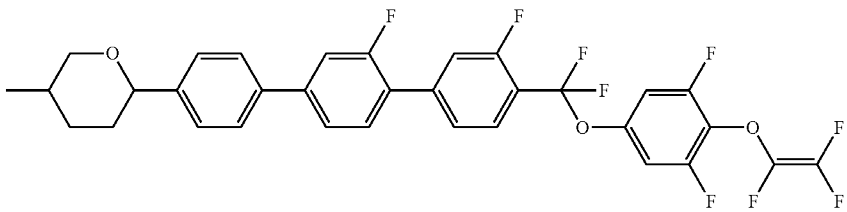 [SMILES: CC1CCC(c2ccc(-c3ccc(-c4ccc(C(F)(F)Oc5cc(F)c(OC(F)=C(F)F)c(F)c5)c(F)c4)c(F)c3)cc2)OC1] |
| Formula 80 | |
|---|---|
| No. | |
| 649 | 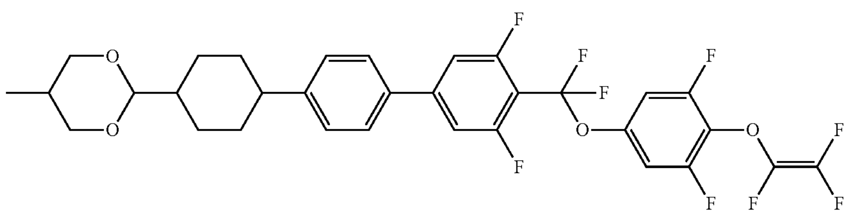 [SMILES: CC1COC(C2CCC(c3ccc(-c4cc(F)c(C(F)(F)Oc5cc(F)c(OC(F)=C(F)F)c(F)c5)c(F)c4)cc3)CC2)OC1] |
| 650 | 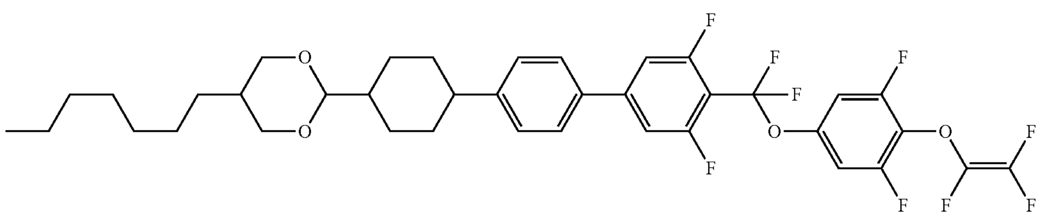 [SMILES: CCCCCCCC1COC(C2CCC(c3ccc(-c4cc(F)c(C(F)(F)Oc5cc(F)c(OC(F)=C(F)F)c(F)c5)c(F)c4)cc3)CC2)OC1] |
| 651 | 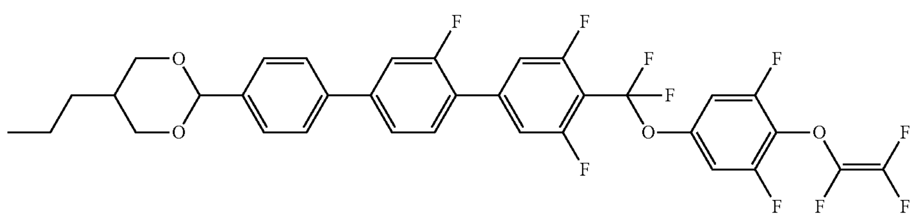 |
| 652 | 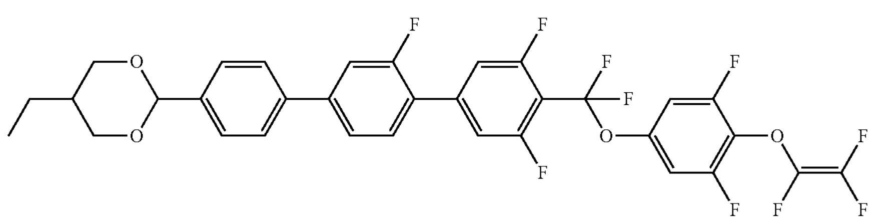 [SMILES: CCC1COC(c2ccc(-c3ccc(-c4cc(F)c(C(F)(F)Oc5cc(F)c(OC(F)=C(F)F)c(F)c5)c(F)c4)c(F)c3)cc2)OC1] |

-continued
| Formula 80 | |
|---|---|
| No. | |
| 653 | 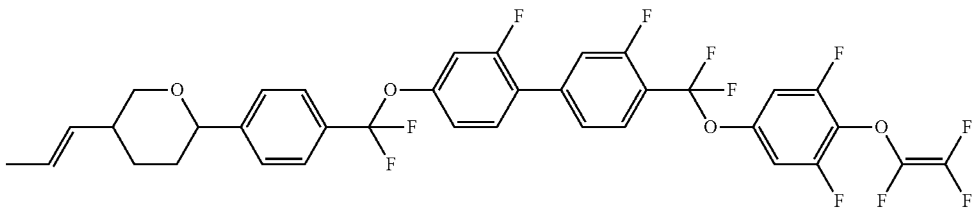 [SMILES: C/C=C/C1CCC(c2ccc(C(F)(F)Oc3ccc(-c4ccc(C(F)(F)Oc5cc(F)c(OC(F)=C(F)F)c(F)c5)c(F)c4)c(F)c3)cc2)OC1] |
| 654 | 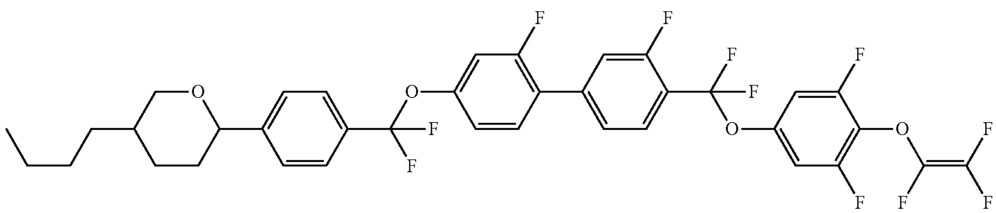 |
| 655 | 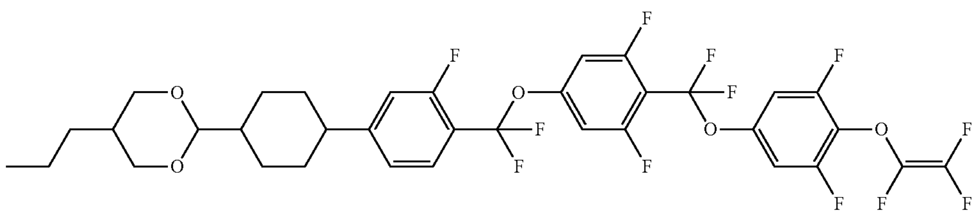 |
| 656 | 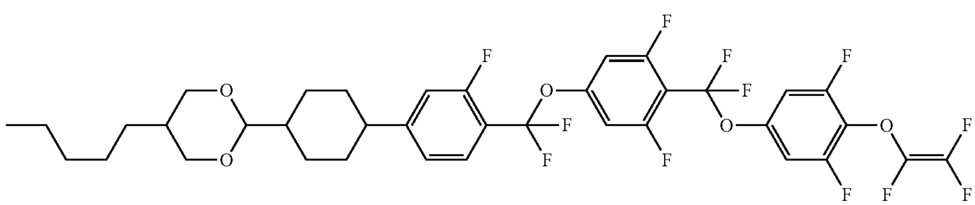 [SMILES: CCCCCC1COC(C2CCC(c3ccc(C(F)(F)Oc4cc(F)c(C(F)(F)Oc5cc(F)c(OC(F)=C(F)F)c(F)c5)c(F)c4)c(F)c3)CC2)OC1] |
| 657 | 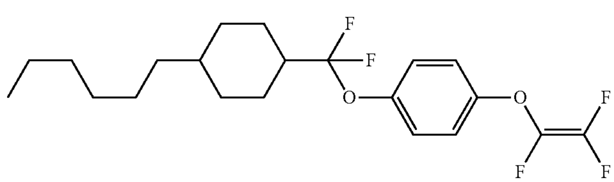 [SMILES: CCCCCCC1CCC(C(F)(F)Oc2ccc(OC(F)=C(F)F)cc2)CC1] |
| 658 | 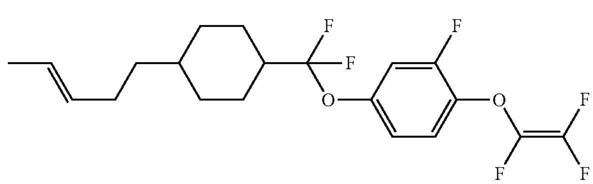 [SMILES: C/C=C/CCC1CCC(C(F)(F)Oc2ccc(OC(F)=C(F)F)c(F)c2)CC1] |
| 659 | 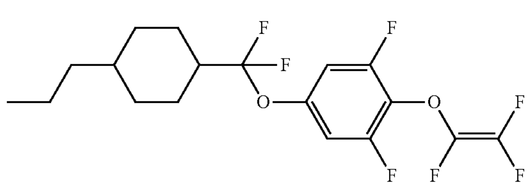 [SMILES: CCCC1CCC(C(F)(F)Oc2cc(F)c(OC(F)=C(F)F)c(F)c2)CC1] |

-continued
| Formula 80 | |
|---|---|
| No. | |
| 660 | 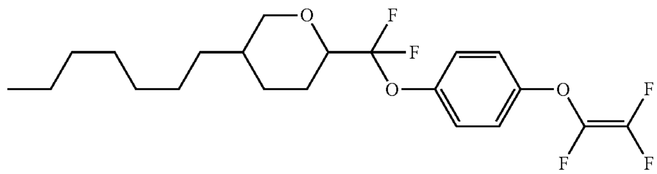 [SMILES: CCCCCCCC1CCC(C(F)(F)Oc2ccc(OC(F)=C(F)F)cc2)OC1] |
| 661 | 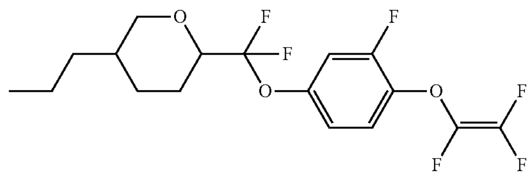 [SMILES: CCCC1CCC(C(F)(F)Oc2ccc(OC(F)=C(F)F)c(F)c2)OC1] |
| 662 | 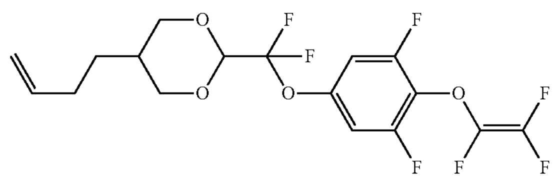 [SMILES: C=CCCC1COC(C(F)(F)Oc2cc(F)c(OC(F)=C(F)F)c(F)c2)OC1] |
| 663 | 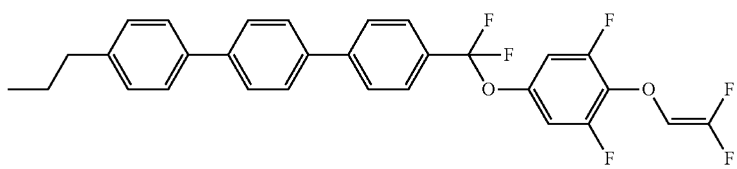 [SMILES: CCCc1ccc(-c2ccc(-c3ccc(C(F)(F)Oc4cc(F)c(OC=C(F)F)c(F)c4)cc3)cc2)cc1] |
| 664 | 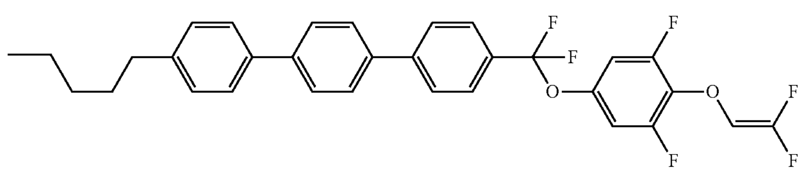 [SMILES: CCCCCc1ccc(-c2ccc(-c3ccc(C(F)(F)Oc4cc(F)c(OC=C(F)F)c(F)c4)cc3)cc2)cc1] |
| 665 | 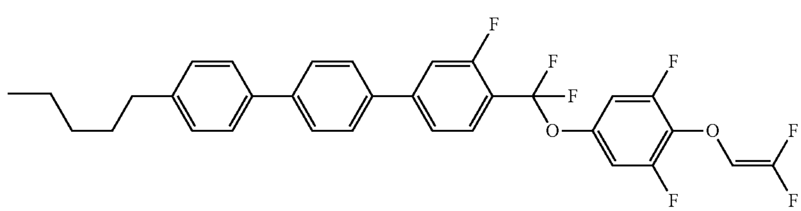 [SMILES: CCCCCc1ccc(-c2ccc(-c3ccc(C(F)(F)Oc4cc(F)c(OC=C(F)F)c(F)c4)cc3)cc2)c(F)c1] |
| 666 | 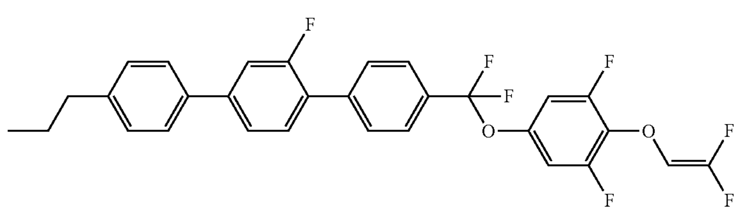 |
| 667 | 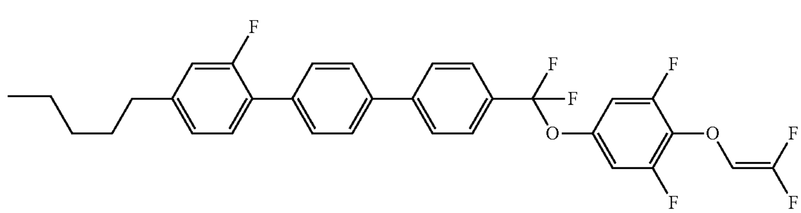 |

-continued
| Formula 80 | |
|---|---|
| No. | |
| 668 | 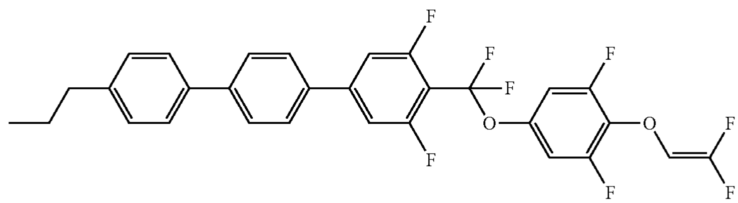 [SMILES: CCCc1ccc(-c2ccc(-c3cc(F)c(C(F)(F)Oc4cc(F)c(OC=C(F)F)c(F)c4)c(F)c3)cc2)cc1] |
| 669 | 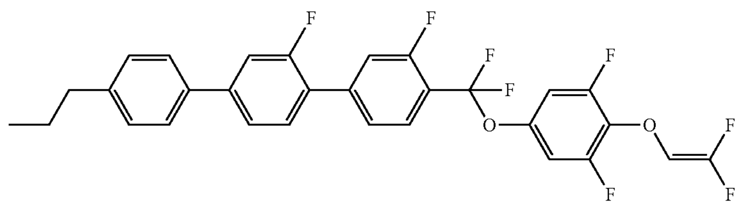 [SMILES: CCCc1ccc(-c2ccc(-c3ccc(C(F)(F)Oc4cc(F)c(OC=C(F)F)c(F)c4)c(F)c3)c(F)c2)cc1] |
| 670 | 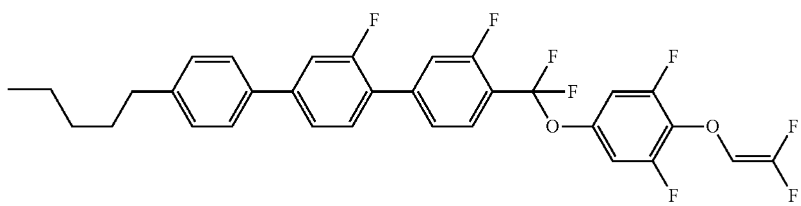 [SMILES: CCCCCc1ccc(-c2ccc(-c3ccc(C(F)(F)Oc4cc(F)c(OC=C(F)F)c(F)c4)c(F)c3)c(F)c2)cc1] |
| 671 | 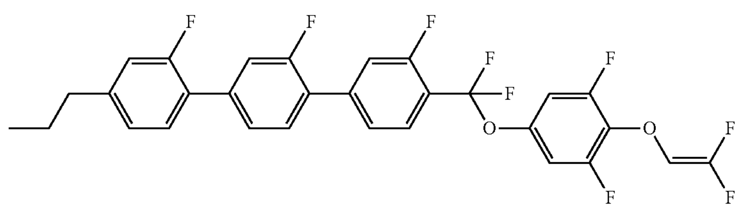 [SMILES: CCCc1ccc(-c2ccc(-c3ccc(C(F)(F)Oc4cc(F)c(OC=C(F)F)c(F)c4)c(F)c3)c(F)c2)c(F)c1] |
| 672 | 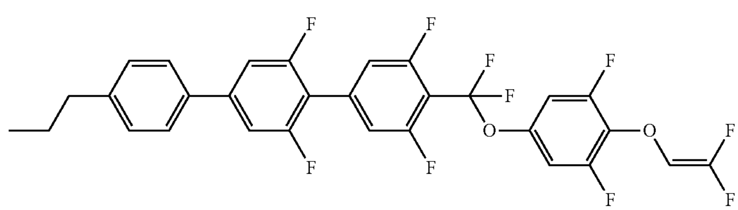 [SMILES: CCCc1ccc(-c2cc(F)c(-c3cc(F)c(C(F)(F)Oc4cc(F)c(OC=C(F)F)c(F)c4)c(F)c3)c(F)c2)cc1] |
| Formula 81 | |
|---|---|
| No. | |
| 673 | 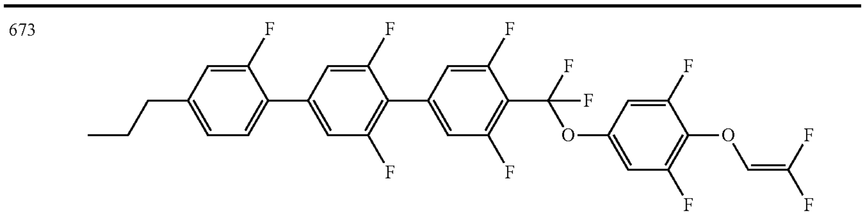 |

-continued
| Formula 81 |
|---|
| No. | |
|---|---|
| 674 | 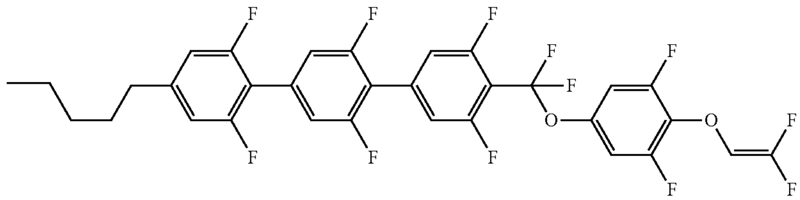 [SMILES: CCCCCc1cc(F)c(-c2cc(F)c(-c3cc(F)c(C(F)(F)Oc4cc(F)c(OC=C(F)F)c(F)c4)c(F)c3)c(F)c2)c(F)c1] |
| 675 | 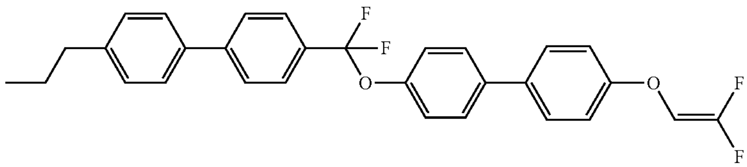 [SMILES: CCCc1ccc(-c2ccc(C(F)(F)Oc3ccc(-c4ccc(OC=C(F)F)cc4)cc3)cc2)cc1] |
| 676 | 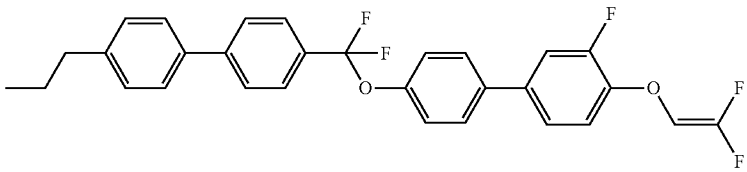 [SMILES: CCCc1ccc(-c2ccc(C(F)(F)Oc3ccc(-c4ccc(OC=C(F)F)c(F)c4)cc3)cc2)cc1] |
| 677 | 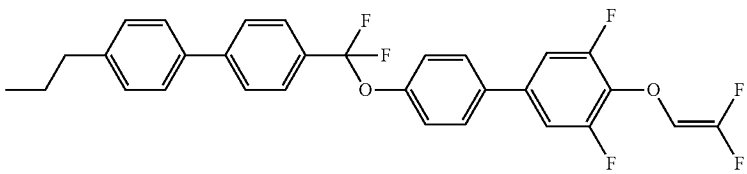 [SMILES: CCCc1ccc(-c2ccc(C(F)(F)Oc3ccc(-c4cc(F)c(OC=C(F)F)c(F)c4)cc3)cc2)cc1] |
| 678 | 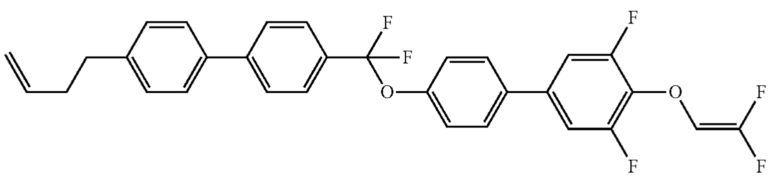 [SMILES: C=CCCc1ccc(-c2ccc(C(F)(F)Oc3ccc(-c4cc(F)c(OC=C(F)F)c(F)c4)cc3)cc2)cc1] |
| 679 | 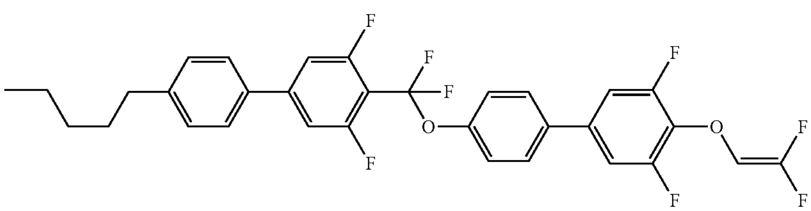 [SMILES: CCCCCc1ccc(-c2cc(F)c(C(F)(F)Oc3ccc(-c4cc(F)c(OC=C(F)F)c(F)c4)cc3)c(F)c2)cc1] |
| 680 | 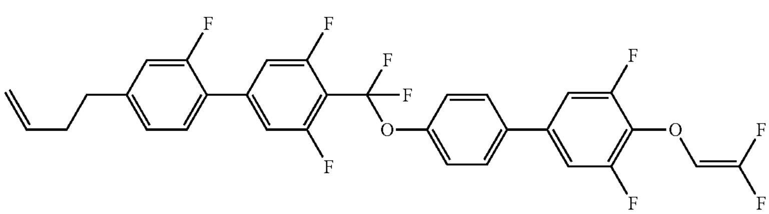 [SMILES: C=CCCc1ccc(-c2cc(F)c(C(F)(F)Oc3ccc(-c4cc(F)c(OC=C(F)F)c(F)c4)cc3)c(F)c2)c(F)c1] |
| 681 | 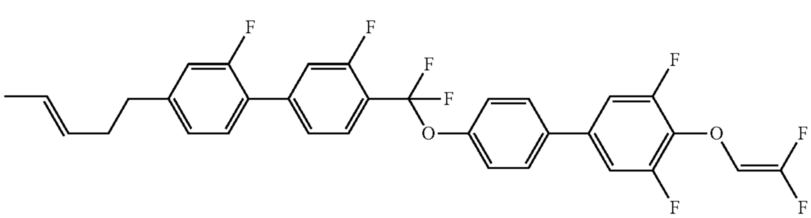 [SMILES: C/C=C/CCc1ccc(-c2ccc(C(F)(F)Oc3ccc(-c4cc(F)c(OC=C(F)F)c(F)c4)cc3)c(F)c2)c(F)c1] |

-continued
Formula 81
| No. | |
|---|---|
| 682 | 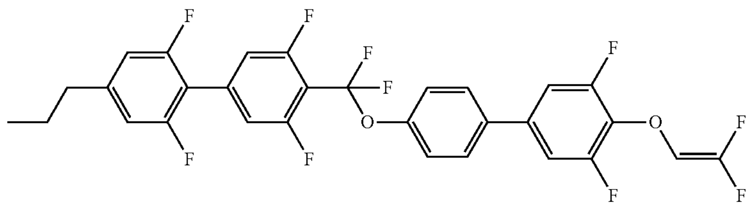 [SMILES: CCCc1cc(F)c(-c2cc(F)c(C(F)(F)Oc3ccc(-c4cc(F)c(OC=C(F)F)c(F)c4)cc3)c(F)c2)c(F)c1] |
| 683 | 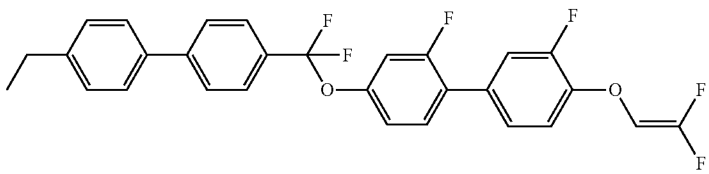 [SMILES: CCc1ccc(-c2ccc(C(F)(F)Oc3ccc(-c4ccc(OC=C(F)F)c(F)c4)c(F)c3)cc2)cc1] |
| 684 | 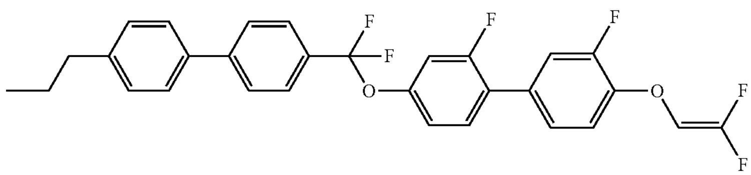 [SMILES: CCCc1ccc(-c2ccc(C(F)(F)Oc3ccc(-c4ccc(OC=C(F)F)c(F)c4)c(F)c3)cc2)cc1] |
| 685 | 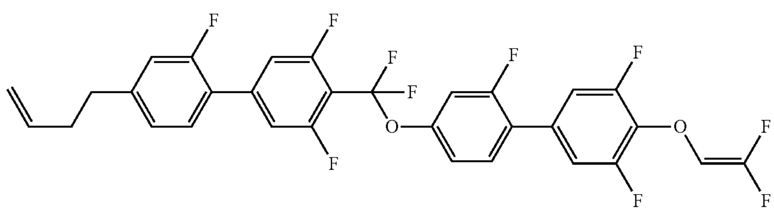 [SMILES: C=CCCc1ccc(-c2cc(F)c(C(F)(F)Oc3ccc(-c4cc(F)c(OC=C(F)F)c(F)c4)c(F)c3)c(F)c2)c(F)c1] |
| 686 | 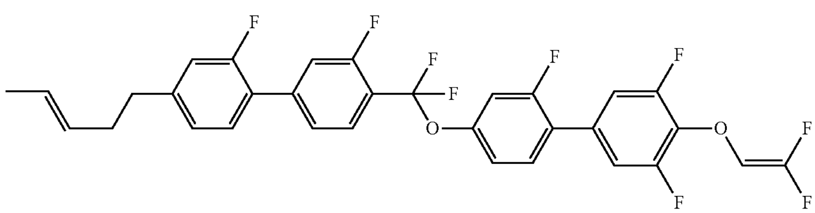 |
| 687 | 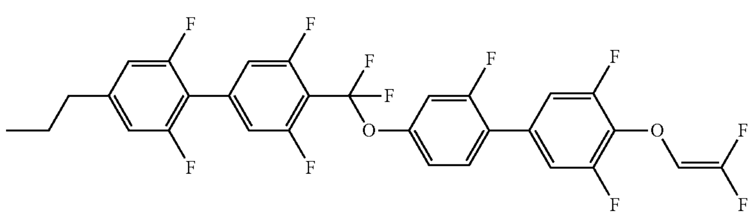 |
| 688 | 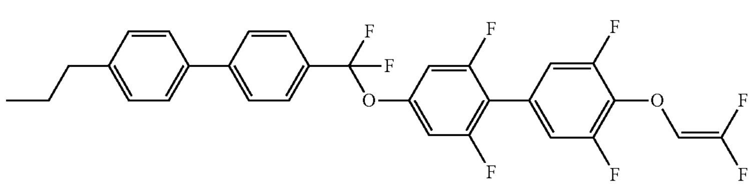 |

-continued
| Formula 81 | |
|---|---|
| No. | |
| 689 | 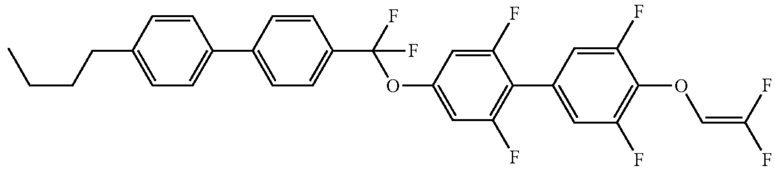 [SMILES: CCCCc1ccc(-c2ccc(C(F)(F)Oc3cc(F)c(-c4cc(F)c(OC=C(F)F)c(F)c4)c(F)c3)cc2)cc1] |
| 690 | 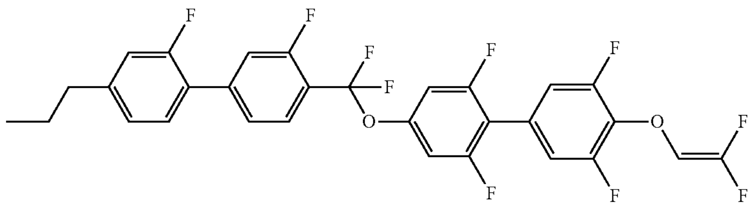 [SMILES: CCCc1ccc(-c2ccc(C(F)(F)Oc3cc(F)c(-c4cc(F)c(OC=C(F)F)c(F)c4)c(F)c3)c(F)c2)c(F)c1] |
| 691 | 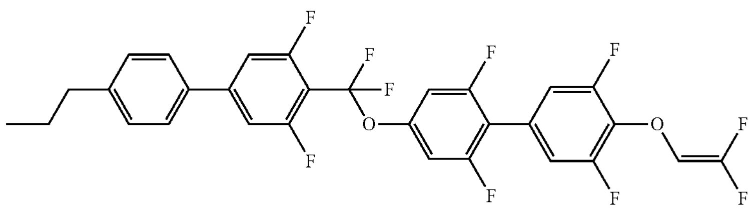 [SMILES: CCCc1ccc(-c2cc(F)c(C(F)(F)Oc3cc(F)c(-c4cc(F)c(OC=C(F)F)c(F)c4)c(F)c3)c(F)c2)cc1] |
| 692 | 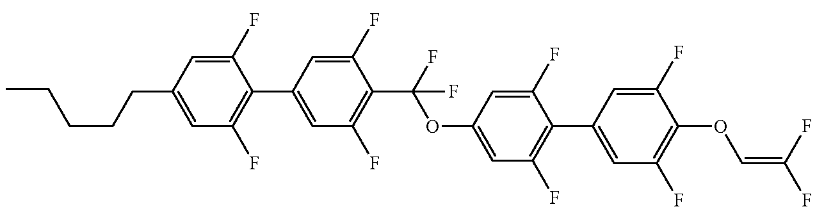 [SMILES: CCCCCc1cc(F)c(-c2cc(F)c(C(F)(F)Oc3cc(F)c(-c4cc(F)c(OC=C(F)F)c(F)c4)c(F)c3)c(F)c2)c(F)c1] |
| 693 | 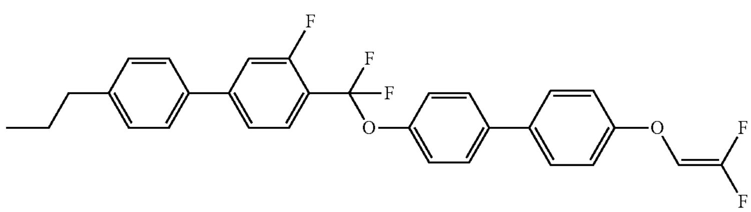 [SMILES: CCCc1ccc(-c2ccc(C(F)(F)Oc3ccc(-c4ccc(OC=C(F)F)cc4)cc3)c(F)c2)cc1] |
| 694 | 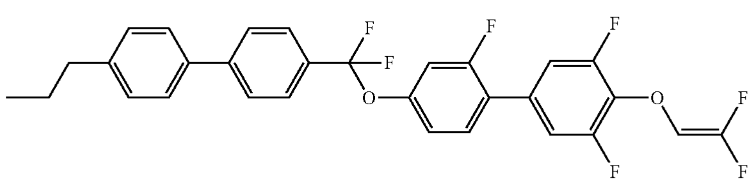<br>C 106.3 SA 153.3 N 181.7 I<br>$T_{NI}$ = 131.7° C., η = 49.2 mPa • S, Δ n = 0.2103, Δ ε = 29.23 |
| 695 | 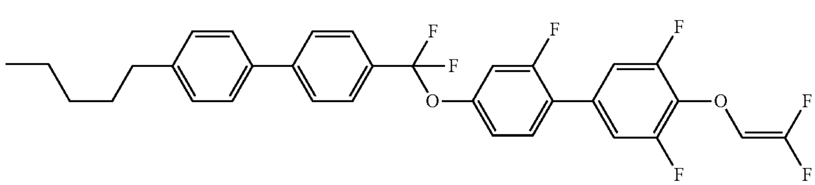 [SMILES: CCCCCc1ccc(-c2ccc(C(F)(F)Oc3ccc(-c4cc(F)c(OC=C(F)F)c(F)c4)c(F)c3)cc2)cc1] |

-continued

| Formula 81 | |
|---|---|
| No. | |
| 696 | 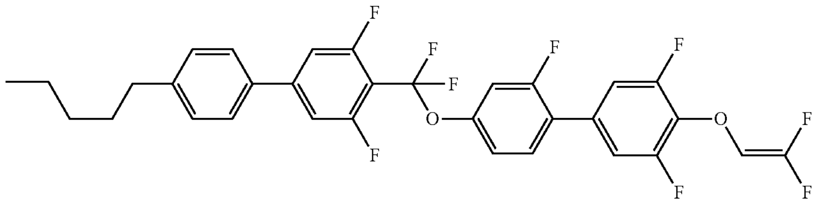 [SMILES: CCCCCc1ccc(-c2cc(F)c(C(F)(F)Oc3ccc(-c4cc(F)c(OC=C(F)F)c(F)c4)c(F)c3)c(F)c2)cc1] |

Comparative Example 1

As a comparative compound, compound (A) was prepared in a manner similar to the operations in Example 1. The compound corresponds to compound (S-3) described in DE 19531165 A (Patent literature No. 10).

Formula 82

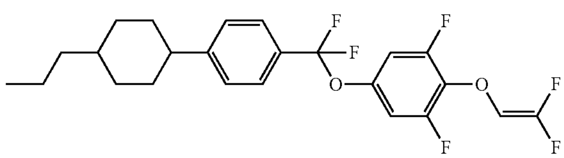

(A)

Physical properties of comparative compound (A) were as described below.

Transition temperature: $T_{NI}$=41.7° C.

TABLE 1

| Physical properties of compound (No. 13) and comparative compound (A) | |
|---|---|
| | Compound (No. 13)<br>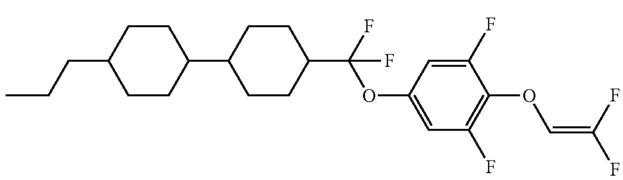 |
| Maximum temperature ($T_{NI}$) | 105.7° C. |
| | Comparative compound (A)<br>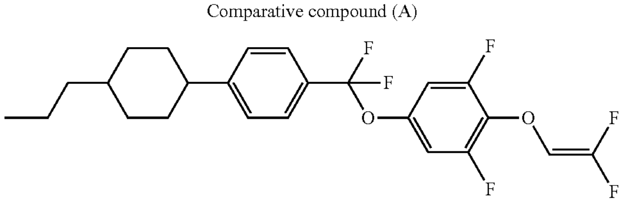 [SMILES: CCCC1CCC(c2ccc(C(F)(F)Oc3cc(F)c(OC=C(F)F)c(F)c3)cc2)CC1] |
| Maximum temperature ($T_{NI}$) | 41.7° C. |

Physical properties of compound (No. 13) obtained in Example 1 and comparative compound (A) were summarized in Table 1. Table 1 represents that compound (No. 13) is superior to comparative compound (A) in view of a higher maximum temperature.

1-2. Examples of Composition (1)

Liquid crystal composition (1) of the invention will be explained in detail by way of Examples. The invention is not limited by the Examples described below. Compounds in Examples are described using symbols based on definitions in Table 2 below. In Table 2, a configuration of 1,4-cyclohexylene is trans. In Examples, a parenthesized number next to a symbolized compound corresponds to the number of the compound. A symbol (–) means any other liquid crystal compound. A ratio (percentage) of the liquid crystal compounds is expressed in terms of weight percent (% by weight) based on the total weight of the liquid crystal composition. Values of physical properties of the composition were summarized in a last part. Physical properties were measured according to the methods described above, and measured values were described as were without extrapolation of the measured values.

TABLE 2

| Table Method for Description of Compounds using Symbols $R—(A_1)—Z_1— . . . —Z_n—(A_n)—R'$ | |
|---|---|
| 1) Left-terminal Group R— | Symbol |
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| 2). Right-terminal Group —R' | Symbol |
| —$C_nH_{2n+1}$ | -n |
| —$OC_nH_{2n+1}$ | —On |
| —$COOCH_3$ | —EMe |
| —CH=$CH_2$ | —V |
| —CH=CH—$C_nH_{2n+1}$ | —Vn |
| —$C_nH_{2n}$—CH=$CH_2$ | —nV |
| —$C_mH_{2m}$—CH=CH—CnH2n + 1 | —mVn |
| —CH=$CF_2$ | —VFF |
| —OCH=$CF_2$ | —OVFF |
| —F | —F |
| —Cl | —CL |
| —$OCF_3$ | —OCF3 |
| —$OCF_2H$ | —OCF2H |
| —$CF_3$ | —CF3 |
| —CN | —C |
| 3). Bonding Group —$Z_n$— | Symbol |
| —$C_nH_{2n}$— | n |
| —COO— | E |
| —CH=CH— | V |
| —$CH_2O$— | 1O |
| —$OCH_2$— | O1 |
| —$CF_2O$— | X |
| —C≡C— | T |
| 4) Ring Structure —$A_n$— | Symbol |
| 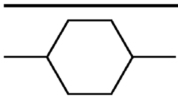 | H |
| 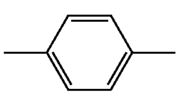 | B |
| 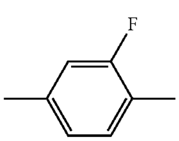 | B(F) |
| 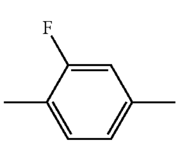 | B(2F) |
| 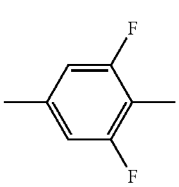 | B(F,F) |

TABLE 2-continued

| Table Method for Description of Compounds using Symbols $R—(A_1)—Z_1— . . . —Z_n—(A_n)—R'$ | |
|---|---|
| 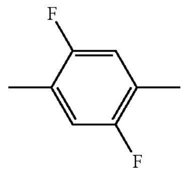 | B(2F,5F) |
| 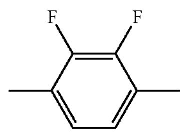 | B(2F,3F) |
| 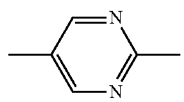 | Py |
| 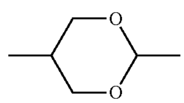 | G |
| 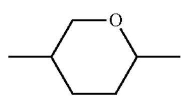 | dh |
| 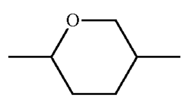 | Dh |
| 5) Examples of Description | |
| Example 1 3-HHXB(F,F)—OVFF | |
| 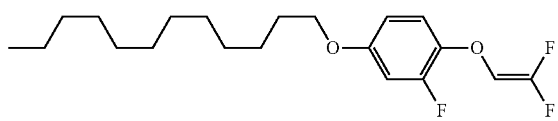 | |
| Example 1 3-HHXB(F,F)—OVFF | |
| Example 2 3-BB(F)B(F,F)XB(F,F)—OVFF | |
| 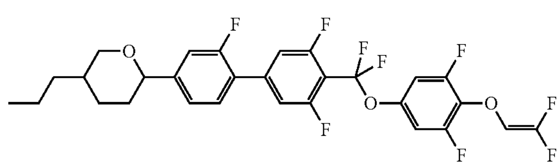 | |
| Example 3 3-HHB—CL | |
| 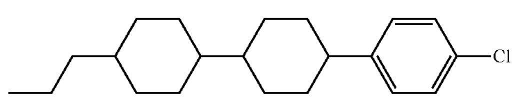 | |
| Example 4 1V2-BEB(F)—C | |
| 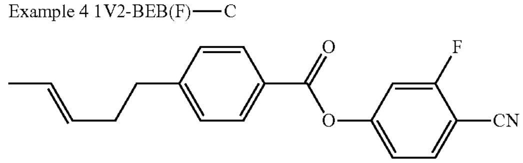 | |

Example 15

Use Example 1

TABLE 3

| | | |
|---|---|---|
| 3-HHXB(F,F)-OVFF | (No. 13) | 6% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 5-HHBB(F,F)-F | (4-6) | 3% |
| 3-HH2BB(F,F)-F | (4-15) | 3% |

NI = 110.4° C.;
Δn = 0.088;
Δϵ = 4.1;
η = 16.1 mPa · s.

Example 16

Use Example 2

TABLE 4

| | | |
|---|---|---|
| 3-dhB(F)B(F,F)XB(F,F)-OVFF | (No. 205) | 7% |
| 3-HHB(F,F)-F | (3-2) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 18% |
| 5-HBB(F,F)-F | (3-24) | 16% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-4 | (14-1) | 4% |
| 1O1-HBBH-5 | (14-1) | 4% |

NI = 100.7° C.;
Δn = 0.118;
Δϵ = 10.8;
η = 36.2 mPa · s.

Example 17

Use Example 3

TABLE 5

| | | |
|---|---|---|
| 3-HHXB(F,F)-OVFF | (No. 13) | 7% |
| 5-HB-F | (2-2) | 9% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCF2H | (3-3) | 4% |
| 3-HHB(F,F)-OCF3 | (3-3) | 5% |
| 3-HH2B(F)-F | (3-5) | 3% |
| 3-HBB(F)-F | (3-23) | 8% |
| 5-HBB(F)-F | (3-23) | 8% |
| 5-HBBH-3 | (14-1) | 3% |
| 3-HB(F)BH-3 | (14-2) | 3% |

NI = 90.3° C.;
Δn = 0.093;
Δϵ = 5.3;
η = 15.8 mPa · s.

A pitch when adding 0.25 part of (Op-05) was added to 100 parts of the composition was 59.8 micrometers.

Example 18

Use Example 4

TABLE 6

| | | |
|---|---|---|
| 3-dhB(F)B(F,F)XB(F,F)-OVFF | (No. 205) | 8% |
| 5-HB-CL | (2-2) | 8% |
| 3-HH-4 | (12-1) | 8% |
| 3-HHB-1 | (13-1) | 2% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 8% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

NI = 81.1° C.;
Δn = 0.108;
Δϵ = 11.2;
η = 25.5 mPa · s.

Example 19

Use Example 5

TABLE 7

| | | |
|---|---|---|
| 3-HHXB(F,F)-OVFF | (No. 13) | 8% |
| 3-HB-CL | (2-2) | 3% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 5% |
| 3-HBEB(F,F)-F | (3-39) | 5% |

NI = 74.2° C.;
Δn = 0.096;
Δϵ = 9.0;
η = 26.1 mPa · s.

Example 20

Use Example 6

TABLE 8

| | | |
|---|---|---|
| 3-dhB(F)B(F,F)XB(F,F)-OVFF | (No. 205) | 6% |
| 5-HB-CL | (2-2) | 14% |
| 7-HB(F,F)-F | (2-4) | 3% |
| 3-HH-4 | (12-1) | 10% |
| 3-HH-5 | (12-1) | 5% |
| 3-HB-O2 | (12-5) | 12% |
| 3-HHB-1 | (13-1) | 8% |
| 3-HHB-O1 | (13-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

NI = 76.1° C.;
Δn = 0.078;
Δϵ = 4.8;
η = 17.3 mPa · s.

Example 21

Use Example 7

TABLE 9

| | | |
|---|---|---|
| 3-HHXB(F,F)-OVFF | (No. 13) | 7% |
| 5-HB-CL | (2-2) | 3% |
| 7-HB(F)-F | (2-3) | 7% |
| 3-HH-4 | (12-1) | 9% |
| 3-HH-EMe | (12-2) | 23% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 4-HGB(F,F)-F | (3-103) | 3% |
| 5-HGB(F,F)-F | (3-103) | 6% |
| 3-H2GB(F,F)-F | (3-106) | 5% |
| 5-GHB(F,F)-F | (3-109) | 6% |

NI = 84.6° C.;
Δn = 0.067;
Δϵ = 5.7;
η = 18.6 mPa · s.

Example 22

Use Example 8

TABLE 10

| | | |
|---|---|---|
| 3-dhB(F)B(F,F)XB(F,F)-OVFF | (No. 205) | 6% |
| 3-HB-O2 | (12-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (14-5) | 7% |
| 5-HBB(F)B-3 | (14-5) | 7% |

NI = 91.0° C.;
Δn = 0.184;
Δϵ = 10.0;
η = 39.6 mPa · s.

Example 23

Use Example 9

TABLE 11

| | | |
|---|---|---|
| 3-HHXB(F,F)-OVFF | (No. 13) | 3% |
| 3-dhB(F)B(F,F)XB(F,F)-OVFF | (No. 251) | 4% |
| 3-HB-C | (5-1) | 5% |
| 3-BEB(F)-C | (5-14) | 4% |
| 1V2-BEB(F)-C | (5-14) | 12% |
| 3-HHB-C | (5-28) | 6% |
| 3-HHB(F)-C | (5-29) | 6% |
| 3-HB-O2 | (12-5) | 11% |
| 2-HH-3 | (12-1) | 11% |
| 3-HH-4 | (12-1) | 10% |
| 3-HHB-1 | (13-1) | 8% |
| 3-HHB-O1 | (13-1) | 4% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 4% |

NI = 105.1° C.;
Δn = 0.132;
Δϵ = 10.7;
η = 21.8 mPa · s.

Example 24

Use Example 10

TABLE 12

| | | |
|---|---|---|
| 3-HHXB(F,F)-OVFF | (No. 13) | 4% |
| 3-dhB(F)B(F,F)XB(F,F)-OVFF | (No. 251) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 7% |
| 5-HHB(2F,3F)-O2 | (7-1) | 13% |
| 3-HHB-1 | (13-1) | 6% |

NI = 78.8° C.;
Δn = 0.085;
Δϵ = −2.3;
η = 33.1 mPa · s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal compound of the invention has a high stability to heat, light and so forth, a high clearing point, a low minimum temperature of a liquid crystal phase, a small viscosity, a suitable optical anisotropy, a large dielectric anisotropy, a suitable elastic constant and an excellent solubility in other liquid crystal compounds. A liquid crystal composition of the invention contains the compound, and has a high maximum temperature of a nematic phase, a low minimum temperature of the nematic phase, a small viscosity, a suitable optical anisotropy, a large dielectric anisotropy and a suitable elastic constant. The composition has a suitable balance regarding at least two of physical properties. A liquid crystal display device of the invention includes the composition, and has a wide temperature range in which the device can be used, a short response time, a large voltage holding ratio, a large contrast ratio and a long service life. Accordingly, the device can be widely utilized for a liquid crystal display device to be used for a personal computer, a television and so forth.

What is claimed is:

1. A compound represented by formula (1):

(1)

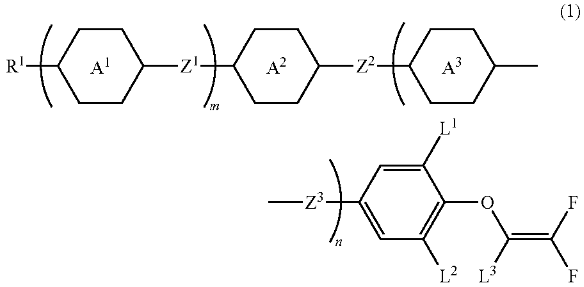

wherein, in the formula, $R^1$ is alkyl having 1 to 20 carbons, and in the alkyl, at least one of —$CH_2$— may be replaced by —O—, and at least one of —$(CH_2)_2$— may be replaced by —CH═CH—;

ring $A^1$ is 1,4-phenylene in which hydrogen may be replaced by halogen, tetrahydropyran-2,5-diyl or 1,3-dioxane-2,5-diyl, ring $A^3$ is 1,4-cyclohexylene, 1,4-cyclohexenylene, 1,4-phenylene in which hydrogen may be replaced by halogen, tetrahydropyran-2,5-diyl or 1,3-dioxane-2,5-diyl, ring $A^2$ is 1,4-phenylene in which at least one hydrogen is replaced by halogen;

$Z^1$ and $Z^3$ are independently a single bond, —$(CH_2)_2$—, —CH═CH—, —$CF_2O$—, —$CH_2O$—, —CF═CF—, —$(CH_2)_2CF_2O$—, —CH═$CHCF_2O$, —$CF_2O(CH_2)_2$—, $CF_2OCH$═CH—, —CH═CH—$(CH_2)_2$— or —$(CH_2)_2$—CH═CH—;

$Z^2$ is —$CF_2O$—;

$L^1$, $L^2$ and $L^3$ are independently hydrogen or halogen;

m is 1 or 2; and n is 0, 1, or 2, and a sum of m and n is 1, 2 or 3, and when m or n is 2 or 3, a plurality of ring $A^1$ or ring $A^3$ may be identical or different, and a plurality of $Z^1$ or $Z^3$ may be identical or different.

2. The compound according to claim 1, wherein $R^1$ is alkyl having 1 to 20 carbons or alkenyl having 2 to 20 carbons;

ring $A^1$, and ring $A^3$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl;

$Z^1$ and $Z^3$ are independently a single bond, —CH═CH— or —$CF_2O$—, and $L^1$, $L^2$ and $L^3$ are independently hydrogen or fluorine.

3. The compound according to claim 1, wherein ring $A^2$ 2-fluoro-1,4-phenylene or 2,6-difluoro-1,4-phenylene.

4. The compound according to claim 1, wherein $Z^1$ is a single bond.

5. The compound according to claim 1, wherein n is 0.

6. A compound represented with any of formula (1-2) to formula (1-4):

(1-2)

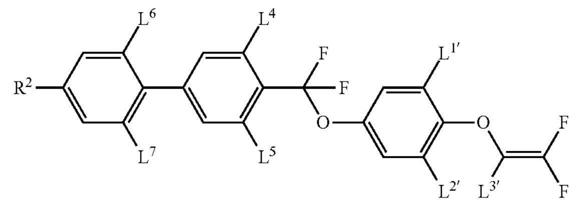

(1-3)

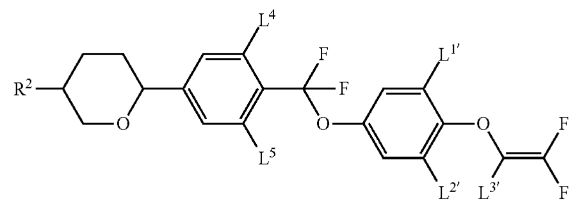

(1-4)

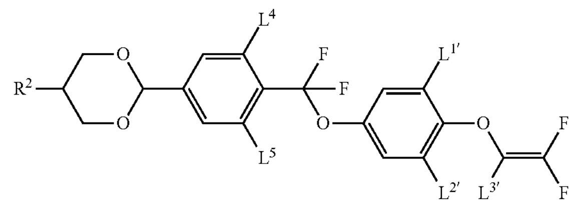

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$ and $L^7$ are independently hydrogen or fluorine.

7. A compound represented by any one of formula (1-8) to formulas (1-11):

(1-8)

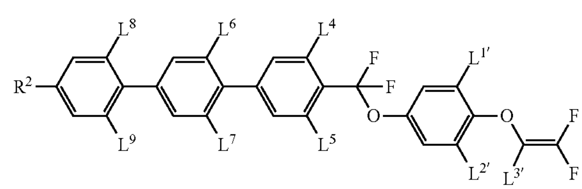

(1-9)

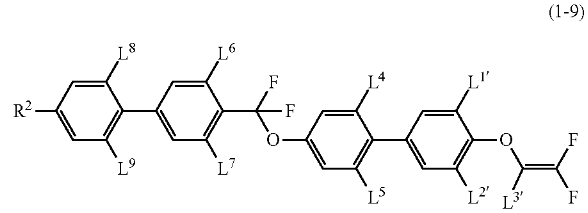

(1-10)

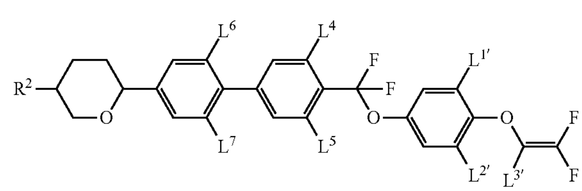

-continued (1-11)

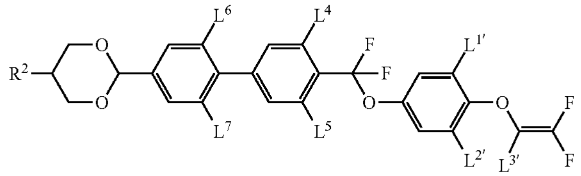

wherein, in the formulas, $R^2$ is alkyl having 1 to 5 carbons, alkenyl having 2 to 6 carbons or alkoxy having 1 to 5 carbons; and $L^{1'}$, $L^{2'}$, $L^{3'}$, $L^4$, $L^5$, $L^6$, $L^7$, $L^8$ and $L^9$ are independently hydrogen or fluorine.

8. A liquid crystal composition containing at least one of the compound according to claim 1.

9. The liquid crystal composition according to claim 8, further containing at least one of compound selected from the group of compounds represented by formulas (2) to (4):

(2)

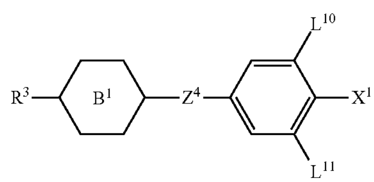

(3)

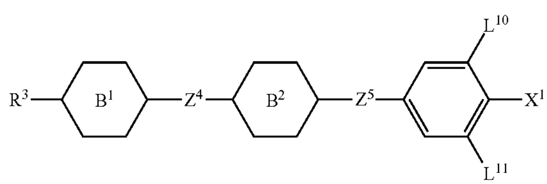

(4)

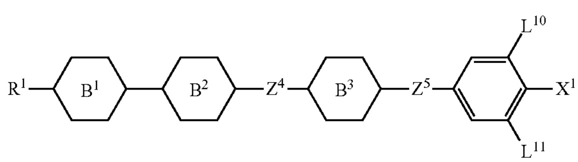

wherein, in the formulas, $R^3$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

$X^1$ is fluorine, chlorine, —$OCF_3$, —$OCF_2H$, —$CF_3$, —$CHF_2$, —CF═$CF_2$, —$OCF_2OCF_2$ or —$OCF_2CHFCF_3$;

ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl;

$Z^4$ and $Z^5$ are independently a single bond, —$(CH_2)_2$—, —CH═CH—, —C≡C—, —COO—, —$CF_2O$—, —$OCF_2$—, —$CH_2O$— or —$(CH_2)_4$—, and $Z^4$ and $Z^5$ are not simultaneously —$CF_2O$— or —$OCF_2$—; and $L^{10}$ and $L^{11}$ independently hydrogen or fluorine.

10. The liquid crystal composition according to claim 8, further containing at least one of compound selected from the group of compounds represented by formula (5):

(5)

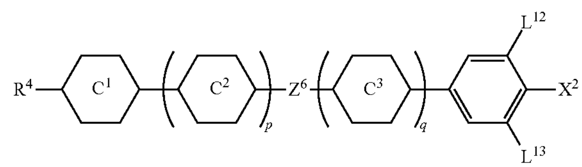

wherein, in the formula, $R^4$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

$X^2$ is —C≡N or —C≡C—C≡N;

ring $C^1$, ring $C^2$ and ring $C^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^6$ is a single bond, —$(CH_2)_2$—, —C≡C—, —COO—, —$CF_2O$—, —$OCF_2$— or —$CH_2O$—;

$L^{12}$ and $L^{13}$ are independently hydrogen or fluorine; and p is 0, 1 or 2, q is 0 or 1, and a sum of p and q is 0, 1, 2 or 3.

11. The liquid crystal composition according to claim 8, further containing at least one of compound selected from the group of compounds represented by formulas (6) to (1):

(6)

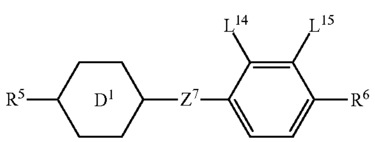

(7)

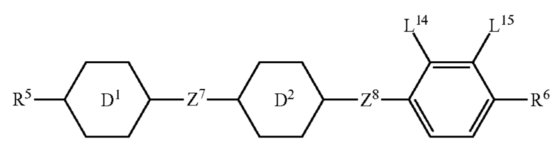

(8)

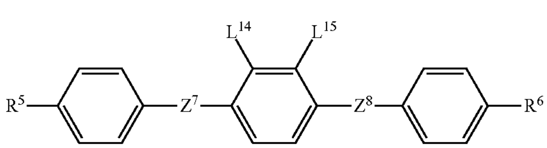

(9)

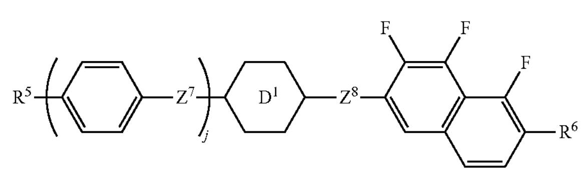

-continued (10)

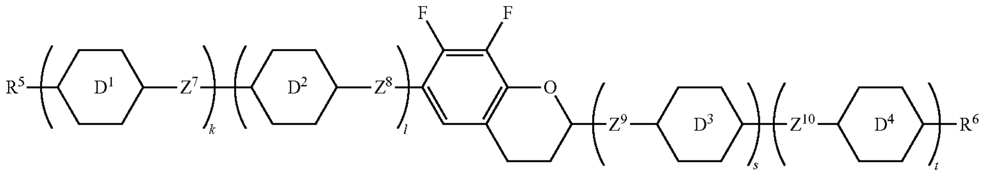

(11)

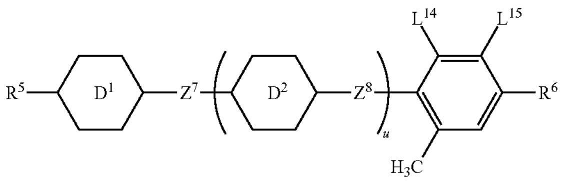

wherein, in the formulas, $R^5$ and $R^6$ are independently, alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydro-2,6-naphthalene;

$Z^7$, $Z^8$, $Z^9$ and $Z^{10}$ are independently a single bond, —$(CH_2)_2$—, —COO—, —$CH_2O$—, —$OCF_2$— or —$OCF_2(CH_2)_2$—;

$L^{14}$ and $L^{15}$ are independently fluorine or chlorine; and j, k, l, s, t and u are independently 0 or 1, and a sum of k, l, s and t is 1 or 2.

12. The liquid crystal composition according to claim 8, further containing at least one of compound selected from the group of compounds represented by formulas (12) to (14):

(12)

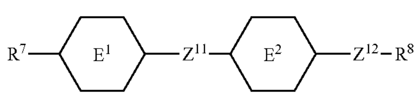

(13)

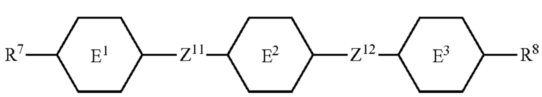

(14)

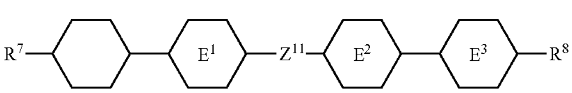

wherein, in the formulas, $R^7$ and $R^8$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene, or pyrimidine-2,5-diyl; and $Z^{11}$ and $Z^{12}$ are independently a single bond, —$(CH_2)_2$—, —CH═CH—, —C≡C— or —COO—.

13. The liquid crystal composition according to claim 8, further containing at least one of compound selected from the group of compounds represented by formulas (12) to (14):

(12)

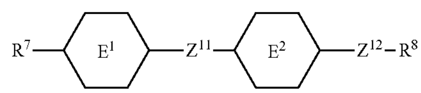

(13)

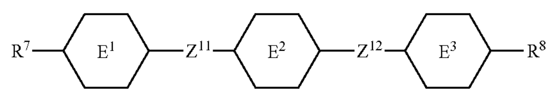

(14)

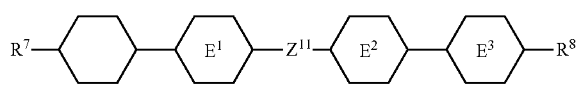

wherein, in the formulas, $R^7$ and $R^8$ are independently alkyl having 1 to 10 carbons or alkenyl having 2 to 10 carbons, and in the alkyl and the alkenyl, at least one of —$CH_2$— may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene, or pyrimidine-2,5-diyl; and $Z^{11}$ and $Z^{12}$ are independently a single bond, —$(CH_2)_2$—, —CH═CH—, —C≡C— or —COO—.

14. The liquid crystal composition according to claim 8, further containing at least one of optically active compound.

15. The liquid crystal composition according to claim 8, further containing at least one of antioxidant and/or ultraviolet light absorber.

16. A liquid crystal display device including the liquid crystal composition according to claim 8.

* * * * *